Jan. 30, 1962        B. L. HAVENS        3,018,957
ELECTRONIC MULTIPLIER-DIVIDER
Filed Nov. 22, 1954        70 Sheets-Sheet 1
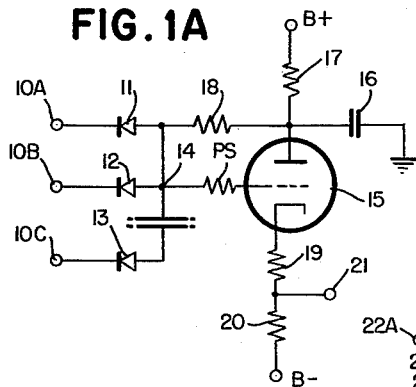
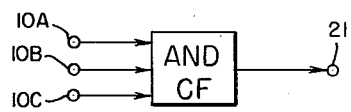
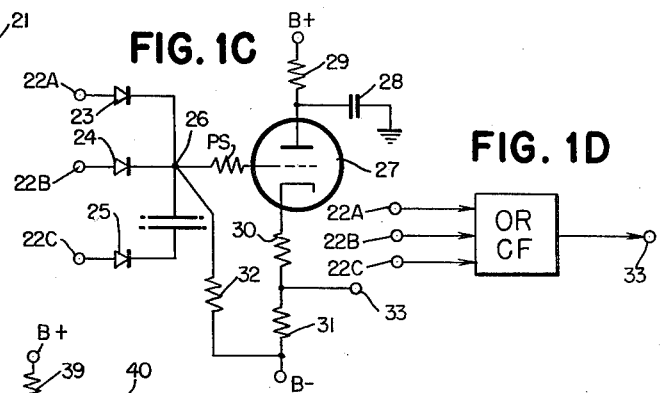
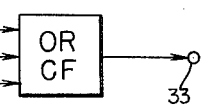
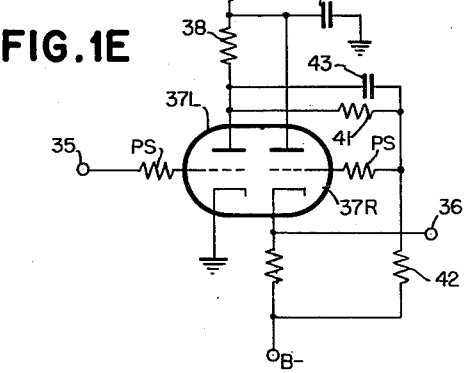
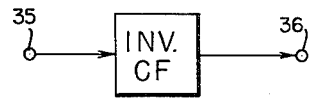
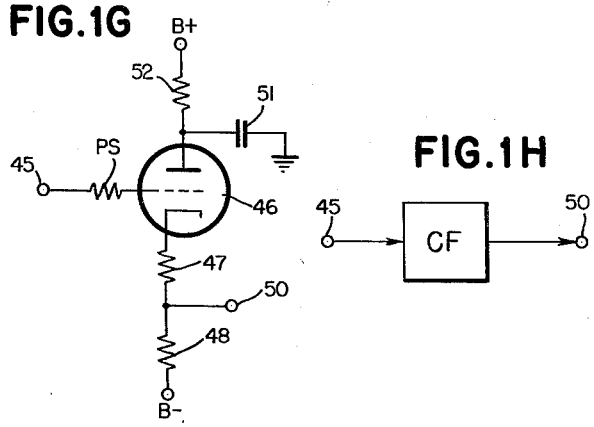
*INVENTOR.*
BYRON L. HAVENS
BY Dwight D. Mooney
ATTORNEY Jan. 30, 1962 B. L. HAVENS 3,018,957
ELECTRONIC MULTIPLIER-DIVIDER
Filed Nov. 22, 1954 70 Sheets-Sheet 2
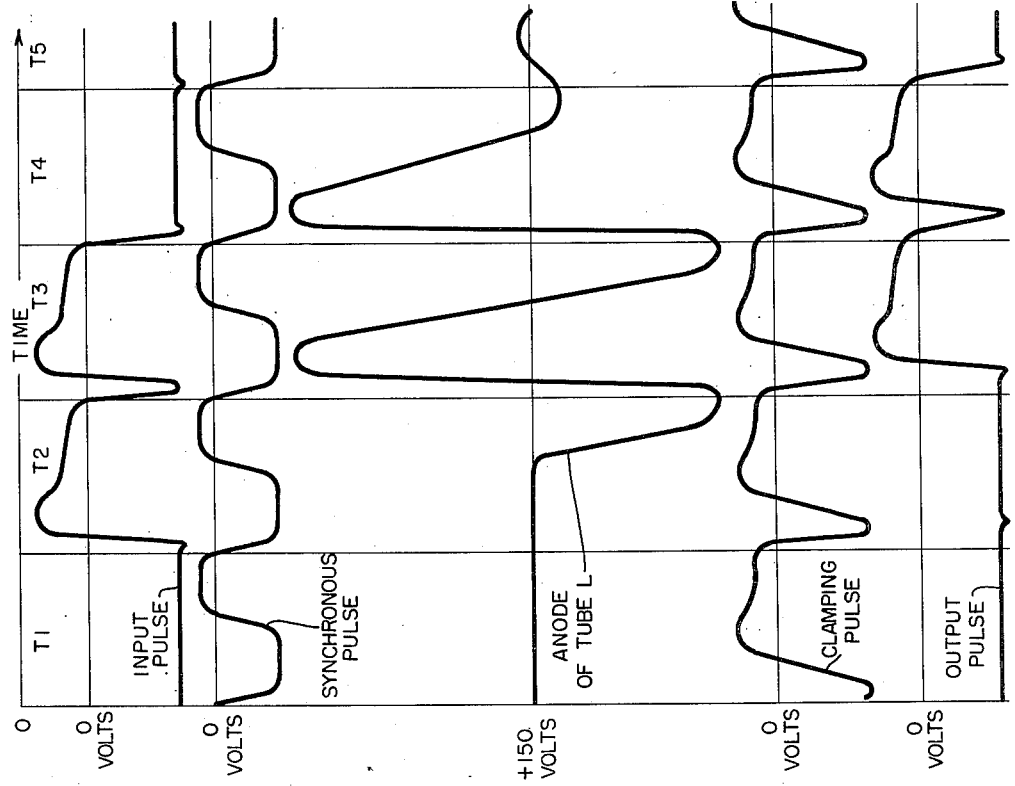
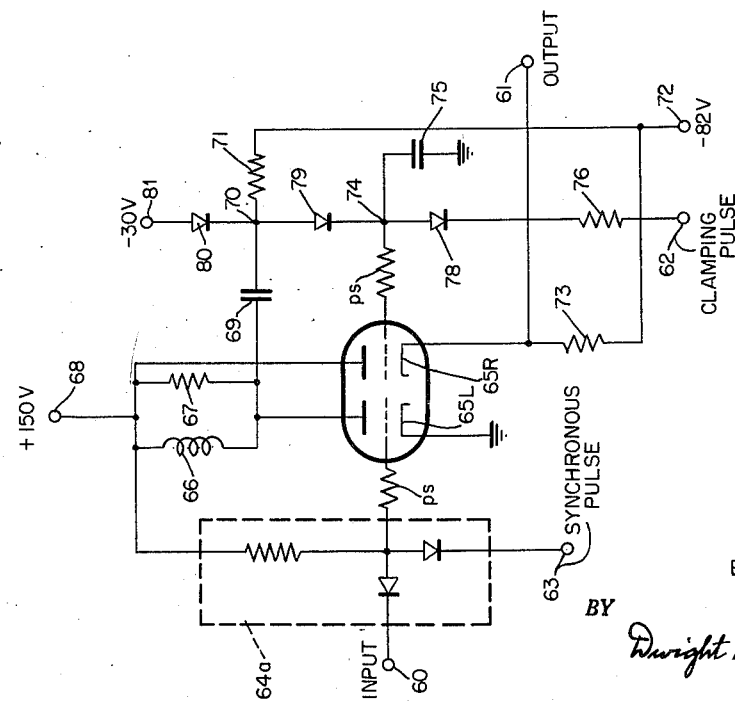
INVENTOR.
BYRON L. HAVENS
BY
Dwight D. Mooney
ATTORNEY

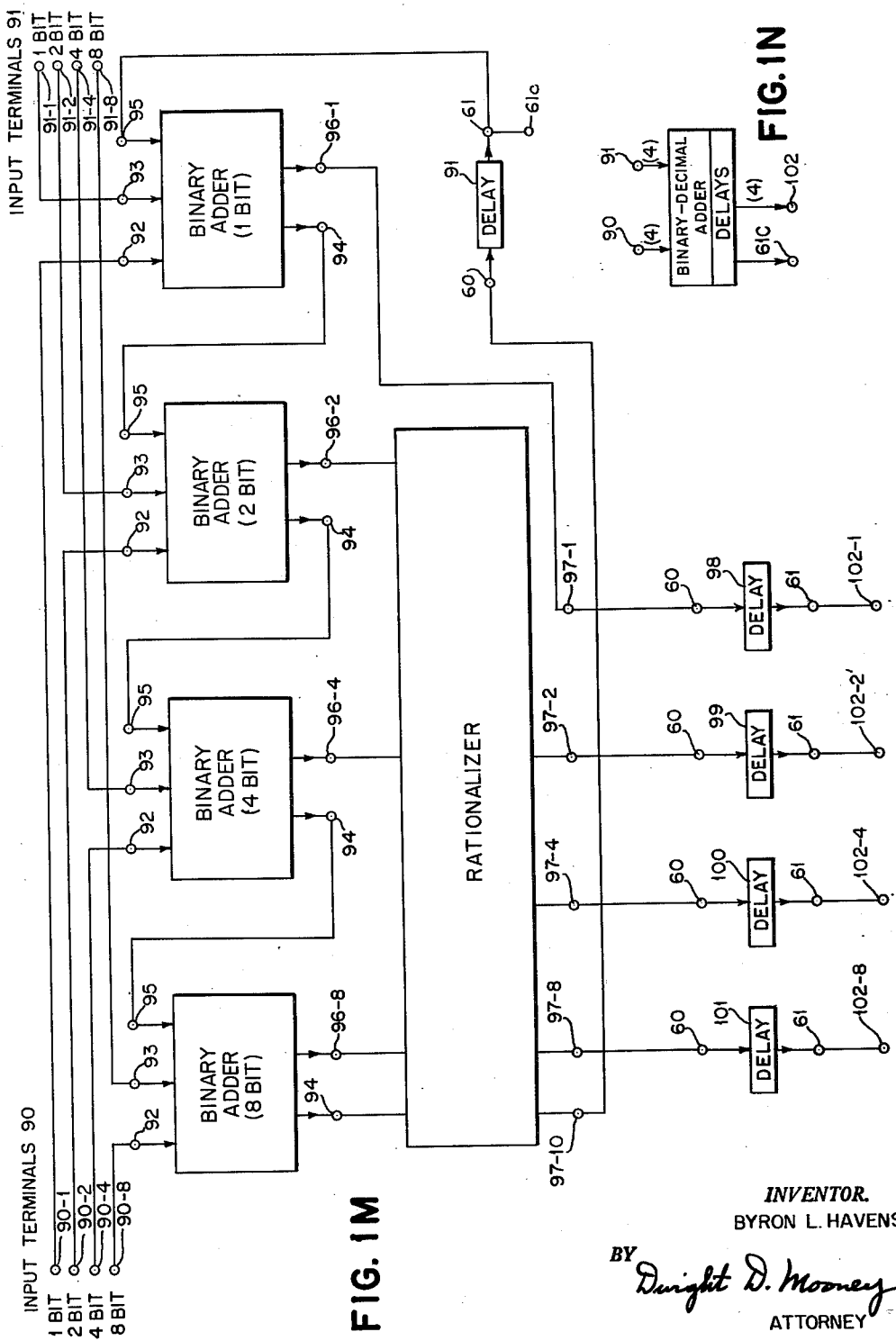

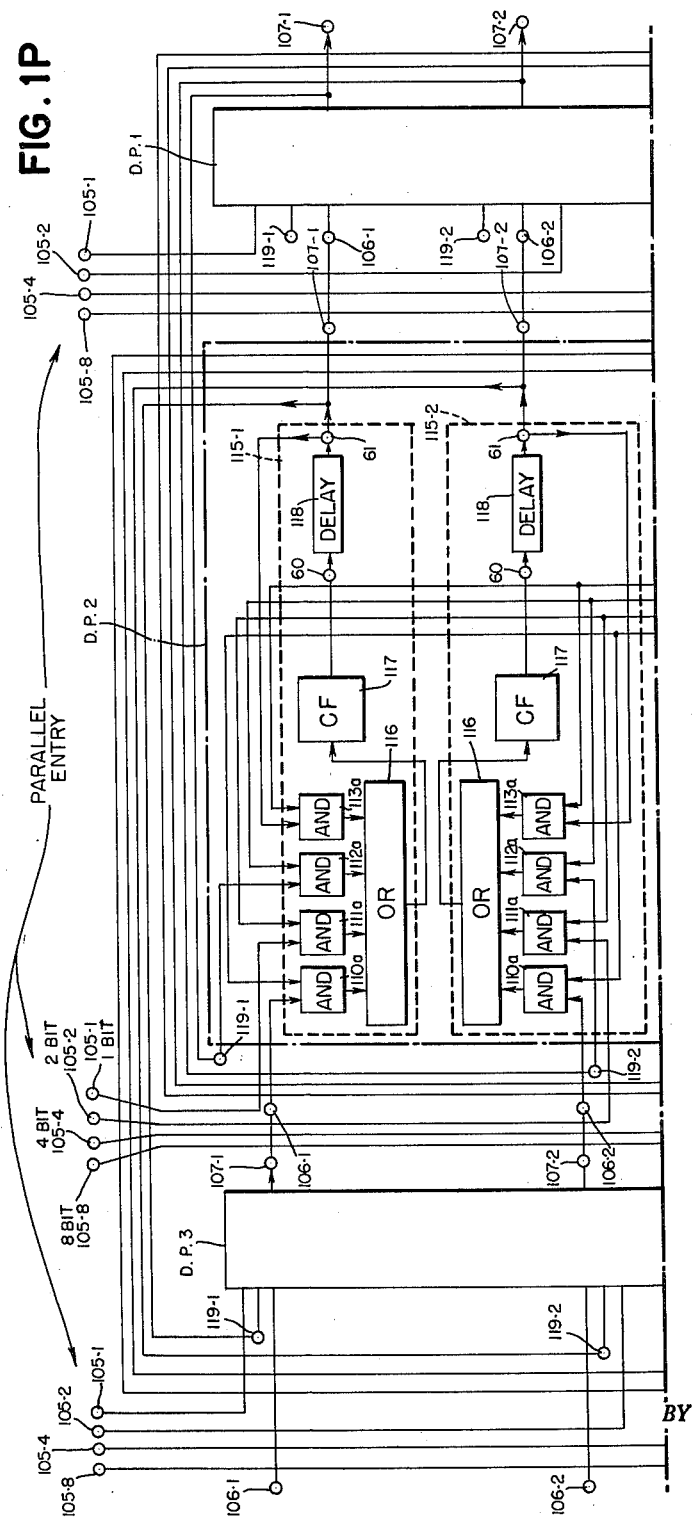

Jan. 30, 1962   B. L. HAVENS   3,018,957
ELECTRONIC MULTIPLIER-DIVIDER
Filed Nov. 22, 1954   70 Sheets-Sheet 5

| FIG. 1P | FIG. 1Q |

INVENTOR.
BYRON L. HAVENS
BY Dwight D. Mooney
ATTORNEY

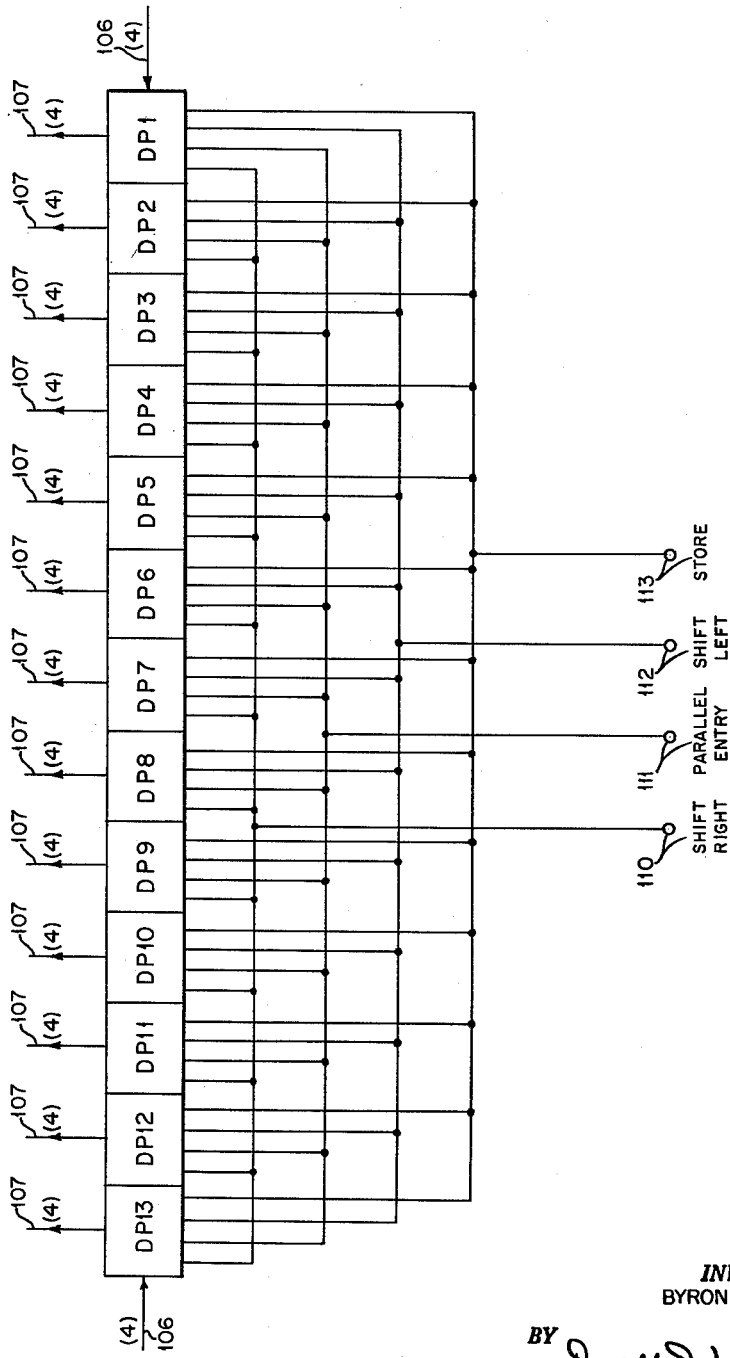

Jan. 30, 1962  B. L. HAVENS  3,018,957
ELECTRONIC MULTIPLIER-DIVIDER
Filed Nov. 22, 1954  70 Sheets-Sheet 7

| FIG. 2 | FIG.4A | FIG.4B | FIG.4C | FIG.4D | FIG.4E | FIG.3 |

*INVENTOR.*
BYRON L. HAVENS

BY Dwight D. Mooney
ATTORNEY

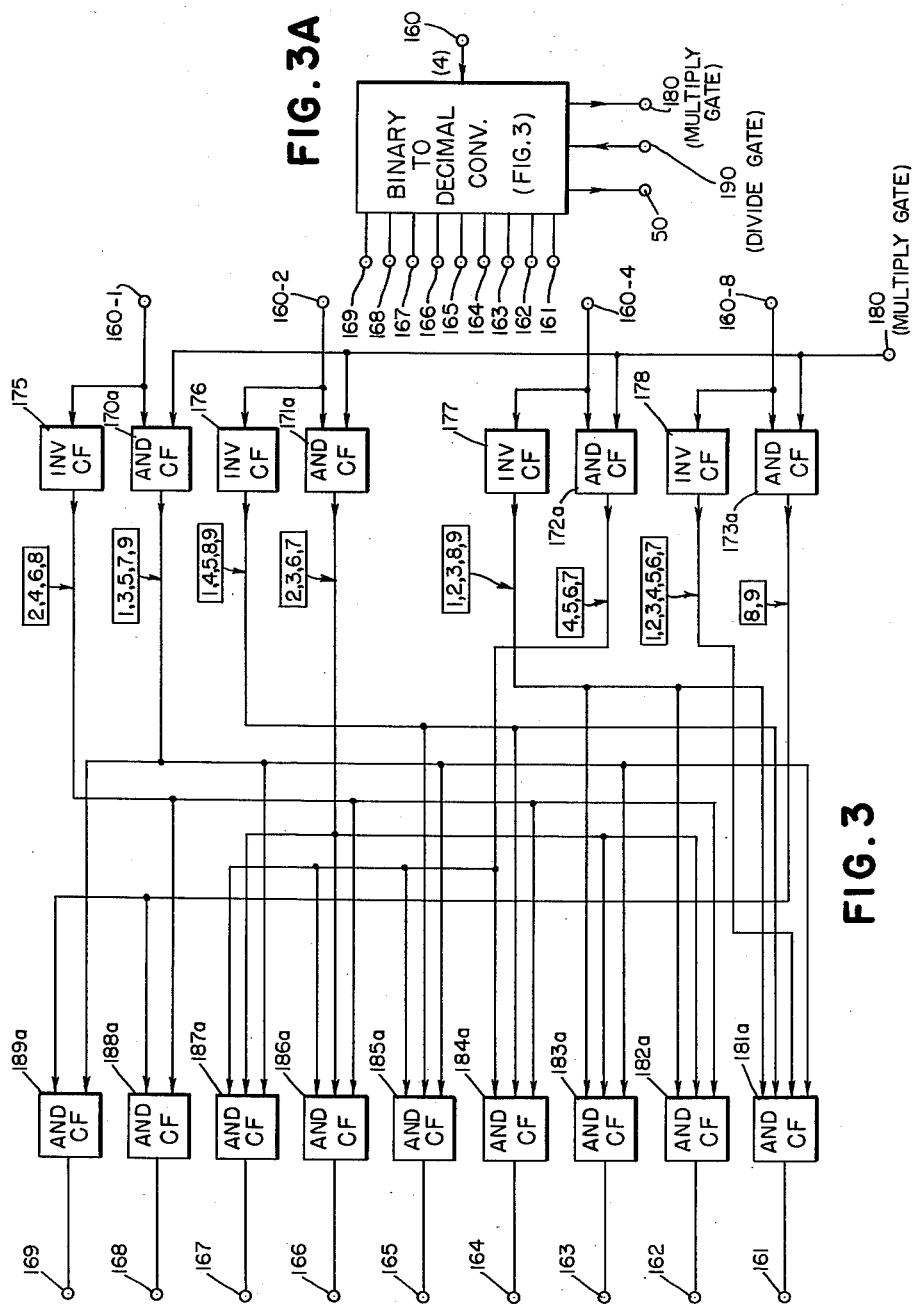

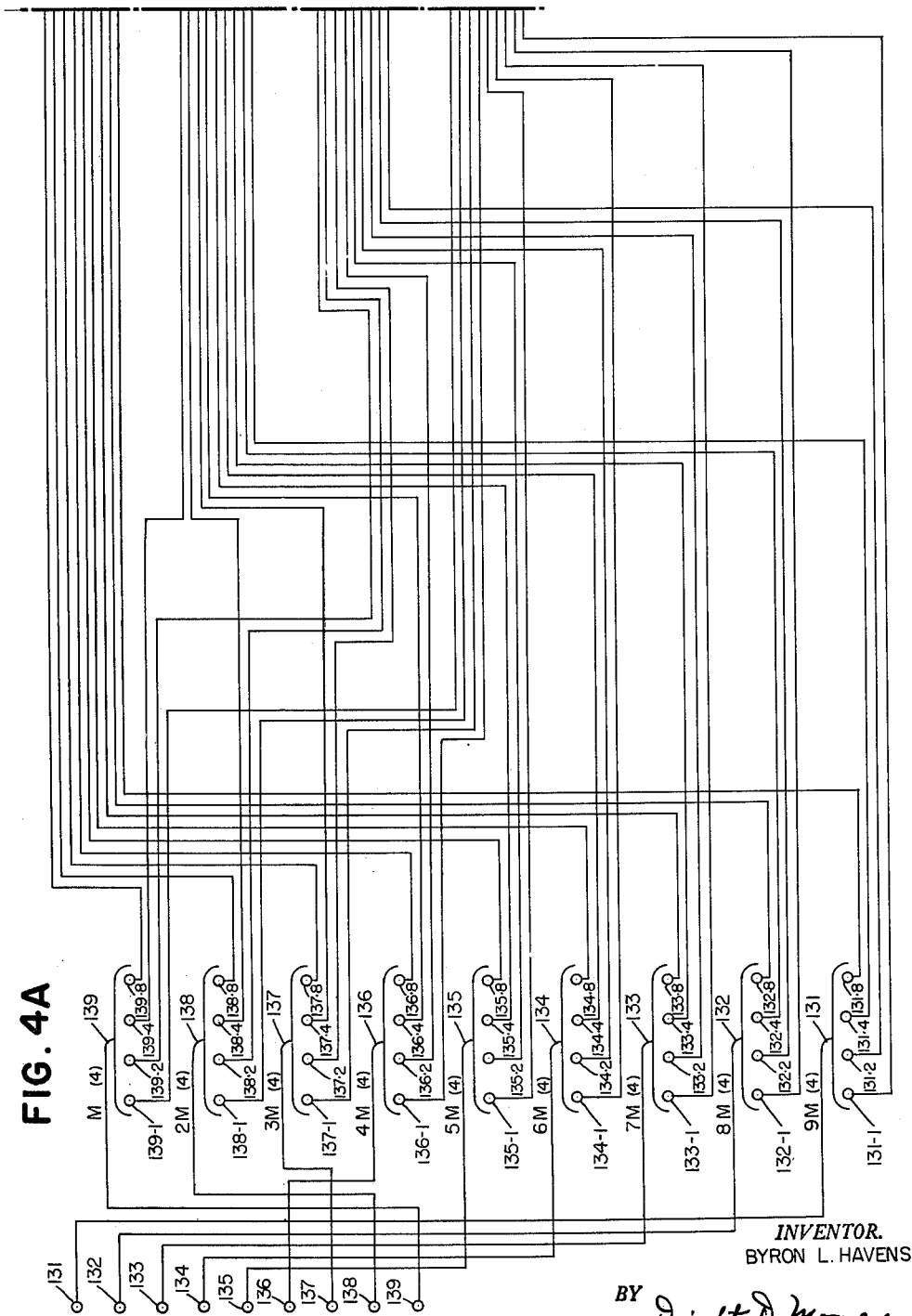

Jan. 30, 1962  B. L. HAVENS  3,018,957
ELECTRONIC MULTIPLIER-DIVIDER
Filed Nov. 22, 1954  70 Sheets-Sheet 10

*INVENTOR.*
BYRON L. HAVENS
BY Dwight D. Mooney
ATTORNEY

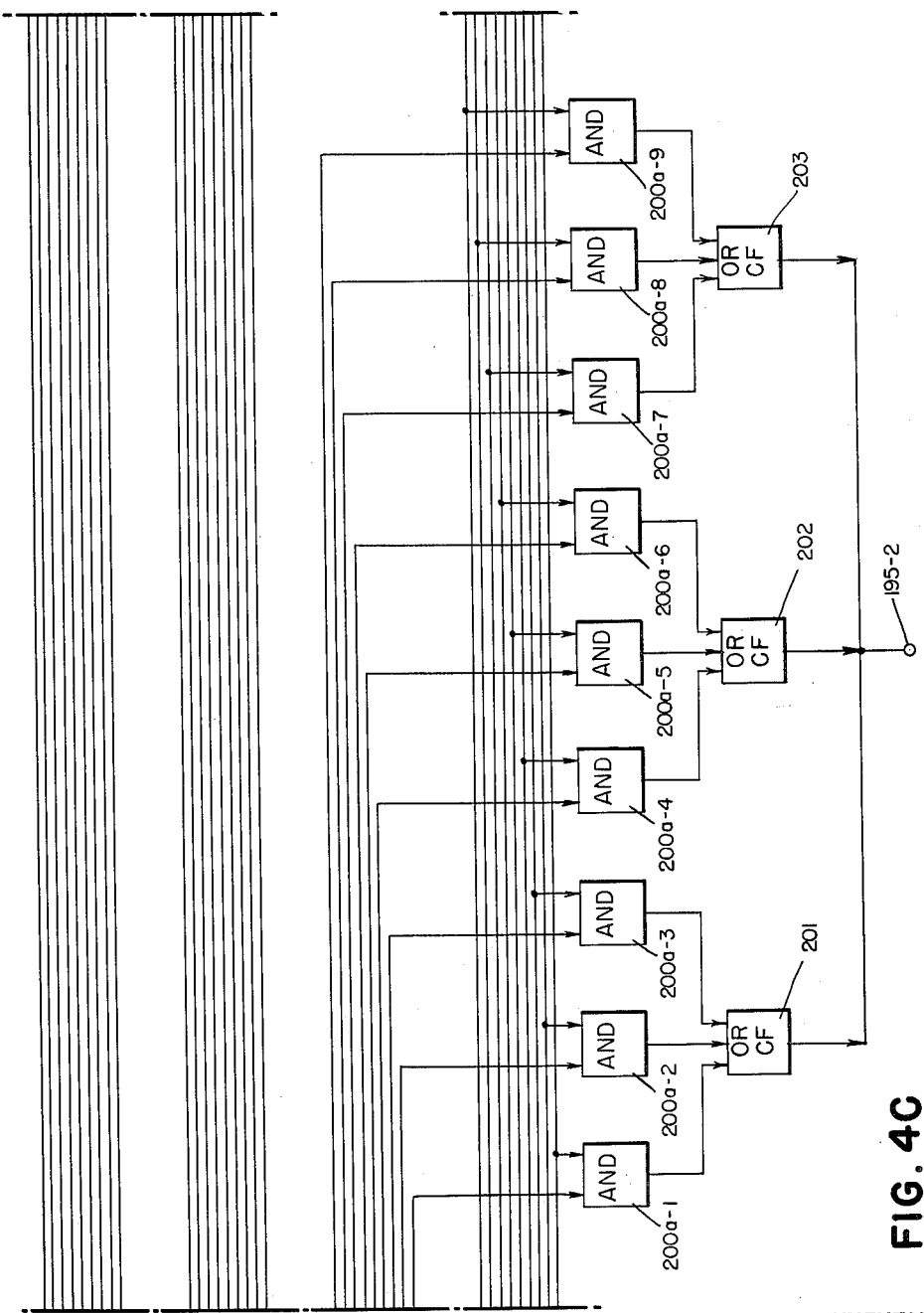

Jan. 30, 1962     B. L. HAVENS     3,018,957
ELECTRONIC MULTIPLIER-DIVIDER
Filed Nov. 22, 1954     70 Sheets-Sheet 12

INVENTOR.
BYRON L. HAVENS
BY Dwight D. Mooney
ATTORNEY

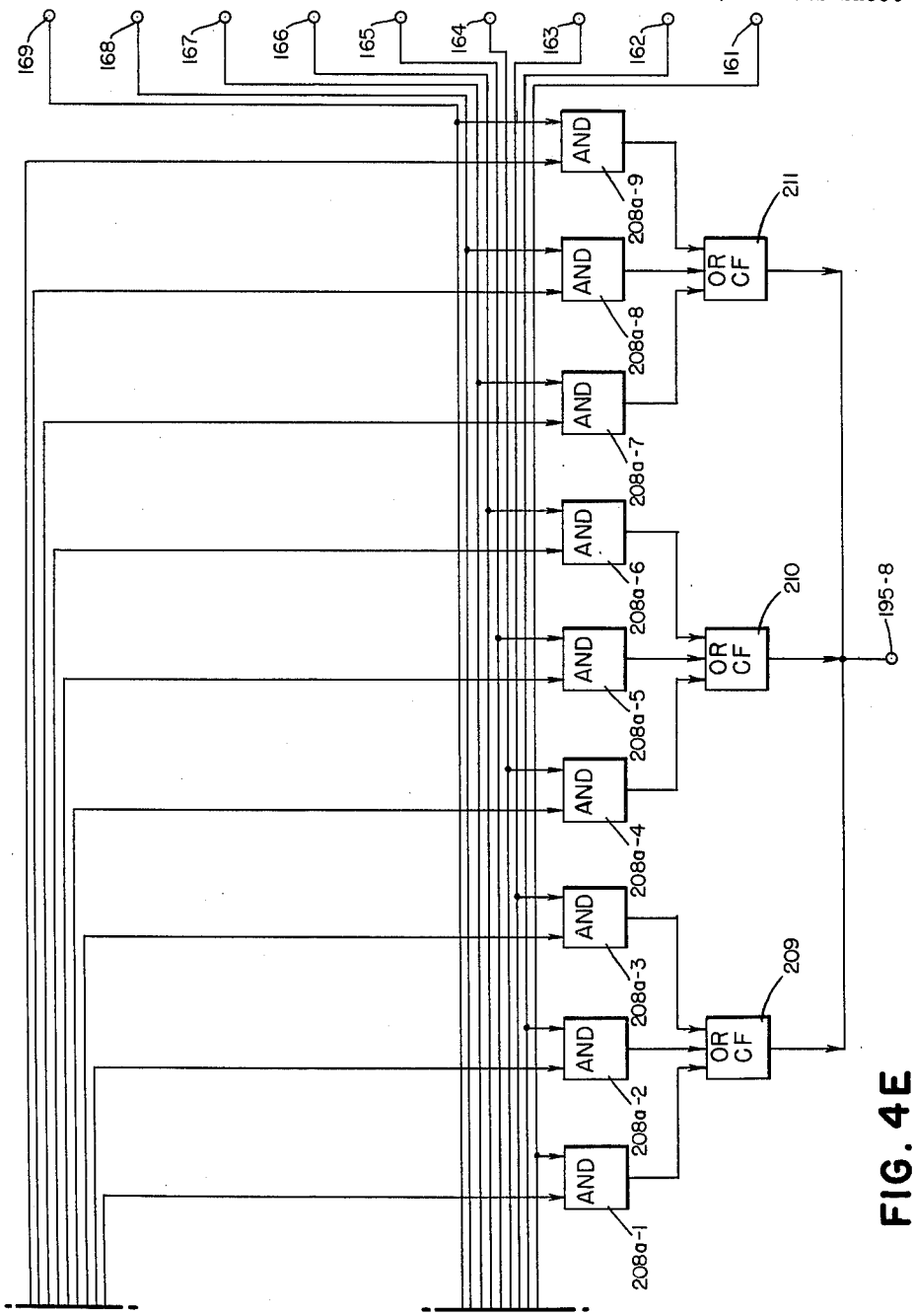

Jan. 30, 1962  B. L. HAVENS  3,018,957
ELECTRONIC MULTIPLIER-DIVIDER
Filed Nov. 22, 1954  70 Sheets-Sheet 15
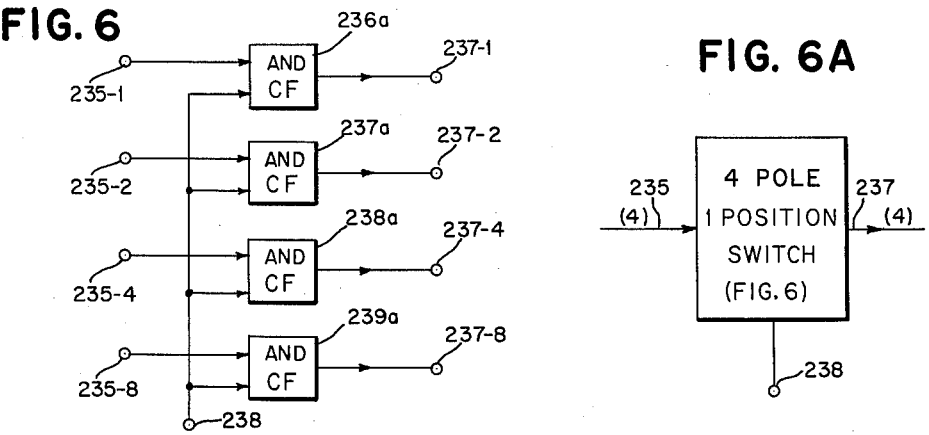
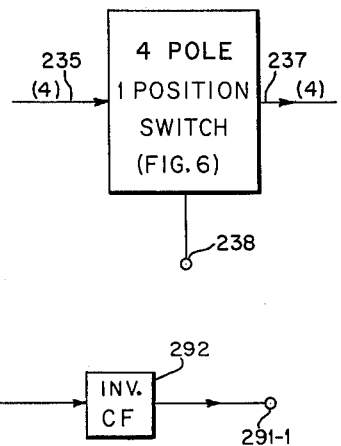
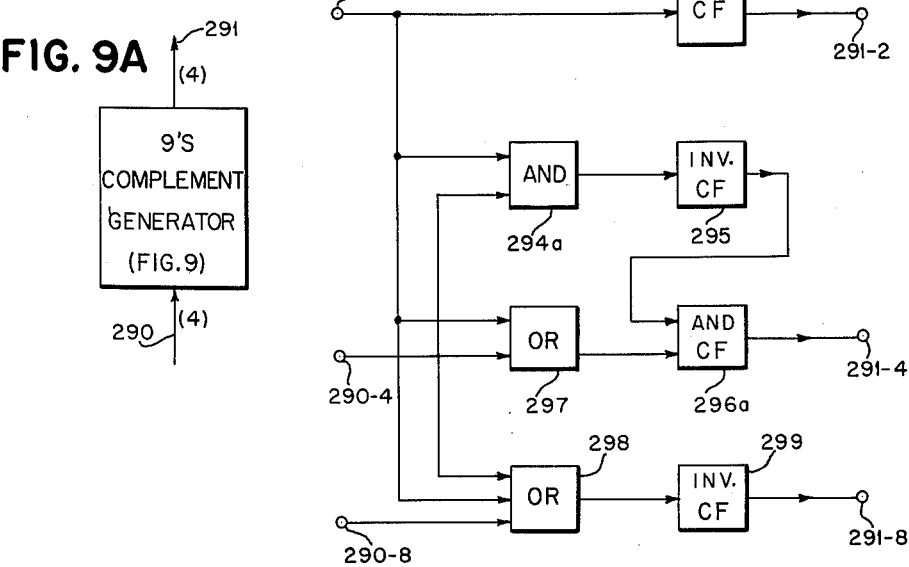
INVENTOR.
BYRON L. HAVENS
BY Dwight D. Mooney
ATTORNEY

INVENTOR.
BYRON L. HAVENS

Jan. 30, 1962   B. L. HAVENS   3,018,957
ELECTRONIC MULTIPLIER-DIVIDER
Filed Nov. 22, 1954   70 Sheets-Sheet 18

| FIG. 10A | FIG. 10B | FIG. 10C |

*INVENTOR.*
BYRON L. HAVENS
BY Dwight D. Mooney
ATTORNEY

INVENTOR.
BYRON L. HAVENS
BY Dwight D. Mooney
ATTORNEY

Jan. 30, 1962  B. L. HAVENS  3,018,957
ELECTRONIC MULTIPLIER-DIVIDER
Filed Nov. 22, 1954  70 Sheets-Sheet 24

*INVENTOR.*
BYRON L. HAVENS
BY
Dwight D. Mooney
ATTORNEY

Jan. 30, 1962   B. L. HAVENS   3,018,957
ELECTRONIC MULTIPLIER-DIVIDER
Filed Nov. 22, 1954   70 Sheets-Sheet 25

INVENTOR.
BYRON L. HAVENS
BY Dwight D. Mooney
ATTORNEY

INVENTOR.
BYRON L. HAVENS
BY Dwight D. Mooney
ATTORNEY

Jan. 30, 1962  B. L. HAVENS  3,018,957
ELECTRONIC MULTIPLIER-DIVIDER
Filed Nov. 22, 1954  70 Sheets-Sheet 27

*INVENTOR.*
BYRON L. HAVENS

BY Dwight D. Mooney
ATTORNEY

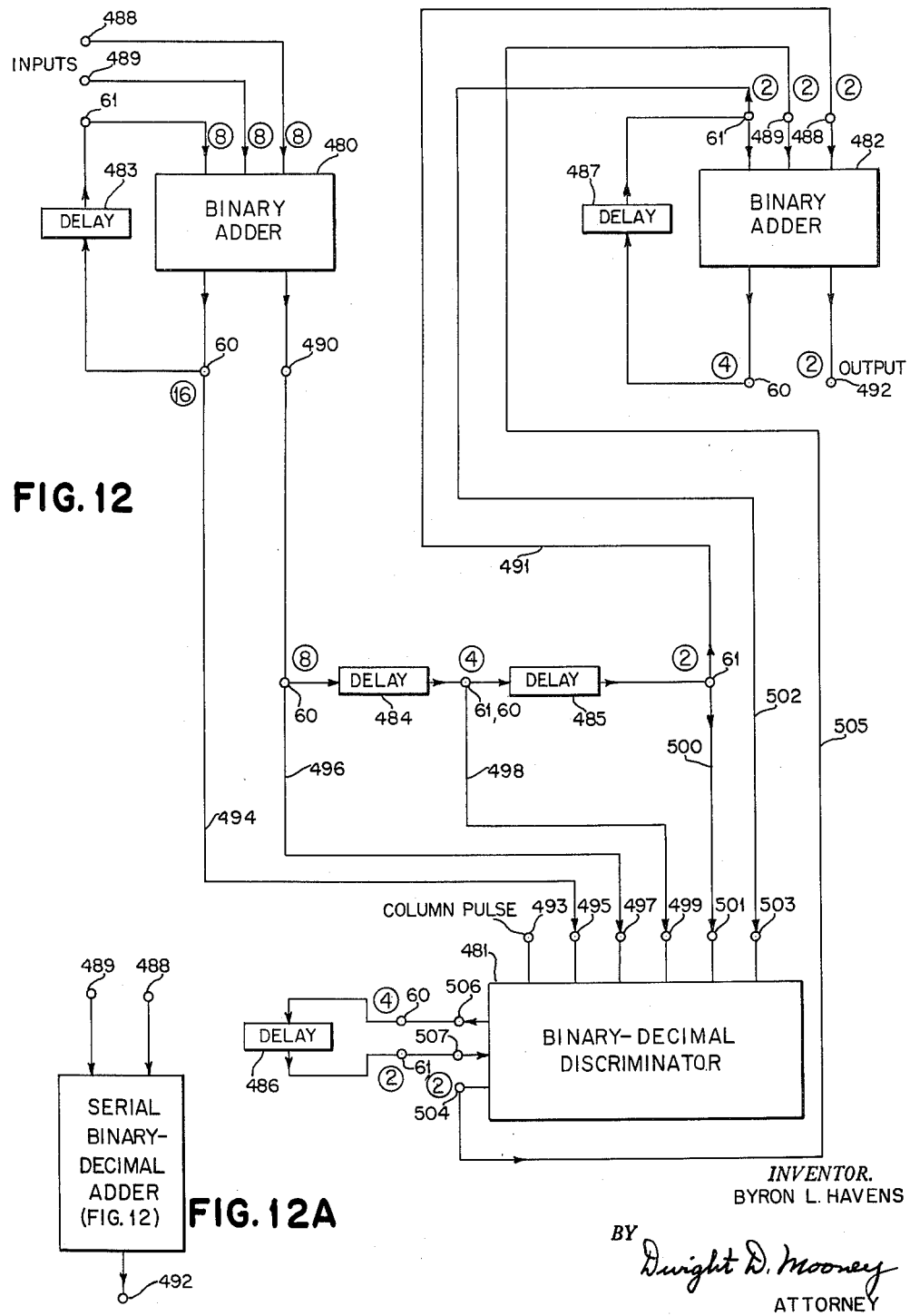

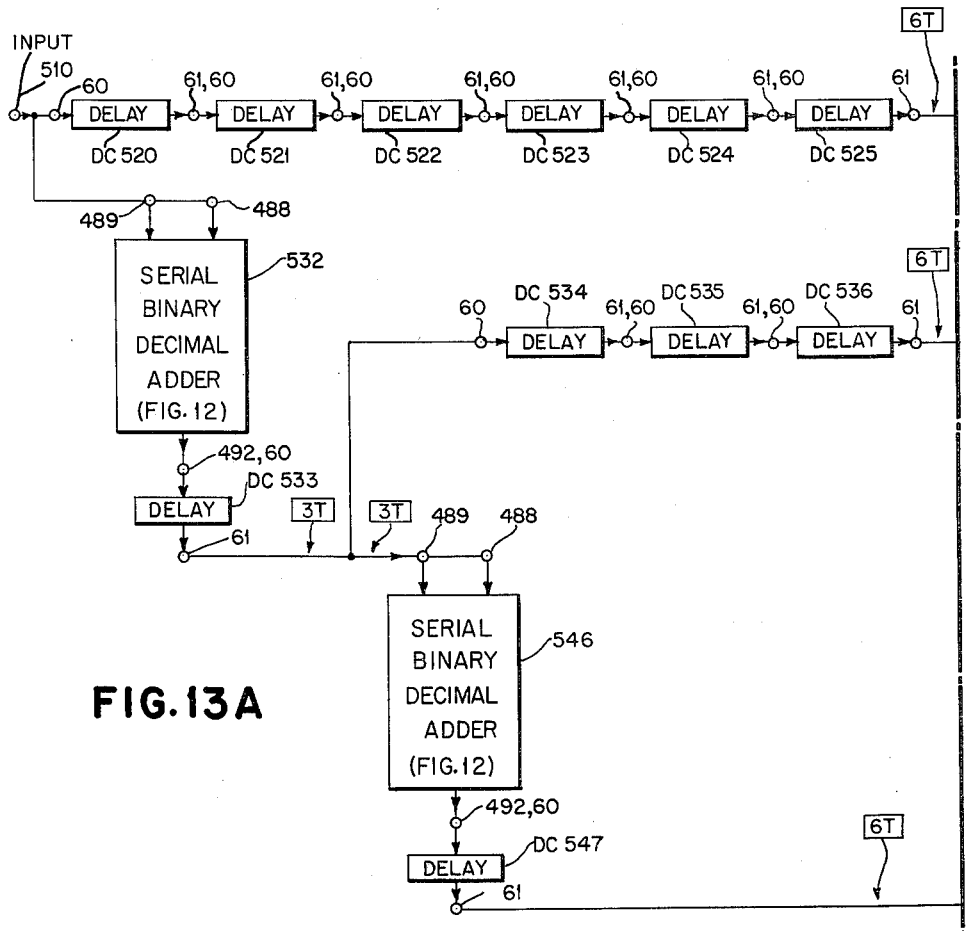

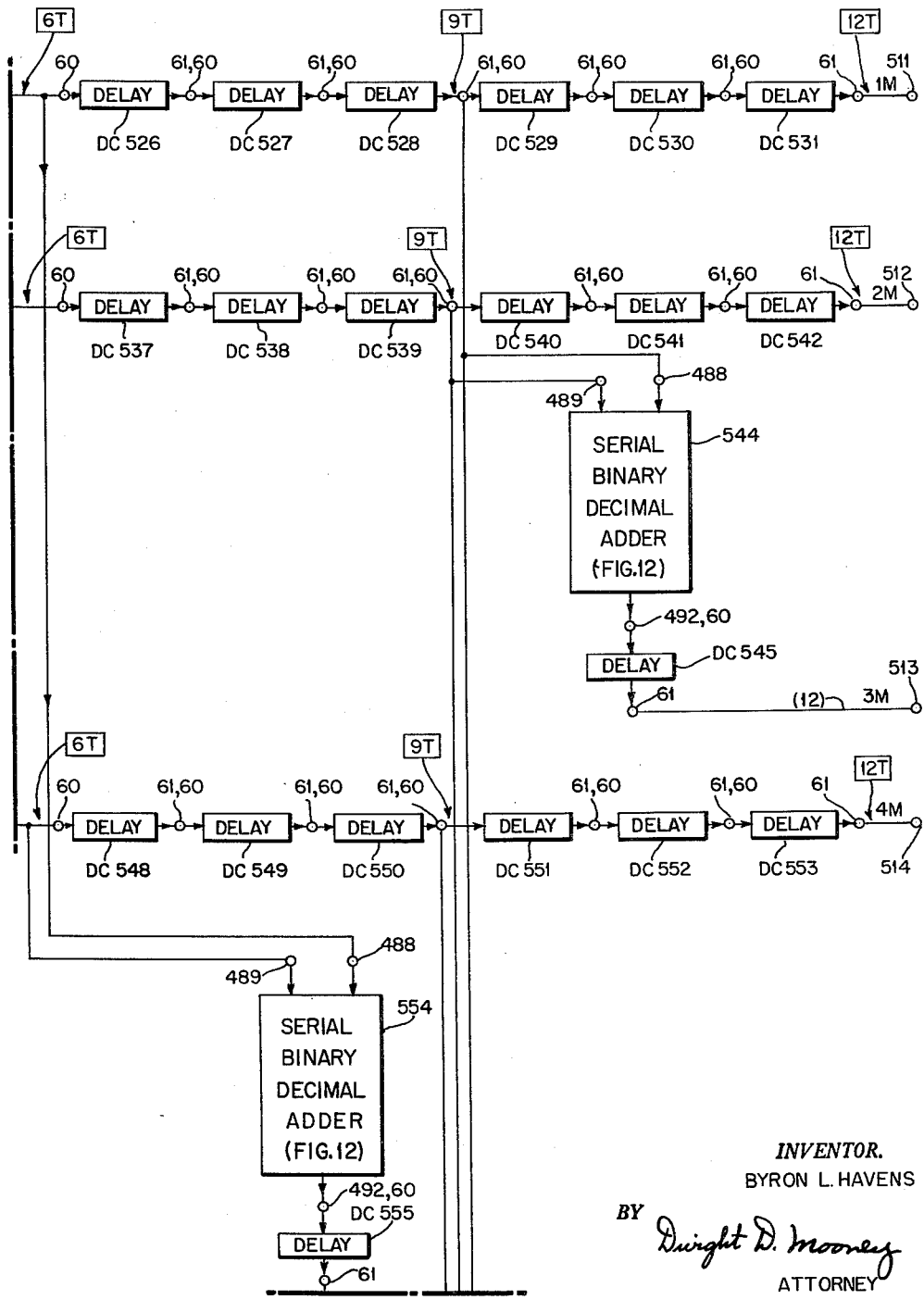

Jan. 30, 1962     B. L. HAVENS     3,018,957
ELECTRONIC MULTIPLIER-DIVIDER
Filed Nov. 22, 1954     70 Sheets-Sheet 31

*INVENTOR.*
BYRON L. HAVENS
BY
ATTORNEY

Jan. 30, 1962  B. L. HAVENS  3,018,957
ELECTRONIC MULTIPLIER-DIVIDER
Filed Nov. 22, 1954  70 Sheets-Sheet 33

FIG. 15
FIG. 15A
FIG. 15B
FIG. 15C
FIG. 15D
FIG. 15E

INVENTOR.
BYRON L. HAVENS
BY Dwight D. Mooney
ATTORNEY

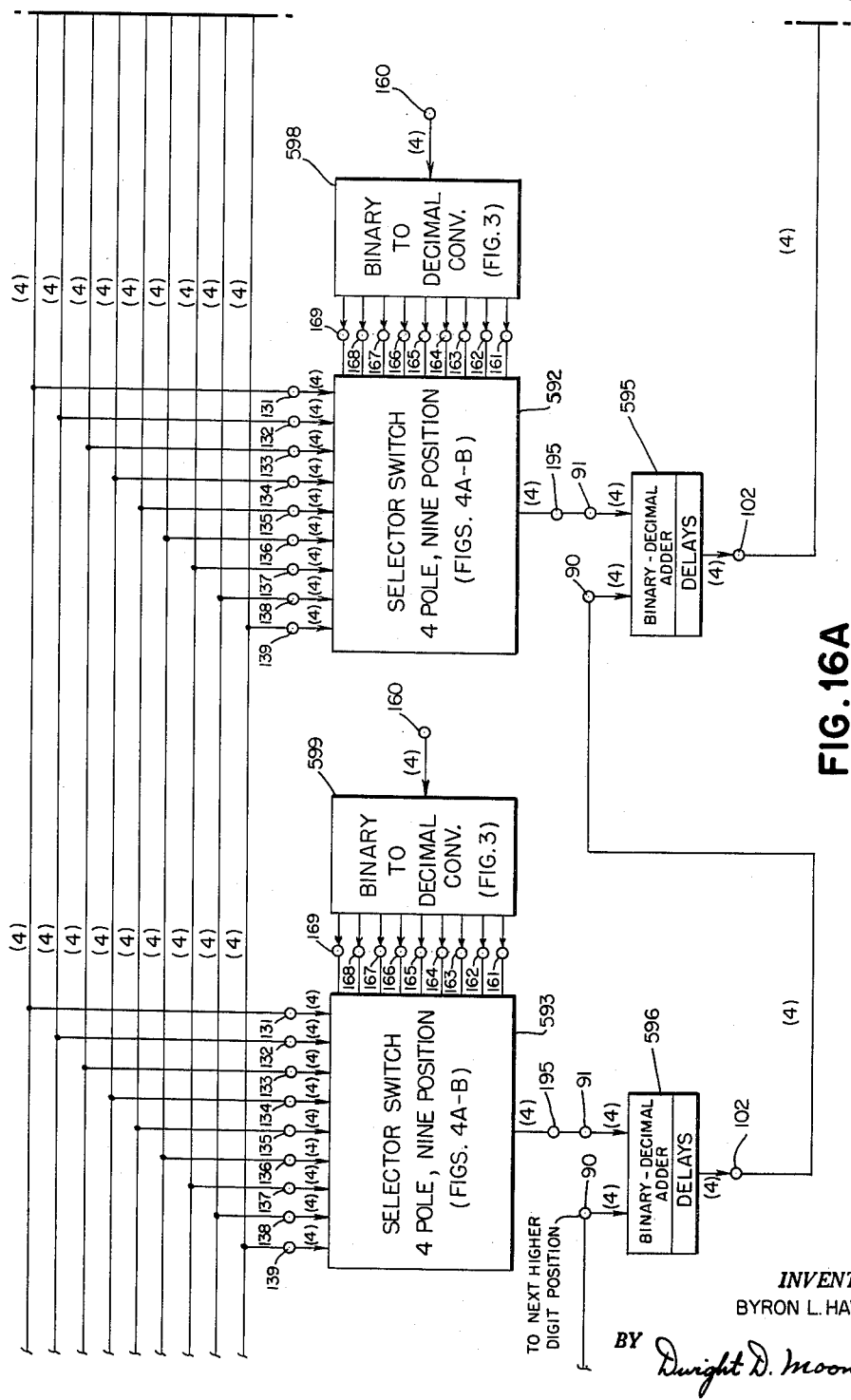

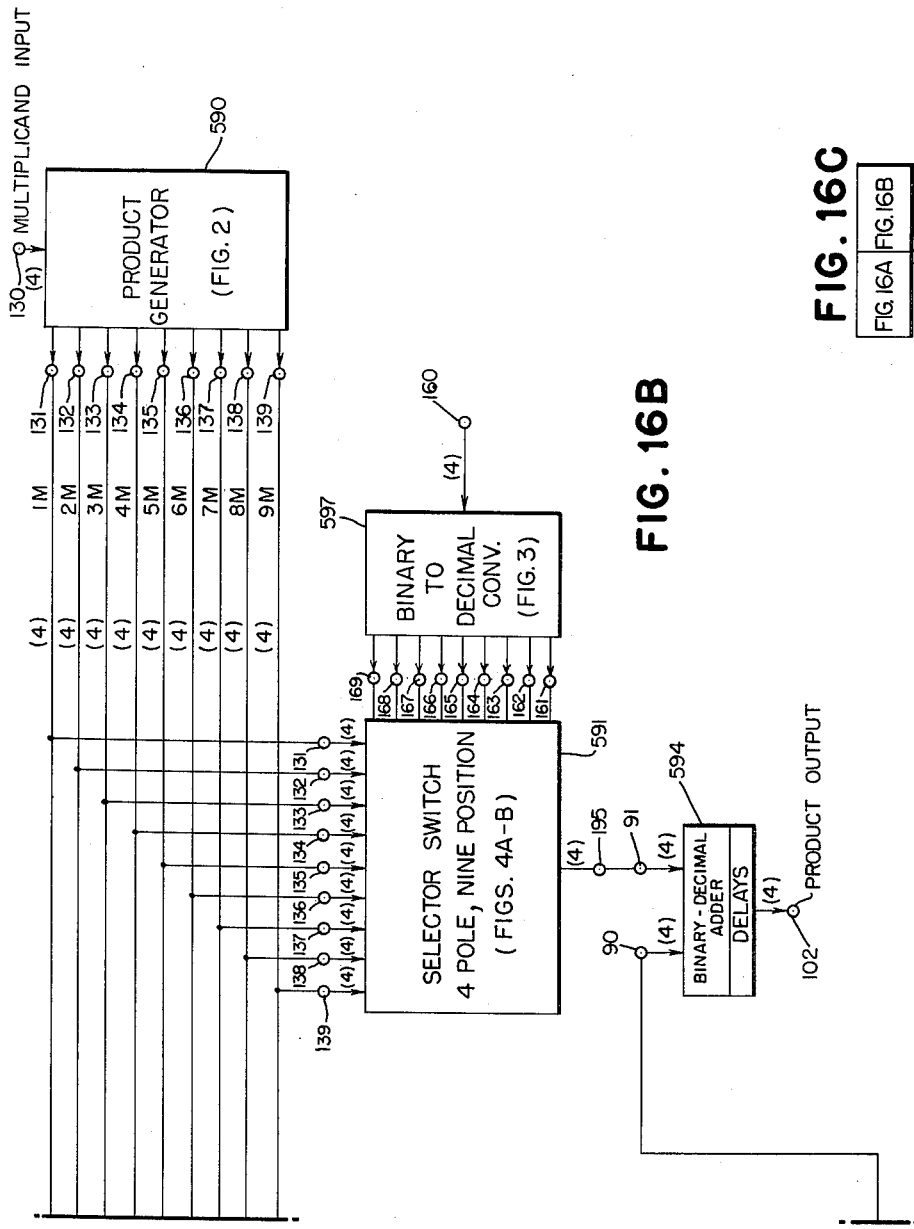

INVENTOR.
BYRON L. HAVENS

Jan. 30, 1962  B. L. HAVENS  3,018,957
ELECTRONIC MULTIPLIER-DIVIDER
Filed Nov. 22, 1954  70 Sheets-Sheet 37

INVENTOR.
BYRON L. HAVENS
BY Dwight D. Mooney
ATTORNEY

INVENTOR.
BYRON L. HAVENS

BY Dwight D. Mooney
ATTORNEY

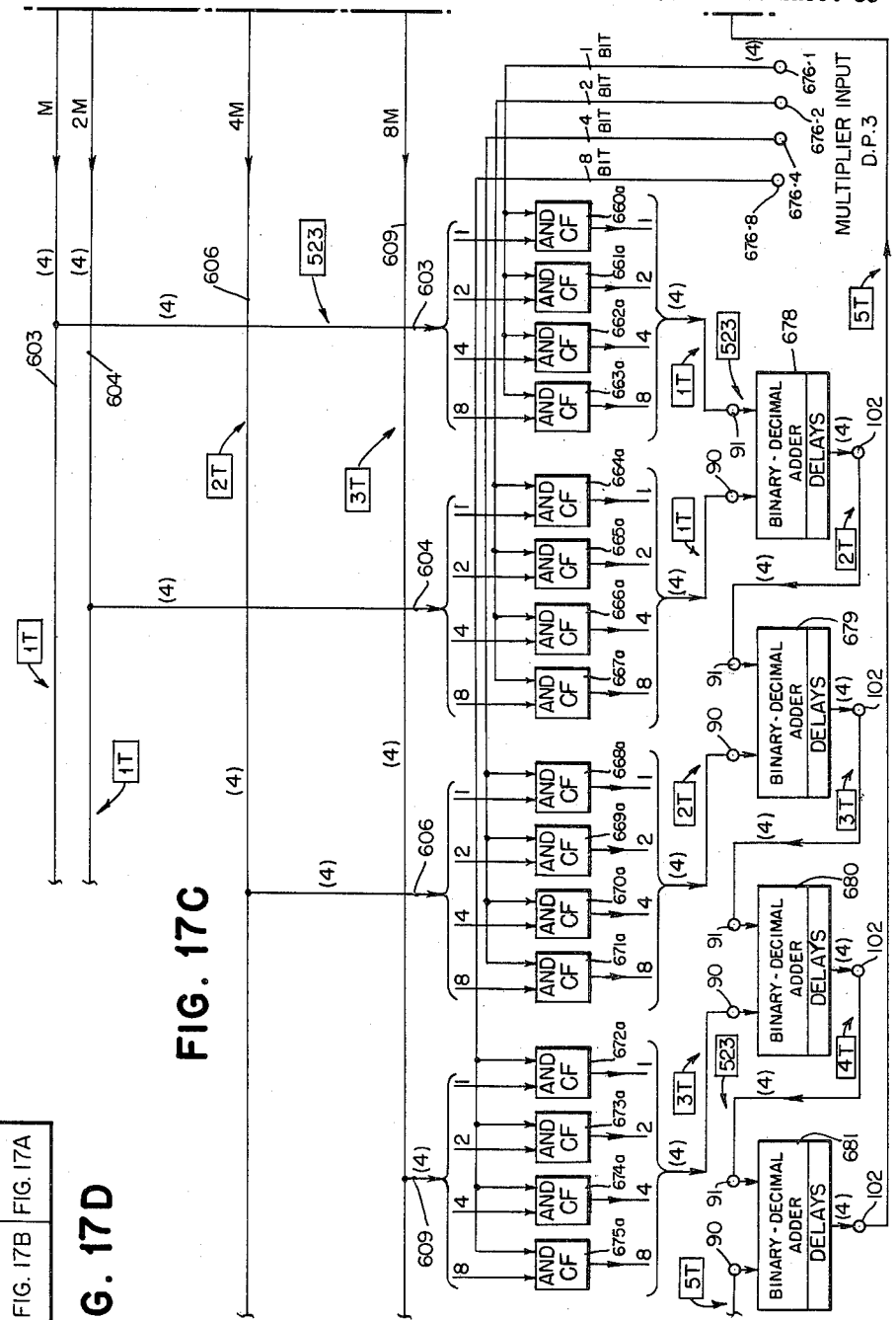

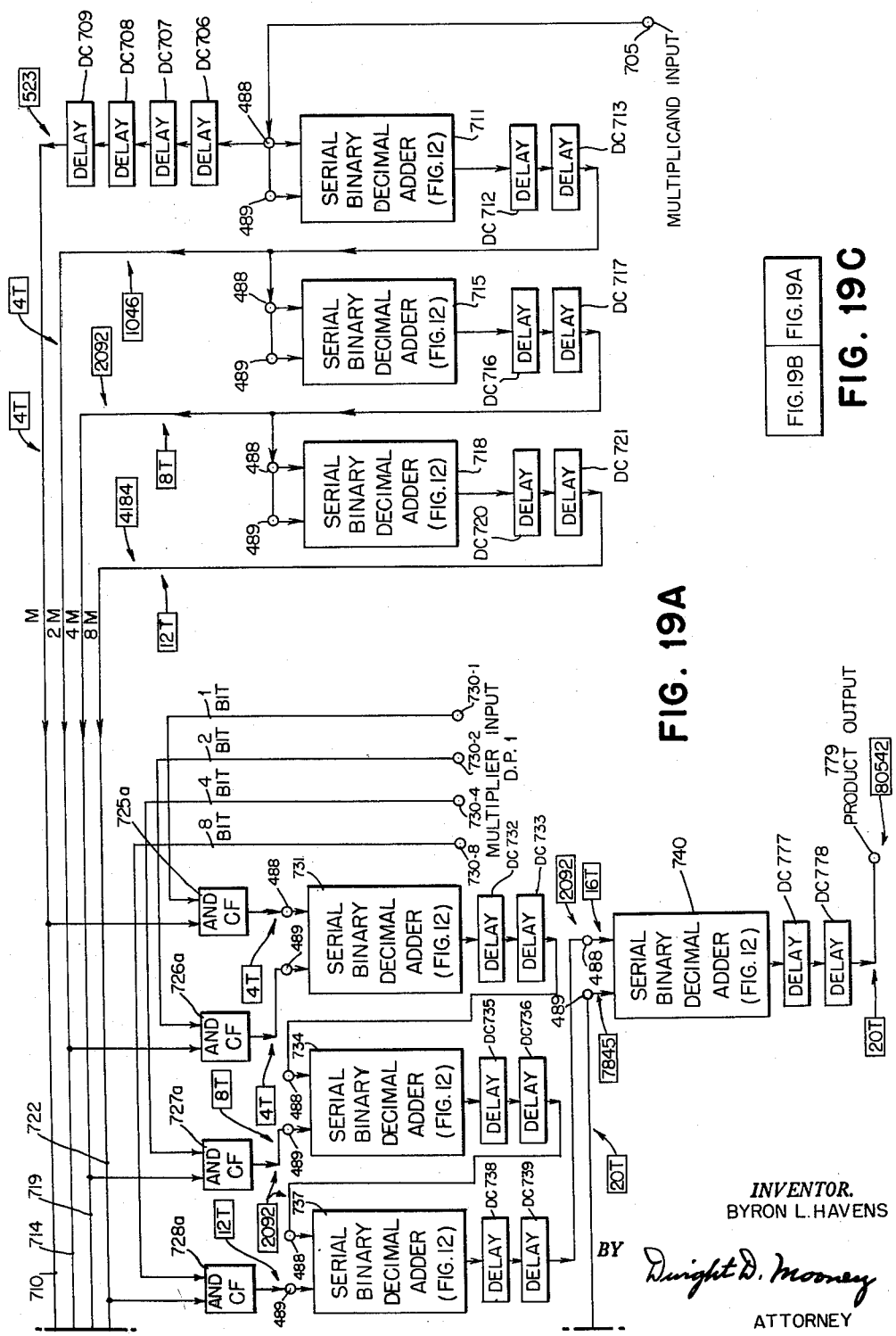

Jan. 30, 1962 B. L. HAVENS 3,018,957
ELECTRONIC MULTIPLIER-DIVIDER
Filed Nov. 22, 1954 70 Sheets-Sheet 43

INVENTOR.
BYRON L. HAVENS
BY Dwight D. Mooney
ATTORNEY

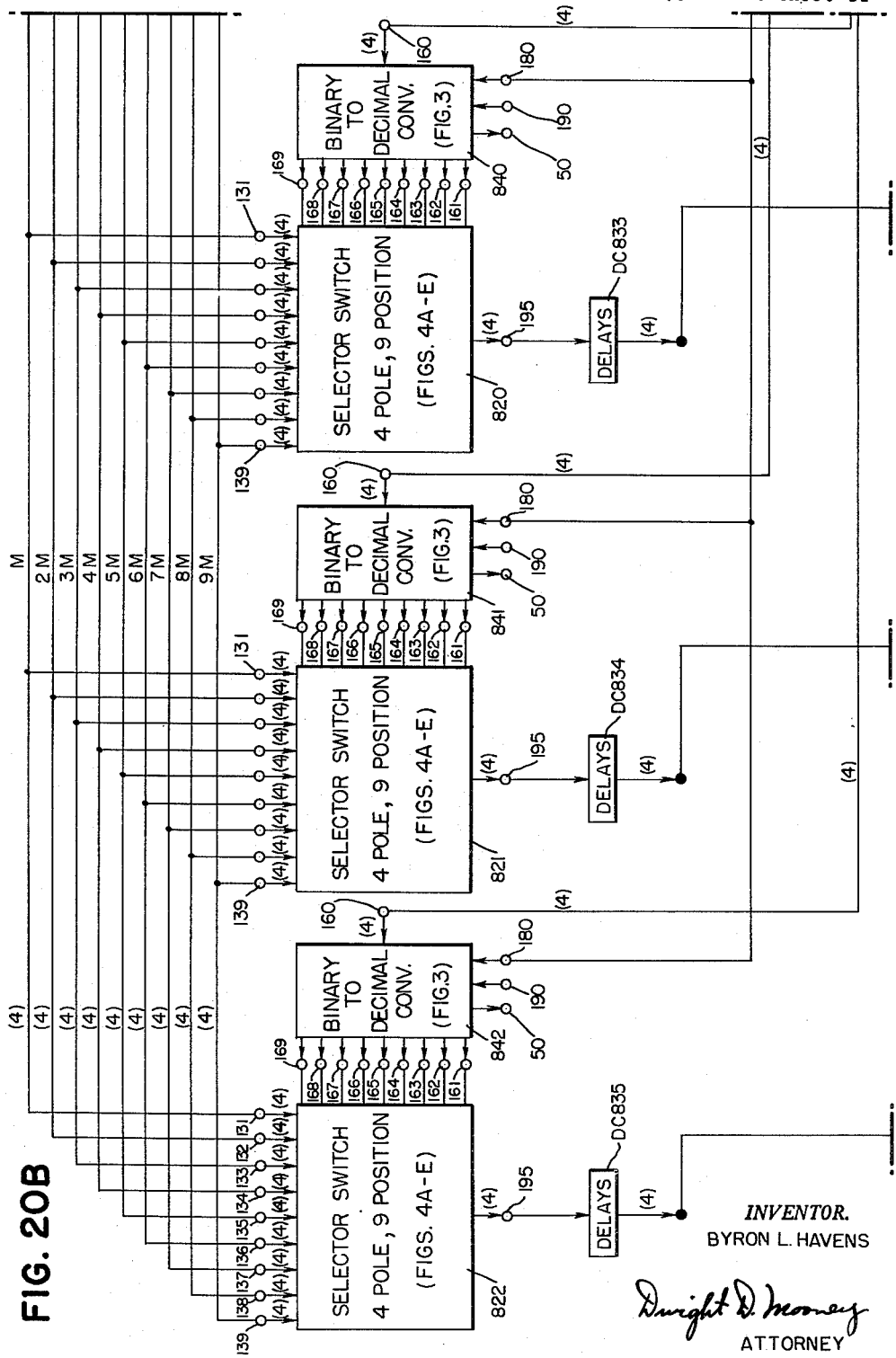

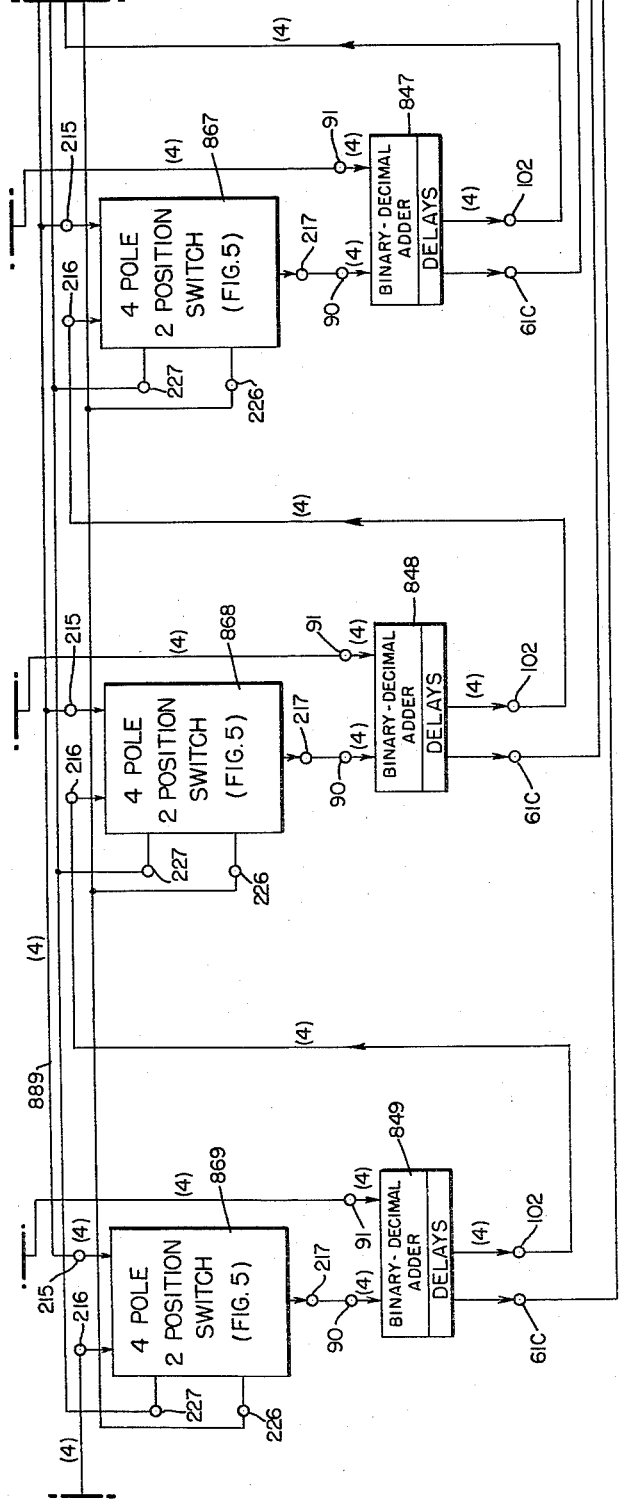

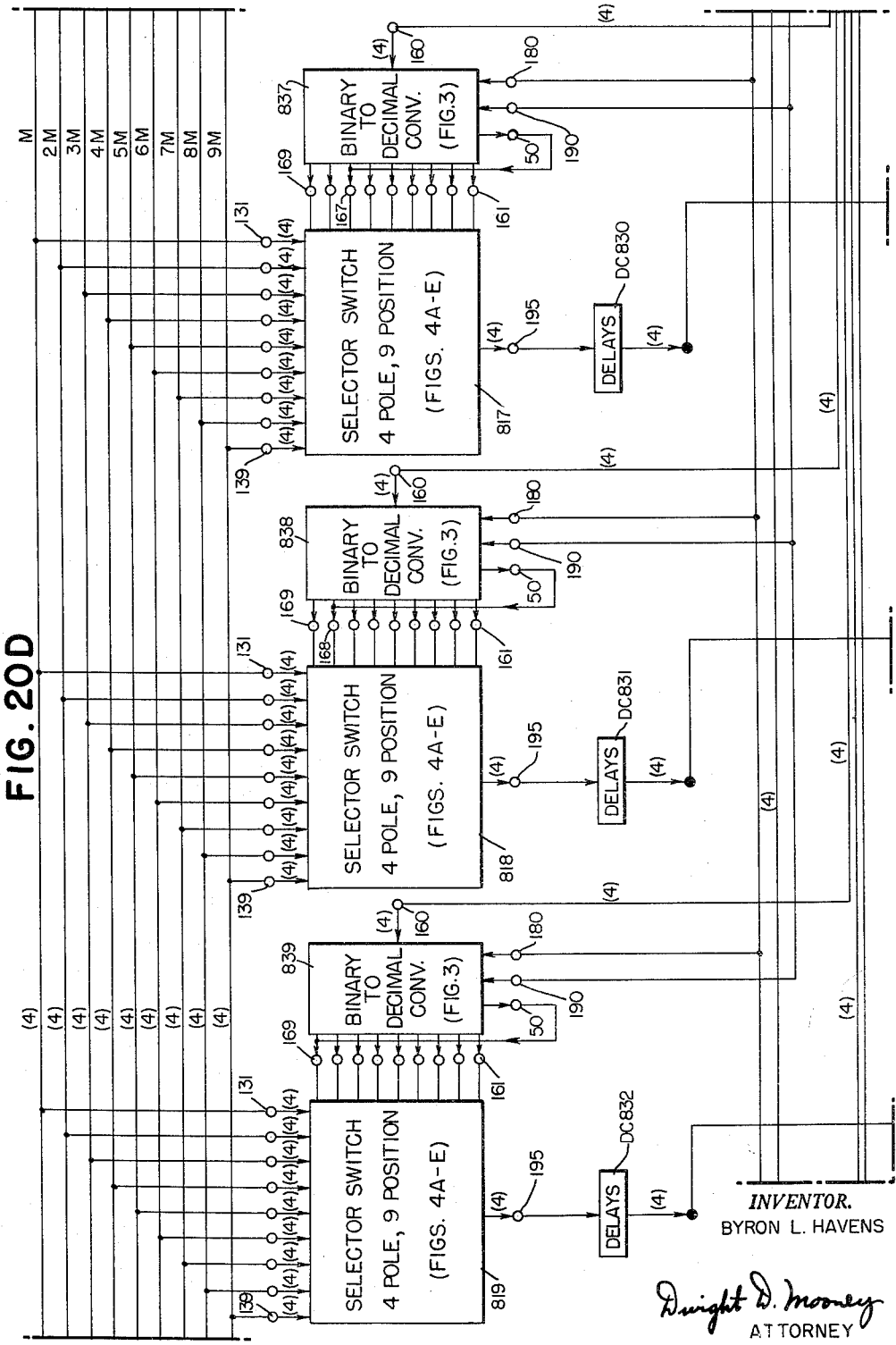

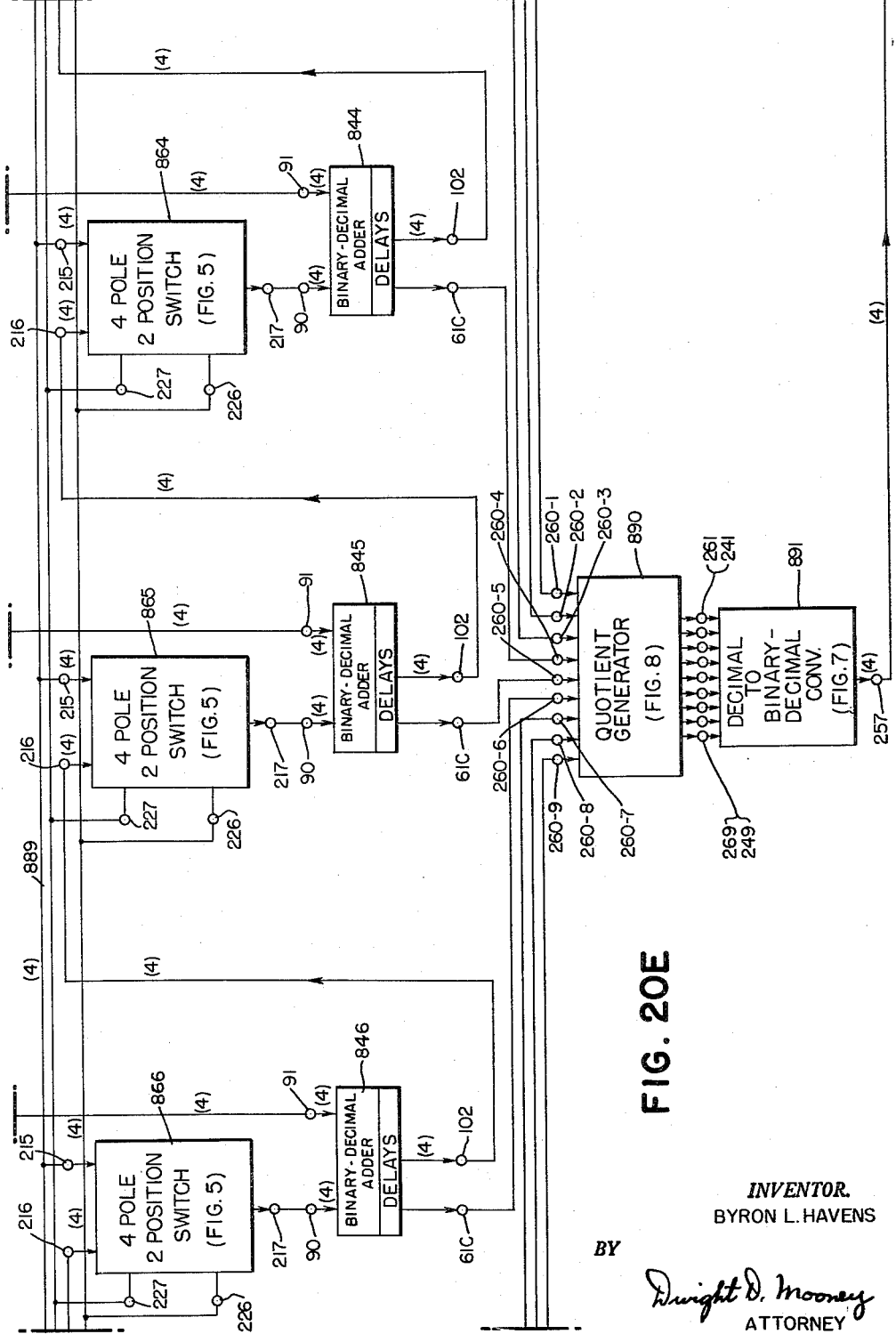

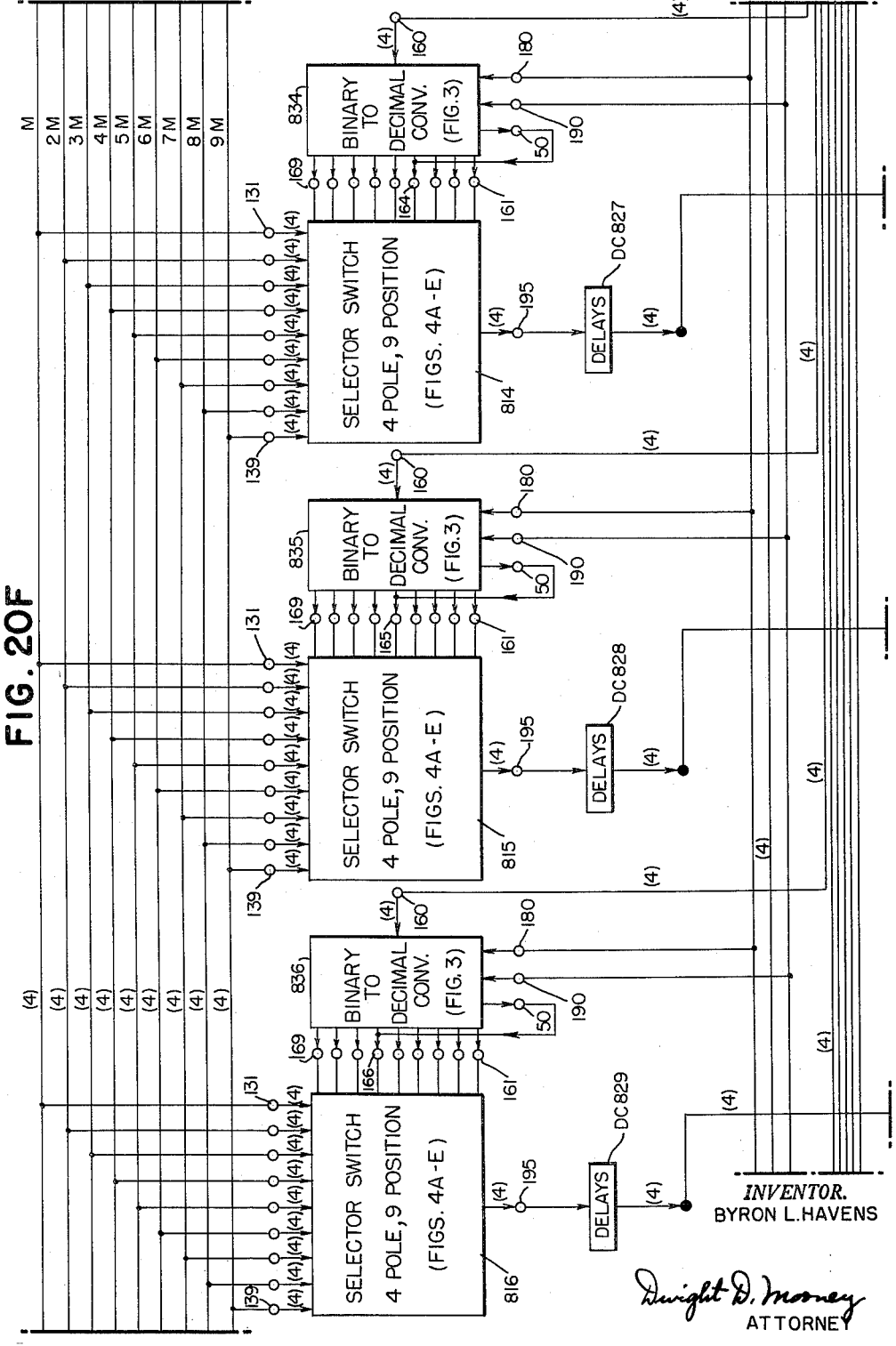

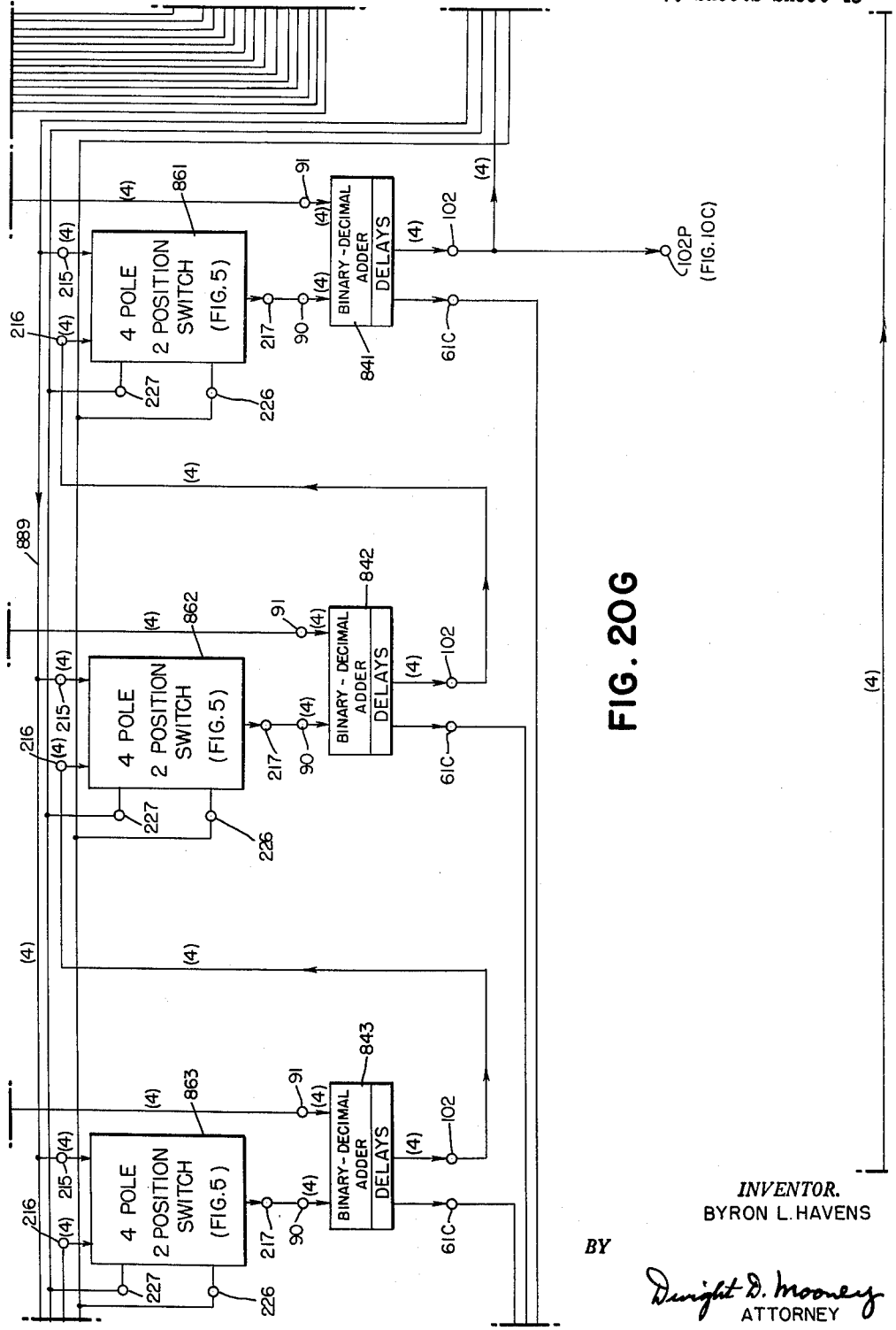

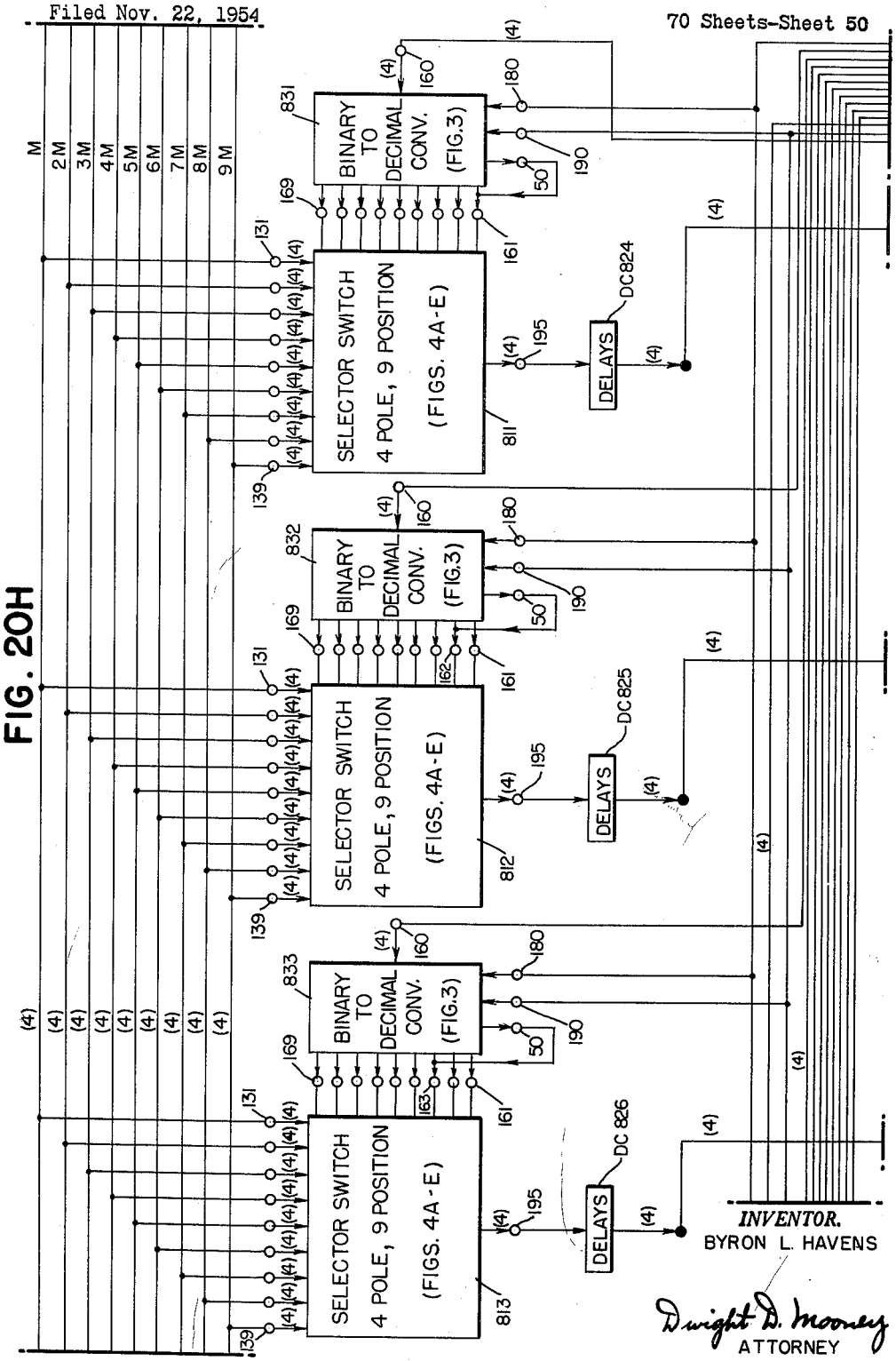

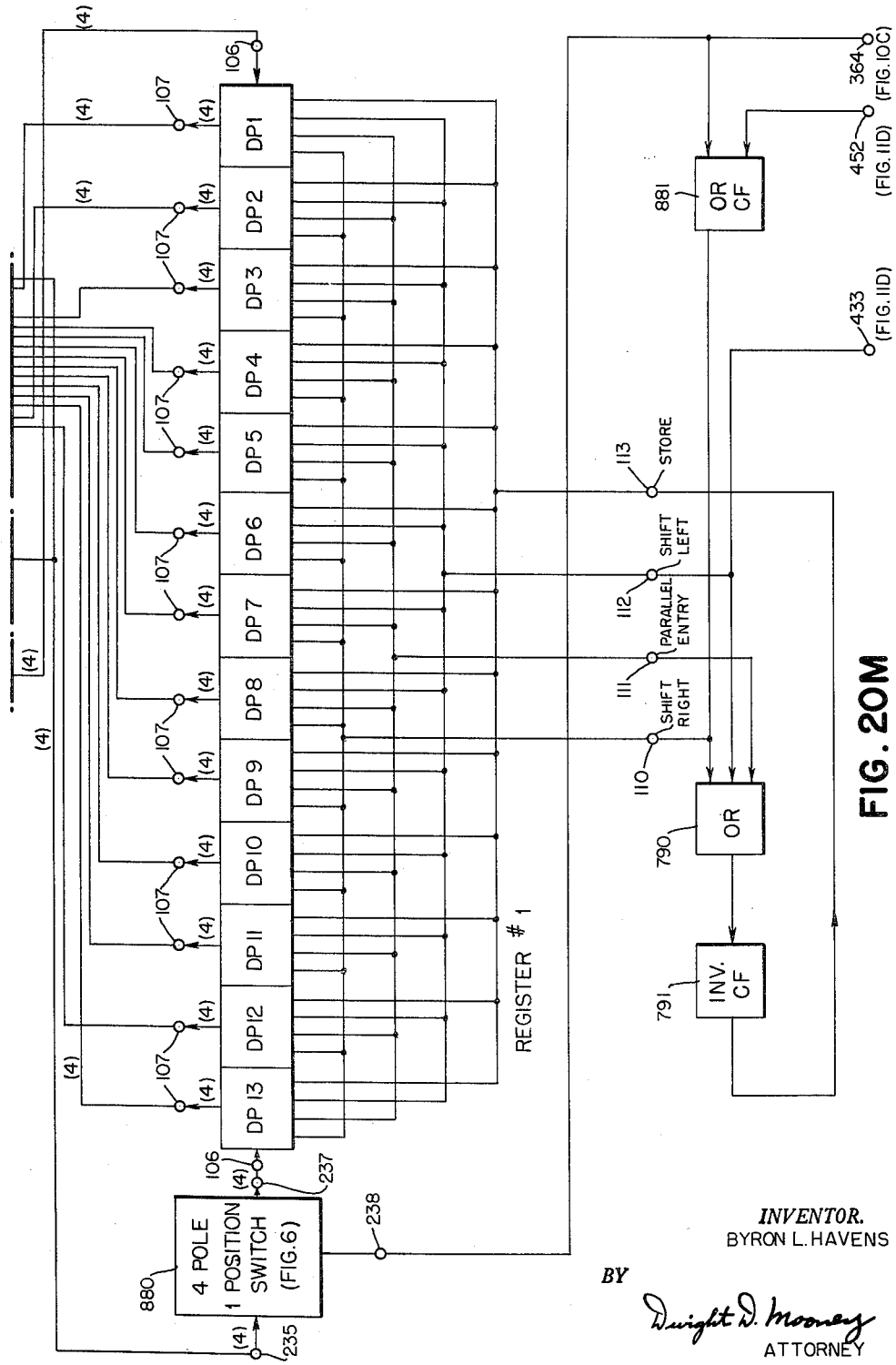

Jan. 30, 1962 — B. L. HAVENS — 3,018,957
ELECTRONIC MULTIPLIER-DIVIDER
Filed Nov. 22, 1954 — 70 Sheets-Sheet 54

INVENTOR.
BYRON L. HAVENS
BY Dwight D. Mooney
ATTORNEY

Jan. 30, 1962    B. L. HAVENS    3,018,957
ELECTRONIC MULTIPLIER-DIVIDER
Filed Nov. 22, 1954    70 Sheets-Sheet 55

| FIG. 21A | FIG. 21B | FIG. 21C | FIG. 21D |

REGISTER 2 (MULTIPLICAND)

| TIME INTERVALS | DP13 | DP12 | DP11 | DP10 | DP9 | DP8 | DP7 | DP6 | DP5 | DP4 | DP3 | DP2 | DP1 |
|---|---|---|---|---|---|---|---|---|---|---|---|---|---|
| 0 | 4 | 9 | 7 | 6 | 5 | 4 | 2 | 2 | 8 | 6 | 3 | 2 | 1 |
| 1 | 0 | 4 | 9 | 7 | 6 | 5 | 4 | 2 | 2 | 8 | 6 | 3 | 2 |
| 2 | 0 | 0 | 4 | 9 | 7 | 6 | 5 | 4 | 2 | 2 | 8 | 6 | 3 |
| 3 | 0 | 0 | 0 | 4 | 9 | 7 | 6 | 5 | 4 | 2 | 2 | 8 | 6 |
| 4 | 0 | 0 | 0 | 0 | 4 | 9 | 7 | 6 | 5 | 4 | 2 | 2 | 8 |
| 5 | 0 | 0 | 0 | 0 | 0 | 4 | 9 | 7 | 6 | 5 | 4 | 2 | 2 |
| 6 | 0 | 0 | 0 | 0 | 0 | 0 | 4 | 9 | 7 | 6 | 5 | 4 | 2 |
| 7 | 0 | 0 | 0 | 0 | 0 | 0 | 0 | 4 | 9 | 7 | 6 | 5 | 4 |
| 8 | 9 | 0 | 0 | 0 | 0 | 0 | 0 | 0 | 4 | 9 | 7 | 6 | 5 |
| 9 | 8 | 9 | 0 | 0 | 0 | 0 | 0 | 0 | 0 | 4 | 9 | 7 | 6 |
| 10 | 5 | 8 | 9 | 0 | 0 | 0 | 0 | 0 | 0 | 0 | 4 | 9 | 7 |
| 11 | 1 | 5 | 8 | 9 | 0 | 0 | 0 | 0 | 0 | 0 | 0 | 4 | 9 |
| 12 | 1 | 1 | 5 | 8 | 9 | 0 | 9 | 0 | 0 | 0 | 0 | 0 | 4 |
| 13 | 9 | 1 | 1 | 5 | 8 | 9 | 0 | 0 | 0 | 0 | 0 | 0 | 0 |
| 14 | 7 | 9 | 1 | 1 | 5 | 8 | 9 | 0 | 0 | 0 | 0 | 0 | 0 |
| 15 | 6 | 7 | 9 | 1 | 1 | 5 | 8 | 9 | 0 | 0 | 0 | 0 | 0 |
| 16 | 6 | 6 | 7 | 9 | 1 | 1 | 5 | 8 | 9 | 0 | 0 | 0 | 0 |
| 17 | 1 | 6 | 6 | 7 | 9 | 1 | 1 | 5 | 8 | 9 | 0 | 0 | 0 |
| 18 | 1 | 1 | 6 | 6 | 7 | 9 | 1 | 1 | 5 | 8 | 9 | 0 | 0 |
| 19 | 5 | 1 | 1 | 6 | 6 | 7 | 9 | 1 | 1 | 5 | 8 | 9 | 0 |
| 20 | 5 | 1 | 1 | 6 | 6 | 7 | 9 | 1 | 1 | 5 | 8 | 9 | 0 |
| 21 | 5 | 1 | 1 | 6 | 6 | 7 | 9 | 1 | 1 | 5 | 8 | 9 | 0 |
| 22 | 5 | 1 | 1 | 6 | 6 | 7 | 9 | 1 | 1 | 5 | 8 | 9 | 0 |
| 23 | 5 | 1 | 1 | 6 | 6 | 7 | 9 | 1 | 1 | 5 | 8 | 9 | 0 |
| 24 | 5 | 1 | 1 | 6 | 6 | 7 | 9 | 1 | 1 | 5 | 8 | 9 | 0 |
| 25 | 5 | 1 | 1 | 6 | 6 | 7 | 9 | 1 | 1 | 5 | 8 | 9 | 0 |
| 26 | 5 | 1 | 1 | 6 | 6 | 7 | 9 | 1 | 1 | 5 | 8 | 9 | 0 |
| 27 | 5 | 1 | 1 | 6 | 6 | 7 | 9 | 1 | 1 | 5 | 8 | 9 | 0 |
| 28 | 5 | 1 | 1 | 6 | 6 | 7 | 9 | 1 | 1 | 5 | 8 | 9 | 0 |
| 29 | 5 | 1 | 1 | 6 | 6 | 7 | 9 | 1 | 1 | 5 | 8 | 9 | 0 |
| 30 | 5 | 1 | 1 | 6 | 6 | 7 | 9 | 1 | 1 | 5 | 8 | 9 | 0 |
| 31 | 5 | 1 | 1 | 6 | 6 | 7 | 9 | 1 | 1 | 5 | 8 | 9 | 0 |
| 32 | 5 | 1 | 1 | 6 | 6 | 7 | 9 | 1 | 1 | 5 | 8 | 9 | 0 |
| 33 | 5 | 1 | 1 | 6 | 6 | 7 | 9 | 1 | 1 | 5 | 8 | 9 | 0 |
| 34 | 7 | 5 | 1 | 1 | 6 | 6 | 7 | 9 | 1 | 1 | 5 | 8 | 9 |

13 LOWEST DIGIT POSITIONS OF PRODUCT

Jan. 30, 1962 — B. L. HAVENS — 3,018,957
ELECTRONIC MULTIPLIER-DIVIDER
Filed Nov. 22, 1954 — 70 Sheets-Sheet 56

FIG. 21C

| (13th PP) TERM. 60 DELAYS DC 852 | (12th PP) TERM. 90 ADDER 851 | TERM. 91 ADDER 851 | (11th PP) TERM. 90 ADDER 850 | TERM. 91 ADDER 850 | (10th PP) TERM. 90 ADDER 849 | TERM. 91 ADDER 849 | (9th PP) TERM. 90 ADDER 848 | TERM. 91 ADDER 848 | (8th PP) TERM. 90 ADDER 847 | TERM. 91 ADDER 847 | (7th PP) TERM. 90 ADDER 846 | TERM. 91 ADDER 846 | (6th PP) TERM. 90 ADDER 845 | TERM. 91 ADDER 845 |
|---|---|---|---|---|---|---|---|---|---|---|---|---|---|---|
| 5 | 0 | 4 | 0 | 6 | 0 | 3 | 0 | 8 | 0 | 1 | 0 | 9 | 0 | 7 |
| 0 | 5 | 8 | 4 | 2 | 6 | 6 | 3 | 6 | 8 | 2 | 1 | 8 | 9 | 4 |
| 6 | 0 | 2 | 3 | 9 | 6 | 9 | 2 | 5 | 9 | 3 | 0 | 8 | 9 | 2 |
| 1 | 6 | 5 | 3 | 7 | 2 | 8 | 6 | 0 | 7 | 6 | 3 | 6 | 8 | 4 |
| 3 | 1 | 4 | 1 | 1 | 1 | 5 | 1 | 9 | 6 | 8 | 4 | 7 | 9 | 0 |
| 4 | 3 | 1 | 6 | 7 | 3 | 8 | 7 | 2 | 0 | 2 | 5 | 5 | 1 | 0 |
| 1 | 4 | 9 | 4 | 3 | 3 | 6 | 1 | 8 | 0 | 2 | 3 | 0 | 1 | 6 |
| 1 | 1 | 6 | 3 | 5 | 8 | 2 | 0 | 3 | 0 | 4 | 2 | 8 | 4 | 9 |
| 7 | 1 | 1 | 8 | 2 | 8 | 6 | 1 | 3 | 4 | 5 | 4 | 8 | 0 | 7 |
| 2 | 7 | 6 | 2 | 9 | 0 | 9 | 5 | 2 | 4 | 6 | 9 | 8 | 3 | 5 |
| 8 | 2 | 0 | 3 | 5 | 2 | 2 | 0 | 1 | 7 | 7 | 0 | 8 | 8 | 3 |
| 8 | 8 | 9 | 3 | 8 | 9 | 9 | 5 | 8 | 1 | 9 | 5 | 7 | 9 | 8 |
| 4 | 8 | 9 | 7 | 9 | 1 | 4 | 8 | 9 | 3 | 4 | 1 | 4 | 2 | 4 |
| 2 | 4 | 1 | 8 | 2 | 7 | 1 | 6 | 3 | 8 | 0 | 8 | 4 | 6 | 3 |
|   |   | 2 |   | 6 |   | 1 |   | 8 |   | 0 |   | 8 |   | 2 |
|   |   | 2 |   | 7 |   | 1 |   | 9 |   | 0 |   | 0 |   | 9 |
|   |   |   |   | 2 |   | 7 |   | 1 |   | 9 |   | 0 |   | 9 |
|   |   |   |   |   |   | 2 |   | 7 |   | 1 |   | 9 |   | 1 |
|   |   |   |   |   |   |   |   | 2 |   | 7 |   | 1 |   | 7 |
|   |   |   |   |   |   |   |   |   |   | 2 |   | 7 |   | 2 |

Jan. 30, 1962     B. L. HAVENS     3,018,957
ELECTRONIC MULTIPLIER-DIVIDER

Filed Nov. 22, 1954     70 Sheets-Sheet 58

| TERM. 90 ADDER 844 | (5th PP) TERM. 91 ADDER 844 | TERM. 90 ADDER 843 | (4th PP) TERM. 91 ADDER 843 | TERM. 90 ADDER 842 | (3rd PP) TERM. 91 ADDER 842 | TERM. 90 ADDER 841 | (2nd PP) TERM. 91 ADDER 841 | TERM. 90 ADDER 801M | (1st PP) TERM. 91 ADDER 801M | TERM. 102 ADDER 801M | REGISTER 2 SHIFT RIGHT (TERM. 110 FIG. 20 N) | REGISTER 1 SHIFT RIGHT (TERM. 110 FIG. 20M) | FOUR-POLE, 2 POSITION SWITCH 797 (TERM. 238 FIG. 20K) | TERM. 301 FIG. 10C AND TERM. 301 FIG. 20J | END OF MULTIPLICATION TERM. 373 (FIG. 10C) |
|---|---|---|---|---|---|---|---|---|---|---|---|---|---|---|---|
| 0 | 1 | 0 | 0 | 0 | 7 | 0 | 0 | 0 | 9 | 0 | | | | | |
| 7 | 2 | 1 | 0 | 0 | 4 | 7 | 0 | 0 | 8 | 9 | | | | | |
| 3 | 3 | 9 | 0 | 1 | 2 | 4 | 0 | 7 | 8 | 8 | | | | | |
| 2 | 6 | 6 | 0 | 9 | 4 | 3 | 0 | 4 | 6 | 5 | | | | | |
| 3 | 8 | 8 | 0 | 6 | 0 | 3 | 0 | 3 | 7 | 1 | | | | | |
| 0 | 2 | 1 | 0 | 8 | 0 | 7 | 0 | 3 | 5 | 1 | | | | | |
| 2 | 2 | 3 | 0 | 1 | 6 | 8 | 0 | 7 | 0 | 9 | | | | | |
| 7 | 4 | 4 | 0 | 3 | 9 | 7 | 0 | 8 | 8 | 7 | | | | | |
| 3 | 5 | 1 | 0 | 4 | 7 | 2 | 0 | 7 | 8 | 6 | | | | | |
| 8 | 6 | 9 | 0 | 1 | 5 | 2 | 0 | 2 | 8 | 6 | | | | | |
| 8 | 7 | 4 | 0 | 9 | 3 | 7 | 0 | 2 | 8 | 1 | | | | | |
| 1 | 9 | 6 | 0 | 4 | 8 | 2 | 0 | 7 | 7 | 1 | | | | | |
| 8 | 4 | 1 | 0 | 6 | 4 | 3 | 0 | 2 | 4 | 5 | | | | | |
| 7 | 0 | 3 | 0 | 1 | 3 | 1 | 0 | 3 | 4 | 7 | | | | | |
| 9 | | 8 | | 3 | | 5 | | 1 | | 7 | | | | | |
| 2 | | 9 | | 8 | | 3 | | 5 | | 1 | PRODUCT | | | | |
| 9 | | 2 | | 9 | | 8 | | 3 | | 5 | | | | | |
| 0 | | 9 | | 2 | | 9 | | 8 | | 3 | | | | | |
| 9 | | 0 | | 9 | | 2 | | 9 | | 8 | | | | | |
| 1 | | 9 | | 0 | | 9 | | 2 | | 9 | | | | | |
| 7 | | 1 | | 9 | | 0 | | 9 | | 2 | | | | | |
| 2 | | 7 | | 1 | | 9 | | 0 | | 9 | | | | | |
| | | 2 | | 7 | | 1 | | 9 | | 0 | | | | | |
| | | | | 2 | | 7 | | 1 | | 9 | | | | | |
| | | | | | | 2 | | 7 | | 1 | | | | | |
| | | | | | | | | 2 | | 7 | | | | | |
| | | | | | | | | | | 2 | | | | | |

FIG. 21D

```
                    1 5 4      ← QUO = QUOTIENT
DS=DIVISOR
        5 2 3 | 8 0 5 4 2      ← DD = DIVIDEND
               -5 2 3           ← 1ST MULTIPLE OF DS
                2 8 2 4         ← 1ST PARTIAL DD
               -2 6 1 5         ← 5TH MULTIPLE OF DS
                  2 0 9 2       ← 2ND PARTIAL DD
                  2 0 9 2       ← 4TH MULTIPLE OF DS
                  0 0 0 0       ← 3RD PARTIAL DD
```

FIG. 22A

| | | |
|---|---|---|
| 9'S COMPLEMENT OF DD ⟶ | 9 1 9 4 5 7 | |
| 1ST MULTIPLE OF DS ⟶ | 5 2 3 | QUO 1 = 1 |
| 1ST PARTIAL DD ⟶ | 9 7 1 7 5 7 | |
| SHIFT 1ST PARTIAL DD ONE DIGIT POSITION TO LEFT ⟶ | 9 7 1 7 5 7 | |
| 5TH MULTIPLE OF DS ⟶ | 2 6 1 5 | QUO 2 = 5 |
| 2ND PARTIAL DD ⟶ | 9 9 7 9 0 7 | |
| SHIFT 2ND PARTIAL DD ONE DIGIT POSITION TO LEFT ⟶ | 9 9 7 9 0 7 | |
| 4TH MULTIPLE OF DS ⟶ | 2 0 9 2 | QUO 3 = 4 |
| 3RD PARTIAL DD ⟶ | 9 9 9 9 9 9 | |

FIG. 22B

*INVENTOR.*
BYRON L. HAVENS
BY Dwight D. Mooney
ATTORNEY

Jan. 30, 1962  B. L. HAVENS  3,018,957
ELECTRONIC MULTIPLIER-DIVIDER
Filed Nov. 22, 1954  70 Sheets-Sheet 60

FIG. 23A

INVENTOR.
BYRON L. HAVENS
BY Dwight D. Mooney
ATTORNEY

Jan. 30, 1962  B. L. HAVENS  3,018,957
ELECTRONIC MULTIPLIER-DIVIDER
Filed Nov. 22, 1954  70 Sheets-Sheet 61

INVENTOR.
BYRON L. HAVENS
BY
Dwight D. Mooney
ATTORNEY

FIG. 23C

INVENTOR.
BYRON L. HAVENS
BY
Dwight D. Mooney
ATTORNEY

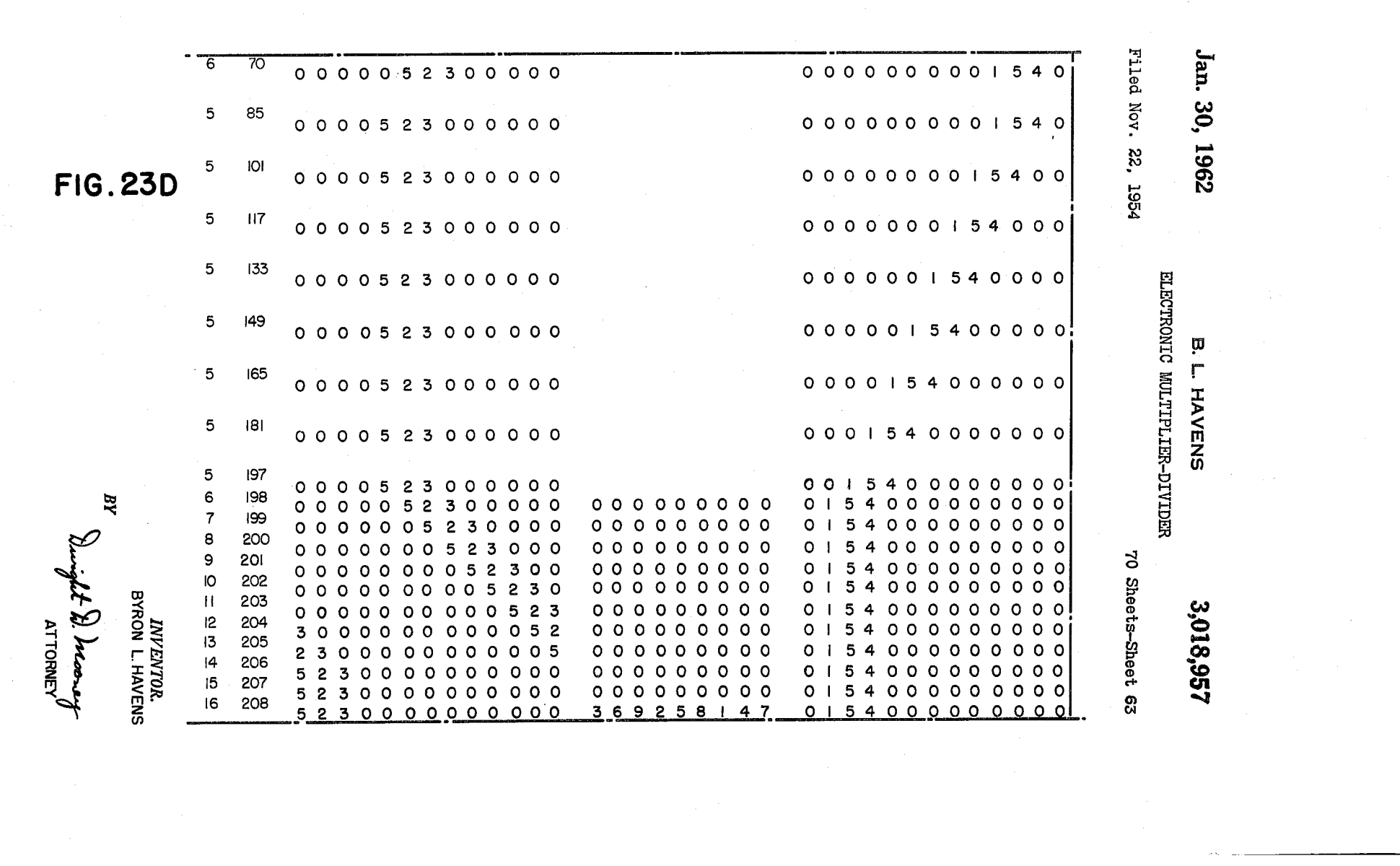

Jan. 30, 1962           B. L. HAVENS           3,018,957

ELECTRONIC MULTIPLIER-DIVIDER

Filed Nov. 22, 1954           70 Sheets-Sheet 63

FIG. 23D

INVENTOR.
BYRON L. HAVENS
BY
Dwight D. Mooney
ATTORNEY

Jan. 30, 1962  B. L. HAVENS  3,018,957
ELECTRONIC MULTIPLIER-DIVIDER
Filed Nov. 22, 1954  70 Sheets-Sheet 64

INVENTOR.
BYRON L. HAVENS
BY Dwight D. Mooney
ATTORNEY

Jan. 30, 1962  B. L. HAVENS  3,018,957
ELECTRONIC MULTIPLIER-DIVIDER
Filed Nov. 22, 1954  70 Sheets-Sheet 65

TERM. 462 SWITCHES 861-869 (TERM. 226)

SWITCH 886 { TERM. 226
TERM. 227

BINARY TO DECIMAL CONVERTER 830M, TERM. 180

REG. 1 (STORE), TERM. 113

REG. 1 RIGHT SHIFT (TERM. 452)

REG. 1 LEFT SHIFT (TERM. 433)

REG. 2 (STORE), TERM. 113

TERM 442 { TERM. 238 (442) PROD. GEN.
INPUT SWITCH 797
REG. 2 RIGHT SHIFT (TERM. 110)

OUTPUT DELAY DC 887

OUTPUT DELAY 888 {
15
14
13
12
11
10
9
8
7
6
5
4
3
2
1
}

OUTPUT QUOTIENT GEN. 890

OUTPUT TERM. 102 ADDER 801M

9's COMP. OF DIVIDEND (DELAYED 2)

INPUT TERM. 91 ADDER 801M

9's COMP. OF DIVIDEND (DELAYED 1)

INPUT TERM. 90 ADDER 801M

POSITION OF SELECTOR SWITCH 801M

9's COMP. OF DIVIDEND

NINES COMPLEMENT GEN. 885 OUTPUT

FIG. 23F

*INVENTOR.*
BYRON L. HAVENS
BY Dwight D. Mooney
ATTORNEY

Jan. 30, 1962  B. L. HAVENS  3,018,957
ELECTRONIC MULTIPLIER-DIVIDER
Filed Nov. 22, 1954  70 Sheets-Sheet 67

INVENTOR.
BYRON L. HAVENS
BY
ATTORNEY

Jan. 30, 1962   B. L. HAVENS   3,018,957
ELECTRONIC MULTIPLIER-DIVIDER
Filed Nov. 22, 1954   70 Sheets-Sheet 69

INVENTOR.
BYRON L. HAVENS

Jan. 30, 1962   B. L. HAVENS   3,018,957
ELECTRONIC MULTIPLIER-DIVIDER
Filed Nov. 22, 1954   70 Sheets-Sheet 70

INVENTOR.
BYRON L. HAVENS
BY Dwight D. Mooney
ATTORNEY

United States Patent Office 3,018,957
Patented Jan. 30, 1962

3,018,957
ELECTRONIC MULTIPLIER-DIVIDER
Byron L. Havens, Closter, N.J., assignor to International Business Machines Corporation, New York, N.Y., a corporation of New York
Filed Nov. 22, 1954, Ser. No. 470,160
50 Claims. (Cl. 235—159)

This invention relates to electronic circuits and more particularly to high speed electronic multiplying and dividing circuits.

The orders of a binary number, reading from right to left, correspond in value to $2^0$, $2^1$, $2^2$, $2^3$, $2^4$, etc., or decimal digits, 1, 2, 4, 8, 16, respectively. The presence of a binary 1, represented by a pulse, indicates the presence of a decimal digit corresponding thereto, and the presence of binary 0, represented by the absence of a pulse, indicates the absence of that decimal digit. The binary number 1001 therefore represents the sum of the decimal digits 1 and 8 or the decimal digit 9.

In the binary decimal system each decimal digit is represented in the pure binary notation. For example, 459 is written in the written binary system as 0100, 0101, 1001. The decimal digit 9 occupying the first digit position is written as 1001 where the binary orders, from right to left, represent 1, 2, 4 and 8, respectively. The decimal digit 5 occupying the second digit position is written as 0101 where the binary orders from right to left represent 10, 20, 40 and 80, respectively. The decimal digit 4 occupying the third digit position is written as 0100 where the binary orders, from right to left, represent 100, 200, 400 and 800, respectively. In the practice of the invention any decimal digit is represented by four binary orders. A binary 1 or binary 0 occupying these orders, from right to left, are designated as a 1 bit, 2 bit, 4 bit and 8 bit, respectively.

It is a frequent practice to effect over and over addition of the multiplicand to derive the product or to add certain multiples of the multiplicand different from those designated by the actual digits of the multiplier and then perform corrective operations to produce the correct product. These multiplication systems are disadvantageous in that an excessive number of machine cycles are required to produce a product and extra operations are required to produce the correct product. A frequent practice employed by dividers is to effect over and over subtraction of the divisor from the dividend or subtraction of certain multiples of the divisor from the dividend. The former practice is disadvantageous in that an excessive number of machine cycles are required to produce the quotient. The latter practice is disadvantageous in that it requires extra operations to provide the correct quotient digits and the correct remainder.

A principal object of this invention is to provide an improved electronic multiplier which eliminates the above disadvantages.

Another principal object of this invention is to provide an improved electronic divider which eliminates the above disadvantages.

An object of the invention is to provide an electronic multiplier wherein all partial products are formed simultaneously and added in proper time sequences to provide the product.

Another object is to provide a novel electronic multiplier wherein the first addition operation and each addition operation thereafter produce a digit of the product.

Another object is to provide a novel electronic multiplier wherein digits of the product and digits of the partial products are provided simultaneously.

Another object is to provide an electronic multiplier having a plurality of adders wherein a different one of the partial products is added in each adder simultaneously.

Still another object is to provide an electronic multiplier having a plurality of adders wherein a corresponding partial product is applied to each of the adders to be added therein to the sum of the higher of the partial products.

Still another object is to provide an electronic multiplier wherein an adder provides the product serially by decimal digits, each digit of the product being provided by each addition effected by the adder.

A further object is to provide an electronic multiplier wherein each digit of the multiplier is applied in parallel to a switch corresponding to the digit position thereof to permit transfer, serially by decimal digit, to the adding means, of a multiple of the multiplicand corresponding in value to that digit of the multiplier.

A still further object is to provide an electronic multiplier having adding means connected to receive multiples of the multiplicand corresponding to each digit position of the multiplier and effect addition thereof with the sum provided by the adding means corresponding to the next higher digit position of the multiplier.

An object of the invention is to provide a novel electronic divider wherein multiples of the divisor are employed to determine each digit of the quotient and each quotient digit is employed to determine the correct multiple of the divisor which must be subtracted from the dividend or partial dividend, as the acse may be, to provide the new partial dividend.

Another object is to provide a novel divider wherein the divisor is shifted out of storage to permit creation of the multiples one through 9 thereof, and is simultaneously restored.

Another object is to provide a novel divider wherein the multiples one through 9 of the divisor are simultaneously added to the complement of the dividend or partial dividend, as the case may be, to determine each quotient digit.

Still another object is to provide an electronic divider including means responsive to the addition of the divisor or a multiple thereof to the complement of the dividend or a partial dividend to determine serially the correct quotient digits beginning with the quotient digit occupying the first digit position.

Still another object is to provide an electronic divider including means responsive to the presence and the absence of carries produced by the addition of multiples of the divisor to the complement of the dividend and partial dividends to determine the correct quotient digits.

A further object of the invention is to provide a novel divider including means for producing each quotient digit from a single inspection of predetermined circuits.

A still further object is to provide a novel divider wherein the multiples one through nine, are respectively added simultaneously to a complement of the dividend or partial dividend, as the case may be, to determine each quotient digit.

Another object of the invention is to provide novel circuit means for providing a plurality of multiples simultaneously.

Another object is to provide novel circuit means for receiving any number and providing preselected multiples thereof having corresponding digit positions in simultaneity.

Still another object is to provide a novel product generator for receiving information in the binary decimal system and providing the multiples one through nine, in the binary decimal system.

A further object is to provide a novel product generator for producing predetermined multiples of an input wherein the input is doubled a number of times corresponding to the exponent of 2 represented by the multiple.

Another object of the invention is to provide a novel binary to decimal converter for converting representations expressed in the binary notation into a single decimal representation of corresponding value.

Another object is to provide a novel electronic circuit which receives information in the binary notation and provides a first voltage from each input terminal in response to the presence of a binary 1, and a second voltage in response to the presence of a binary 0, and selectively applies these voltages to coincidence circuits corresponding to the decimal digits one through nine, to provide an UP voltage only at the output of the coincidence circuit corresponding to the decimal digit represented in the binary notation.

Another object of the invention is to provide a novel 4 pole 9 position coincidence selector switch for selecting the multiple of a binary decimal input corresponding to the decimal value of a second input.

Another object is to provide a novel coincidence circuit means for providing an output representing a multiple corresponding in decimal value to the decimal representation of one input.

A further object is to provide a novel circuit means having inputs for receiving a given multiplicand and multiples thereof, through the ninth, and an input for receiving a given multiplier to provide the product of the multiplicand and multiplier at the output.

A further object is to provide a novel circuit arrangement for converting a value represented in the decimal system to the same value represented in the binary notation.

A further object is to provide a novel circuit arrangement for converting, one at a time, digits represented in the decimal system to representations in the binary decimal system.

Another object of the invention is to provide a novel circuit for converting individual representations in a first coded system into the corresponding representations in a second coded system.

Another object of the invention is to provide a novel system for controlling the cyclic operation of an electronic multiplier.

Still another object is to provide a novel circuit for cyclically controlling the operation of an electronic multiplier wherein the presence of a product digit greater than zero in the highest digit position of the product is utilized by the same circuit to change the cyclic pattern of multiplier operations to effect storage of this digit occupying the highest digit position of the product.

Another object of the invention is to provide a novel circuit for cyclically controlling the operation of electronic divider.

Another object of the invention is to provide a novel serial type generator for simultaneously providing preselected multiples of an input.

Another object of the invention is to provide a novel single pole converter for selecting a multiple of a multiplicand in accordance with the value of a multiplier.

Another object of the invention is to provide a novel electronic multiplier wherein the partial products and the product are obtained susbtantially simultaneously.

Still another object is to provide a novel multiplier wherein the highest partial product is added to the next lower partial product and the sum added to the next lower partial product until the output, including the lowest partial product, represents the product.

A further object is to provide a novel multiplier wherein multiples of the multiplicand determined by the multiplier are added in timed relation to provide the product.

A further object is to provide a novel multiplier for creating multiples of the multiplicand corresponding to bit values in the binary decimal system and utilizing these multiples in accordance with the occurrence of the bits in each decimal digit of the multiplier.

A further object is to provide a novel multiplier of the binary decimal type wherein multiples of the divisor corresponding to bit values of the binary decimal system are selected in accordance with the decimal value of each digit of the multiplier and combined to determine partial products related thereto.

Other objects of the invention will be pointed out in the following description and claims and illustrated in the accompanying drawings, which disclose, by way of examples, the principle of the invention and the best mode, which has been contemplated, of applying that principle.

Figures 1Q, 1R:
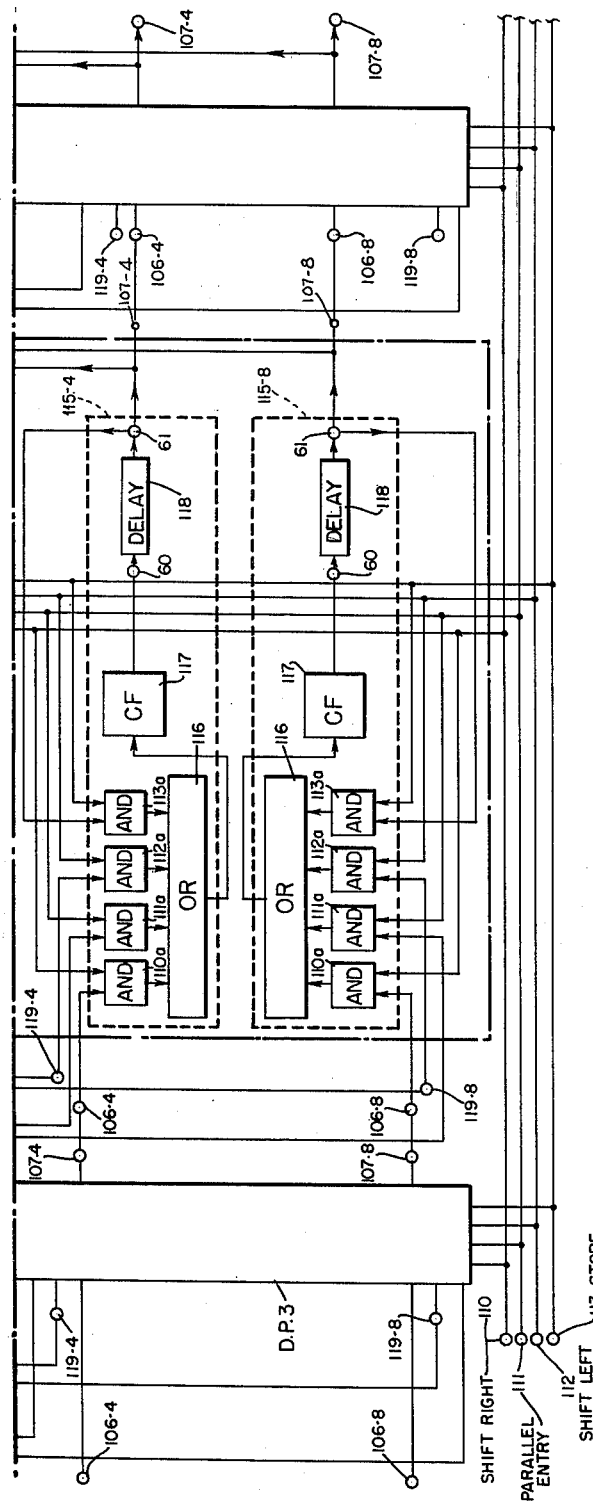
FIG. 1A is a circuit diagram of an AND circuit suitable for use with the invention.
FIG. 1B is a block diagram of the circuit of FIG. 1A.
FIG. 1C is a circuit diagram of an OR circuit suitable for use with the invention.
FIG. 1D is a block diagram of the circuit of FIG. 1C.
FIG. 1E is a circuit diagram of an inverting circuit.
FIG. 1F is a block diagram of the circuit shown in FIG. 1E.
FIG. 1G is a circuit diagram of a cathode follower.
FIG. 1H is a block diagram of the circuit of FIG. 1G.
FIG. 1J is a circuit diagram of a delay circuit.
FIG. 1K is a series of curves showing the operation of the circuit of FIG. 1J.
FIG. 1L is a block diagram of the circuit of FIG. 1J.
FIG. 1M is a diagram of a serial-parallel type binary decimal adder.
FIG. 1N is a block diagram of the adder of FIG. 1M.
Figures 2, 4F:
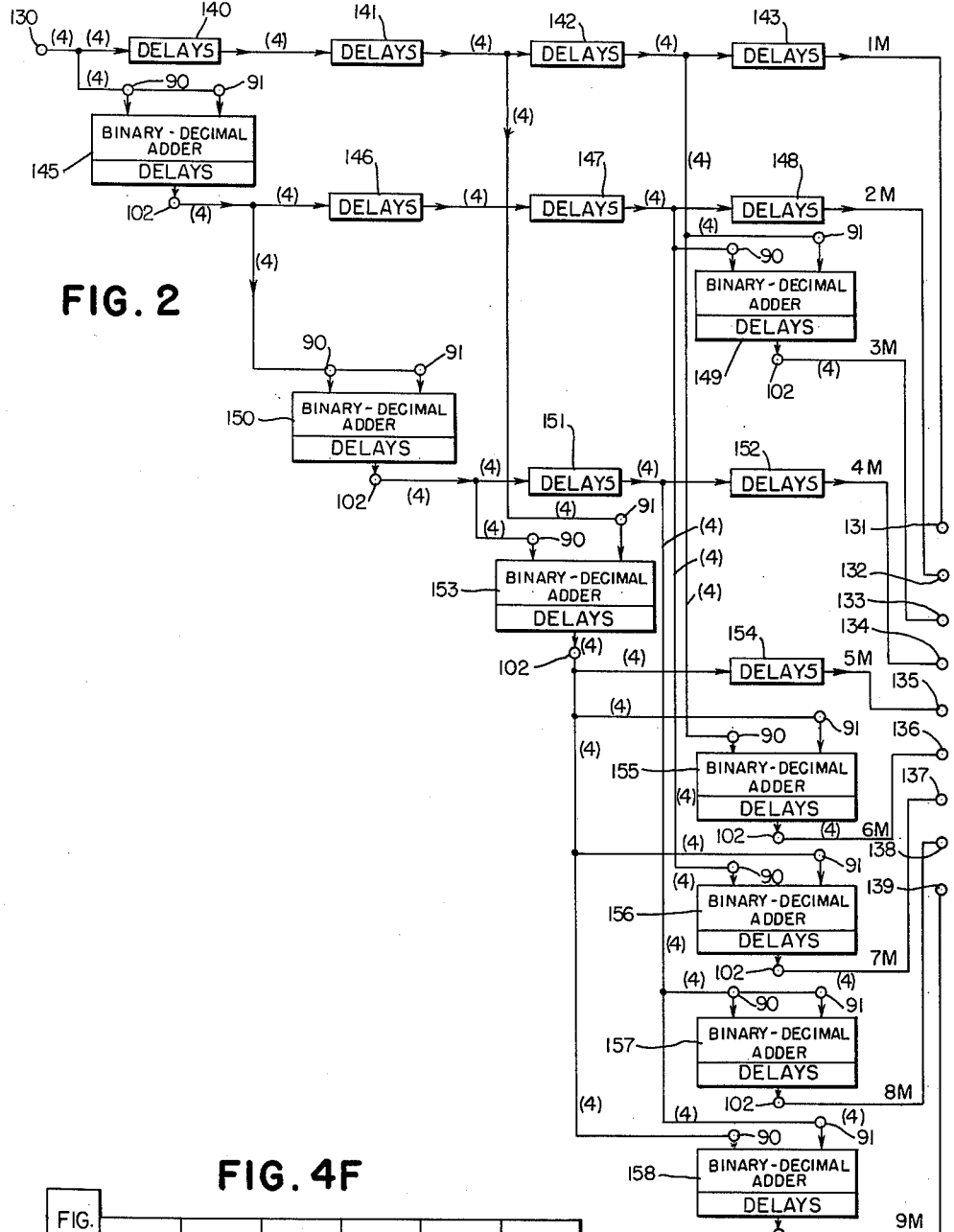
Figures 5, 5A:
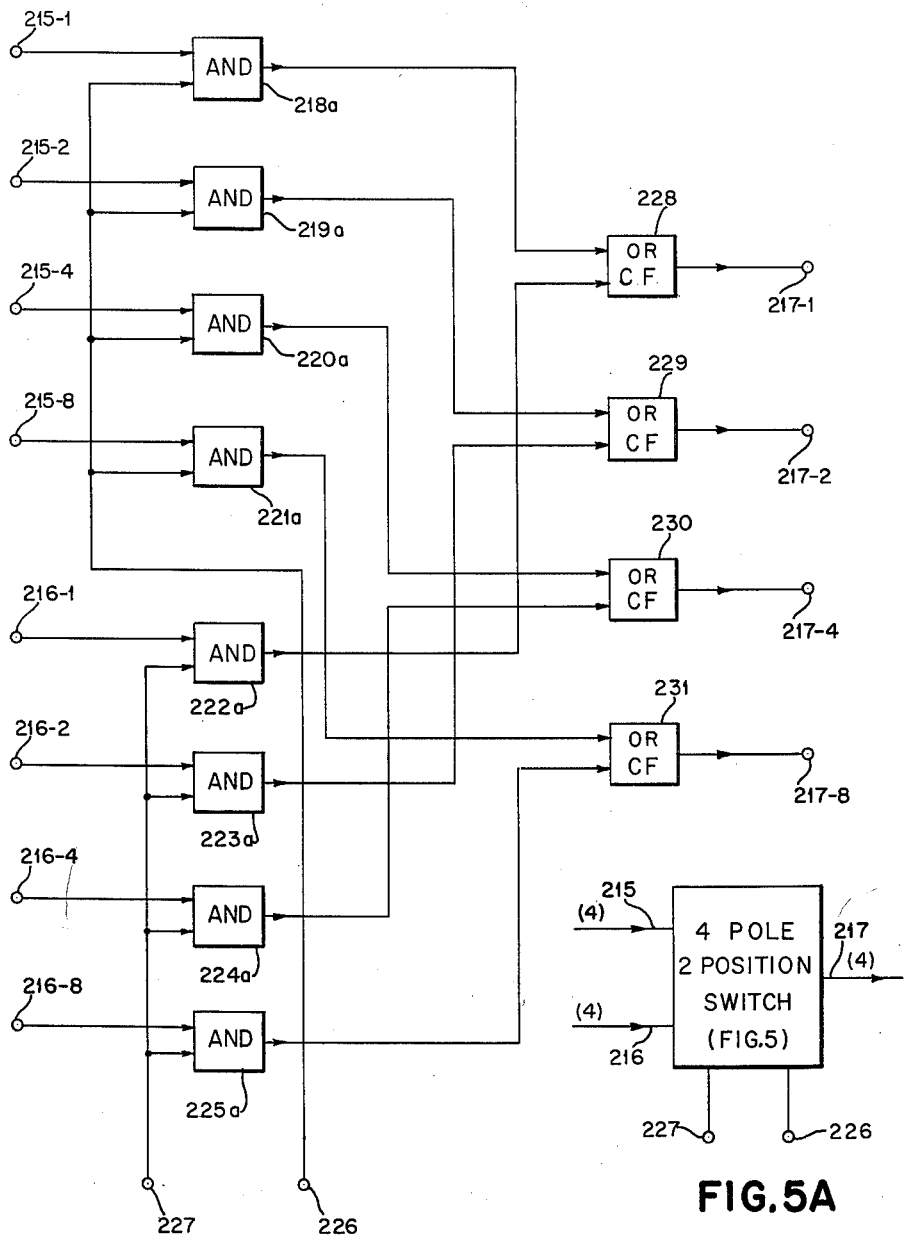
Figures 7, 7A:
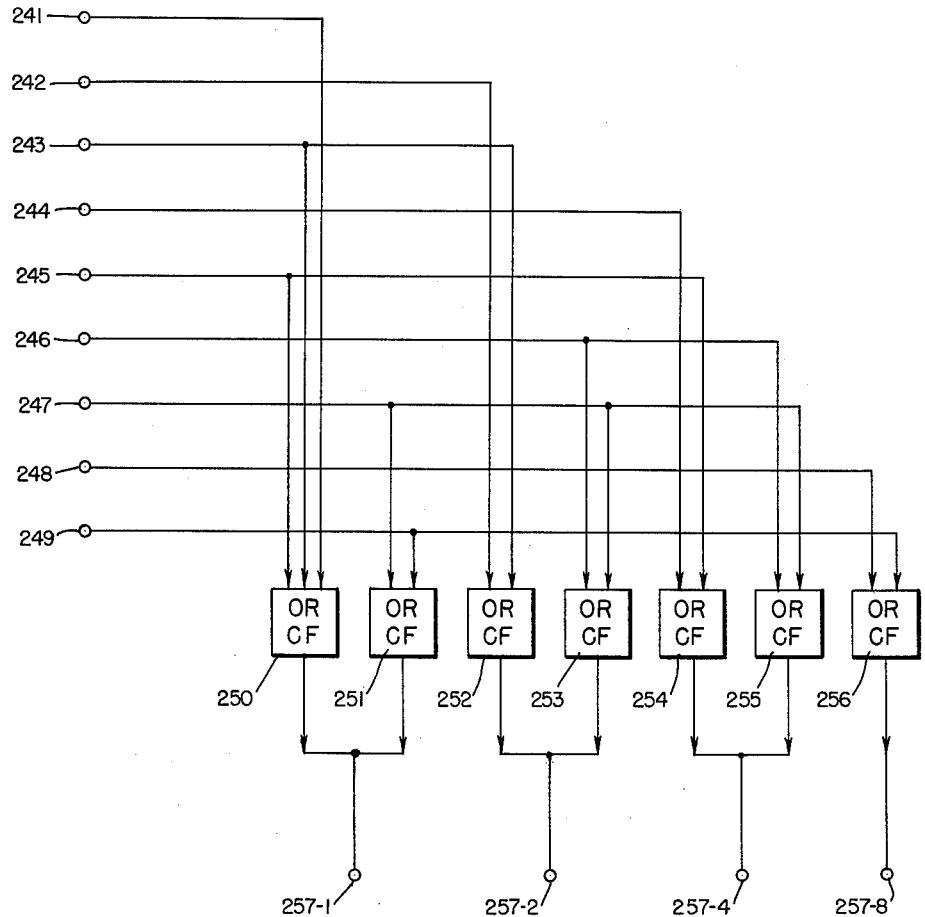
Figure 8A:
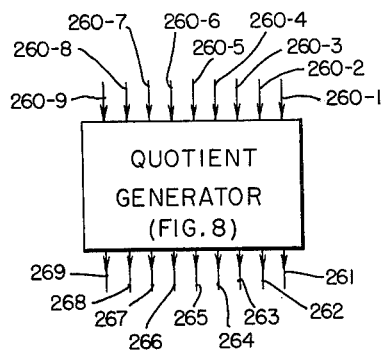
Figure 8:
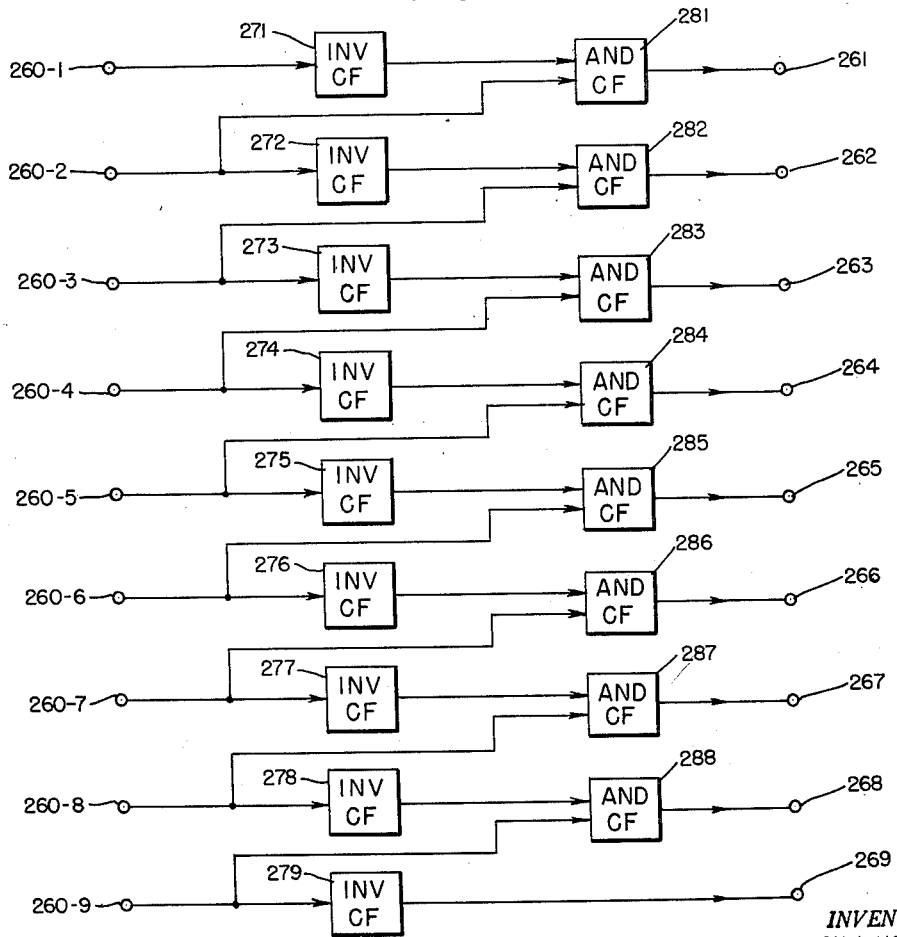
Figures 10A, 10D:
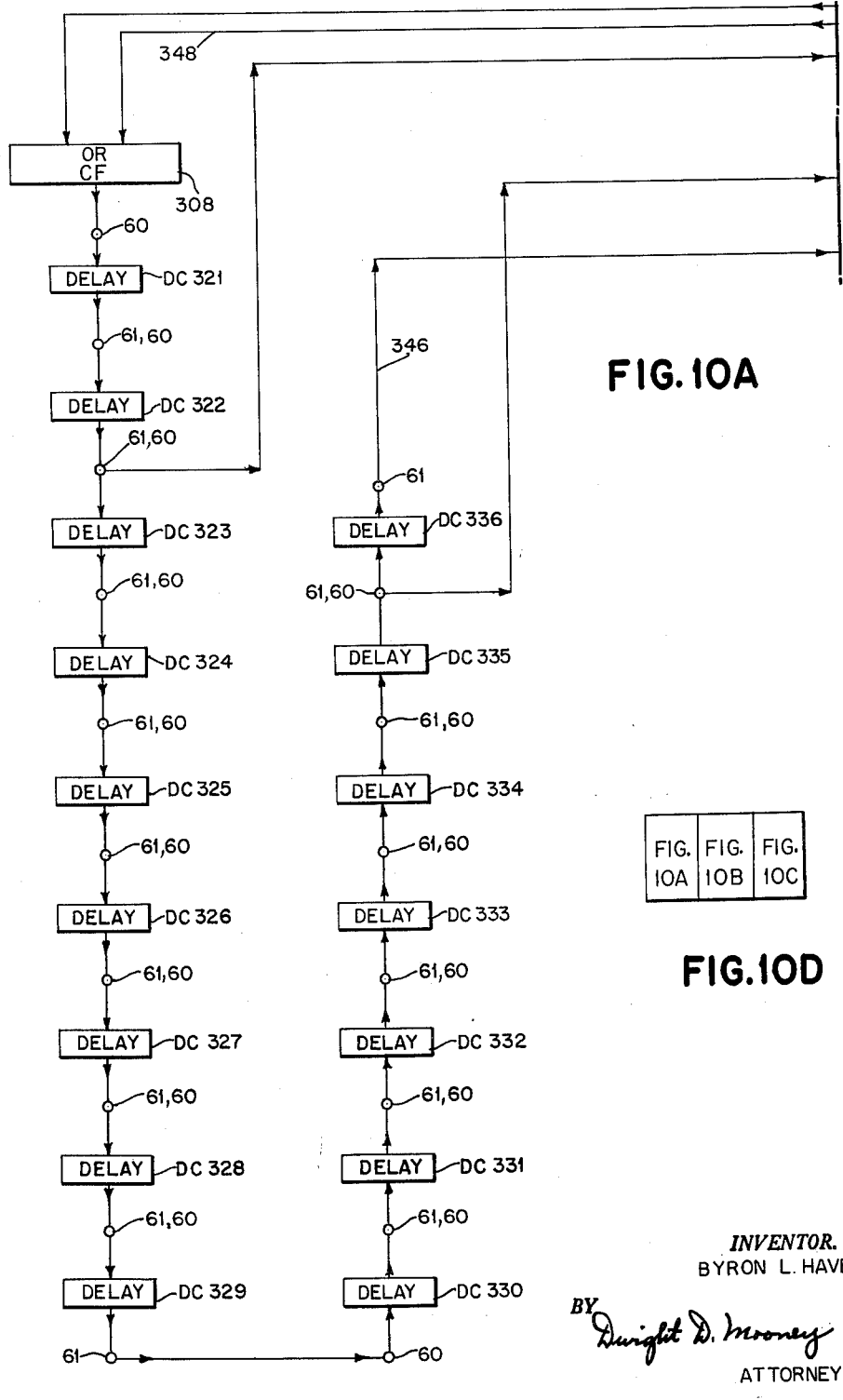
Figure 10B:
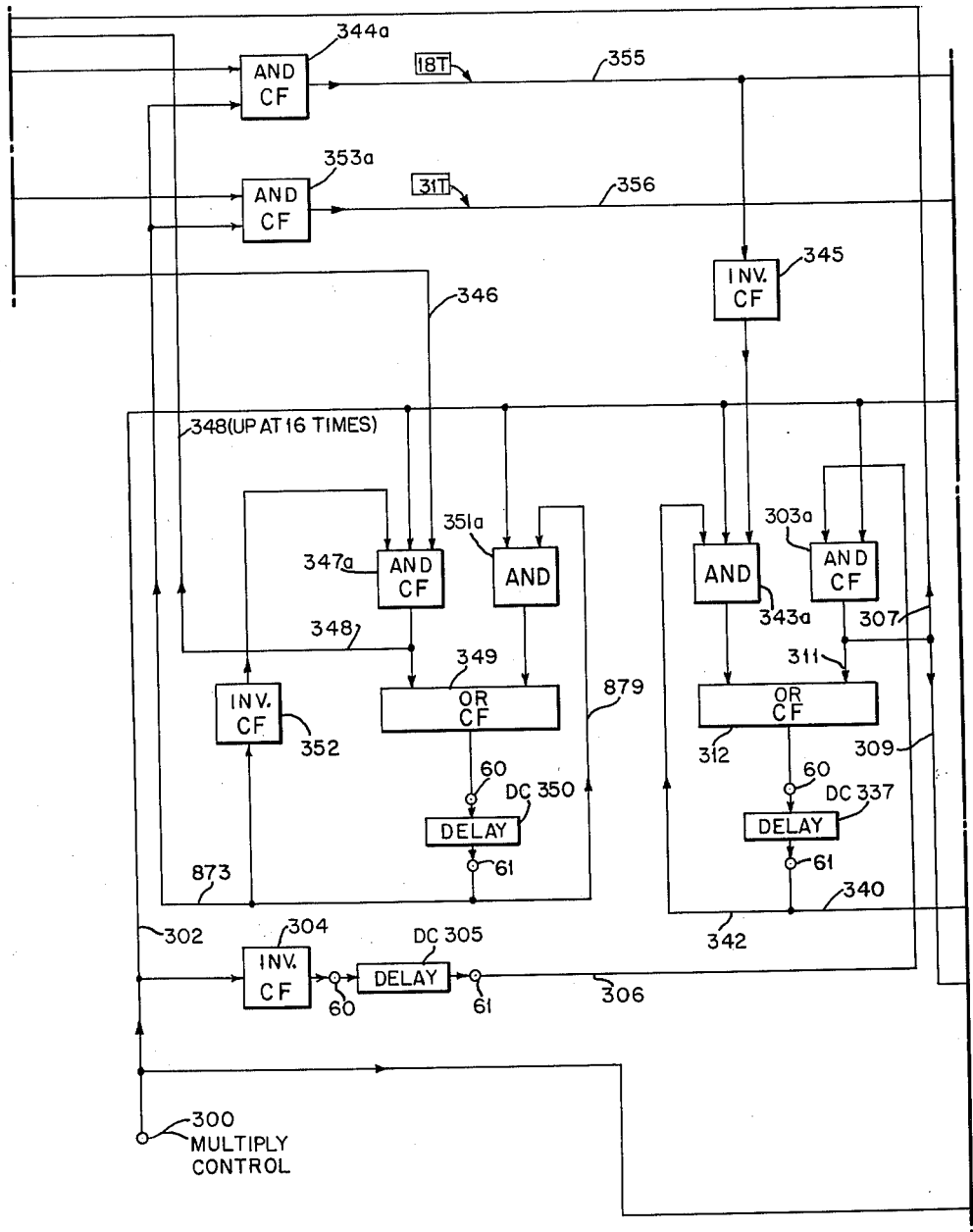
Figure 10C:
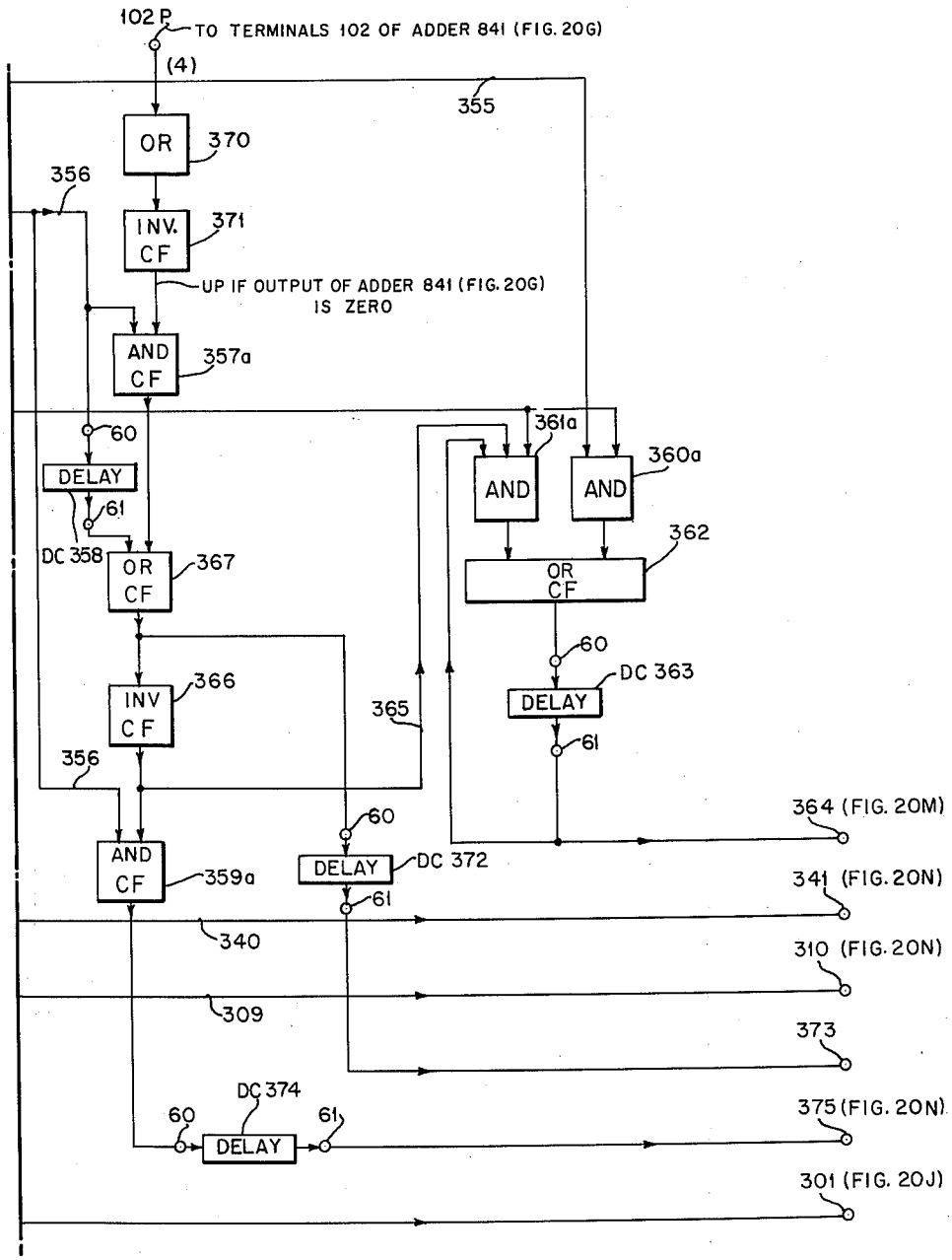
Figure 10E:
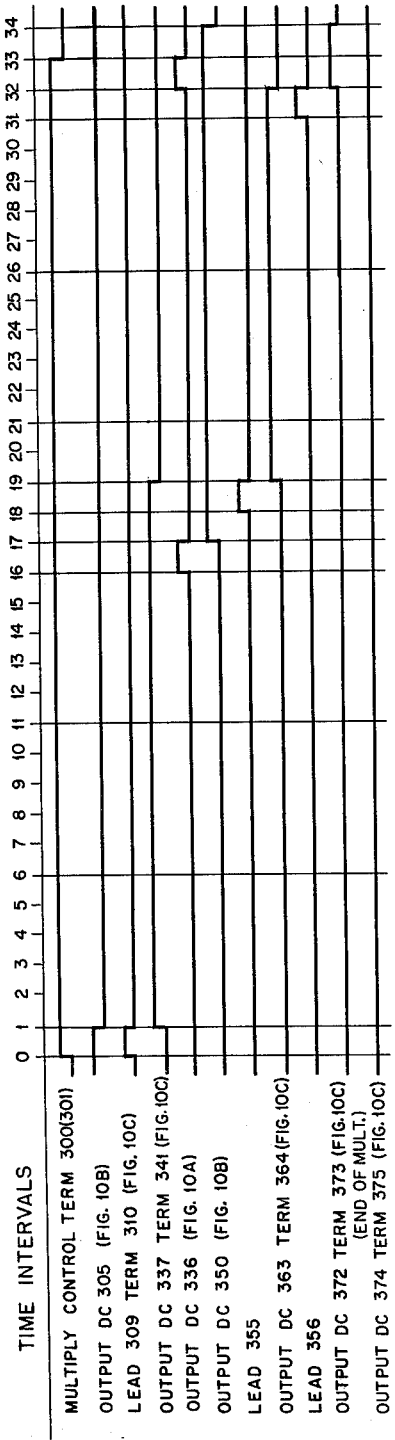
Figure 10F:
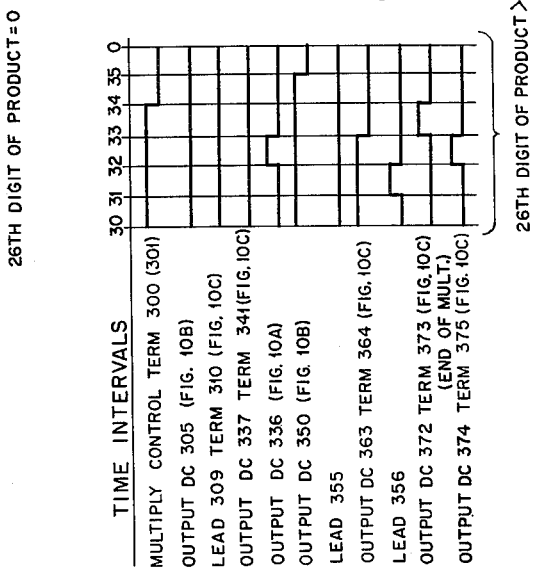
Figure 11A:
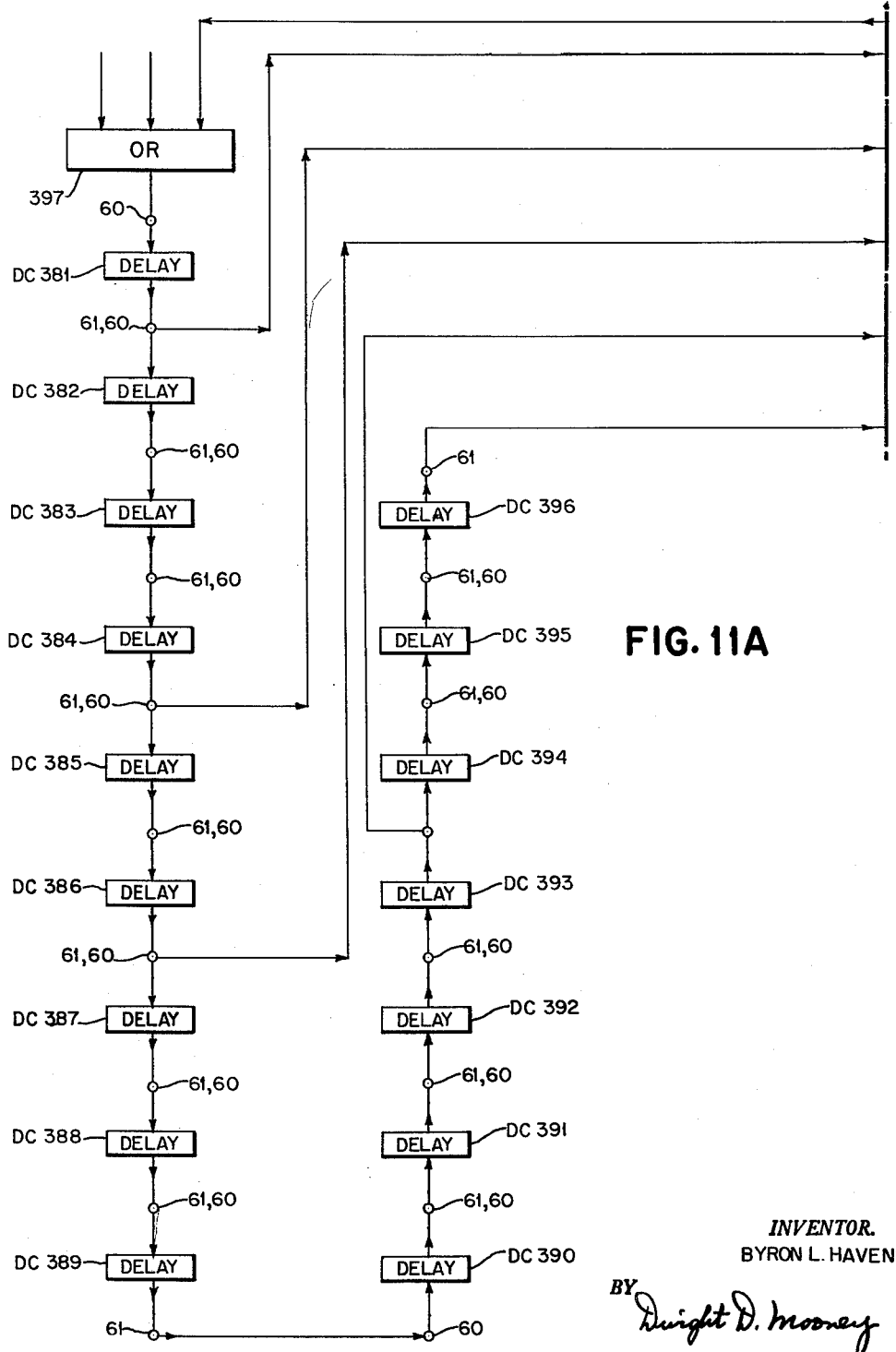
Figure 11B:
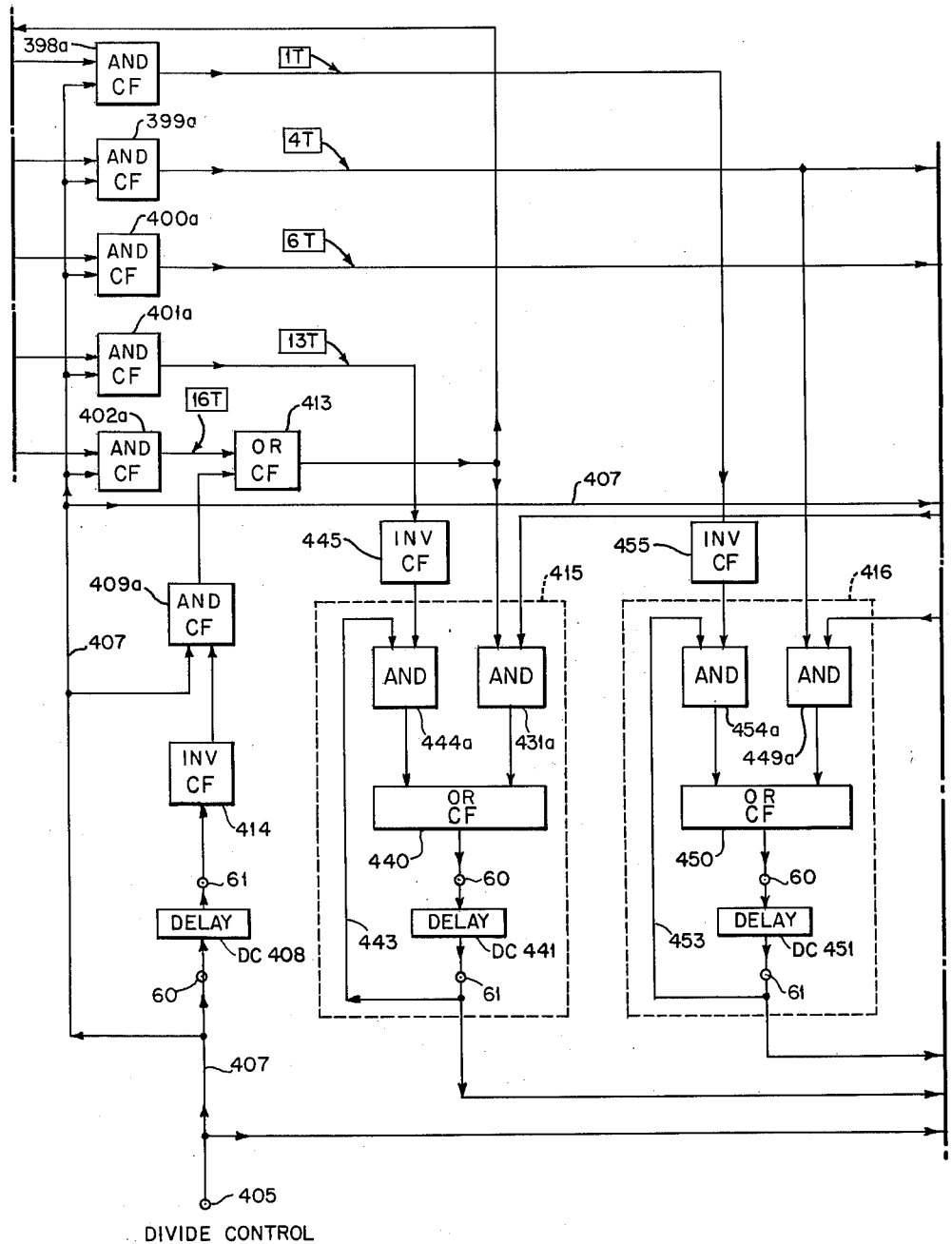
Figure 11C:
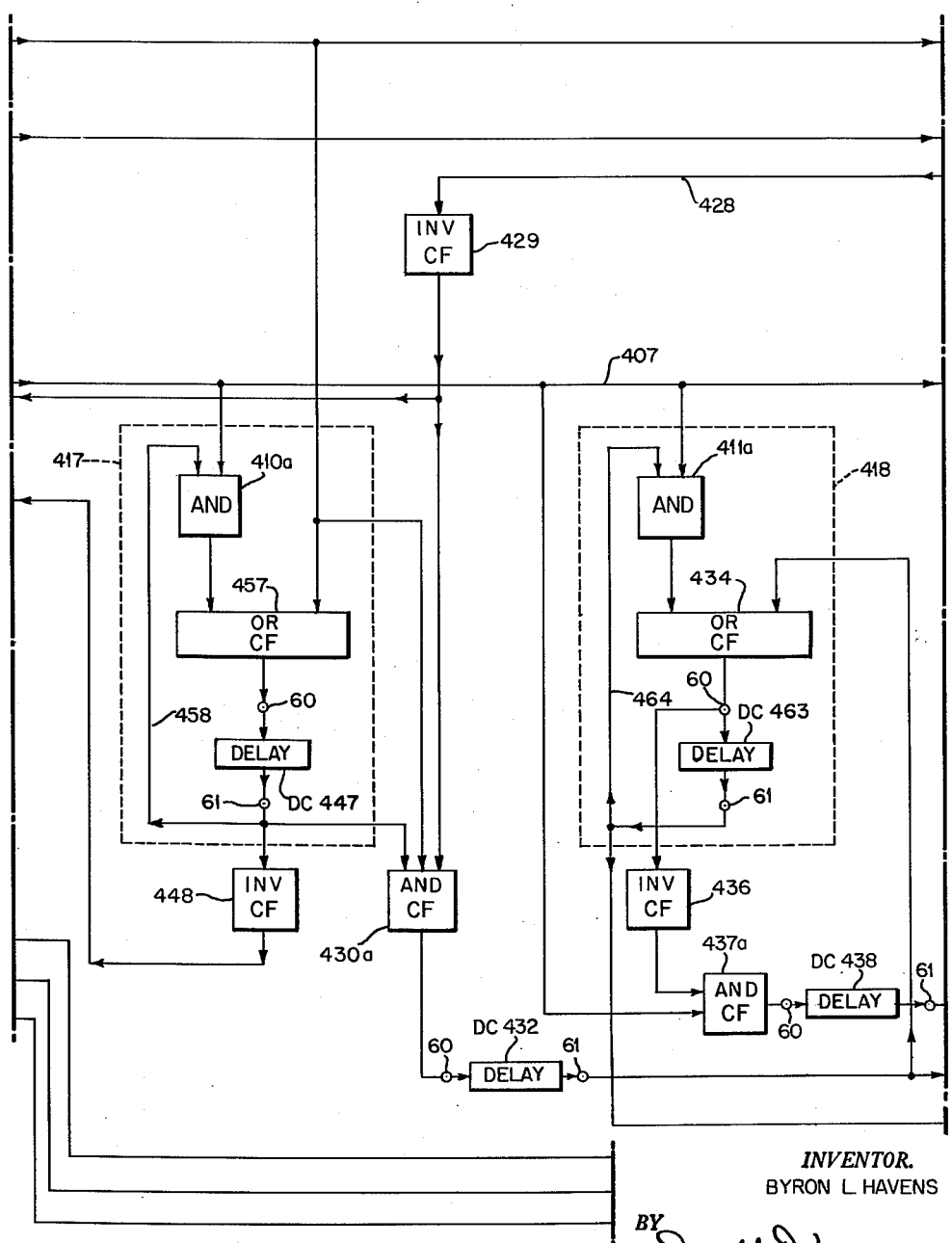
Figure 11D:
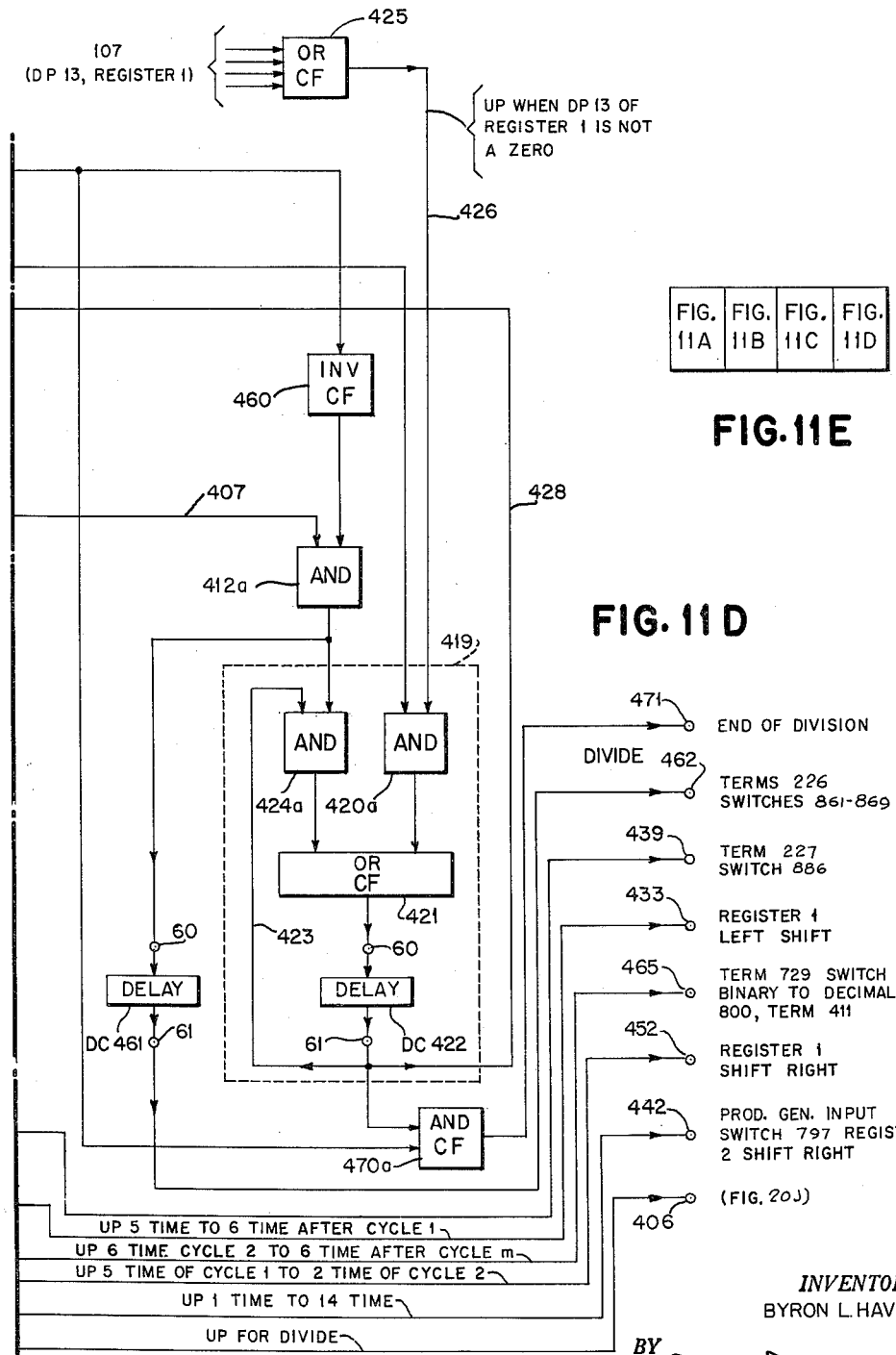
Figure 11E:
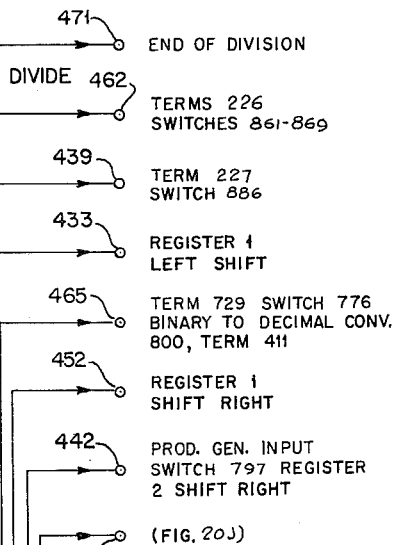
Figures 11F, 11H:
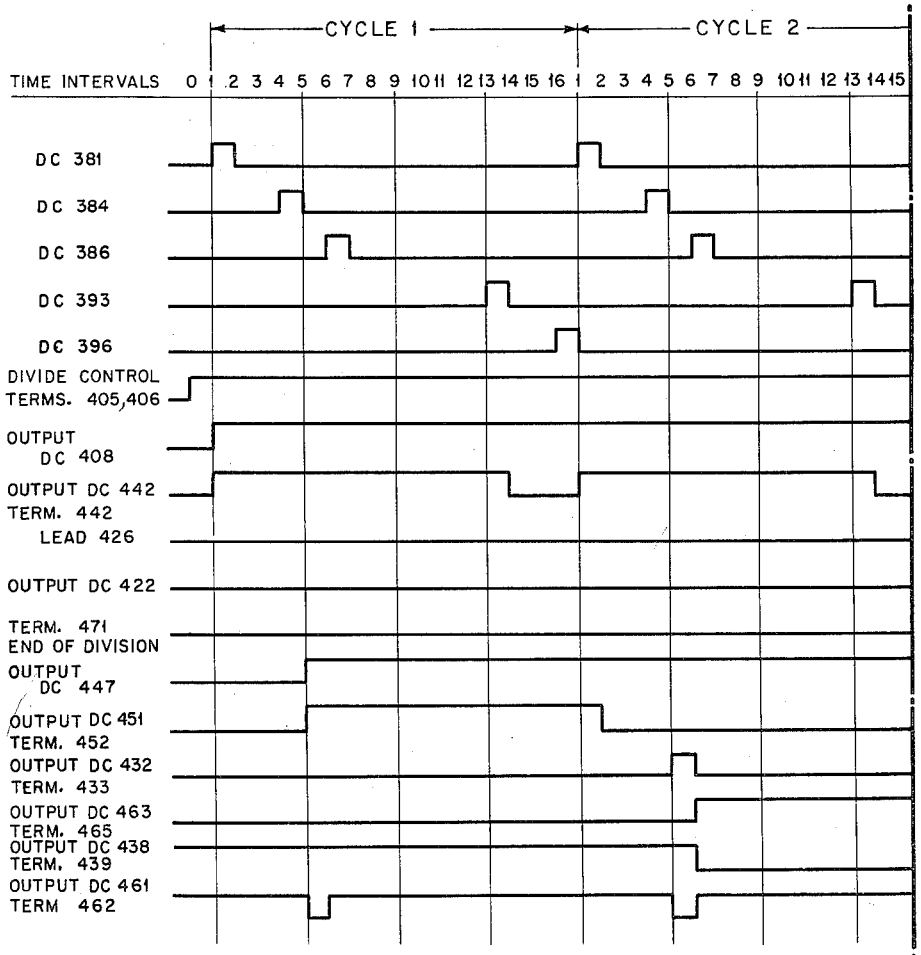
Figure 11G:
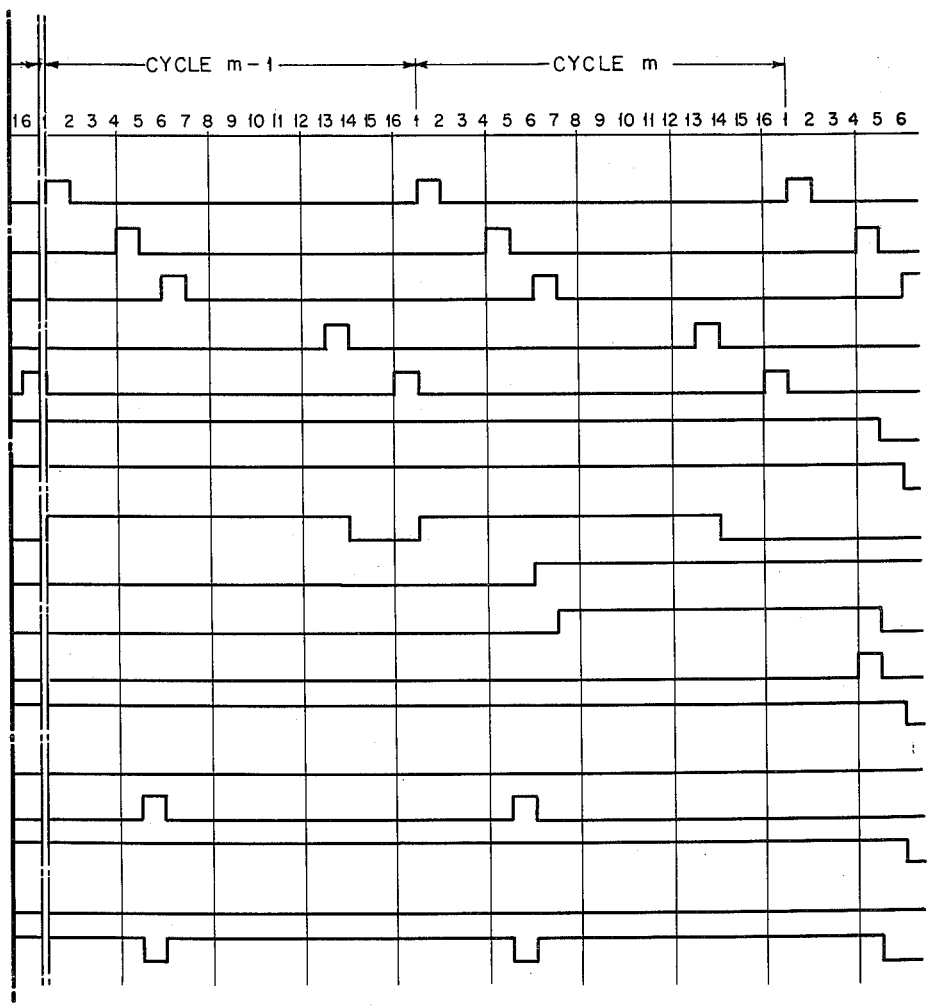
Figure 13C:
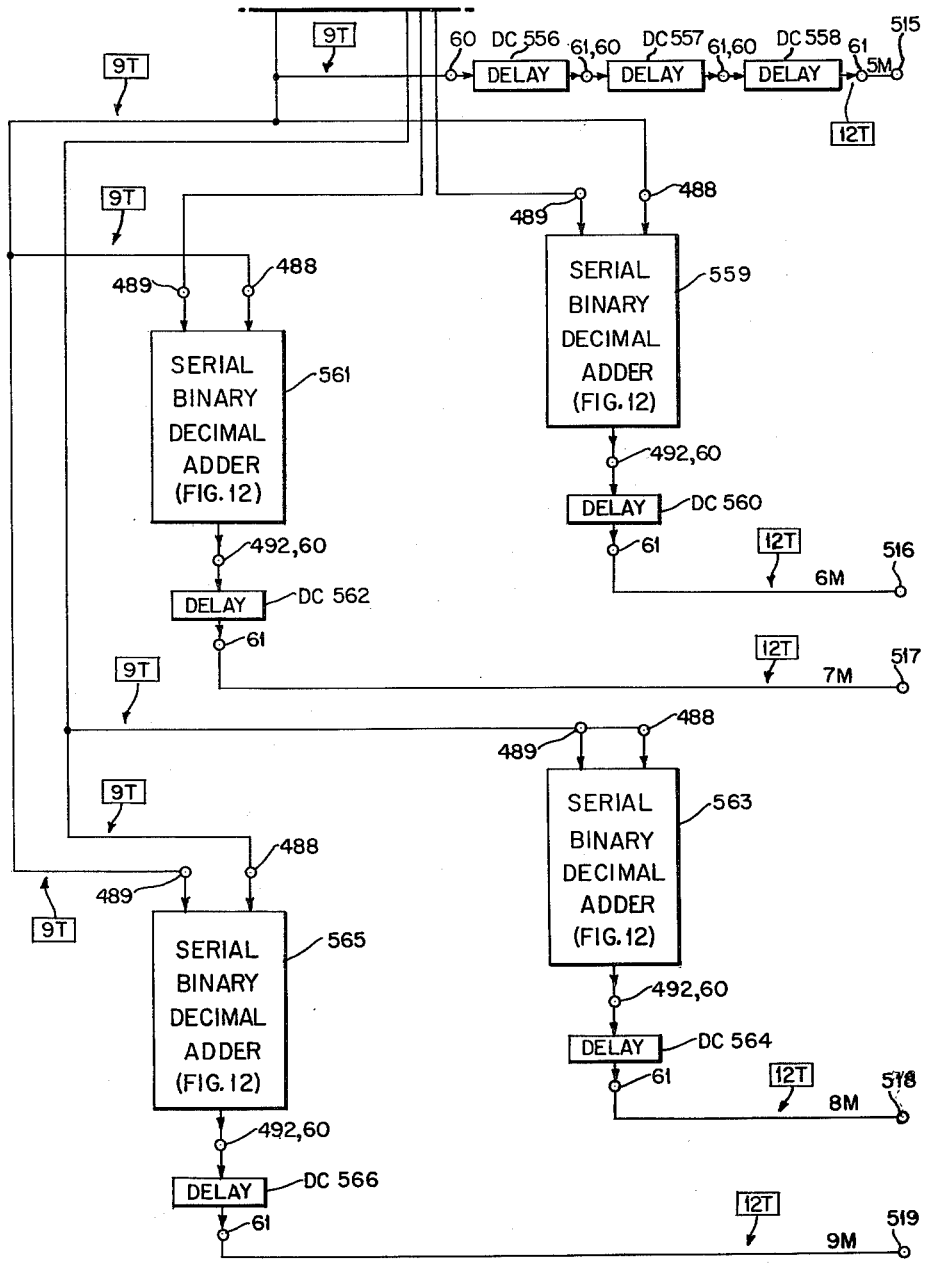
Figure 14:
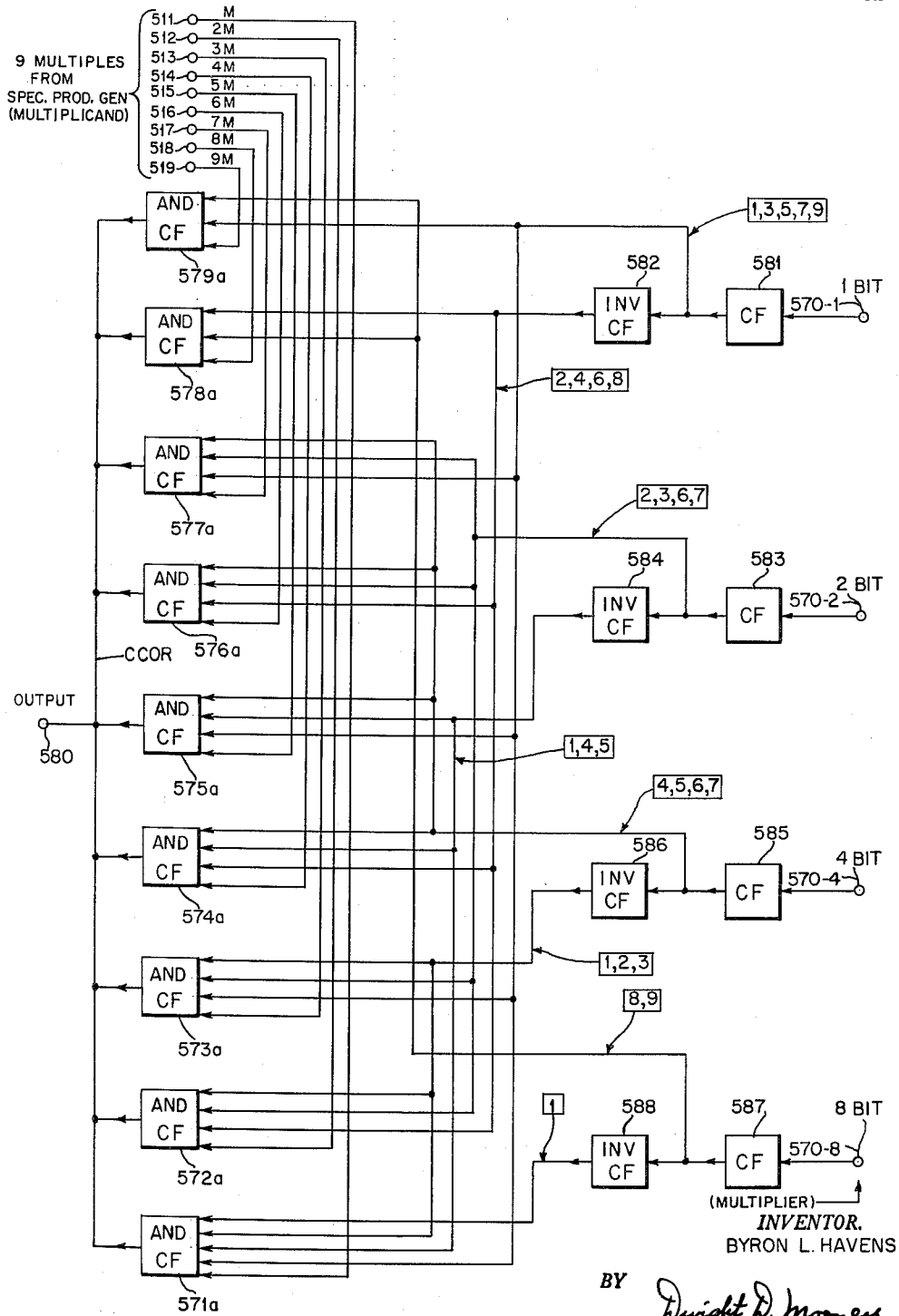
Figure 16D:
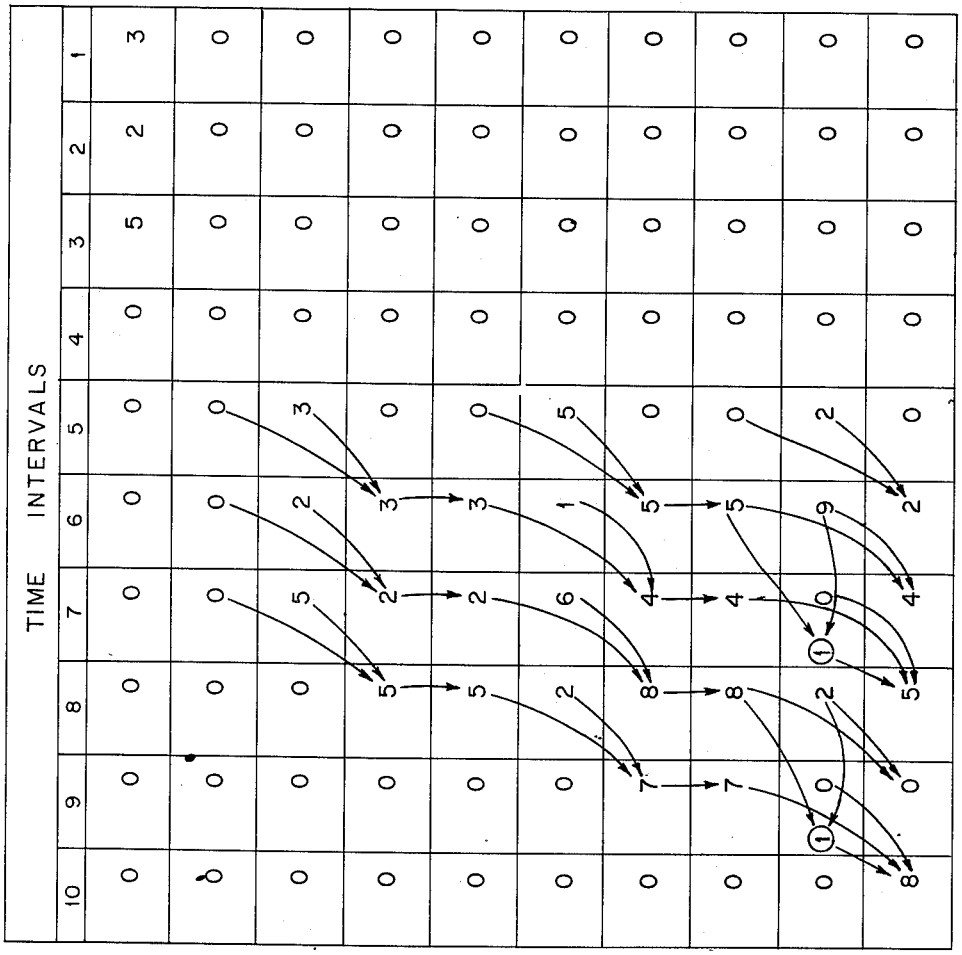
Figure 17A:
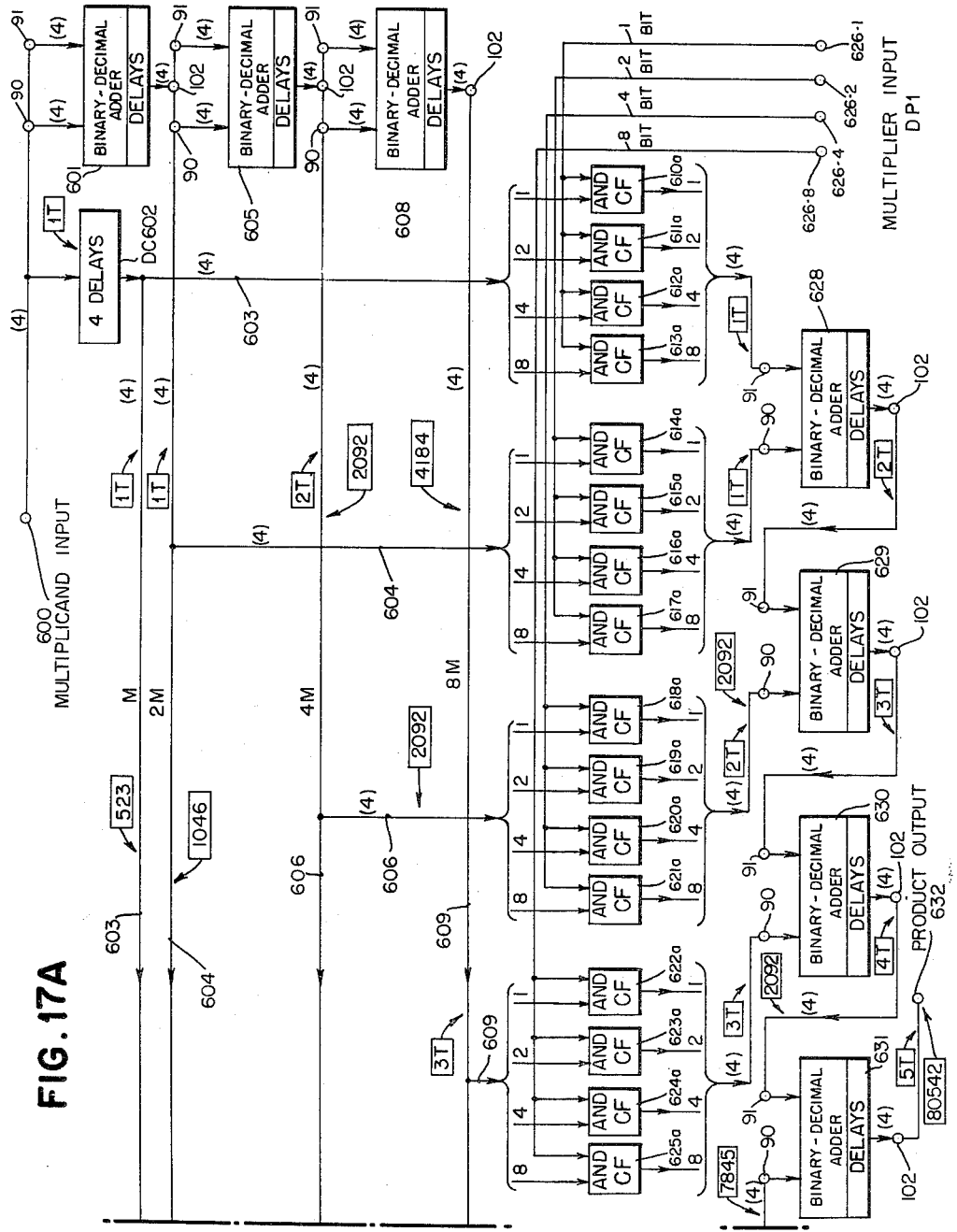
Figure 17B:
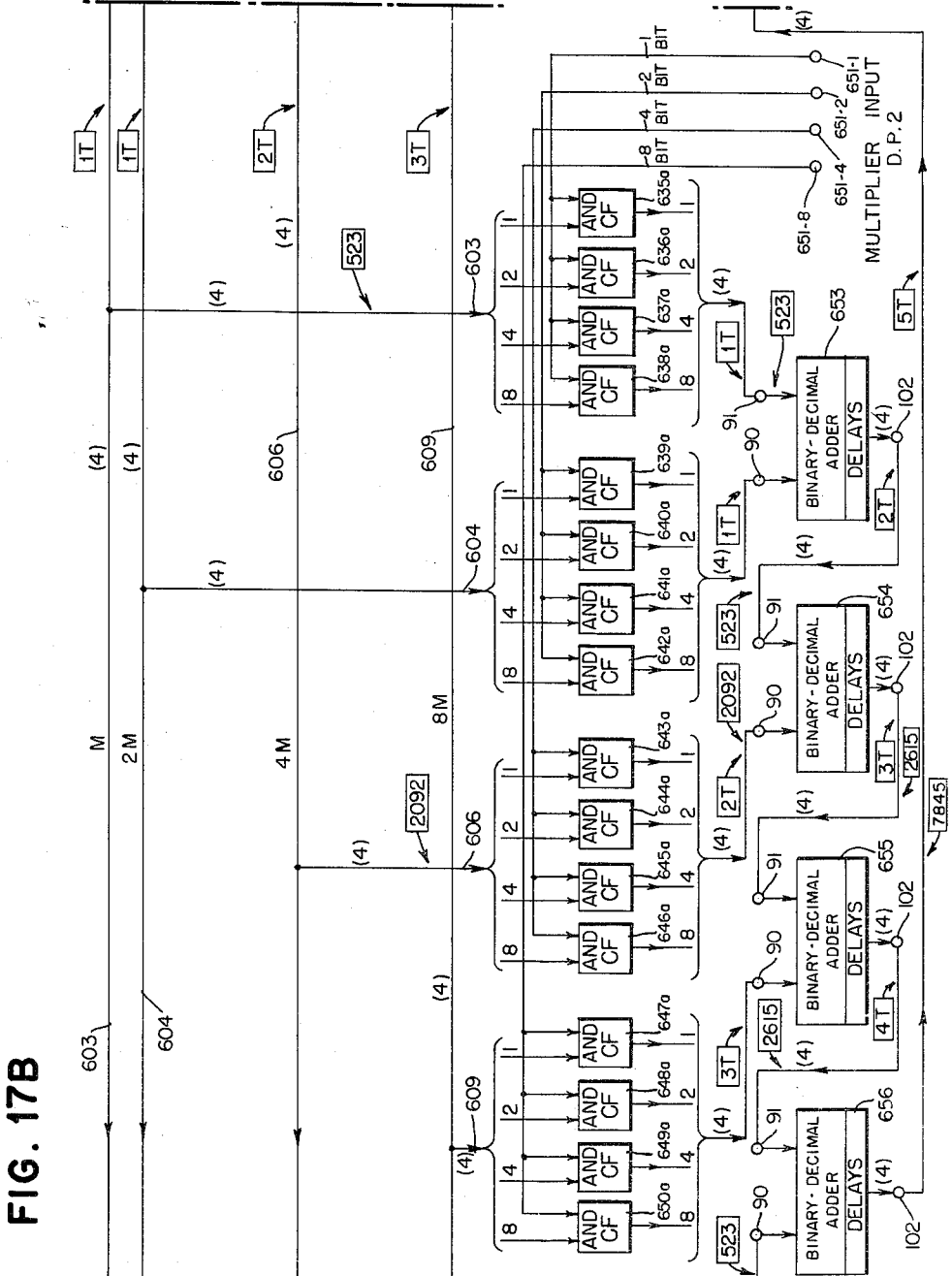
Figure 18:
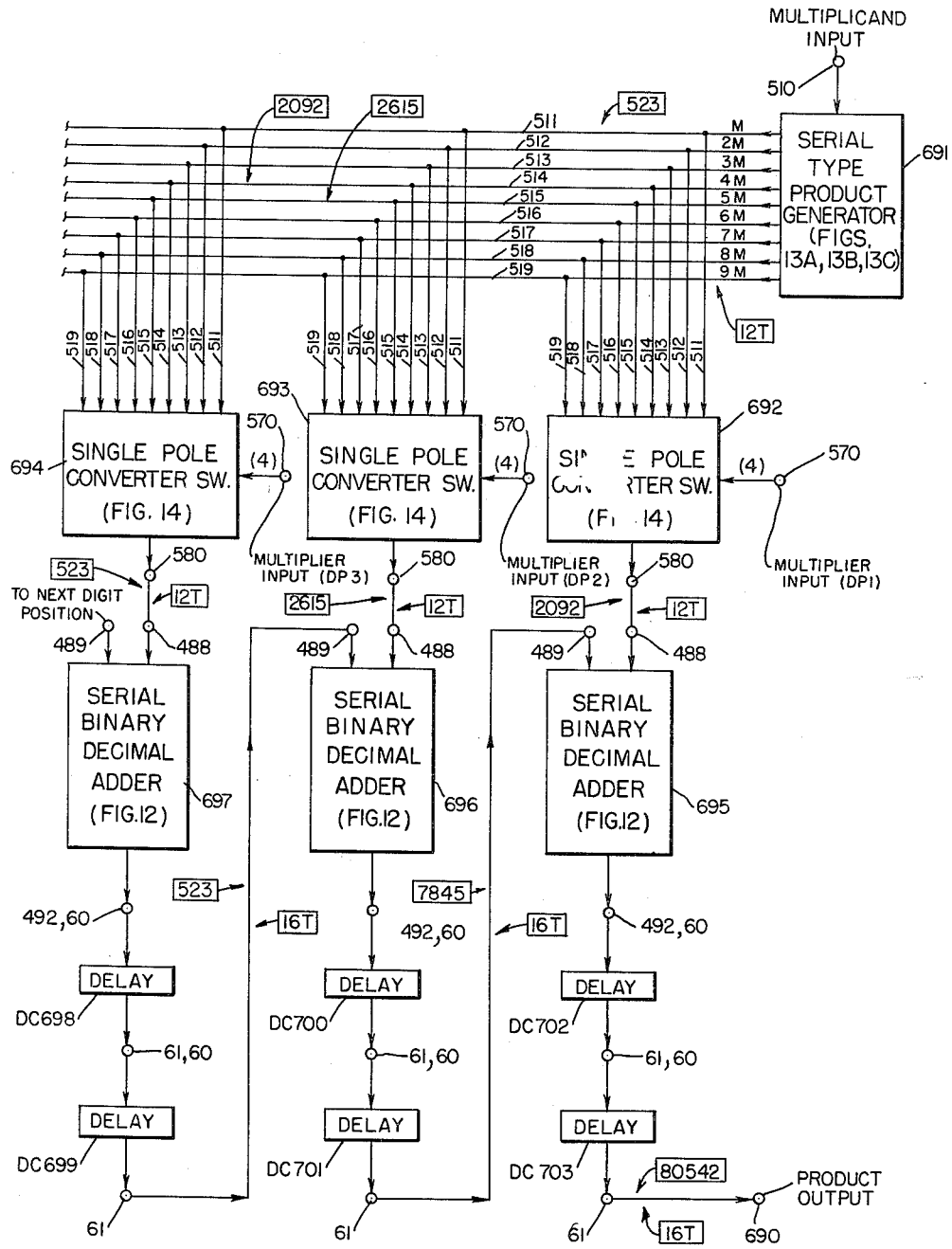
Figure 19B:
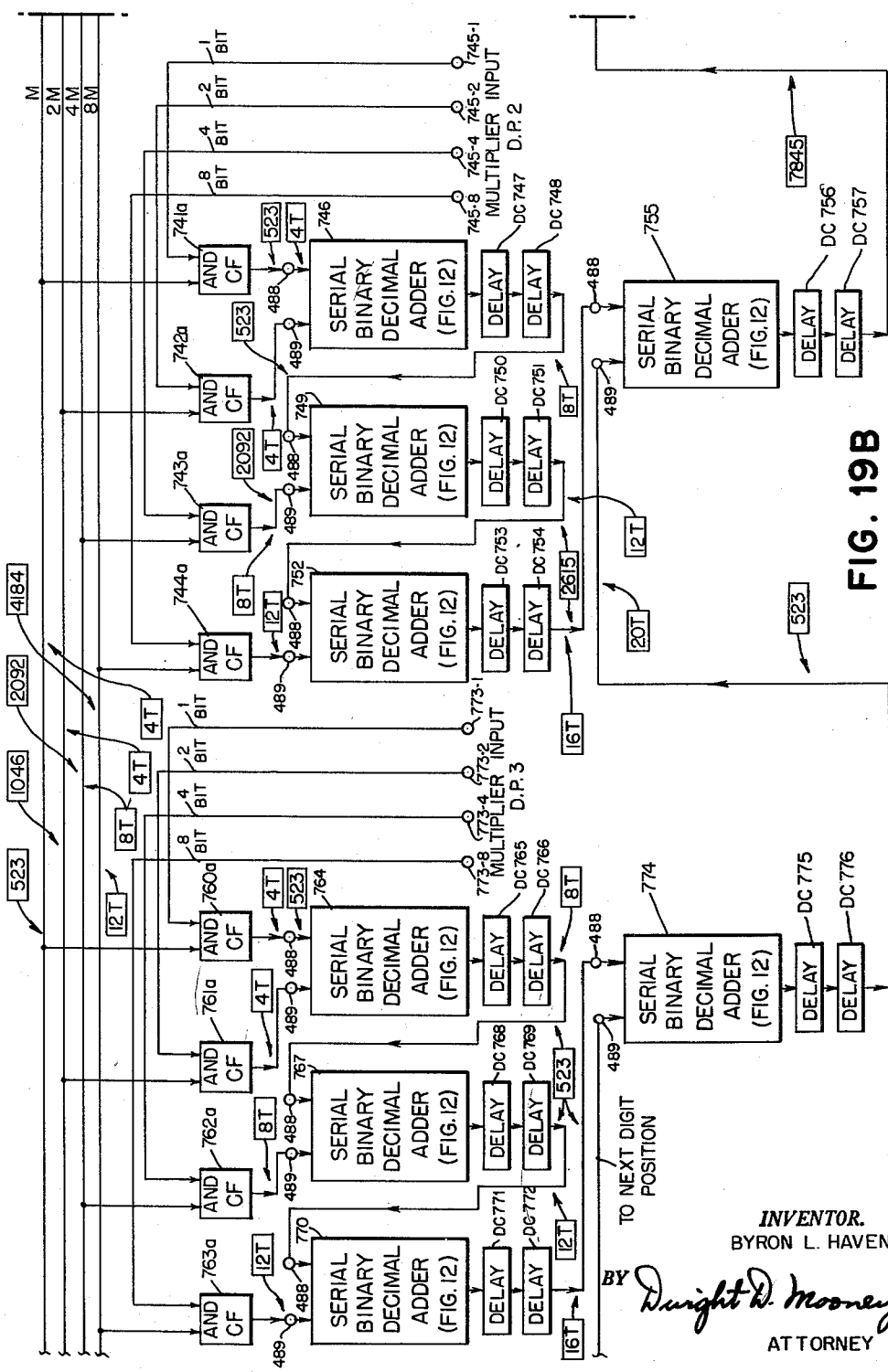
Figure 20A:
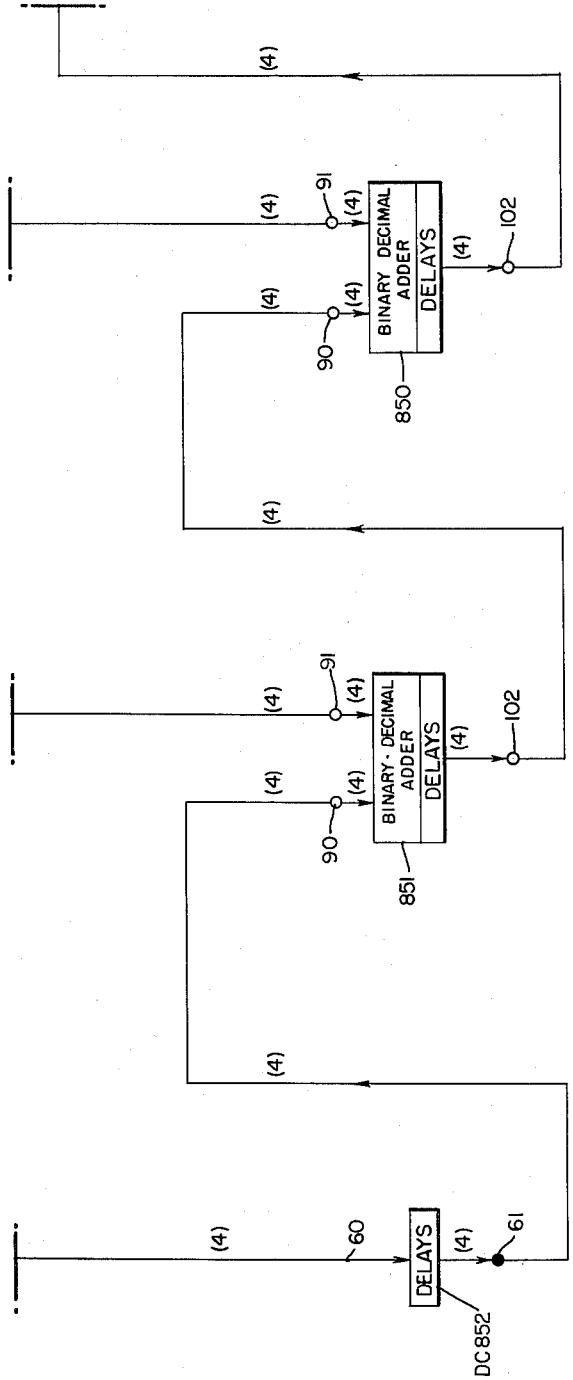
Figure 20P:
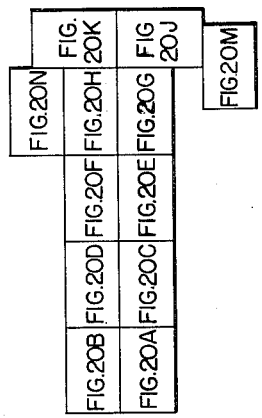
Figure 21B:
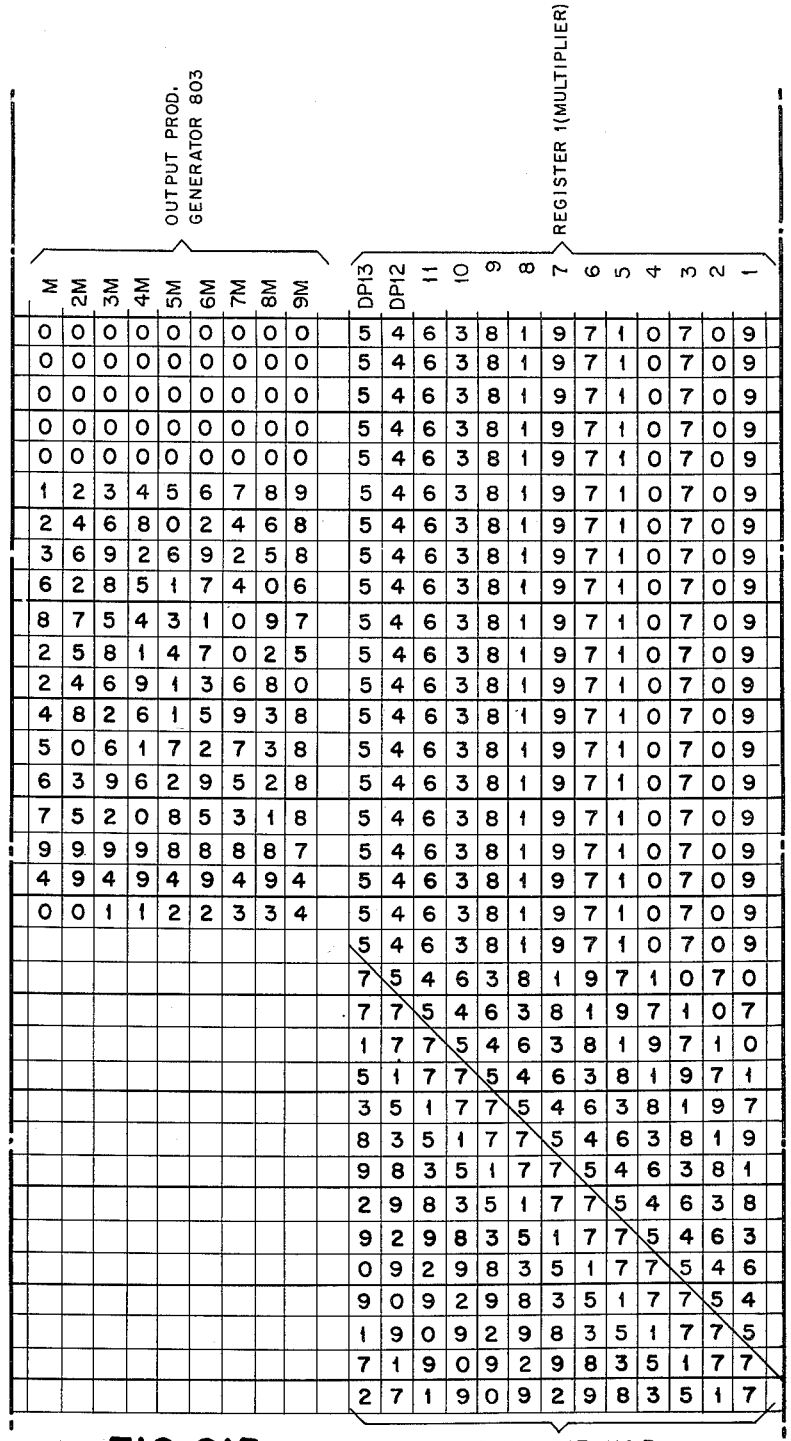
Figure 23B:
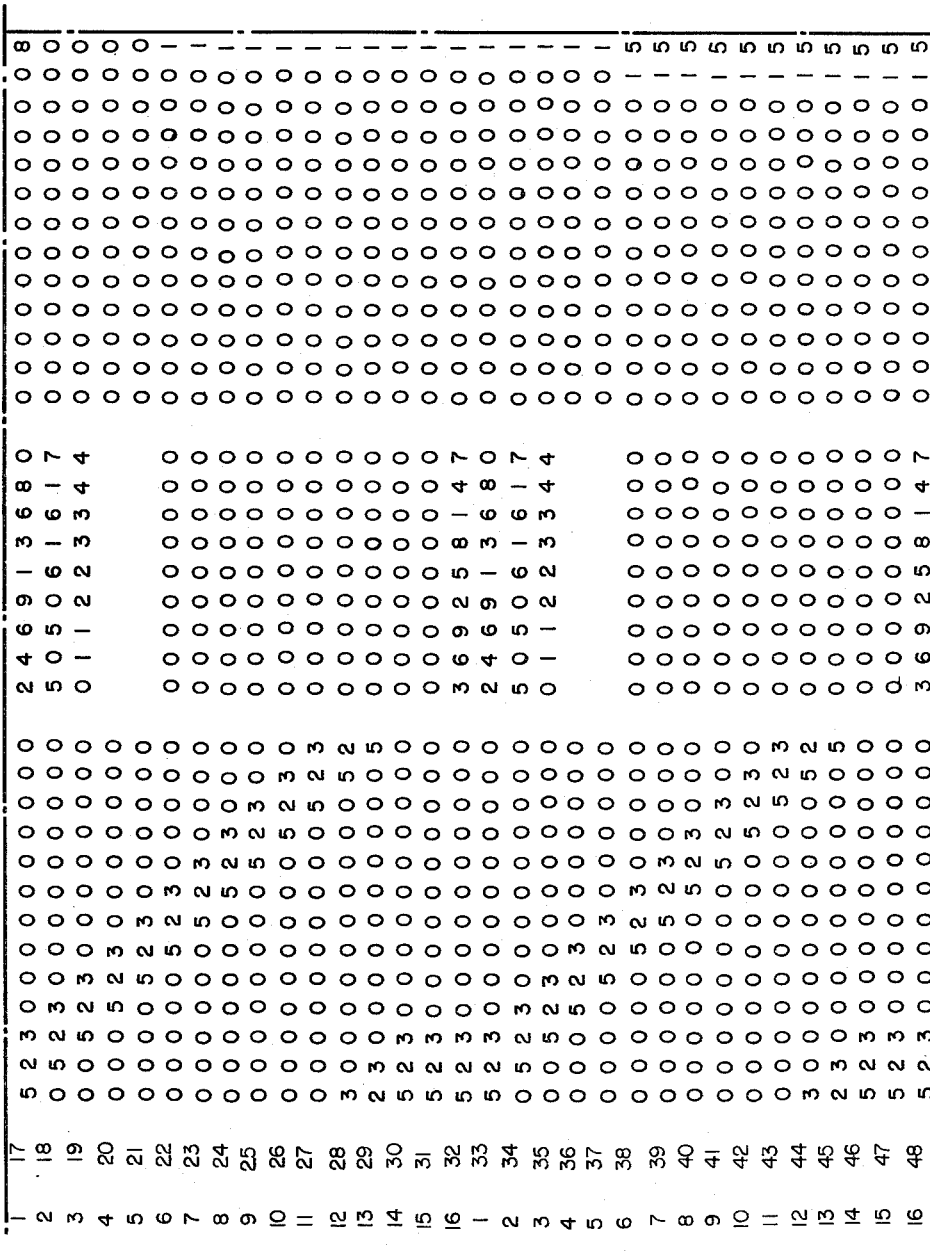
Figure 24:
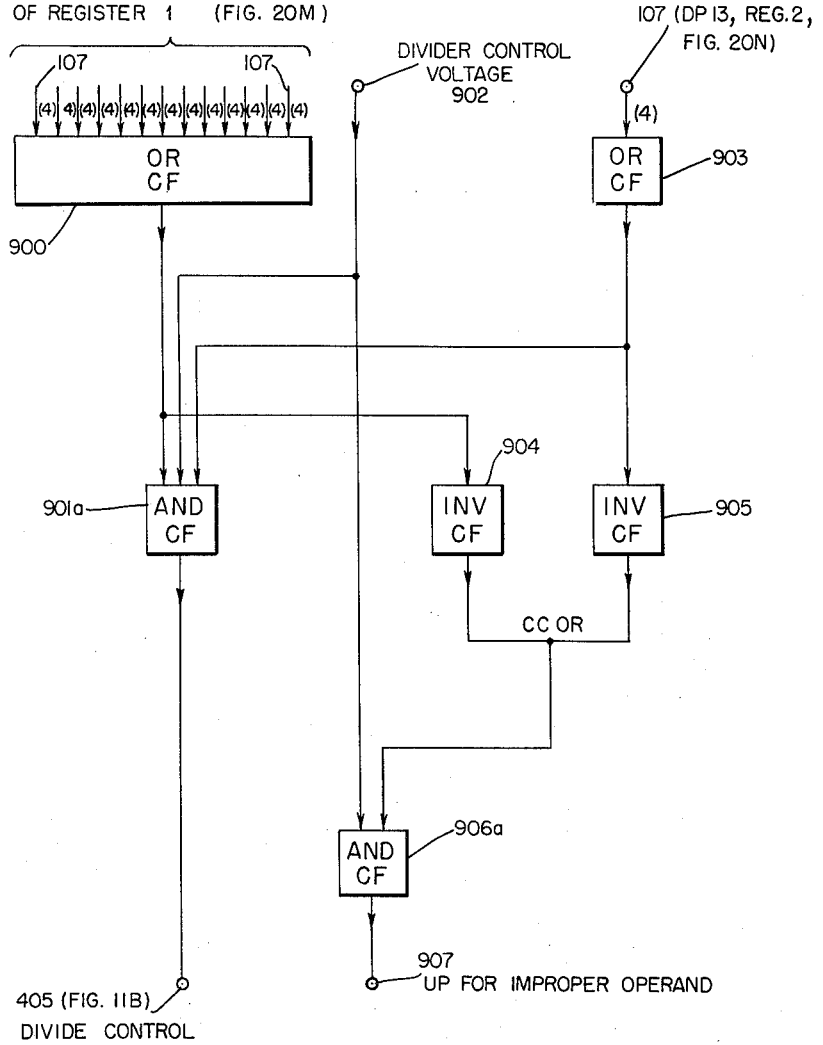

FIGS. 1P and 1Q arranged as in FIG. 1R show three digit positions of a universal register suitable for use with the invention;

FIG. 1S is a block diagram of the universal register shown in FIG. 1R;

FIG. 2 is a diagram showing a product generator for producing predetermined multiples of an input;

FIG. 3 is a diagram of the binary to decimal converter;

FIG. 3A is a block diagram of the converter of FIG. 3;

FIGS. 4A, 4B, 4C and 4D arranged as indicated in FIG. 4F comprise a 4 pole 9 position selector switch;

FIG. 5 is a diagram of a 4 pole 2 position switch employed by the invention;

FIG. 5A is a block diagram of the switch shown in FIG. 5;

FIG. 6 is a diagram of a 4 pole 1 position switch employed by the invention;

FIG. 6A is a block diagram of the switch shown in FIG. 6;

FIG. 7 is a diagram of a novel decimal to binary decimal converter;

FIG. 7A is a block diagram of the decimal to binary decimal converter of FIG. 7;

FIG. 8 is a diagram of a novel quotient generator employed by the invention;

FIG. 8A is a block diagram of the quotient generator of FIG. 8;

FIG. 9 is a diagram of a nines complement generator;

FIG. 9A is a block diagram of the nines complement generator shown in FIG. 9;

FIGS. 10A, 10B and 10C arranged as shown in FIG. 10D comprise a diagram of a control circuit for use with a multiplier of the invention;

FIGS. 10E and 10F show principal waveforms produced by the control circuit of FIG. 10D;

FIGS. 11A, 11B, 11C and 11D arranged as shown in FIG. 11E comprise a diagram of a control circuit for use with the divider of the invention;

FIGS. 11F and 11G arranged as shown in FIG. 11H show principal waveforms produced by the control circuit of FIG. 11E;

FIG. 12 is a diagram of a serial binary-decimal adder;

FIG. 12A is a block diagram of the serial binary-decimal adder of FIG. 12;

FIGS. 13A, 13B and 13C arranged as shown in FIG. 13D comprise a diagram of a novel serial type generator;

FIG. 14 is a diagram of a novel single pole converter switch;

FIGS. 15, 15A, 15B, 15C, 15D and 15E illustrate how multiplication is performed by the invention;

FIGS. 16A and 16B arranged as shown in FIG. 16C comprise an embodiment of the multiplier of the invention;

FIG. 16D is a chart illustrating the operation of the multiplier of FIG. 16C;

FIGS. 17A, 17B and 17C arranged as shown in FIG. 17D comprise a diagram of another embodiment of the multiplier of the invention;

FIG. 18 is an embodiment of a serial type multiplier of the invention;

FIGS. 19A and 19B arranged as shown in FIG. 19C comprise a further embodiment of a serial type multiplier of the invention;

FIGS. 20A, 20B, 20C, 20D, 20E, 20F, 20G, 20H, 20J, 20K, 20M and 20N arranged as shown in FIG. 20P comprise an embodiment of the multiplier-divider of the invention;

FIGS. 21A, 21B, 21C, 21D arranged as shown in FIG. 21E comprise a chart showing the operation of the circuit of FIG. 20P in the solution of a particular multiplication problem;

FIGS. 22A and 22B illustrate solution of a division problem;

Figure 23C:
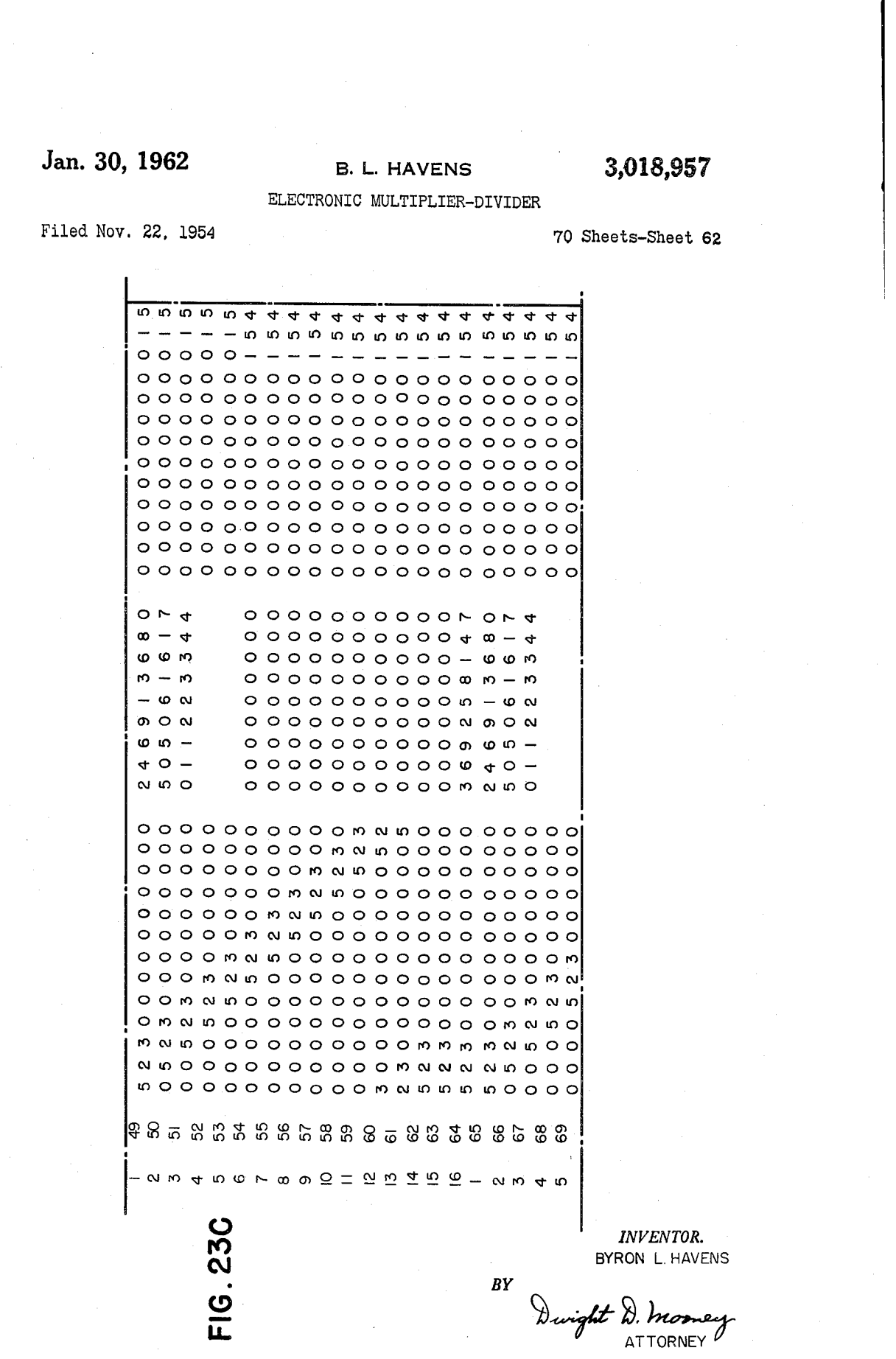

FIGS. 23A, 23B, 23C, 23D, 23E, 23F, 23G, 23H, 23J and 23K arranged as shown in FIG. 23M comprise a chart showing the flow of decimal digits when a specified division problem is solved by the circuit of FIG. 20P;

FIG. 24 is a diagram of a circuit for preventing operation of the divider of FIG. 20P when such operation would give a wrong result.

Briefly, in the multiplication operation each digit of the multiplier causes a digit of the multiplicand corresponding thereto to be selected. Hence, each multiple selected is added as a partial product to produce the product selection of the multiples for addition of the partial products, and production of the product are occurring during simultaneous time intervals. Embodiments for effecting selection of the multiples of the multiplicand serially by binary bit and serially by decimal digit, and parallel by binary bit, are shown. Embodiments are included wherein only a single multiple of the multiplicand is selected by each digit of the multiplier to form the related partial product and wherein a plurality of multiples of the multiplicand may be selected by each digit of the multiplier and added to form the related partial product. Briefly, in the division operation, the divisor is formed into the multiples one through nine thereof which appear simultaneously. Each of these multiples is added simultaneously to the nines complement of the dividend. The presence and absence of carries produced by these simultaneous additions are utilized to determine the first or correct quotient digit occupying the highest digit position of the quotient. This first quotient digit is stored and later utilized to permit the passage of the multiple of the divisor corresponding to the quotient digit to an adder where it is added to the nines complement of the dividend to provide a sum representing the nines complement of the first partial dividend.

This first partial dividend is circulated in a dividend loop and is also added to each of the multiples one through nine of the divisor. The presence and absence of carry produced by the simultaneous additions it utilized to determine the second quotient digit. The second quotient digit is stored and later utilized to permit the passage of the multiple of the divisor corresponding to that quotient digit to an adder where it is added to the nines complement of the first partial dividend to provide a sum representing the nines complement of the second partial dividend. This process is repeated until all quotient digits are determined.

DEFINITIONS

The following terms are defined to facilitate an understanding of their use herein:

An "UP" voltage present at a designated circuit point is the more positive of the two voltages which may be present at the circuit point.

A "DOWN" voltage present at a designated circuit point is the less positive of the two voltages which may be present at the circuit point.

"Time interval" refers to a certain elapsed time, the duration of which is of no consequence to the invention provided it is substantially uniform in each instance.

"Digit position" applies only to the decimal system and designates the numerical position, beginning at the right, occupied by the digit referred to. For example, in the number 864, the digit 4 occupies the first digit position, the digit 6 occupies the second digit position and the digit 8 occupies the third or highest digit position.

"Shift right" refers to the operation causing each digit to occupy the next lower numbered digit position during each successive time interval that the operation is effective.

"Shift left" refers to the operation causing each digit to occupy the next higher numbered digit position during each successive time interval that the operation is effective.

"Exclusive OR circuit" refers to a circuit having a plurality of inputs and a single output wherein the output is UP when an input is UP and the output is DOWN when all inputs are UP, or if no input is UP.

A circuit M is referred to as being "conditioned" when the operation thereof can be caused by a certain subsequent and predetermined electrical manifestation. A circuit is referred to as being "de-conditioned" when operation thereof cannot be caused by an electrical manifestation normally employed to effect operation thereof.

A "latch circuit" is a circuit having certain first inputs which must be UP simultaneously to produce an output which will thereafter remain UP until after a certain other input goes DOWN.

"True form" refers to the representation of digits or numbers in accordance with their true value. For example, the digit 3 is always represented by a 3.

"Complement form" refers to the representation of digits or numbers in nines complement form. For example, the digit 3 is represented in complement form by 6 derived by the subtraction of 3 from 9.

"Binary character" refers to a binary 1 or a binary 0.

"Bit" refers to a possible representation in the binary or binary decimal system without regard to the presence or absence of the representation.

An "operand" is a multi-digit number which is employed to produce another number. For example, a divisor, dividend, partial dividend, multiplier, multiplicand, and partial products are operands.

CIRCUITS FREQUENTLY EMPLOYED

Referring to FIG. 1A a plurality of input terminals 10 designated as 10A, 10B and 10C, respectively are connected to the cathodes of diodes 11, 12 and 13 having their plates commonly connected to a juncture 14 connected through parasitic suppressor resistor ps to the control grid of cathode follower tube 15 having its plate connected to ground through the capacitor 16 and to a source of B+ voltage by resistor 17. Capacitor 16 and resistor 17 serve conjointly as a decoupling circuit between the high voltage supply B+ and the plate of the cathode follower tube 15. The plate of tube 15 is also connected to the juncture 14 by a pull-up resistor 18. The cathode of tube 15 is connected through voltage dividing resistors 19 and 20 to the terminal B—. The juncture of resistors 19 and 20 is connected to output terminal 21. The break in the common connection of the plates of the diodes 11, 12 and 13 indicates that any desired number of input terminals 10 and a diode corresponding to each may be employed.

If all of the input terminals 10 are UP simultaneously, the juncture 14 and control grid of the cathode follower tube 15 are caused to go UP. This causes the output terminal 21 to go UP. The cathode follower tube 15 is employed to provide isolation between the input terminals 10 and the output terminal 21. The current requirements of a load connected to the terminal 21 render the use of a cathode follower desirable. If the use of a cathode follower is not required the output terminal 21 is connected directly to the juncture 14 which is also connected through a pull-up resistor to the terminal B+.

FIG. 1B is a block diagram representing the circuit of FIG. 1A. The direction of the arrows on the input connections and on the output connection indicates the direction of pulse transfer effected by the operation of the circuit. These arrows therefore render it unnecessary to include the terminal designations each time the circuit is employed herein or to show the block diagram in any particular uniform position. When FIG. 1B is employed without the letters CF therein, it illustrates an AND circuit which does not include a cathode follower. The output terminal and the pull-up resistor are therefore connected in this instance directly to the juncture of the plates of the diodes.

Referring to FIG. 1C the input terminals 22A, 22B, and 22C are connected respectively to the plates of diodes 23, 24 and 25 having their cathodes commonly connected to a juncture 26 which is connected through the parasitic suppressor resistor ps to the control grid of cathode follower tube 27. The plate of tube 27 is connected through a capacitor 28 to ground and through a resistor 29 to the terminal B+. Capacitor 28 and resistor 29 conjointly serve as a decoupling network. The cathode of tube 27 is connected through voltage dividing resistors 30 and 31 to the terminal B— which is also connected through pull-down resistor 32 to the juncture 26 connected to the cathodes of diodes 23, 24, and 25. The juncture of resistors 30 and 31 is connected to the output terminal 33.

When one or more of the input terminals 22A, 22B, and 22C are UP or at approximately +5 volts the juncture 26 and therefore the control grid of tube 27 are UP causing the output terminal 33 to be UP. If all of the input terminals are DOWN, the output terminal 33 is DOWN.

The break in the common connection of the cathodes of diodes 23, 24, and 25 indicates that any desired number of diodes may be so connected. If the use of a cathode follower is not dictated by the circuit requirements, the output terminal 33 may be connected directly to the juncture 26.

FIG. 1D illustrates the circuit of FIG. 1C in block diagram form. If the letters CF are not shown within the block it indicates that the cathode follower tube 27 is not employed and that the output terminal 33 is connected directly to the juncture 26. Again, the arrows indicate the direction of pulse transfer.

Referring to FIG. 1E a positive pulse applied to the input terminal 35 causes the inverting circuit shown to produce a negative pulse at its output terminal 36. The input terminal 35 is connected through a parasitic suppressor resistor ps to the control grid of tube 37L. If the input terminal 35 is Up the control grid of tube 37L renders the tube conductive and causes its plate to go DOWN. The plate of tube 37L is connected through plate load resistor 38 and the decoupling resistor 39 to the terminal B+. The juncture of resistors 38 and 39 is connected to ground through capacitor 40. Resistor 39 and capacitor 40 comprise a decoupling network. Voltage dividing resistors 41 and 42 are connected between the plate of tube 37L and the terminal B— and direct couple the grid of cathode follower tube 37R to the plate of tube 37L. Frequency compensating capacitor 43 is connected in parallel with resistor 41.

When a positive pulse is applied to input terminal 35 the plate of tube 37L goes DOWN and the control grid of tube 37R does DOWN and causes the cathode of tube 37R and hence the output terminal 36 connected thereto to go DOWN. When the input terminal 35 is DOWN the inverting tube 37L is cut off and its plate is at the potential of terminal B+. The action of voltage dividing resistors 41 and 42 causes the grid of cathode follower tube 37R to go UP. The output terminal 36 is therefore UP when input terminal 35 is DOWN.

FIG. 1F shows the circuit of FIG. 1E in block diagram form.

Referring to FIG. 1G the input terminal 45 of the cathode follower circuit is connected through parasitic suppressor resistor ps to the control grid of cathode follower tube 46. The cathode of tube 46 is connected through voltage dividing resistors 47 and 48 to the terminal B—. An output terminal 50 is connected to the juncture of resistors 47 and 48. The plate of tube 46 is connected to ground through a capacitor 51 and to the B+ terminal through a resistor 52. The capacitor 51 and resistor 52 comprise a decoupling network.

If the input terminal 45 is UP or at approximately +5 volts the output terminal 50 is UP or at approximately +5 volts. Also, if the input terminal 45 is DOWN the output terminal 50 is DOWN. The cathode follower provides a positive output in response to receipt of a positive input and is used for isolation purposes or in a unit where the significant source cannot supply the necessary current.

Referring to FIG. 1H the circuit of FIG. 1G is shown in block diagram form. The arrow on the input and output connections indicates the direction of pulse transfer.

Referring more particularly to FIG. 1J there is shown a circuit diagram of a delay circuit which will receive a positive input pulse at its input terminal 60 during one preselected time interval and supply a positive output pulse at its output terminal 61 during the next succeeding time interval. This delay circuit is fully disclosed and claimed in Reissue Patent No. 23,699.

FIG. 1K shows wave forms explanatory of the operation of FIG. 1J. Clamping pulses are applied to the terminal 62 and synchronous pulses are applied to the terminal 63. The provision of means for producing these pulses is set forth in the United States patent application of Charles R. Borders, Serial Number 444,251 and entitled Regeneration and Octal Counter, filed July 19, 1954. Briefly, the input terminals 60 and the synchronous pulse terminal 63 comprise the inputs to a two-input AND circuit 64a having its output connected through the parasitic suppressing resistor ps to the control grid of tube 65L. The plate of tube 65L is connected through the inductance 66 and the load resistor 67 to the +150 volt terminal 68. The plate of tube 65L is also connected through capacitor 69 to the juncture 70 which is connected through resistor 71 to the —82 volt terminal 72 connected through load resistor 73 to the cathode of cathode follower tube 65R. The control grid of tube 65R is connected through parasitic suppressor resistor ps to the juncture 74 connected through capacitor 75 to ground. The resistor 76 and rectifiers 78, 79 and 80 are connected in series as shown between the clamping pulse terminal 62 and —30 volt terminal 81.

The rectifier 80 keeps the juncture 70 from becoming substantially more negative than the —30 volt terminal 81 and resistor 71 prevents the voltage at juncture 70 from drifting between the application of successive clamping pulses. The rectifier 79 conducts to charge capacitor 75 and when the clamping pulse is negative it is seen that the upper plate of capacitor 75 is initially at approximately —30 volts.

When the clamping pulse goes negative it pulls DOWN the control grid of tube 65R and therefore wipes out the information stored after that information has been presented at the output terminal 61. This is demonstrated in FIG. 1K during the first half of time interval T4. Hence, when the clamping pulse goes negative the rectifiers 78, 79 and 80 are rendered conductive.

The input and synchronous pulses go negative for the first time just after the beginning of time interval T3 (FIG. 1K). The voltage at the control grid of tube 65L therefore goes DOWN and permits the plate thereof to reach a voltage more positive than +150 volts because of the action of the inductance 66. This flyback is utilized to set up the output pulse present during time interval T3. A positive pulse is transferred through the capacitor 69 and causes the juncture 70 to go UP. This causes the rectifiers 79 and 78 to conduct and the capacitor 75 to be charged. The control grid and cathode follower tube 65R therefore go UP to place the output terminal 61 in the UP condition.

It will be noted that an output pulse may be produced at the output terminal 61 during the same time interval, for example time interval T3, that an input pulse is applied to the input terminal 60. This is made possible by utilization of the flyback during one preselected time interval to produce an output pulse during the next succeeding time interval and by the complete isolation of the simultaneously operable input and output circuits. This isolation is obtained through the use of capacitor 69, rectifiers 78, 79 and 80, and the clamping pulse.

FIG. 1L is a block diagram illustrating the circuit diagram shown in FIG. 1J.

BINARY-DECIMAL ADDER

The binary-decimal adder employed, except for the delay circuit connected to each output terminal, is the same as that disclosed and claimed in the United States patent application of Byron L. Havens and Charles R. Borders, Serial No. 338,122, now Patent No. 2,938,668, entitled Serial-Parallel Binary-Decimal Adder, filed February 20, 1953.

Referring more particularly to FIG. 1M the binary decimal adder includes input terminals generally designated as 90 and 91 each comprising four terminals for receiving the 1 bit, 2 bit, 4 bit and 8 bit respectively. The respective binary bits or the binary bits representing one decimal digit to be added are applied to the correspondingly designated terminal or terminals of the input terminals 90 and the binary bits representing the other decimal digit to be added are applied to the correspondingly designated terminal of the input terminals 91. All of these bits to be added are applied simultaneously. For example, assume the decimal digits 5 and 6 occur in the same digit position and are to be added and that the 5 (0101) is to be applied to the input terminals 90 and the 6 (0110) is to be applied to the input terminals 91.

It is now understood that pulses will be applied to the terminals 90–1 and 90–4 corresponding to the 1 bit and 4 bit respectively and to the terminals 91–2 and 91–4 corresponding to the 2 bit and 4 bit respectively.

A binary adder is employed to accommodate each of the bits. That is, the 1 bit terminals 90–1 and 91–1 are applied to the input terminals 92 and 93 of the 1 bit adder. The input terminals 90–2 and 91–2 are applied to the input terminals 92 and 93 of the 2 bit adder. The input terminals 90–4 and 91–4 are applied to the input terminals 92 and 93 of the 4 bit adder. The input terminals 90–8 and 91–8 are applied to the input terminals 92 and 93 of the 8 bit adder. The carry output terminal 94 of each binary adder is connected to the carry input terminal 95 of the adder accommodating the next higher numbered bit except the carry output terminal 94 of the 8 bit adder. The binary sum is produced at the output terminals 96–1, 96–2, 96–4 and 96–8 of the 1 bit, 2 bit, 4 bit, and 8 bit adders respectively. The output terminals 96–2, 96–4, and 96–8 of the 2 bit, 4 bit and 8 bit adders and the carry output terminal 94 of the 8 bit adder supply the inputs to the rationalizer. These inputs cause the circuits of the rationalizer to produce an output such that the outputs at the terminal 97–1 connected to the output erminal 96–1 of the 1 bit adder and the terminals 97–2, 97–4 and 97–8 represent the sum in the binary-decimal system of the two decimal digits to be added, the suffix of the terminal designation indicating the bit represented thereby. The carry output terminal 97–10 of the rationalizer indicates that a carry input should be supplied to the next digit position. This terminal is connected to the input terminal 60 of delay 91 having its output terminal 61 connected to the carry input terminal 95 of the 1 bit adder. Hence, this carry pulse is delayed one time interval and supplied as an input to the lowest digit representing bit of the next higher order and is supplied thereto simultaneously with the application of the next inputs to the input terminals 90 and 91.

The output terminals 97–1 97–2, 97–4 and 97–8 are connected to the input terminals of delays 98, 99, 100 and 101, respectively. The output terminals of the delay circuits 98, 99, 100 and 101 are connected respectively to the output terminals 102–1, 102–2, 102–4, and 102–8.

Hence, the sum of two decimal digits appears in the binary-decimal system at the output terminals 102 one time interval after those decimal digits are applied to the input terminals 90 and 91.

If the sum of any digit position is over 9 it must be between the limits 10 through 19. In such case the outputs of the binary adders will not be in the binary-decimal system. Such a condition will be indicated by the presence of a carry pulse at the carry terminal 94 of the 8 bit adder, or the presence of an output at the terminal 96–8 of the 8 bit adder plus an output at the terminal 96–4 of the 4 bit adder, or the presence of an output at the terminal 96–8 of the 8 bit adder and an output at the terminal 96–2 of the 2 bit adder. The rationalizer includes circuits which respond to any one of these conditions to cause the sum to appear in the binary-decimal system.

FIG. 1N shows the binary-decimal adder of FIG. 1M in block diagram form. The (4) adjacent to the leads connected to terminals 90 and 92 indicate that the lead corresponding thereto represents four wires. The terminal 61C corresponds to the juncture of terminal 61 of delay 91 and terminal 95 of the 1 bit adder. This terminal 61C is shown hereinafter only when it is connected to other circuits. Such is used to indicate the presence or absence of a carry from a digit position during the division operation.

UNIVERSAL REGISTER

The circuit diagram showing three orders or digit positions of the universal register is realized by placing FIGS. 1P and 1Q as indicated by FIG. 1R. The universal register is basically the same as that shown and claimed in the United States patent application of Byron L. Havens and Charles R. Borders, Serial No. 257,747, filed November 23, 1951, entitled Digital Information Register, and granted as U.S. Patent No. 2,782,305, on February 19, 1957. The register receives and stores information in the binary-decimal system. The information may be received either serially or in parallel. It may than be shifted right or shifted left, and the stored information may be read out either serially or in parallel.

FIGS. 1P and 1R show three orders of digit positions of the register. These digit positions are designated as DP1, DP2, and DP3 and correspond respectively to the units, tens and hundreds orders. It is understood that the register may comprise any desired number, or orders, of digit positions. For example, the register as used herein accommodates thirteen digit positions as indicated by FIG. 1S.

In FIGS. 1P and 1Q a decimal number may be entered into the register serially; that is, sequentially by decimal digits, by first entering the digit of DP1 at the beginning of any chosen time interval into DP3 of the register. At the beginning of the next time interval the register causes the DP1 digit to be shifted to the right or from DP3 to DP2 of the register and the DP2 digit to be entered into DP3 of the register. During the next or third time interval the register is shifted to the right to shift the DP1 digit from DP2 to DP1 in the register and the DP2 digit from DP3 to DP2 in the register and to enter the DP3 digit into DP3 of the register.

For example, suppose the number 579 is to be entered serially in the register as above described. The DP1 digit 9, expressed in the binary-decimal system, is first entered into DP3 of the register. This is entered by causing the register to shift right. During the next time interval the register is again shifted right, the 9 is shifted into the DP2 position of the register and the DP2 digit 7 is entered into DP3 of the register. During the next or third time interval the register is again shifted right and the DP1 digit 9 is shifted from DP2 to DP1 of the register, and the DP2 digit 7 is shifted from DP3 to DP2 of the register, and the DP3 digit 5 is entered into the DP3 position of the register.

Numbers may also be entered serially into the register by entering the highest order or digit into the lowest digit position of the register. For example, suppose the number 579 is to be so entered. During the first time interval the DP3 digit 5 is entered into digit position DP1 of the register as a result of the shift left of the register. During the next time interval the register is left-shifted to cause the DP3 digit 5 to be left-shifted from DP1 to DP2 of the register and the DP2 digit 7 is entered into DP1 of the register. During the third time interval the register is again left-shifted to shift the DP3 digit 5 from the DP2 position of the register into the DP3 position and the DP2 digit 7 from the DP1 position into the DP2 position and the DP1 digit 9 into the DP1 position of the register.

Parallel entry terminals are associated with each digit position of the register to permit simultaneous entry of all digits into the register. For example, 579 will be entered into the register during one time interval.

After entry all digits may be shifted left or shifted right as desired.

Read out terminals are also associated with each digit position of the register to permit simultaneous read out from all digit positions.

Briefly, because individual binary bits representing a single decimal digit always appear simultaneously or in parallel, the groups of binary bits representing a decimal number or plurality of digits can be read into or read out of the register either serially or in parallel.

Each digit position of the register is similar. The second digit position DP2 is shown in detail. Digit positions DP1 and DP3 are indicated by blocks designated as DP1 and DP3 respectively. Each digit position is provided with a group of parallel entry terminals 105-1, 105-2, 105-4 and 105-8 to accommodate the 1, 2, 4 and 8 bits respectively. Each digit position is also provided with input terminals 106-1, 106-2, 106-4 and 106-8 and with output terminals 107-1, 107-2, 107-4 and 107-8. In each instance the suffix digit indicates the decimal value of the bit accommodated. Control terminals 110, 111, 112 and 113 are connected to each digit position of the register. In operation only a single one of the control terminals will be UP at any one time and when UP will effect the function designated. For example, when terminal 110 is UP the register is permitted to shift right.

Each digit position of the register includes similar units 115-1, 115-2, 115-4 and 115-8 to accommodate the respective bits thereof. Each of these units includes AND circuits 110a, 111a, 112a and 113a and a four-input OR circuit 116 connected to the outputs thereof, cathode follower 117 having its input connected to the output of OR circuit 116 and a delay circuit 118 having its input terminal 60 connected to the output of cathode follower 117. The right inputs of AND circuits 110a, 111a, 112a and 113a, respectively, of each unit 115 are connected to the control terminals 110, 111, 112 and 113, respectively. The left input terminal of each of the AND circuits 110a is connected to the corresponding input terminal 106 of that digit position of the register, the left input of each of the AND circuits 111a is connected to the parallel entry terminal 105 receiving the same bit, the left input of each of the AND circuits 112a is connected to the corresponding terminal 119 connected to the output terminal 107 of the next lower digit position of the register, and the left input of each of the AND circuits 113a is connected to the output terminal 61 of the delay circuit 118 coresponding thereto.

Briefly, when both inputs of AND circuits 110a are UP a shift right is effected, when both inputs of AND circuits 111a are UP parallel entry is permitted, when both inputs of AND circuits 112a are UP a shift left is effected and when both inputs of AND circuits 113a are UP the information in the register is continuously stored.

When the shift right control terminal 110 is UP for any one time interval the remaining control terminals 111, 112, and 113 are DOWN. This means that the register is conditioned to shift right. The digital information in binary-decimal form at the output terminals 107 of digit position DP3 of the register is supplied to the input terminal 106 of the digit position DP2 of the register and to the left inputs of AND circuits 110a. The right input of AND circuits 110a is UP because the shift right control terminal 110 is UP. Hence, the terminals 106 of digit position DP2 which exhibit a binary 1 cause the outputs of the corresponding AND circuits 110a to go UP. As an example, assume that AND circuit 110a having its left input connected to input terminal 106-1 is UP. As a result the OR circuit 116 of unit 115-1 goes UP. The output of the cathode follower 117 goes UP and causes the output terminal 61 of the delay circuit 118 to go UP during the next subsequent time interval. As a result the output terminal 107-1 of digit position DP2 goes UP during the next subsequent time interval to complete a shifting of the information from the digit position DP3 to the digit position DP2. The control terminals determine whether this information will be accepted in DP2. If the information is accepted then it may be shifted from the input terminal 106-1 of position DP2 to the output terminal 107-1 of the digit position DP1 during the next time interval.

If the parallel entry control terminal 111 is UP for any one time interval the remaining control terminals are DOWN and AND circuits 111a have their right input UP. The left input terminal of AND circuits 111a is connected to the corresponding parallel entry terminal related to that digit position. Hence, in the digit position DP2 the parallel entry terminal 105 which receives the 1 bit is connected to the left input terminal of AND circuit 111a of unit 115-1. If a binary 1 is applied to the parallel entry terminal 105-1 the left input of this AND circuit 111a goes UP causing its output to go UP. As a result the output terminal of the OR circuit 116 and the cathode follower 117 go UP. This causes the output terminal 61 of the delay circuit 118 of unit 115-1 to go UP during the next subsequent time interval. In this manner the information present at the parallel entry terminals is read into the corresponding units 115 of the related digit position.

If the shift left control terminal 112 is UP during any one time interval the remaining control terminals are DOWN and the register is conditioned to effect a shift left operation. This means that the right input of each AND circuit 112a is UP. If during this time interval the corresponding input terminal of the next lower digit position is UP the binary 1 represented thereby will be transferred to the digit position to its immediate left. For example, assume that the input terminal 107-1 of digit position DP1 is UP. This input terminal is connected via terminal 119-1 of digit position DP2 to the left input of AND circuit 112a of unit 115-1 of digit position DP2. As a result the output terminal of this AND circuit, 112a, goes UP, the outputs of the OR circuit 116 and the output of the cathode follower 117 go UP so that the output terminal 61 of the delay 118 goes UP during the next subsequent time interval.

If the store control terminal 113 is UP during any one time interval and the remaining control terminals are DOWN, the right input of each of the AND circuits 113a is UP.

Again assume that the output terminal 61 of the delay 118 of unit 115–1 of the digit position DP2 is UP. This output terminal is connected to the left input of AND circuit 113a of unit 115–1 of digit position DP2. As a result the output of the AND circuit 113a goes UP, the output of the OR circuit 116 goes UP and the output of the cathode follower 117 goes UP to apply the output of the delay 118 to its input terminal 60. Hence, the information is circulated or stored within the same digit position of the register.

It is seen that the shift right parallel entry, shift left and store information described may be continued for any chosen period of time. Hence, the information in the register may be shifted out from digit position DP1, information read into all digit positions simultaneously, shifted out from the digit position DP3, and continuously stored. It is also clear that the register may comprise any desired number of digit positions. The register employed in the multiplier and divider circuit of the invention includes thirteen digit positions respectively designated DP1 through DP13.

In order to simplify the showing of the registers in the related circuits the block diagram of FIG. 1S is employed.

It is assumed hereinafter that the multiplier, multiplicand, divisor and dividend have been properly entered into the correct register. This entry is made as indicated by FIGS. 1P and 1Q.

Referring to FIG. 1S the leads representing the inputs 106 and the outputs 107 have a (4) adjacent thereto. This (4) indicates that there are actually four leads, one for the 1 bit, one for the 2 bit, one for the 4 bit and one for the 8 bit or the proper tens multiple thereof. For example, the output leads 107 from DP3 convey 100, 200, 400 and 800 bits, respectively.

PRODUCT GENERATOR

The product generator receives a number at its input terminals decimal digit by decimal digit in the binary-decimal system and supplies the multiples one through nine thereof in the binary decimal system simultaneously at its output terminals. Hence, this product generator is serial by decimal digit and parallel by binary bit, the binary bits representing a decimal digit occurring simultaneously.

Referring more particularly to FIG. 2 the number from which the multiples one through nine is to be obtained is applied to the input terminals 130. The first multiple M appears at the output terminal 131, the second multiple 2M at the output terminal 132, the third multiple 3M at the output terminal 133, the fourth multiple 4M at the output terminal 134, the fifth multiple 5M at the output terminal 135, the sixth multiple 6M at the output terminal 136, the seventh multiple 7M at the output terminal 137, the eighth multiple 8M at the output terminal 138, and the ninth multiple 9M at the output terminal 139.

It is seen that delays 140, 141, 142 and 143 alone are serially connected between the input terminals 130 and the output terminals 131. In other words, there will be a delay of four time intervals between receipt of pulses at input terminals 130 and their presence at the output terminals 131. From the columnar layout of FIG. 2 it is understood that there is an equal delay of four time intervals between the input terminals 130 and all of the output terminals 131–139 inclusive. Each of the designated terminals is representative of four terminals for accommodating the 1, 2, 4 and 8 bits, respectively. Similarly, each of the leads shown represents four leads as indicated by the (4) thereby. It follows, therefore, that each of the delays represents four delays, one for each lead.

If a carry is produced in obtaining any mutliple that carry is added into the next digit position. Hence, where the multiples of a single digit are to be obtained such a carry means that the multiple being produced will include two digits. Where the multiples of a multiple digit number are being obtained the carry pulse will be added into the next digit position with the particular digit thereof. The above will be clear from the subsequent examples.

Assume that a decimal 3 (0011) is applied to the input terminals 130. The resulting operation of the product generator will be explained by conjoint reference to FIG. 2 and Table I below, wherein the actual binary decimal representations present are indicated by the corresponding decimal digit.

Table I

TIMING CHART FOR FIGURE 2 WHEN 3 IS APPLIED TO INPUT TERMINALS 130

|  | Time intervals |  |  |  |  |  | Multiples |
|---|---|---|---|---|---|---|---|
|  | 1 | 2 | 3 | 4 | 5 | 6 |  |
| Input to Input Terminals 130 | 3 |  |  |  |  |  |  |
| Terminals 131 |  |  |  |  | 3 |  | M |
| Input 90, Adder 145 | 3 |  |  |  |  |  |  |
| Input 91, Adder 145 | 3 |  |  |  |  |  |  |
| Output Adder 145 |  | 6 |  |  |  |  |  |
| Terminals 132 |  |  |  |  | 6 |  | 2M |
| Input 90, Adder 149 |  |  |  | 6 |  |  |  |
| Input 91, Adder 149 |  |  |  | 3 |  |  |  |
| Output Adder 149 (Terminals 133) |  |  |  |  | 9 |  | 3M |
| Input 90, Adder 150 |  | 6 |  |  |  |  |  |
| Input 91, Adder 150 |  | 6 |  |  |  |  |  |
| Output Adder 150 |  |  | 2 | 1 |  |  |  |
| Terminals 134 |  |  |  |  | 2 | 1 | 4M |
| Input 90, Adder 153 |  |  | 2 | 1 |  |  |  |
| Input 91, Adder 153 |  |  | 3 |  |  |  |  |
| Output Adder 153 |  |  |  | 5 | 1 |  |  |
| Terminals 135 |  |  |  |  | 5 | 1 | 5M |
| Input 90, Adder 155 |  |  |  | 3 |  |  |  |
| Input 91, Adder 155 |  |  |  | 5 |  |  |  |
| Output Adder 155 (Terminals 136) |  |  |  |  | 8 | 1 | 6M |
| Input 90, Adder 156 |  |  |  | 6 |  |  |  |
| Input 91, Adder 156 |  |  |  | 5 | 1 |  |  |
| Output Adder 156 (Terminals 137) |  |  |  |  | 1 | 2 | 7M |
| Input 90, Adder 157 |  |  |  | 2 | 1 |  |  |
| Input 91, Adder 157 |  |  |  | 2 | 1 |  |  |
| Output Adder 157 (Terminals 138) |  |  |  |  | 4 | 2 | 8M |
| Input 90, Adder 158 |  |  |  | 5 | 1 |  |  |
| Input 91, Adder 158 |  |  |  | 2 | 1 |  |  |
| Output Adder 158 (Terminals 139) |  |  |  |  | 7 | 2 | 9M |

If a 3 is applied to the input terminals 130 during a first time interval the one multiple, M, appears at the output terminals 131 during the fifth time interval as indicated by the 3 in Table I, opposite the legend "Terminals 131" and underneath the heading Time Intervals 5.

To produce the two multiple, 2M, the input terminals 130 are connected to the inputs 90 and 91 of the binary decimal adder 145 and appear at the outputs of the delays thereof, designated as "Output Adder 145" in Table I, during the second time interval. The output of adder 145 is transferred through delays 146, 147 and 148 to the output terminals 132, or 2M. It follows that the two multiple 2M, is 6 and that it appears at the output terminals 132 during the fifth time interval.

The three multiple, 3M, is obtained by adding the one multiple, M, to the two multiple, 2M. Since the three multiple must also appear at the output terminals 133 during the fifth time interval the first multiple and the second multiple are applied to the inputs 91 and 90, respectively, of the adder 149 during the fourth time interval. In other words, a 6 is applied to the input terminals 90 and a 3 is applied to the input terminals 91 of the adder 149 during the fourth time interval. The output of adder 149 is, therefore, the three multiple, 3M, or 9, which appears at the output terminals 133 during the fifth time interval.

The four multiple, 4M, is obtained by adding the two multiple, 2M, to itself. Hence, the output of adder 145 is supplied to both the inputs of adder 150 during the second time interval. The sum at the output terminals of adder 150 is, therefore 12, the four multiple of 3. Since 6 is applied to each input terminal of the adder 150 during the second time interval a 2 will appear at the output of the delays thereof during the third time interval and a 1 (next digit position) will appear at that output during the fourth time interval. The outputs of adder 150 are transferred through delays 151 and 152 to the terminals 134. Hence, the 2 appears at the output terminals 134 during the fifth time interval and the 1 appears thereat during the sixth time interval, the 2 and the 1 representing the first and second digit positions respectively of the four multiple of 3, 4M or 12.

The five multiple, 5M, is derived by the addition of the one multiple and the four multiple within the binary-decimal adder 153 during the third and fourth time intervals. Hence, the sum of the one multiple, 3, and 2, the first digit position of the four multiple, or 5 appears at the output terminals of adder 153 during the fourth time interval and the second digit position of the four multiple or, 1, appears at the output of adder 153 during the fifth time interval. The output of adder 153 is transferred through delays 154 to the output terminals 135. It follows that during the fifth time interval a 5 appears at terminals 135 and during the sixth time interval a 1 appears thereat. Accordingly, the five multiple, 5M, or 15 appears at the terminals 135.

The six multiple, 6M, is obtained by the addition of the five multiple and the one multiple by the adder 155. During the fourth time interval the one multiple 3 and the digit 5 occupying the first digit position of the five multiple are applied to the input terminals 90 and 91 of adder 155 respectively. The digit 1 occupying the second digit position of the five multiple is applied to the input terminals 91 of adder 155 during the fifth time interval. The sum of 5 and 3 or 8 therefore appears at the output terminals 136 during the fifth time interval and a 1 appears thereat during the sixth time interval. In this manner, the six multiple (6M) of 3, or 18, is provided at the terminals 136.

The seven multiple is produced at the output of adder 156, connected to the terminals 137 by the addition of the two multiple and the five multiples. Hence, a 1 appears at the output terminals 137 during the fifth time interval and a 2 appears thereat during the sixth time interval to provide a total of 21, the seven multiple, 7M.

The eight multiple, 8M, is obtained by adding the four multiple to itself. Hence, the four multiple, 4M, is applied to the inputs 90 and 91 of the adder 157 and is presented at the output thereof, connected to the terminals 138, as a 4 and a 2 during the fifth and sixth time intervals respectively. In this manner the eight multiple of 3, or 24, is provided at the output terminals 138.

The nine multiple, 9M, is produced by the addition of the four and five multiples in the adder 158 having its output connected to the terminals 139. As indicated in Table I, a 7 appears at the terminals 139 during the fifth time interval and a 2 appears thereat during the sixth time interval to provide a total of 27, the nine multiple of 3.

The operation of the product generator of FIG. 2 is more completely understood from the operation when the multiples of a number having a plurality of digit positions is obtained. Suppose, for example, that the multiples one through nine, or M through 9M of the number 523 are to be obtained. The digit 3 occupying the first digit position is applied to the input terminals 130 during the first time interval. The digit 2 occupying the second digit position is applied during the second time interval and the digit 5 occupying the third digit position is applied during a third time interval. The digit occupyng the first digit position of the multiples one through nine of the number 523 appears at the output terminals 131 through 139 four time intervals after the digit 3 occupying the first digit position is applied to the input terminals 130. Hence, the digit occupying the first digit position of the multiples appears during the fifth time interval, the digit occupying the second digit position during the sixth time interval, the digit occupying the third digit position during the seventh time interval, and the digit occupying the fourth digit position during the eighth time interval.

When in obtaining the various multiples a carry occurs it is added to the same multiple of the next higher digit during the next time interval to provide a sum equal to the carry plus the particular multiple. This is understood by reference to Table II below.

*Table II*

MULTIPLES OF THE NUMBER 523 SHOWING CARRIES

| | | | | 5 | 2 | 3 |
|---|---|---|---|---|---|---|
| M | | | | 5 | 2 | 3 |
| | 2M less carries | | | 0 | 4 | 6 |
| | Carry | 1 | | | | |
| 2M | | 1 | | 0 | 4 | 6 |
| | 3M less carries | | | 5 | 6 | 9 |
| | Carry | 1 | | | | |
| 3M | | 1 | | 5 | 6 | 9 |
| | 4M less carries | | | 0 | 8 | 2 |
| | Carries | 2 | | | 1 | |
| 4M | | 2 | | 0 | 9 | 2 |
| | 5M less carries | | | 5 | 0 | 5 |
| | Carries | 2 | | 1 | 1 | |
| 5M | | 2 | | 6 | 1 | 5 |
| | 6M less carries | | | 0 | 2 | 8 |
| | Carries | 3 | | 1 | 1 | |
| 6M | | 3 | | 1 | 3 | 8 |
| | 7M less carries | | | 5 | 4 | 1 |
| | Carries | 3 | | 1 | 2 | |
| 7M | | 3 | | 6 | 6 | 1 |
| | 8M less carries | | | 0 | 6 | 4 |
| | Carries | 4 | | 1 | 2 | |
| 8M | | 4 | | 1 | 8 | 4 |
| | 9M less carries | | | 5 | 8 | 7 |
| | Carries | 4 | | 1 | 2 | |
| 9M | | 4 | | 7 | 0 | 7 |

In Table II the four multiple of 523 without considering the carries involved is 082 as indicated opposite the designation "4M less carries." The true four multiple of 523 (carries included), designated as 4M, is 2092. As stated hereinbefore, to obtain the four multiple of 523, the 3 is applied to terminals 130 of FIG. 2 during a first time interval and the digit occupying the first digit position of the various multiples of 3 is present at the output terminals during the fifth time interval. The four multiple of 3 is 2 if the carry is disregarded. This 2 appears at the output terminals 132 during the fifth time interval. During the second time interval the digit 2 occupying the second digit position is applied to the input terminals 130. The four multiple of 2 or 8 plus the carry of 1 from the previous digit position derived from obtaining the four multiple of 3, or 12, appears at the output terminals 134 during the sixth time interval. During the third time interval the digit 5 occupying the third digit position of the number 523 is applied to the input terminals 130. The four multiple of 5 is 0 plus 2 to be carried to the next higher digit position. It follows that the 0 appears at the output terminals 134 during the seventh time interval and the carry 2 appears at the output terminals 134 during the next or eighth time interval.

Hence, the four multiple of 523 which is 2092 appears serially by decimal digit at the output terminals 134 from the fifth to the eighth time intervals inclusive. It is seen from Table II that all of the multiples appear at a similar time. The digits occupying the first digit positions or the right digits of Table II appear during the fifth time interval, the digits occupying the second digit positions during the sixth time interval, the third digit positions during the seventh time interval and the fourth digit positions during the eighth time interval.

BINARY TO DECIMAL CONVERTER

The binary to decimal converter shown in FIG. 3 receives a decimal digit expressed in the binary notation in accordance with the binary-decimal system and converts the binary-decimal representations to a representation corresponding to the decimal digit.

The input terminals 160–1, 160–2, 160–4 and 160–8 receive information corresponding to the 1 bit, 2 bit, 4 bit and 8 bit, respectively. Information expressed in the binary-decimal system is applied to these input terminals a decimal digit at a time. The output terminals 160, 161, 162, 163, 164, 165, 166, 167, 168 and 169 correspond to the decimal digits 1, 2, 3, 4, 5, 6, 7, 8 and 9, respectively. Hence, if the binary decimal representations applied to the input terminals 160 represent the decimal number 6 the output terminal 166 is caused to go UP. The input terminals 160–1, 160-2, 160–4 and 160–8 are connected to the upper input of AND circuits 170a, 171a, 172a and 173a, respectively, and to the inverters 175, 176, 177 and 178, respectively. The lower input of each of the two-input AND circuits 170a, 171a, 172a, and 173a is commonly connected to a terminal 180. It is apparent that the AND circuits 170a, 171a, 172a and 173a are operative only when the terminal 180 is UP. The principal use of the binary to decimal converter by the invention is in the multiplication operation. Hence, the terminal 180 is termed the multiply gate terminal and is UP during the entire multiplication operation.

The outputs of the AND circuits 170a, 171a, 172a and 173a and the inverters 175, 176, 177 and 178 are connected as indicated in FIG. 3 to the inputs of the AND circuits 181a, 182a, 183a, 184a, 185a, 186a, 187a, 188a and 189a. The outputs of AND circuits 181a through 189a are connected respectively to the output terminals 161, 162, 163, 164, 165, 166, 167, 168 and 169.

The operation of the circuit of FIG. 3 is undertaken by conjoint reference to FIG. 3 and Table III below.

*Table III*

| Binary-decimal system | Decimal System | Input Terminals | | | |
|---|---|---|---|---|---|
| | | 160-1 | 160-2 | 160-4 | 160-8 |
| 0001 | 1 | U | D | D | D |
| 0010 | 2 | D | U | D | D |
| 0011 | 3 | U | U | D | D |
| 0100 | 4 | D | D | U | D |
| 0101 | 5 | U | D | U | D |
| 0110 | 6 | D | U | U | D |
| 0111 | 7 | U | U | U | D |
| 1000 | 8 | D | D | D | U |
| 1001 | 9 | U | D | D | U |

In Table III the binary-decimal representation of the decimal digits 1 through 9 are correlated with the voltage condition at the input terminals 160–1, 160–2, 160–4 and 160–8. A "U" indicates that the particular input terminal designated is UP and a "D" indicates that the particular terminal is DOWN. If, for example, a 4 (0100) is to be applied to the input terminals of the converter, then the input terminal 160-4 is UP and the remaining input terminals are DOWN.

It is understood from reference to Table III that a binary 1 is present in the decimal digits 1, 3, 5, 7, and 9. This means that the terminal 160–1 will be UP when a binary decimal representation of any one of these decimal digits is applied to the input terminals. Hence, the output of AND circuit 170a is UP when the digits 1, 3, 5, 7 or 9 are present. Such is indicated by the inclosure of the digits 1, 3, 5, 7 and 9 in a rectangle directed to this output. In a similar manner the UP condition of the various outputs is indicated in FIG. 3.

If an input terminal is UP the output of the inverter connected thereto will be DOWN and if the input terminal is DOWN the output of the inverter will be UP. Hence, the output of inverter 175 will be UP when the output of AND circuit 170a is DOWN or when any one of the digits 2, 4, 6 or 8 is present. Such is indicated by the inclosure of these digits in a rectangle referred to the output of inverter 175.

An examination of the connections to the inputs of AND circuits 181a through 189a shows that only one of the output terminals is UP at any one time and that the terminal that is UP is representative of the value applied to the input terminals 160. The inputs to the AND circuits 181a through 189a will be referred to as first, second, third and fourth inputs beginning with the topmost input as shown in the drawing.

The first input of AND circuit 181a is connected to the output of inverter 177 and is UP when any one of the digits 1, 2, 3, 8 or 9 is present. The second input is connected to the output of inverter 176 and is UP when any one of the digits 1, 4, 5, 8 or 9 is present. The third input of AND circuit 181a is connected to the output of inverter 178 and is UP when any one of the inputs 1, 2, 3, 4, 5, 6 or 7 is present. The fourth input of AND circuit 181a is connected to the output of AND circuit 170a and is UP when any one of the digits 1, 3, 5, 7 or 9 is present. For the output of AND circuit 181a to be UP and thereby indicate the presence of a decimal 1, all of its inputs must be UP. It is now obvious from the above that the only time all of the inputs to the AND circuit 181a are UP is when a decimal digit 1 is present. This is because the outputs of inverters 176, 177 and 178, and the output of AND circuit 170a connected to these respective inputs are all UP simultaneously only when a decimal 1 is present.

The first input of AND circuit 182a is connected to the output of inverter 177 which is UP when any one of the digits 1, 2, 3, 8 or 9 is present. The second input of AND circuit 182a is connected to the output of AND circuit 171a and is UP when any one of the digits 2, 3, 6 or 7 is present. The third input to AND circuit 182a is connected to the output of inverter 175 and is UP when any one of the digits 2, 4, 6 or 8 is present. The digit common to this recitation is 2. The output terminal 162 is, therefore, UP only when the decimal digit 2 is presented to the input terminals 160 in the binary-decimal system.

The first input of AND circuit 183a is connected to the output of inverter 177 which is UP when any one of the digits 1, 2, 3, 8, or 9 is present. The second input of AND circuit 183a is connected to the output of AND circuit 171a and is UP when any one of the digits 2, 3, 6 or 7 is present. The third input of AND circuit 183a is connected to the output of AND circuit 170a which is UP when any one of the digits 1, 3, 5, 7 or 9 is present. The digit common to this recitation is 3. The output terminal 163 is, therefore, UP only when a decimal 3 is present.

The first input of AND circuit 184a is connected to the output of AND circuit 172a which is UP when any one of the digits 4, 5, 6 or 7 is present. The second input of AND circuit 184a is connected to the output of inverter 176 which is UP when any one of the digits 1, 4, 5, 8 or 9 is present. The third input of AND circuit 184a is connected to the output of inverter 175 which is UP when any one of the digits 2, 4, 6 or 8 is present. The digit common to this recitation is 4. The output terminal 164 is, therefore, UP only when a decimal 4 is present.

The AND circuit 185a is connected to the output of AND circuit 172a which is UP when any one of the digits 4, 5, 6 or 7 is present. The second input of AND circuit 185a is connected to the output of inverter 176 which is UP when any one of the digits 1, 4, 5, 8 or 9 is present. The third input of AND circuit 185a is connected to the output of AND circuit 170a which is UP when any one of the digits 1, 3, 5, 7 or 9 is present. The digit common to this recitation is 5. The output terminal 165 is, therefore, UP only when a decimal 5 is present.

The first input of AND circuit 186a is connected to the output of AND circuit 172a which is UP when any one of the digits 4, 5, 6 or 7 is present. The second input of AND circuit 186a is connected to the output of AND circuit 171a which is UP when any one of the digits 2, 3, 6 or 7 is present. The third input of AND circuit 186a is connected to the output of inverter 175 which is UP when any one of the digits 2, 4, 6 or 8 is present. The digit common to this recitation is 6. The output terminal 166 is, therefore, UP only when a decimal 6 is present.

The first input of AND circuit 187a is connected to the output of AND circuit 172a which is UP when any one of the digits 4, 5, 6 or 7 is present. The second input of AND circuit 187a is connected to the output of AND circuit 171a which is UP when any one of the digits 2, 3, 6 or 7 is present. The third input of AND circuit 187a is connected to the output of AND circuit 170a which is UP when any one of the digits 1, 3, 5, 7 or 9 is present. The digit common to this recitation is 7. The output terminal 167 is, therefore, UP only when a decimal 7 is present.

The first input of AND circuit 188a is connected to the output of AND circuit 173a which is UP when either of the digits 8 or 9 is present. The second input of AND circuit 188a is connected to the output of inverter 175a which is UP when any one of the digits 2, 4, 6 or 8 is present. The digit common to this recitation is 8. The output terminal 168 is, therefore, UP only when a decimal 8 is present.

The first input of AND circuit 189a is connected to the output of AND circuit 173a which is UP when either an 8 or 9 is present. The second input of AND circuit 189a is connected to the output of AND circuit 170a which is UP when any one of the digits 1, 3, 5, 7 or 9 is present. The digit common to this recitation is 9. The output terminal 169 is, therefore, UP only when a decimal 9 is present.

It is now clear that when representations are applied to the input terminals 160 in the binary-decimal system that the decimal digit represented thereby is indicated at the one of the output terminals 160 through 169 corresponding thereto. Hence, representations in the binary notation are converted to decimal representations. During the conversion operation it is often necessary in accordance with the operation of the invention that a certain one of the output terminals of the binary to decimal converters employed be UP. A cathode follower (FIG. 1H) is employed for this purpose. The voltage at the divide gate terminal 190 (FIG. 3A) is applied to the input terminal 45 of the cathode follower to cause this output terminal 50 (FIG. 3A) to go UP. This output terminal 50 is connected to the particular output terminal of the binary decimal converter which it is desired to place in the UP condition. In order that these connections may be shown, the binary to decimal converter is represented as in FIG. 3A.

In FIG. 3A the single connection from the input terminals 160 represents the four leads shown in FIG. 3. Each of the output terminals 161 through 169 is shown individually. The divide gate terminal 190 is connected to the input terminal 45 (not shown) of the cathode follower (FIG. 1H). If the cathode follower is employed the output terminal 50 will be connected to a preselected one of the output terminals 161 through 169 for reasons stated hereinafter to cause that terminal to remain UP during a particular operation.

4 POLE-9 POSITION COINCIDENCE SELECTOR SWITCH

This selector switch is termed a 4 pole-9 position switch because it functions similar to a simple 4 pole-9 position mechanically operated switch. The diagram of the selector switch is realized by placing FIGS. 4A, 4B, 4C, 4D and 4E as indicated in FIG. 4F. Inputs are received at the input terminals 161–169 (FIG. 4E) and 131 through 139 (FIG. 4A) and outputs appear at the output terminals 195–1, 195–2, 195–4 and 195–8 (FIGS. 4B, 4C, 4D and 4E). The suffix designating each group of terminals for the respective input terminals 131 through 139 and the output terminals 195 corresponds to the bit value which appears at the respective terminal. For example, input terminal 131–4 and output terminal 195–4 each represent a 4 bit when in the UP condition. In operation one of the terminals 161 through 169 being UP indicates the presence of the decimal digit corresponding thereto. These terminals correspond to the output terminals 161 through 169 of the binary to decimal converter of FIG. 3. The input terminals 131 through 139 effect transfer of the multiples one through nine as indicated and correspond to output terminals 131 through 139 of the product generator shown in FIG. 2.

The selector switch is employed to select any one of the nine multiples appearing at the input terminals 131 through 139 and provide this multiple at the output terminals 195. The selection of the multiple is effected by the information at input terminals 161 through 169. It is understood from the description of the binary to decimal converter (FIG. 3) that only one of the terminals 161 through 169 is UP at any one time. Hence, for example, if a decimal 5 is present at the input terminals 161 through 169 the terminal 165 will be UP and the remaining terminals will be DOWN. The selector switch utilizes this condition to permit passage of the five multiple appearing at the input terminals 131 through 139 and the five multiple is presented in binary decimal form at the output terminals 195. If a number representing a multiplicand, for example, is applied to the input terminals 130 of the product generator of FIG. 2 the one through nine multiples of that multiplicand are respectively produced at the output terminals 131 through 139 of the product generator. These terminals correspond to the input terminals 131 through 139 of the selector switch. Hence, the one through nine multiples of the multiplicand are respectively applied to the input terminals 131 through 139 of the selector switch. If the input terminal 165 of the selector switch is UP during the application of these multiples the five multiple is caused to appear at the output terminals 195. The five multiple is 5 times the multiplicand and therefore represents the multiplication of the multiplicand by the multiplier 5.

Description of the operation of the selector switch is undertaken by conjoint reference to FIGS. 4A, 4B, 4C, 4D and 4E, FIG. 3 and Table IV. In Table IV below the left column indicates the multiples M through 9M, the next column to the right shows these one through nine multiples of 3 in the decimal system, the next column to the right shows the one through nine multiples written in the binary-decimal system and the extreme right column indicates the terminal numbers 131 through 139 at which these respective multiples appear.

*Table IV*

| Multiples | Multiples in Decimal System | Multiples in Binary-Decimal System | Terminal (Fig. 2, Fig. 4A) |
|---|---|---|---|
| M | 3 | 0000, 0011 | 131 |
| 2M | 6 | 0000, 0110 | 132 |
| 3M | 9 | 0000, 1001 | 133 |
| 4M | 12 | 0001, 0010 | 134 |
| 5M | 15 | 0001, 0101 | 135 |
| 6M | 18 | 0001, 1000 | 136 |
| 7M | 21 | 0010, 0001 | 137 |
| 8M | 24 | 0010, 0100 | 138 |
| 9M | 27 | 0010, 0111 | 139 |

It is understood from the decription of the product generator of FIG. 2 that the first digit of all multiples appears at the output terminals 131 through 139 during the fifth time interval and that the second digit position of all multiples appears at these terminals in the sixth time interval. In other words, the four right columns of the multiples in the binary-demical system appear during the fifth time interval and the four left columns appear during the sixth time interval.

Figure 4B:
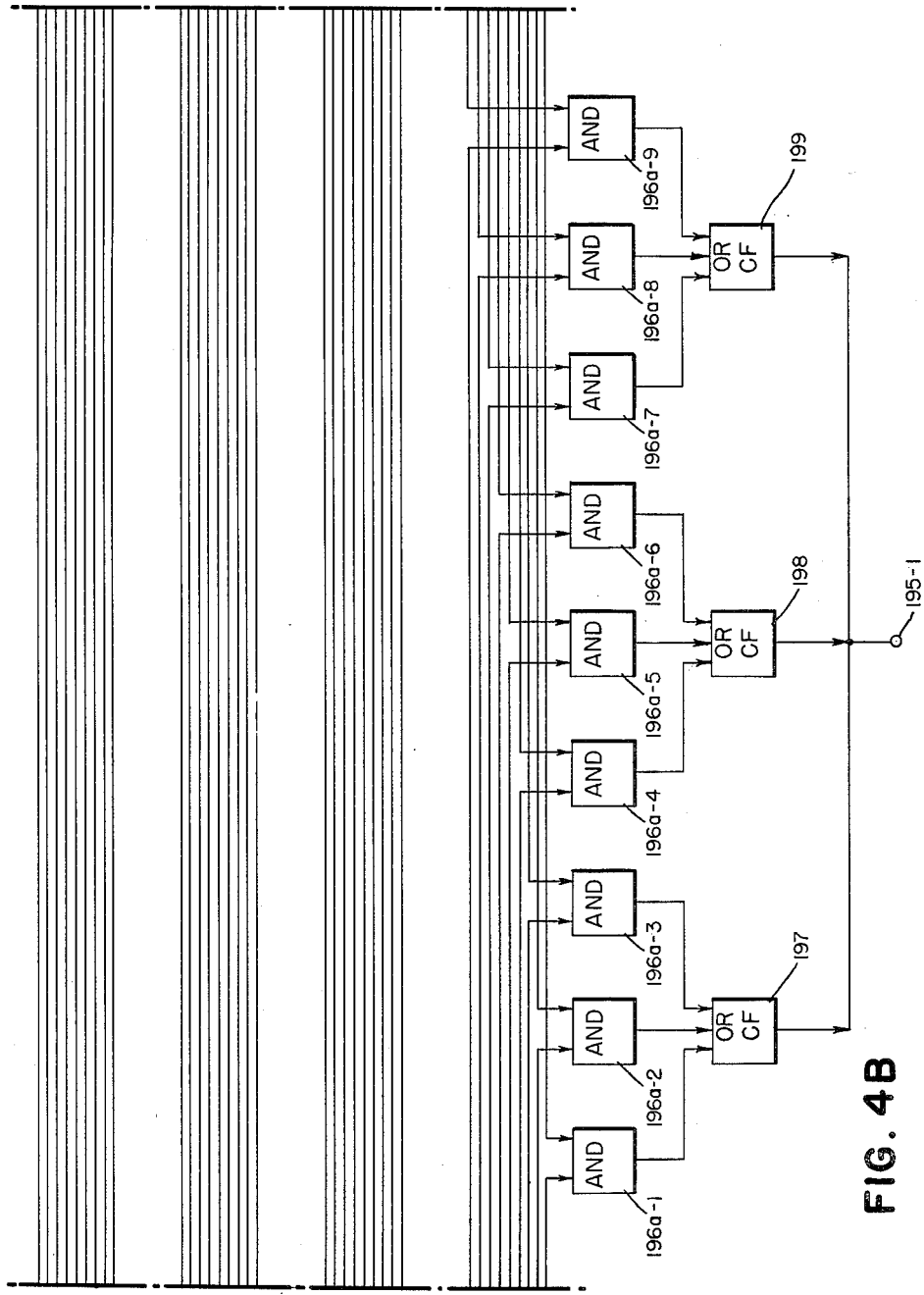

Referring more particularly to FIG. 4B the AND circuits 196a–1 through 196a–9 each correspond to the multiple indicated by its suffix. These nine AND circuits are connected to the terminals 131 through 139 (FIG. 4A) to receive the 1 bit of the corresponding multiple. The right input of AND circuits 196a–1 through 196a–9 inclusive are connected to the input terminals 161 through 169 respectively (FIG. 4E). The output of AND circuits 196a–1 through 196a–3 are connected to the inputs of OR circuit 197, the outputs of AND circuits 196a–4 through 196a–6 are connected to the inputs of the OR circuit 198, and the outputs of AND circuits 196a–7 through 196a–9 are connected to the inputs of OR circuit 199. The outputs of OR circuits 197, 198 and 199 are commonly connected to the output terminal 195–1.

If the terminal 165 (FIG. 4E) is UP the right input of AND circuit 196a–5 is UP. If at the same time the terminal 135–1 (FIG. 4A) connected to the left input of AND circuit 196a–5 goes UP, the output of OR circuit 198 goes UP and causes the output terminal 195–1 to go UP. Such indicates that a binary 1 was present in the five multiple. Since only one of the input terminals 161 through 169 may be UP at any one time only the corresponding one of the AND circuits 196a–1 through 196a–9 can be rendered operative from the terminals 131 through 139. If a binary 1 is present at the terminals 131 through 139 corresponding to the AND circuit having its right input UP then that AND circuit is rendered conductive, the output of that AND circuit goes UP, the output of the corresponding OR circuit goes UP and the output terminal 195 goes UP.

Referring to FIG. 4C AND circuits 200a–1 through 200a–9 have their right inputs connected to the corresponding one of the terminals 161 through 169 (FIG. 4E) and their left inputs connected to the corresponding terminals 131 through 139. For example, the right terminal of AND circuit 200a–6 is connected to the terminal 166 and the left input of AND circuit 206a–6 is connected to the terminal 136–2. Hence, AND circuits 200a–1 through 200a–9 accommodate the 2 bit of the nine multiples. The outputs of AND circuits 200a–1 through 200a–3 are connected to the inputs of OR circuit 201, the outputs of AND circuits 200a–4 through 200a–6 are connected to the inputs of OR circuit 202 and the outputs of AND circuits 200a–7 through 200a–9 are connected to the inputs of OR circuit 203. The outputs of OR circuits 201, 202 and 203 are commonly connected to the output terminal 195–2.

Figure 4D:
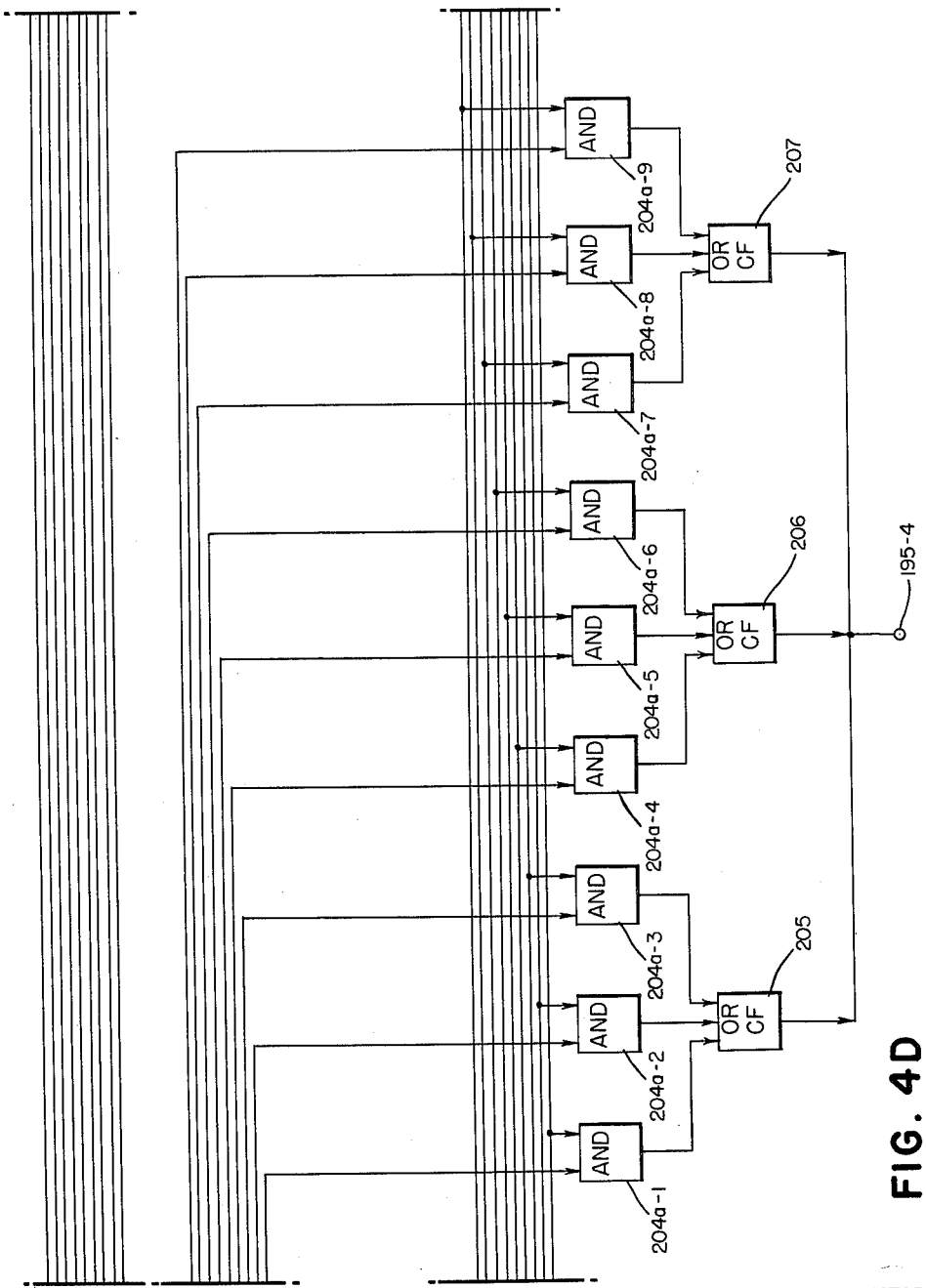

Referring to FIG. 4D the right inputs of AND circuits 204a–1 through 204a–9 are connected to the corresponding input terminals 161 through 169 inclusive and the left input terminals of these AND circuits are connected to the corresponding 4 bit terminal of the terminals 131 through 139. The outputs of AND circuits 204a–1 through 204a–3 are connected to the inputs of OR circuit 205, the outputs of AND circuits 204a–4 through 204a–6 are connected to the inputs of OR circuit 206 and the outputs of AND circuits 204a–7 through 204a–9 are connected to the inputs of OR circuit 207. The outputs of OR circuits 205, 206 and 207 are commonly connected to the output terminal 195–4.

Referring to FIG. 4E the right inputs of AND circuits 208a–1 through 208a–9 are connected to the corresponding input terminals 161 through 169 and the left input terminals of these AND circuits are connected to the corresponding 8 bit terminal of the terminals 131 through 139.

Assume that 3 (0011) is applied to the input terminals 130 (FIG. 2). It is seen by reference to the four right binary columns (Table IV) that the following input terminals (FIG. 4A) are UP during the fifth time interval: 131–1, 131–2 (M); 132–2, 132–4 (2M); 133–1, 133–8 (3M); 134–2 (4M); 135–1, 135–4 (5M); 136–8 (6M); 137–1 (7M); 138–4 (8M); and 139–1, 139–2, 139–4 (9M). Hence, during the fifth time interval the left input of each of the following AND circuits is UP: 196a–1, 196a–3, 196a–5, 196a–7 and 196a–9 of FIG. 4B; 200a–1, 200a–2, 200a–4 and 200a–9 of FIG. 4C; 204a–2, 204a–5, 204a–8 and 204a–9 of FIG. 4D; and 208a–3, 208a–6 of FIG. 4E. If now the multiply gate terminal 180 (FIG. 3) is UP and 4 (0100) is applied to the input terminals 160 of the binary to decimal converter (FIG. 3) the input terminal 164 (FIG. 4E) of the selector switch is UP. This causes the right input terminal of each of the AND circuits 196a–4, 200a–4, 204a–4 and 208a–4 to be UP. It is noted from the above that of these AND circuits all the left inputs are DOWN except AND circuit 200a–4 which has its left input UP. The output of OR circuit 202 and terminal 195–2 are therefore UP to read out 0010 or 2.

During the sixth time interval the input terminals 134–1, 136–1, 137–2, 138–2 and 139–2 (FIG. 4A) are UP. It follows that the left input terminals of AND circuits 196a–4, 196a–5, 196a–6, 200a–7, 200a–8 and 200a–9 are UP. Again, the input terminal 164 is UP.

It follows that of the above enumerated AND circuits only the AND circuit 196a–4 has both its inputs UP. As a result only the output terminal 195–1 is UP during the sixth time interval. This effects read out of 0001 or 10. Hence, the four multiple of 3 or 12 was read out during the fifth and sixth time intervals. This means that the multiplicand 3 has been multiplied by the multiplier 4 to obtain a product of 12. In a similar manner any desired multiplicand is multiplied by any desired multiplier by forming the multiples 1–9 inclusive of the multiplicand in the product generator, applying those multiples in binary decimal form to the AND circuits of FIGS. 4B, 4C, 4D and 4E, and selecting the multiple corresponding in value to the multiplier by employing the multiplier to render the proper AND circuits operative to produce the product at the output terminals 195.

4 POLE-2 POSITION SWITCH

Referring more particularly to FIG. 5 the 4 pole-2 position switch is similar in operation to a mechanical 4 pole-2 position switch in that four inputs are applied to each of two groups of input terminals and the input of either may be applied to a single group of four output terminals. One group of input terminals includes the terminals 215–1, 215–2, 215–4 and 215–8 to which information in the binary-decimal system may be applied. The other group of input terminals includes the terminals 216–1, 216–2, 216–4 and 216–8 to which information in the binary-decimal system may be applied. The output terminals 217–1, 217–2, 217–4 and 217–8 receive the inputs from one group of the input terminals; i.e., either terminals 215 or terminals 216. The terminals 215–1 through 215–8 are connected to one input of the two-input AND circuits 218a, 219a, 220a and 221a, respectively and the input terminals 216–1 through 216–8 are connected to one input of the two-input AND circuits 222a, 223a, 224a and 225a respectively. The other input terminal of each AND circuit 218a, 219a, 220a and 221a is connected to a control terminal 226 and the other input terminal of each AND circuit 222a, 223a, 224a and 225a is connected to a control terminal 227. Control terminals 226 and 227 are never UP simultaneously.

If control terminal 226 is UP the outputs of the AND circuits 218a, 219a, 220a and 221a will go UP in response to the presence of a binary 1 at the corresponding input terminal 215. The outputs of AND circuits 218a, 219a, 220a and 221a are connected to one input of the OR circuits 228, 229, 230 and 231. Hence, if an output of any of the AND circuits 218a, 219a, 220a, and 221a goes UP the output of the corresponding OR circuit goes UP, and the output terminal 217 connected to the output of that OR circuit goes UP. For example, if a binary 1 is present at the input terminal 215–2 the output of AND circuit 219a goes UP, the corresponding input to OR circuit 229 goes UP, the otuput of OR circuit 229 goes UP and the output terminal 217–2 goes UP. In this manner, the binary decimal inputs present at the input terminals 215 are transferred to the output terminals 217. If the control terminal 226 is DOWN the input of each of the AND circuits 218a, 219a, 220a and 221a corresponding thereto is DOWN and the inputs applied to the input terminals 215 are prevented from reaching the output terminals 217.

If the control terminal 227 is UP the corresponding input of the AND circuits 222a, 223a, 224a and 225a is UP. Hence, a binary 1 present at an input terminal 216 causes the output of the corresponding AND circuit to go UP. These AND circuits are connected to the other input of OR circuits 228, 229, 230 and 231 respectively. Hence, when the output of any of the AND circuits 222a, 223a, 224a and 225a is UP the input of the corresponding OR circuits is UP so that the output terminals connected to the OR circuits go UP. For example, if a binary 1 is present at the input terminal 216–2 the output of AND circuit 223a goes UP, the corresponding input to OR circuit 229 goes UP, the output of OR circuit 229 goes UP and the output terminal 217–2 goes UP. In this manner, information in binary form present at the input terminals 216 is transferred to the output terminals 217. If the control terminal 227 is DOWN the binary decimal information present at the input terminals 216 is prevented from reaching the output terminals 217.

It is now clear that when control terminal 226 is UP the switch passes the binary decimal information at the input terminals 215 to the output terminals 217 and that when the control terminal 227 is UP the switch passes the binary decimal inputs present at the input terminals 216 to the output terminals 217.

FIG. 5A shows the 4 pole-2 position switch of FIG. 5 in block diagram form. The showing of FIG. 5A will be used to illustrate the 4 pole-2 position switch hereinafter except that the particular terminals may be differently arranged to accommodate the various circuit conditions.

4 POLE-1 POSITION SWITCH

Referring to FIG. 6 inputs in binary decimal form are applied to the input terminals 235–1, 235–2, 235–4 and 235–8. These input terminals are connected respectively to one input of the two-input AND circuits 236a, 237a, 238a and 239a, respectively. The outputs of these AND circuits are connected to the output terminals 237–1, 237–2, 237–4 and 237–8, respectively. The other input of each of the AND circuits is commonly connected to a control terminal 238. When the control terminal 238 is UP the binary decimal input at the terminals 235 is transferred through the respective AND circuits to the outnut terminals 237. When the control terminal 238 is DOWN the input at terminals 235 is prevented from causing the output of any AND circuit from going UP. Hence, by controlling the UP and DOWN condition of the control terminal 238 the input to the terminals 235 may be passed to the output terminals 237 or prevented from passing thereto.

A block diagram of the four pole-one position switch of FIG. 6 is shown in FIG. 6A. This block diagram representation is used hereinafter. The particular positioning of the terminals 235, 237 and 238 may differ from that shown in FIG. 6A.

DECIMAL TO BINARY-DECIMAL CONVERTER

Referring to FIG. 7 the decimal to binary-decimal converter receives information in accordance with the decimal system at input terminals 241, 242, 243, 244, 245, 246, 247, 248 and 249 which represent the decimal digits 1 through 9. Hence, if a decimal 1 is present the terminal 241 is UP. As a further example, if decimal 6 is present terminal 246 is UP. Only a single one of the input terminals 241 through 249 is UP during any one time interval. The single input representing a decimal value is transferred through one or more of the OR circuits 250, 251, 252, 253, 254, 255 and 256 to the output terminals 257–1, 257–2, 257–4 and 257–8 where it is presented in the binary-decimal system. The outputs of the OR circuits 250 and 251 are commonly connected to the output terminal 257–1, the outputs of the OR circuits 252 and 253 are commonly connected to the output terminal 257–2, the outputs of OR circuits 254 and 255 are commonly connected to the output terminal 257–4 and the output of OR circuit 256 is connected to the output terminal 257–8.

Input terminal 241 is connected to one input of OR circuit 250. Input terminal 242 is connected to one input of OR circuit 252, input terminal 243 is connected to one input of each of the OR circuits 250 and 252, input terminal 244 is connected to one input of OR circuit 254, input terminal 245 is connected to one input of each of the OR circuits 250 and 254, input terminal 246 is connected to one input of each of the OR circuits 253 and 255, input terminal 247 is connected to one input of each of the OR circuits 251, 253 and 255, and input terminal 248 is connected to one input of OR circuit 256 and input terminal 249 is connected to one input of each of the OR circuits 251 and 256.

If an input of decimal 7 is applied the input terminal 247 is UP. This causes the corresponding inputs of OR circuits 251, 253 and 255 to go UP. Hence, the outputs of these OR circuits go UP. These outputs are connected respectively to the output terminals 257–1, 257–2, 257–4. Hence, output terminals 257–1, 257–2 and 257–4 are UP and output terminal 257–8 is DOWN. Hence, an output of 0111 is present, the equivalent of a decimal value of 7.

The operation of the decimal to binary-decimal converter may be more readily understood by reference to Table III hereinbefore and with particularity to the columns thereof labelled binary-decimal system and decimal system. Referring conjointly to Table III and FIG. 7, it is seen that the decimal value 1 is represented by 0001 in the binary-decimal system. Hence, if decimal 1 is present the output terminal 257–1 must go UP and the remaining output terminals must remain DOWN. This is accomplished by connecting the input terminal 241 through the OR circuit 250 to the output terminal 257–1. A decimal 3 is represented by 0011 in the binary-decimal system. This means that the output terminals 257–1 and 257–2 should go UP when the input terminal 243 goes UP and that the output terminals 257–4 and 257–8 should remain DOWN. This is accomplished by connecting the input terminal 243 to one input of each of the OR circuits 250 and 252. The output of the OR circuit 250 is connected directly to the output terminal 257–1 and the output of OR circuit 252 is connected directly to the output terminal 257–2. Hence, when input terminal 243 goes UP output terminals 257–1 and 257–2 go UP and output terminals 257–4 and 257–8 remain DOWN.

As a further example, decimal value 7 is represented by 0111 in the binary-decimal system. This means that when the input terminal 247 is UP the output terminals 257–1, 257–2 and 257–4 must go UP, and the output terminal 257–8 must remain DOWN. This is accomplished by connecting the input terminal 247 to one input of each of the OR circuits 251, 253 and 255 which are connected to the output terminals 257-1, 257-2 and 257-4, respectively.

The decimal to binary-decimal converter of FIG. 7 will be shown hereinafter as indicated by the block diagram of FIG. 7A.

QUOTIENT GENERATOR

Referring to FIG. 8, the quotient generator includes input terminals 260-1, 260-2, 260-3, 260-4, 260-5, 260-6, 260-7, 260-8 and 260-9 and output terminals 261, 262, 263, 264, 265, 266, 267, 268 and 269. This circuit is employed during the division operation to determine each quotient digit. Hence, only one of the output terminals 261 through 269 is UP during any one time interval. The quotient digit indicated by any one of the output terminals 261 through 269 being UP is that of the last digit of the designating number; for example, when terminal 264 is UP the quotient digit is 4, when terminal 268 is UP the quotient digit is 8.

To determine any particular quotient digit, multiples of the divisor are added to the complement of the dividend or partial dividend as the case may be. The largest multiple of the divisor which when added to the complement of the partial dividend does not produce a carry pulse is the correct multiple. For example, if the highest multiple which does not produce a carry is the five multiple the correct quotient digit is 5. It follows that the addition of lower multiples of the divisor to the complement of the dividend or partial dividend does not produce carries and that addition of each of the multiples above the fifth multiple produces a carry. Since during the division operation the multiples 1 through 9 of the divisor are added to the complement of the dividend or partial dividend, in each instance to determine the quotient digit, it is necessary to determine which of these nine multiples when added to the complement of the dividend or partial dividend produces a carry. The input terminals 260-1 through 260-9, therefore, are connected to receive an indication of the presence or absence of carry when the addition of the multiple designated by the suffix is effected. For example, when input terminal 260-3 is DOWN a carry pulse was not produced by the addition of the three multiple of the divisor and the complement of the dividend or partial dividend. The absence of carry at the terminal 260-3 indicates that the quotient digit is, therefore, at least equal to 3. When the terminal 260-3 is UP a carry pulse was produced by the addition of the three multiple of the divisor and the complement of the dividend or partial dividend and the correct quotient digit is less than 3. Similarly, when the input terminal 260-7 is DOWN a carry pulse was not produced by the addition of the seven multiple of the divisor and the complement of the dividend or partial dividend. The proper quotient digit is, therefore, at least 7. When the terminal 260-7 is UP a carry was produced by the addition of the seven multiple of the divisor and the complement of the dividend or partial dividend and the correct quotient digit is less than 7.

Assuming that the correct quotient digit is 5, then the input terminals 260-1 through 260-5 are DOWN and the input terminals 260-6 through 260-9 are UP. The input terminal 260-5, therefore, corresponds to the highest multiple of the divisor which does not produce a carry when added to the complement of the dividend or partial dividend. This means that the correct quotient digit is 5 and the output terminal 265 should, therefore, be UP.

The input terminals 260-1 through 260-9 are connected respectively to inverters 271 through 279. The input terminals 260-2 through 260-9 are respectively connected to one input of AND circuits 281 through 288. The outputs of inverters 271 through 278 are connected respectively to the other input of AND circuits 281 through 288. The outputs of AND circuits 281 through 288 are respectively connected to the output terminals 261 through 268. The output of inverter 279 is connected to the output terminal 269.

As stated above, when the correct quotient digit is 5 the input terminals 260-1 through 260-5 are DOWN. Consider input terminals 260-1 and 260-2. When input terminal 260-1 is DOWN the output of inverter 271 goes UP causing the input of the AND circuit 281 connected thereto to go UP. However, the other input of AND circuit 281 is connected directly to the input terminal 260-2 which is DOWN. The output of AND circuit 281 and the output terminal 261 connected thereto are therefore DOWN.

When the correct quotient digit is 5 the input terminals 260-6 through 260-9 are UP. Consider the input terminals 260-5 and 260-6. When the correct quotient digit is 5 terminal 260-6 is UP. The input of AND circuit 285 connected thereto is UP. When the correct quotient digit is 5 the input terminal 260-5 is DOWN, the output of inverter 275 goes UP and the input of AND circuit 285 connected thereto goes UP. Since both inputs of the two-input AND circuit 285 are UP the output terminal 265 is UP. Since the input terminals 260-6 through 260-8 are UP the corresponding input of AND circuits 286-288, respectively, is DOWN. This means that the output terminals 266 through 268 are DOWN. Terminal 260-9 is UP. The output of inverter 279 connected to output terminal 269 is DOWN. Hence, the output terminal 269 is DOWN. When 5 is the correct quotient digit the only output terminal which is UP is the output terminal 265 which represents the decimal digit 5.

It is now clear that the quotient generator utilizes the carry indication corresponding to the lowest quotient digit producing such in combination with the voltage indication of the next lower quotient digit to provide an indication of the correct quotient digit. The quotient generator in effect designates the highest decimal digit at which a certain uniform voltage condition is present. This designation is dependent upon a different voltage condition at the next higher decimal representing terminal except where the voltage condition of all input terminals is the same. In this instance the designation at the highest decimal representing input terminal effects a different voltage designation at the highest decimal representing output terminal.

The quotient generator is illustrated hereinafter in connection with the division operation as shown in the block diagram of FIG. 8A.

NINE'S COMPLEMENT GENERATOR

The 9's complement generator receives information in the binary decimal system a decimal digit at the time and presents the 9's complement thereof in the binary decimal system at its output terminals. For example, a decimal 3 is applied to the input terminals as 0011. This causes 0110, or 6 (the 9's complement of 3) to be presented at the output terminals. An analysis of Table V below is essential to an understanding of the 9's complement generator shown in FIG. 9.

*Table V*

CONVERSION OF A DECIMAL DIGIT TO ITS NINES COMPLEMENT

| Decimal digit | Binary-decimal system | 9's complement in binary-decimal system |
|---|---|---|
| 0 | 0000 | 1001 |
| 1 | 0001 | 1000 |
| 2 | 0010 | 0111 |
| 3 | 0011 | 0110 |
| 4 | 0100 | 0101 |
| 5 | 0101 | 0100 |
| 6 | 0110 | 0011 |
| 7 | 0111 | 0010 |
| 8 | 1000 | 0001 |
| 9 | 1001 | 0000 |

In Table V each decimal digit 0 through 9 is written in the binary-decimal system opposite the showing of that decimal digit. The 9's complement of each decimal digit written in the binary-decimal system is similarly shown. Hence, by inspection of the binary decimal representation for each digit and the binary decimal representation of its 9's complement the changes necessary in the binary bits representing the digit to produce the 9's complement thereof may be determined. A study of these two binary decimal representations shows that the conversion may be effected by following the five rules below:

(1) In converting a digit to its 9's complement the 1 bit always changes value. This is to say that a binary 1 is changed to a binary 0 and that a binary 0 is changed to a binary 1. This is obvious by inspection of the extreme right column of the binary decimal representations.

(2) The 2 bit never changes value when a digit is converted to its 9's complement. This is indicated by inspection of the second binary column from the right in each binary decimal representation.

(3) If both the 2 bit and the 4 bit (second and third columns) or if neither of them is present in the digit the complementary value does not contain a 4 bit. For example, decimal digit 6 is represented as 0110 in the binary-decimal system. Its 9's complement, or 3, is represented as 0011. The 6 includes a 2 bit and a 4 bit and its complement 3 does not include a 4 bit. As a further example, decimal digit 1 is represented as 0001 in the binary-decimal system and its 9's complement, or 8, is represented as 1000. The binary-decimal representation of 1 includes neither a 2 bit nor a 4 bit and the binary representation of its complement 8 does not include a 4 bit.

(4) If either the 2 bit or the 4 bit (but not both) are present in the binary-decimal representation of a digit, a 4 bit will be present in its 9's complement. For example, the decimal digit 2 is represented as 0010 in the binary-decimal system and its 9's complement, or 7, is represented as 0111. Here a 2 bit is present in the binary decimal representation of the decimal digit 2 and a 4 bit is present in the binary decimal representation of its complement 7. As a further example, the decimal digit 4 is written as 0100 in the binary-decimal system and its 9's complement, or 5, is written as 0101 in the binary-decimal system. Here a 4 bit is present in the binary decimal representation of the decimal digit 4 and a 4 bit is present in the binary decimal representation of its complement 5.

(5) An 8 bit is not present in the binary decimal representation of the complement value if a 2 bit or a 4 bit or an 8 bit is present in the binary decimal representation of the decimal digit from which the complement value is derived. The representation corresponding to the decimal digits 2, 4 and 8 of Table V illustrate this rule with reference to the 2, 4 and 8 bits, respectively. It is now seen that any circuit which receives information in the binary decimal form, decimal digit by decimal digit, and effects operation in accordance with the above five rules produces an output in the binary-decimal system representing the 9's complement of the input.

Such a circuit is shown in FIG. 9. Referring more particularly to FIG. 9 the input terminals 290–1, 290–2, 290–4 and 290–8 receive information expressed in the binary-decimal system and provide the 9's complement thereof, in the binary-decimal system at the output terminals 291–1, 291–2, 291–4 and 291–8.

The terminal 290–1 receiving the 1 bit is connected through inverter 292 to the output terminal 291–1. If the input terminal 290–1 is UP the output terminal 291–1 is DOWN and if the input terminal 290–1 is DOWN the output terminal 291–1 is UP. Hence, the value of the 1 bit is always changed and Rule 1 is satisfied.

The input terminal 290–2 is connected through cathode follower 293 to the output terminal 291–2. Hence, if input terminal 290–2 is UP output terminal 291–2 is UP and if input terminal 290–2 is DOWN output terminal 291–2 is DOWN. The 2 bit therefore never changes value and Rule 2 is satisfied.

By definition an exclusive OR circuit is any circuit having its output terminal DOWN when all its inputs are UP or when no input is UP and having its output UP if any one of its inputs is UP. It is seen that such a circuit performs the functions required by Rules 3 and 4. The AND circuit 294a, inverter 295, AND circuit 296a and OR circuit 297 therefore comprise an exclusive OR circuit.

The 2 bit terminal 290–2 and the 4 bit terminal 290–4 for receiving the 2 bit and 4 bit inputs, respectively, each comprise an input to the two-input AND circuit 294a and the two-input OR circuit 297. If both a 2 bit and a 4 bit are present the terminals 290–2 and 290–4 are UP. Both inputs of AND circuit 294a are therefore UP, the output of AND circuit 294a connected to the input of inverter 295 is therefore UP, the output of inverter 295 is DOWN and the input of AND circuit 296a connected to the output of inverter 295 is DOWN. The output of AND circuit 296a and the output terminal 291–4 connected thereto are therefore DOWN. This means that a 4 bit is not present in the output and that the first requirement of Rule 3 is satisfied.

If neither a 2 bit nor a 4 bit is present the output of AND circuit 294a is DOWN, the output of inverter 295 is UP, the corresponding input of AND circuit 296a is UP. However, both inputs to OR circuit 297 are DOWN, the output of OR circuit 297 is DOWN and the input of AND circuit 296a connected to the output of OR circuit 297 is DOWN. The output of AND circuit 296a and the output terminal 291–4 are therefore DOWN, a 4 bit is not present in the output and the second requirement of Rule 3 is satisfied.

If a 2 bit is present and a 4 bit is absent in the input the input terminal 290–2 is UP and the input of AND circuit 294a and OR circuit 297 connected thereto are UP. The output of AND circuit 294a is DOWN, the output of inverter 295 is UP and the input of AND circuit 296a connected thereto is UP. Since one input of OR circuit 297 is UP the output thereof is UP and the corresponding input of AND circuit 296a is UP. Since both inputs of AND circuit 296a are UP the output of AND circuit 296a and the output terminal 291–4 connected thereto are UP and a 4 bit is present in the output.

If a 4 bit is present and a 2 bit is absent the input terminal 290–4 is UP and input terminal 290–2 DOWN. It follows that the input of AND circuit 296a connected to the output of inverter 295 is UP as was the case when the 2 bit was present and the 4 bit was absent. Similarly, the input of AND circuit 296a connected to the output of OR circuit 297 is UP and the output terminal 291–4 is UP and a 4 bit is present in the output. A 4 bit is, therefore, present in the output when either a 2 bit or a 4 bit (but not both) are present in the input. The requirements of Rule 4 are, therefore, satisfied.

The input terminals 290–2, 290–4 and 290–8 are connected to supply the inputs to the three-input OR circuit 298 having its output connected to the input of inverter 299 which has its output connected to the output terminal 291–8. If either a 2 bit, a 4 bit or an 8 bit is present the corresponding one of the terminals 290–2, 290–4 and 290–8 is UP. Hence, the output of OR circuit 298 is UP and the output of inverter 299 is DOWN. If neither a 2 bit, 4 bit or 8 bit is present in the input the output or OR circuit 298 is DOWN. The output of inverter 299 is UP and the output terminal 291–8 is UP. Hence, if neither the 2 bit, 4 bit or 8 bit is present in the input, an 8 bit, exhibited by output terminal 291–8 being UP, is not present in the output. This satisfies the requirements of Rule 5.

It is seen from the above that any decimal digit represented in the binary-decimal system applied at the input terminals 290 produces the 9's complement thereof represented in the binary-decimal system at the output terminals 291.

The 9's complement generator of FIG. 9 is illustrated hereinafter as shown in FIG. 9A.

MULTIPLIER CONTROL CIRCUIT

FIGS. 10A, 10B and 10C when arranged as shown in FIG. 10D comprise the diagram for controlling the multiplier of the invention.

The multiplier control circuit is described by conjoint reference to FIGS. 10A, 10B and 10C and the timing chart therefor shown in FIG. 10E.

Multiplication is initiated by causing the terminal 300 (FIG. 10B) to go UP. This terminal remains UP (FIG. 10E) during the entire multiplication cycle. At the end of the cycle the terminal 300 goes DOWN. When the terminal 300 goes UP at 0 time (FIG. 10E) the terminal 301 connected thereto goes UP, the lead 302 goes UP and causes the corresponding input of AND circuit 303a (FIG. 10B) to go UP. The input of inverter 304 is connected to the terminal 300. Hence, at 0 time the input of inverter 304 goes UP and its output goes DOWN.

At this time (0 time interval) the output of delay DC305 is UP. This output is connected through lead 306 to the other input of AND circuit 303a. Since both inputs of the two-input AND circuit 303a are now UP, its output goes UP. This output is connected by lead 307 to one input of OR circuit 308 (FIG. 10A), by lead 309 to the output terminal 310 and by lead 311 to one input of OR circuit 312 (FIG. 10B). It follows that at 0 time the output terminal 310 and the input to OR circuits 308 and 312 referred to above go UP. When this input of OR circuit 308 (FIG. 10A) goes UP its output terminal goes UP. The OR circuit 308 controls the sixteen delays DC321, DC322, DC323, DC324, DC325, DC326, DC327, DC328, DC329, DC330, DC331, DC332, DC333, DC334, DC335, and DC336 (FIG. 10A) connected in series chain.

Hence, the fact that lead 307 is UP at 0 time causes the input of delay DC321 to go UP. The output of delay DC321 goes UP one time interval later or at 1 time and causes the input of delay DC322 to go UP. The output of delay DC322 goes UP one time interval later or at 2 time and causes the input of delay DC322 to go UP. This process is continued until the output terminal of delay DC336 goes UP. Hence, this process requires sixteen time intervals and is used as a basic timer to control the operation of a multiplier of the invention. It is now clear, for example, that the output of delay DC321 goes UP at 1 time and goes DOWN at 2 time and that the output of delay DC336 (FIG. 10E) goes UP at 16 time and goes DOWN at 17 time.

When the input of OR circuit 312 (FIG. 10B) goes UP at 0 time its output goes UP and causes the input of delay DC337 connected thereto to go UP. It follows that the output of delay DC337 goes UP at 1 time (FIG. 10B). This means that the conductor 340 and the output terminal 341 connected thereto (FIG. 10C) go UP at 1 time and that the conductor 342 (FIG. 10B) also connected to the output of delay DC337 goes UP at 1 time. The conductor 342 is also connected to the left input of AND circuit 343a (FIG. 10B) having its output connected to the other input of OR circuit 312.

When all three inputs of AND circuit 343a are UP its output is UP and the output of OR circuit 312 is UP. This applies an input pulse to the delay DC337. One time interval thereafter the output of delay DC337 is applied to the left input of AND circuit 343a to again cause operation of AND circuit 343a. Hence, it is seen that when the output of AND circuit 303a goes UP the output of OR circuit 312 goes UP. The delay DC337 is operated and the AND circuit 343a continues operation until one of its inputs goes DOWN. This circuit comprising AND circuits 303a and 343a, OR circuit 312 and delay circuit DC337 is therefore referred to as a latch circuit. It is noted that operation of this circuit must be initiated by AND circuit 303a and that once so initiated operation may be continued so long as the two right inputs of AND circuit 343a remain UP.

The center input of AND circuit 343a is UP during the entire multiplying operation because it is connected directly to the multiply control terminal 300. However, at 1 time the right input of AND circuit 343a is also UP.

The upper input of AND circuit 344a (FIG. 10B) is DOWN at 1 time because the output of delay DC322 (FIG. 10A) connected thereto is DOWN. The output of AND circuit 344a is therefore DOWN. This output is connected to the inverter 345 (FIG. 10B) and the output of inverter 345 is therefore UP. The inputs of AND circuit 344a are UP simultaneously for the first time at 18 time. This means that the output of delay DC337 connected to the terminal 341 will remain UP until 19 time. The output of AND circuit 303a goes DOWN at the beginning of 1 time because the output of delay DC305 goes DOWN at 1 time. Hence, the output terminal 310 (FIG. 10C) goes DOWN at 1 time.

The output of delay DC336 (FIG. 10A) is connected over lead 346 to the right input of the three input AND circuit 347a (FIG. 10B). The right input of AND circuit 347a therefore remains DOWN until the output of delay DC336 goes UP at 16 time. Hence, prior to 16 time the lead 348 connected to the output of AND circuit 347a and one input of OR circuit 308 (FIG. 10A) is DOWN. Since the output of AND circuit 347a is DOWN the input of the OR circuit 349 connected thereto in DOWN, the output of OR circuit 349 is DOWN and the input of delay DC350 is DOWN. The output of delay DC350 is therefore DOWN. This output is connected to the right input of AND circuits 351a, and to the input of inverter 352 and one input of AND circuits 344a and 353a.

It is seen that AND circuits 347a and 351a, OR circuit 349 and delay DC350 are connected to comprise a latch circuit. Hence, at 16 time the three inputs of AND circuit 347a are UP and the lead 348 connected to the output of AND circuit 347a goes UP. Since lead 348 is connected to one input of OR circuit 308 (FIG. 10A) the input to delay DC321 (FIG. 10A) goes UP at 16 time and the chain of delays DC321-DC336 inclusive is recycled. Also, the input to delay DC350 connected to the output of OR circuit 349 goes UP at 16 time. Initially, the three inputs of AND circuit 347a must go UP to cause the output of delay DC350 to go UP. Hence, when the output of delay DC350 goes UP and the multiply control terminal 300 is UP both inputs of AND circuit 351a go UP to cause the output of delay DC350 to go UP during the next time interval. This again causes both inputs of AND circuit 351a to be UP. Hence, once the output of AND circuit 351a goes UP the output of delay DC350 goes UP during each subsequent time interval until the multiply control terminal 300 goes DOWN.

Initially, the output of delay DC350 is DOWN. This means that the output of inverter 352 and the left input of AND circuit 347a connected thereto are UP. The center input of AND circuit 347a is UP during the entire multiply operation because the multiply control terminal 300 is UP. The right input of AND circuit 347a is connected to the output of delay DC336 (FIG. 10B, FIG. 10A) which goes UP at 16 time. Hence, the output of AND circuit 347a goes UP at 16 time and the output of delay DC350 (FIG. 10E) goes UP at 17 time and stays UP until the multiply control terminal goes DOWN. Hence, the output of delay DC350 goes DOWN at 34 time.

Since the upper output of AND circuit 344a (FIG. 10B) is connected to the output of delay DC322 (FIG. 10A) this upper input is UP at 2 time. However, the lower input connected to the output of delay DC350 is DOWN at 2 time. This upper input is not UP again until the second operation of delays DC321 through DC336 or until 18 time. The lower input of AND circuit 344a connected to the output of delay DC350 is also UP at 18 time. This means that the output of AND circuit 344a or lead 355 (FIG. 10E) and the output of delay DC322 (FIG. 10A) go DOWN at 19 time. Hence, the upper input of AND circuit 344a (FIG. 10B) and the lead 355 go DOWN at 19 time. The upper input of AND circuit 353a is connected to the output of delay DC335 (FIG. 10A) which goes UP at 15 time. The output of delay DC350 (FIG. 10B) is DOWN at 15 time. Hence, the output of AND circuit 353a connected to lead 356 (FIG. 10E) is DOWN at 15 time. The output of delay DC335 is again UP at 31 time. At this time both inputs of AND circuit 353a are UP. Hence, the output thereof or lead 356 goes UP at 31 time as indicated by 31T enclosed in a rectangle directed to the lead 356. The output of delay DC335 (FIG. 10A) goes DOWN at 32 time. Hence, the lead 356 (FIGS. 10B, 10C and 10E) goes DOWN at 32 time. The lead is connected to one input of the two input AND circuit 357a (FIG. 10C), to the input of delay DC358 and to the left input of the two input AND circuit 359a. Since lead 356 is DOWN until 31 time the output of AND circuit 357a, delay DC358 and AND circuit 359a must remain DOWN until at least 31 time. The lead 355 (FIGS. 10B and 10C), UP during 18 time, is connected to one input of the two input AND circuit 360a (FIG. 10C). The other input of AND circuit 360a and the right input of three input AND circuit 361a (FIG. 10C) are connected directly to the multiply control terminal 300 (FIG. 10B). The right input of AND circuit 360a is therefore UP during the entire multiply operation and the left input is UP during 18 time. Hence, both inputs are UP simultaneously only during 18 time. This causes the output of AND circuit 360a connected to one input of OR circuit 362 to go UP at 18 time. The output of OR circuit 362 is connected to delay DC363 (FIG. 10C). The input of delay DC363 therefore goes UP at 18 time and DOWN at 19 time. It follows that the output of delay DC363 goes UP at 19 time. This output is connected to the output terminal 364 and to the left input of AND circuit 361a.

It is, therefore, seen that AND circuits 360a, 361a, OR circuit 362 and delay DC363 comprise a latch circuit and that once the output of AND circuit 360a goes UP the output of delay DC363 will be UP during subsequent time intervals so long as the two right inputs of AND circuit 361a remain UP. The right input of AND circuit 361a is connected directly to the multiply control terminal 300 (FIG. 10B) and is, therefore, UP during the entire multiply operation. The center input of AND circuit 361a is connected by lead 365 to the output of inverter 366 (FIG. 10C) having its input connected to the output of OR circuit 367 (FIG. 10C). One input of OR circuit 367 is connected to the output of delay DC358 (FIG. 10C) and the other input is connected to the output of AND circuit 357a. One input of AND circuit 357a and the input of delay DC358 are connected to the lead 356 which goes UP at 31 time. Hence, prior to 31 time the output of AND circuit 357a is DOWN and the output of delay DC358 is DOWN. This means that both inputs of OR circuit 367 are DOWN. The output of OR circuit 367 and the input of inverter 366 are therefore DOWN prior to 31 time. This means that the output of inverter 366 and the lead 365 connected to the center input of AND circuit 361a are UP prior to 31 time.

Hence, when the left input of AND circuit 361a goes UP at 19 time all three of the inputs to AND circuit 361a are UP. The output of AND circuit 361a connected as one input of OR circuit 362 therefore goes UP at 19 time. This causes the input to delay DC363 to go UP at 19 time. Hence, at 20 time the output of AND circuit 361a is again UP. This operation is continued until the lead 365 goes DOWN. This input to delay DC363 cannot go DOWN until one time interval after the lead 356 goes DOWN. This is because one time interval is required for the output of delay DC358 to go DOWN after its input has gone DOWN. Hence, the terminal 364 cannot go DOWN prior to 32 time (FIG. 10E).

An embodiment of a multiplier of the invention is illustrated to effect multiplication of two thirteen digit numbers. It follows, therefore, that the product will contain either 25 or 26 digits. It is appreciated that the operation of the control circuit of FIG. 10D must be determined in part by the number of digits in the product since those digits are stored in either register 1 or register 2. Hence, the multiply control circuit must sense the presence of the 26 digit in a product in sufficient time to adjust the circuit operation to accommodate that digit. One time interval is required to effect such accommodation.

If a 26 digit is present it is stored in register 1. To effect such storage registers 1 and 2 must each be shifted one digit position to the right and the digit which was located in digit position DP1 of register 1 must be entered into digit position DP13 of register 2. Such a shifting of the 25 lowest orders or digit positions of the product is required because the twelve lowest order digits or digit positions thereof are stored in digit positions DP2 through DP13 of register 2 and the thirteen highest order digits or digit positions of the product are normally stored in the thirteen digit positions of register 1.

If a 26th digit is present in the product it will appear at the terminals 102P (FIG. 10C), one time interval before it is stored in a register. This fact is clear from subsequent explanation directed to the solution of a particular multiplication problem. Hence, if a 26 digit is present at least one of the terminals 102P will be UP to cause the output of OR circuit 370 (FIG. 10C) to be UP. Operation of the multiply control circuit when only 25 digits are present in the product is explained and thereafter such operation is explained when 26 digits are present in the product.

When only 25 digits are present in the product the terminals 102P remain DOWN during and subsequent to 31 time. As a result the output of OR circuit 370 remains DOWN. This output is connected to the input of inverter 371 so that the output of inverter 371 remains UP. The output of inverter 371 is one input to AND circuit 357a, the other input being via lead 356 which is UP during 31 time. Since both inputs of AND circuit 357a are UP during 31 time its output is UP. This output serves as one input to OR circuit 367. The output of OR circuit 367 is connected as the input to inverter 366 and delay DC372 (FIG. 10C). Since the input of delay DC372 is UP during 31 time its output connected to the output terminal 373 (FIG. 10C) is UP during 32 time.

Since lead 356 is UP during 31 time and transfers an input to delay DC358 (FIG. 10C) the output of this delay circuit, connected as one input of OR circuit 367, is UP during 32 time. The output of OR circuit 367 and the input to inverter 366 and delay DC372 are UP during 32 time. This means that the output of delay DC372 and the output terminal 373 are also UP during 33 time. Since both inputs to OR circuit 367 are DOWN during 33 time the output terminal 373 goes DOWN at 34 time.

It should be noted that lead 356 UP during 31 time is connected as one input of the two input AND circuit 359a (FIG. 10C). The other input of AND circuit 359a is connected to receive the output of inverter 366. It is clear from the above that the output of inverter 366 is DOWN during 31 time when only 25 digits are present in the product. This means that the output of AND circuit 359a is therefore DOWN during 31 time. This output is connected as the input of delay DC374 having its output connected to the output terminal 375. Hence, the output terminal 375 (FIG. 10E) remains DOWN at 31 time.

When only 25 digits are present in the product the multiply operation is completed at the beginning of 33 time. Hence, the UP voltage provided at terminal 373 at the beginning of 32 time is utilized by any conventional circuit means (not shown) to cause the multiply control terminal 300 to go DOWN at the beginning of 33 time.

Then the lead 365 connected from the output of inverter 366 to the center input of AND circuit 361a goes DOWN at the beginning of 31 time the output of AND circuit 361a goes DOWN. Hence, the output of delay DC363 goes DOWN at the beginning of 32 time. The output terminal 364 therefore goes DOWN at 32 time and the left input of AND circuit 361a goes DOWN. The latching action of this latch circuit associated with the AND circuit 361a is therefore destroyed until after both inputs of AND circuit 360a again go UP. This does not occur until 18 time of the next subsequent cycle of the multiply control circuit.

When 26 digits are present in the product, i.e. when the 26 digit position of the product is greater than zero, some voltages produced during the latter time intervals of the multiply control cycle operation are different from those produced during those same time intervals when only 25 digits are present in the product. The waveforms of FIG. 10F which begin at 30 time are to be combined with those of FIG. 10E occurring prior to 30 time to provide the waveforms for a complete cycle of the multiply control circuit when a 26 digit product is present.

When a product of 26 digits is provided at least one of the terminals 102P (FIG. 10C) is UP during 31 time. This means that the output of OR circuit 370 is UP and that the output of inverter 371 is DOWN. Hence, the output of AND circuit 357a is DOWN, and the output of OR circuit 367 is DOWN. Hence, the input to delay DC372 is DOWN during 31 time. This means that its output and the output terminal 373 must remain DOWN during 32 time.

The input to delay DC358 is UP during 31 time. The output of delay DC358 is therefore UP during 32 time and the output of OR circuit 367 is UP during 32 time. This means that the input to delay DC372 goes UP at 32 time and that its output connected to the output terminal 373 goes UP at 33 time. The terminal 373 goes DOWN at 34 time as is the case when the product contains 25 digits.

Since the output of OR circuit 367 in DOWN at 31 time, when 26 digits are present in the product, the output of inverter 366 goes UP at 31 time. This output is connected as one input of the two input AND circuit 359a. The other input provided by lead 356 is also UP at 31 time. This means that the output of AND circuit 359a connected to the input of delay DC374 (FIG. 10F) goes UP at 31 time. Hence, the output of delay DC374 and the output terminal 375 connected thereto go UP at 32 time. When the output of delay DC358 goes UP at 32 time the output of OR circuit 367 goes UP, the output of inverter 366 goes DOWN, and the input to delay DC374 goes DOWN. Hence, the output terminal 375 connected to the output of delay DC374 goes DOWN at 33 time.

As related above the output of inverter 366 is UP at 31 time. Hence, the center input of AND circuit 361a remains UP during 31 time. However, at 32 time the output of inverter 366 goes DOWN and the center input of AND circuit 361a goes DOWN. The input to delay DC363 therefore goes DOWN at 32 time and its output connected to the output terminal 364 goes DOWN at 33 time.

Since the terminal 373 initially goes UP at 33 time it causes the multiply control terminal 300 to go DOWN at 34 time.

DIVISION CONTROL CIRCUITS

The division control circuit is realized by arranging FIGS. 11A, 11B, 11C and 11D as indicated in FIG. 11E. Some of the principal waveforms produced by the operation of the circuit of FIGS. 11A, 11B, 11C and 11D are shown in FIGS. 11F and 11G arranged as shown in FIG. 11H to comprise a single waveform chart. The output terminals of the division control circuit provide the voltages required by an embodiment of the invention. The operation of the control circuit is described by conjoint reference to the circuit diagram comprising FIGS. 11A, 11B, 11C and 11D arranged as shown in FIG. 11E and the waveforms shown in FIGS. 11F and 11G arranged as indicated in FIG. 11H.

The basic cycle of operation of the division control circuit is determined by the sixteen delays DC381 through DC396 (FIG. 11A) connected in a serial chain. An input is supplied to the input terminal of delay DC381 by the OR circuit 397 (FIG. 11A). The output of OR circuit 397 goes up at 0 time so that the output of delay DC381 goes UP at 1 time (FIG. 11F). The two unconnected inputs of OR circuit 397 are provided for use when the serial chain of delay circuits DC381 through DC396 are used in connection with arithmetic operations other than division.

The output of delay DC381 is applied to the input of delay DC382 whose output goes UP at 2 time. It is seen that the output of delay DC383 goes UP at 3 time, the output of delay DC384 goes UP at 4 time, etc., until the output of delay DC396 goes UP at 16 time. Waveforms representing the outputs of delays DC381, DC384, DC386, DC393, and DC396 are shown in FIGS. 11F and 11G. The outputs of these delays DC381, DC384, DC386, DC393 and DC396 are the only outputs of delays DC381 through DC396 which are specifically utilized by the invention. These respective outputs are connected to the upper input of the two-input AND circuits 398a, 399a, 400a, 401a and 402a, respectively. Hence, the upper input of AND circuit 398a goes UP at 1 time, the upper input of AND circuit 399a goes UP at 4 time, the upper input of AND circuit 400a goes UP at 6 time, the upper input of AND circuit 401a goes UP at 13 time and the upper input of AND circuit 402a goes UP at 16 time. This is indicated by the waveforms of FIGS. 11F and 11G.

FIGS. 11F and 11G illustrate four cycles, each of sixteen time intervals. These cycles are designated cycle 1, cycle 2, cycle $m-1$ and cycle $m$. When the thirteenth quotient digits appears during the fourteenth cycle of the division control circuit, cycle $m$ is equal to 14. When the thirteenth quotient digits appears during the fifteenth cycle of the division control, cycle $m$ is equal to 15. This fact will be more readily appreciated hereinafter in connection with terminal 107 (FIG. 11D) which corresponds to terminal 107 of digit position DP13 of register 1 and is fully described hereinafter in connection with an embodiment of the divider. If the first quotient digit is 0 an extra cycle of the division control circuit is required and the thirteenth quotient digit appears during the fifteenth cycle of the division control circuit. If the first quotient digit is a non-zero, or a digit other than 0, the thirteenth quotient digit appears during the fourteenth cycle of the division control circuit. The cycling of the division control circuit is terminated when a non-zero, or a digit other than 0, appears in digit position DP13 of register 1.

When division is to be effected the divide control terminal 405 (FIG. 11B) and the output terminal 406 (FIG. 11D) connected thereto are caused to go UP and remain UP until 5 time following completion of the last of the cycle $m$ of the divide control circuit as shown in FIGS. 11F and 11G. When the divide control terminal 405 goes UP at 0 time (FIG. 11F) the lead 407

(FIG. 11B) connected to the input of delay DC408, AND circuit 409a (FIG. 11B) and the lower input of AND circuits 398a, 399a, 400a, 401a and 402a goes UP. This lead 407 is also connected to the right input of AND circuit 410a and 411a (FIG. 11C) and to the left input of AND circuit 412a (FIG. 11D). The lead 407 and the inputs connected thereto, as recited above, therefore remain UP during the entire operation of the division control circuit.

Sixteen time represents the last time interval of each cycle of the division control circuit and the end of 16 time represents the beginning of 1 time of the next succeeding cycle. It is understood from the description hereinbefore that the output of delay DC396 (FIG. 11A) goes UP at 16 time. This output is connected to the upper input of the two input AND circuit 402a (FIG. 11B). Hence, both inputs of AND circuit 402a are UP at 16 time. It follows that its output connected to the input of OR circuit 413 (FIG. 11B) is UP at 16 time as indicated by the 16T enclosed in the rectangle and directed to the output lead of AND circuit 402a. The output of OR circuit 413 therefore goes UP at 16 time. This output is connected to the input of OR circuit 397 (FIG. 11A) and therefore causes the output of OR circuit 397 to go UP at 16 time. This output is applied to the input of delay DC381 which is therefore UP at 1 time. In this manner, the delays DC381 through DC396 (FIG. 11A) are continuously operable without control from any external source.

Initially, when the divide control terminal 405 goes UP the output of delay DC408 connected to the input of inverter 414 is DOWN. The output of inverter 414 (FIG. 11B) connected to the right input of the two input AND circuit 409a is therefore UP. Hence, at 0 time both inputs of AND circuit 409a are UP. The output of AND circuit 409a connected to the lower input of OR circuit 413 is therefore UP. This causes the output of OR circuit 413 connected to the input of OR circuit 397 (FIG. 11A) to go UP at 0 time. It follows that the input to delay DC381 goes UP at 0 time and its output goes UP at 1 time. In this manner, cycle 1 (FIG. 11F) is initiated.

Since the input to delay DC408 is UP at 0 time its output is UP at 1 time. The output of inverter 414 is therefore DOWN at 1 time to cause the right input of AND circuit 409a to be DOWN. This means that the output of AND circuit 409a and the input to OR circuit 413 are DOWN at 1 time. It follows that the output of OR circuit 413 providing the input to OR circuit 397 (FIG. 11A) is DOWN at 1 time. Hence, a single pulse is applied to the input of delay DC381 at 0 time and a single pulse is applied thereto at 16 time of each cycle of operation of the division control circuits.

The circuits enclosed by dotted lines and designated as 415 (FIG. 11B), 416 (FIG. 11B), 417 (FIG. 11C), 418 (FIG. 11C) and 419 (FIG. 11D) function as latch circuits. For example, for latch circuit 419 to be operated, both inputs of AND circuit 420a must be UP. The output of AND circuit 420a serving as the right input of OR circuit 421 is therefore UP. This causes the output of OR circuit 421 connected as the input of delay DC422 to be UP. One time interval thereafter the output of delay DC422 is UP. This output is connected over lead 423 to the left input of AND circuit 424a. If the right input of AND circuit 424a connected to the output of AND circuit 412a (FIG. 11D) is also UP the output of the AND circuit 424a is UP. The output of AND circuit 424a is the left input of OR circuit 421. Hence, the output of OR circuit 421 and the input to delay DC422 are caused to be UP. Hence, the operation of the latch circuit is continued and the output of delay DC422 remains UP so long as the right input of AND circuit 424a remains UP. However, the operation of the latch may be initiated only by both inputs to AND circuit 420a being UP simultaneously.

The input to OR circuit 425 (FIG. 11D) is connected to the output terminals 107 of digit position DP13 of register 1. The input terminals 107 of OR circuit 425 and hence the lead 426 connected to the output terminal thereof are UP only when the value stored in digit position DP13 of register 1 is not a 0. It is seen that this amount is not a 0 at 6 time of cycle M (FIG. 11G). Hence, the lead 426 goes UP for the first time at 6 time of cycle M. Hence, at 0 time the output of delay DC422 is DOWN. The output of delay DC422 is connected through lead 428 to the input of inverter 429 (FIG. 11C). Hence the output of inverter 429 connected as the right input of AND circuit 430a (FIG. 11C) and the right input of AND circuit 431a (FIG. 11B) are UP at 0 time.

The output of delay DC384 (FIG. 11A) is UP at 4 time. This means that the output of AND circuit 399a (FIG. 11B) is UP at 4 time. This output is connected as the center input of AND circuit 430a (FIG. 11C). Hence the output of AND circuit 430a must be DOWN at 0 time. This output is connected as the input of delay DC432 having its output connected to the output terminal 433 (FIG. 11D) and to the right input of OR circuit 434 of latch 418 (FIG. 11C). The output terminal 433 (FIG. 11F) is therefore DOWN at 0 time and the latch 418 is inoperative. The output of OR circuit 434 is therefore DOWN. This output is connected as the input to inverter 436 (FIG. 11C). The input to inverter 436 is therefore DOWN at 0 time and its output is UP. This output is connected as the upper input of the two input AND circuit 437a. The lower input of AND circuit 437a is connected directly to the lead 407 connected to the divide control terminal 405. Hence, both inputs of AND circuit 437a are UP at 0 time. This means that the input to delay DC438 is UP at 0 time. It follows that the output of delay DC438 and the output terminal 439 connected thereto go UP at 1 time.

The left input of AND circuit 431a (FIG. 11B) of latch 415 is connected to the output of OR circuit 413 (FIG. 11B). This means that both inputs of AND circuit 431a are UP at 0 time.

The output of AND circuit 431a is therefore UP. This output is connected as the right input to OR circuit 440 (FIG. 11B). The output of OR circuit 440 connected as the input to delay DC441 (FIG. 11B) is therefore UP at 0 time. The output of delay circuit DC441 and the output terminal 442 (FIG. 11D) are therefore UP at 1 time. The output of delay DC441 (FIG. 11B) is also connected through lead 443 to the left input of AND circuit 444a. The upper input of AND circuit 401a (FIG. 11B) is connected to the output of delay DC393 (FIG. 11A) which is UP at 13 time. This means that both inputs to AND circuit 401a and hence its output go UP at 13 time. This output is connected through inverter 445 (FIG. 11B) having its output connected as the right input to AND circuit 444a. The operation of latch 415 is therefore maintained via AND circuit 444a until 13 time. The output of delay DC441 and therefore the output terminal 442 remain UP until 14 time.

Initially, latch 417 (FIG. 11C) is inoperative. The output of delay DC447 thereof is DOWN. This output is connected through inverter 448 to the right input of AND circuit 449a (FIG. 11B) of latch 416.

At 4 time the left input of AND circuit 449a connected to the output of AND circuit 399a (FIG 11B) is UP. This means that the output of AND circuit 449a connected as the right input to OR circuit 450 (FIG. 11B) is UP at 4 time. This causes the output of OR circuit 450 connected to the input of delay DC451 to go UP. Hence, during the next time interval, that is 5 time, the output of delay DC451 goes UP. This causes the output terminal 452 (FIG. 11D) connected thereto to go UP. The output of delay DC451 (FIG. 11B) is also connected over lead 453 to the left input of the two input AND circuit 454a (FIG. 11B). The upper input of AND circuit 398a (FIG. 11B) is connected to the output of delay DC381 (FIG. 11A). Since the output of delay DC381 is UP only at 1 time the output of AND circuit 398a is UP only at 1 time. This output is connected to the input of inverter 455, the inverter 455 (FIG. 11B) having its output connected as the right input of AND circuit 454a. Hence, when the output of AND circuit 398a is UP the right input of AND circuit 454a is DOWN and when the output of AND circuit 398a is DOWN the right input to AND circuit 454a is UP. It follows that the right input to AND circuit 454a is DOWN at 1 time and is UP at all other times. Hence, at 1 time the output of AND circuit 454a goes DOWN. The left input to OR circuit 450 therefore goes DOWN and its output connected to the input of delay DC451 goes DOWN. Hence, the output of delay DC451 goes UP at 5 time of cycle 1 and goes DOWN at 2 time of cycle 2 (FIG. 11F). The output terminal 452 (FIG. 11D) therefore is UP from 5 time of cycle 1 to 2 time of cycle 2.

When the output of AND circuit 399a (FIG. 11B) goes UP at 4 time the right input to OR circuit 457 of latch 417 (FIG. 11C) goes UP. The output of OR circuit 457 connected to the input of delay DC447 (FIG. 11C) therefore goes UP. The output of delay DC447 goes UP during the next time interval or at 5 time. This output is connected over a lead 458 to the left input of AND circuit 410a (FIG. 11C). The right input of AND circuit 410a is connected over lead 407 to the divide control terminal 405 (FIG. 11B) which is UP during the entire division operation. Hence, at 5 time the output of AND circuit 410a goes UP causing the output of OR circuit 457 connected to the input of delay DC447 to go UP. This insures that the output of delay DC447 is UP at 6 time. It is seen that this operation continues until the right input of AND circuit 410a or the divide control terminal go DOWN. It follows that the output of delay DC447 is UP from 5 time of cycle 1 until 6 time following cycle m (FIGS. 11F and 11G). The output of delay DC447 is also connected as the left input of the three input AND circuit 430a (FIG. 11C). The left input of of AND circuit 430a is therefore UP when the output of delay DC447 is UP.

At 4 time the output of delay DC422 (FIG. 11D) is DOWN (FIG. 11F). This output is connected over lead 428 to the inverter 429 (FIG. 11C) having its output connected to the right input of AND circuit 430a (FIG. 11C). Hence, it is seen that during cycle 1 the right and center inputs of AND circuit 430a are both UP at 4 time and that the left input connected to the output of delay DC447 is DOWN. At 5 time the left input is UP, the right input is UP and the center input is DOWN. Hence, the output of AND circuit 430a remains DOWN during cycle 1. It follows that the output of delay DC432 remains DOWN during cycle 1. However, at 4 time of cycle 2 and subsequent cycles the left input of AND circuit 430a connected to the output of delay DC 447 is UP. This means that the output of AND circuit 430a goes UP at 4 time of each cycle subsequent to cycle 1. This output is connected to the input of delay DC432 (FIG. 11C) having its output connected to the output terminal 433 (FIG. 11D) and to the right input of OR circuit 434 (FIG. 11C). It follows that the output of delay DC432, the output terminal 433, and the right input to OR circuit 434 are UP at 5 time of each cycle of the division control circuit subsequent to cycle 1. At 5 time the center input to AND circuit 430a always goes DOWN. This means that the output of delay DC432 goes DOWN one time interval later or at 6 time. Hence, the output terminal 433 is UP from 5 time to 6 time after cycle 1.

The output of AND circuit 399a (FIG. 11B) is connected to the input of inverter 460 (FIG. 11D). Since the output of AND circuit 399a is UP only at 4 time the input to inverter 460 is UP only at 4 time. The output of inverter 460 is therefore normally UP except at 4 time when it is DOWN. This output is the right input to AND circuit 412a (FIG. 11D). The left input of AND circuit 412a is connected over lead 407 to the divide control terminal 405 (FIG. 11B) which is UP during the entire division operation. Hence, both inputs of AND circuit 412a are normally UP. The output of AND circuit 412a is therefore UP except at 4 time when it is DOWN. This output is connected as the right input of AND circuit 424a (FIG. 11D) and as the input to delay DC461 (FIG. 11D). The output of delay DC461 connected to the divide terminal 462 is therefore normally UP (FIGS. 11F, 11G). The input to delay DC461 (FIG. 11D) is DOWN only from 4 time to 5 time. The output of delay DC461 and the divide terminal 462 are therefore DOWN only from 5 time to 6 time of each cycle (FIGS. 11F, 11G).

It was explained hereinbefore that the right input to OR circuit 434 (FIG. 11C) is UP from 5 time to 6 time of each cycle after cycle 1. Hence, for the first time the output of OR circuit 434 goes UP is 5 time of cycle 2. This output is connected to the input of delay DC463 (FIG. 11C). The output of delay DC463 is therefore UP during the next time interval or 6 time of cycle 2. This output is connected over a lead 464 to the left input of AND circuit 411a (FIG. 11C). The right input of AND circuit 411a is connected over the lead 407 to the divide control terminal 405 (FIG. 11B) which is UP during the entire division operation. The output of AND circuit 411a therefore goes UP at 6 time of cycle 2. This means that the output of OR circuit 434 and the input to delay DC463 again go UP at 6 time. This operation will continue until the right input of AND circuit 411a connected to terminal 405 goes DOWN. The output of delay DC463 is connected directly to the output terminal 465 (FIG. 11D). It follows that the output terminal 465 goes UP at 6 time of cycle 2 and remains UP until 6 time following cycle m.

The lower input of the two input AND circuit 437a (FIG. 11C) is connected over lead 407 to the divide control terminal 405 which is UP during the entire division operation. The upper input of AND circuit 437a is connected to the input of inverter 436 (FIG. 11C) having its input connected directly to the output of OR circuit 434. Since the output of OR circuit 434 is initially DOWN the output of inverter 436 is initially UP. Hence, at 0 time both inputs of AND circuit 437a are UP and its output connected to the input of delay DC438 (FIG. 11C) is UP. Hence, the output of delay DC438 connected to the output terminal 439 (FIG. 11D) goes UP at 1 time, as explained hereinbefore.

The UP condition of output terminal 439 will continue until the output of OR circuit 434 goes UP at 5 time of cycle 2. This causes the output of inverter 436 and the output of AND circuit 437a to go DOWN at 5 time of cycle 2. This means that the output of delay DC438 and the output terminal 439 go DOWN during the next time interval or at 6 time (FIG. 11F). The output terminal 439 then remains DOWN until 1 time of cycle 1 of the next division operation.

The operation of the diivsion control circuit as described above continues until 6 time of cycle m (FIG. 11G). At this time the thirteenth quotient digit is stored in register 1 and the digit stored in digit position DP12 of register 1 is shifted left to occupy the thirteenth digit position DP13. This causes one or more of the outputs 107 (FIGS. 11D, 20M) of DP13 of register 1 to go UP. Hence, the output of OR circuit 425 (FIG. 11D) goes UP. This output is transferred over lead 426 (see FIGS. 11F and 11G) to the right input of AND circuit 420a (FIG. 11D). The upper input of AND circuit 400a (FIG. 11B) is connected to the output of delay DC386 (FIG. 11A) which is UP at 6 time of each cycle. Hence, the output of AND circuit 400a connected as the left input to AND circuit 420a (FIG. 11D) is UP at 6 time of each cycle. However, both inputs to AND circuit 420a are UP only at 6 time of cycle m. Hence, at 6 time of cycle m the output of AND circuit 420a goes UP.

This output is connected as the right input to OR circuit 421 (FIG. 11D). The output of OR circuit 421 connected as the input to delay DC422 therefore goes UP at 6 time of cycle m. This means that the output of delay DC422 (FIGS. 11F, 11G) goes UP at 7 time. The upper input to the two input AND circuit 470a therefore goes UP at 7 time. The lower input to AND circuit 470a is connected to the output of AND circuit 399a (FIG. 11B) which goes UP at 4 time. Hence, the output of AND circuit 470a connected directly to the output terminal 471 (FIG. 11D) remains DOWN until 4 time of the next cycle which is 4 time following cycle m. At 4 time following cycle m the upper input of AND circuit 470a is UP and the output of AND circuit 399a (FIG. 11D) is UP to cause the lower input of AND circuit 470a (FIG. 11D) to be UP. The output terminal 471 is therefore UP. This signifies the end of the division operation. Connection may be made through any suitable circuit means not shown between the terminal 471 and the divide control terminal 405 (FIGS. 11B, 11F, 11G) to cause the divide control terminal (FIGS. 11F, 11G) to go DOWN at 5 time following cycle m.

When the divide control terminal 405 goes DOWN at 5 time following cycle m the lower input of AND circuit 470a goes DOWN. This causes the output terminal 471 to go DOWN.

When the divide control terminal goes DOWN at 5 time the input to delay DC408 (FIG. 11B) goes DOWN so that the output of delay DC408 (FIGS. 11F, 11G) goes DOWN at 6 time. Also, when the divide control terminal 405 goes DOWN at 5 time the right input of AND circuit 410a (FIG. 11C) goes DOWN. The output of delay DC447 (FIGS. 11F, 11G) therefore goes DOWN at the beginning of the next time interval or at 6 time. Similarly when the divide control terminal 405 goes DOWN at 5 time the right input to AND circuit 411a (FIG. 11C) goes DOWN. This means that the output of delay DC463 goes DOWN during the next time interval or at 6 time (FIGS. 11F, 11G).

When the output of AND circuit 399a (FIG. 11B) goes UP at 4 time following cycle m the input to inverter 460 (FIG. 11D) goes UP. The output of AND circuit 412a therefore goes DOWN at 4 time and the right input of AND circuit 424a connected thereto goes DOWN at 4 time. This means that the input to delay DC442 (FIG. 11D) goes DOWN at 4 time. The output of delay DC422 therefore goes DOWN at 5 time (FIGS. 11F, 11G) following cycle m.

SERIAL BINARY-DECIMAL ADDER

In the serial type binary-decimal adder each number to be added is applied serially in the binary-decimal system to a separate input terminal. Digits occupying corresponding digit positions of each number are applied simultaneously and the same time interval elapses between the occurrence of successive bits.

Referring more particularly to FIG. 12 there is shown a binary adder 480, a binary-decimal discriminator 481, a binary adder 482 and five delays 483 through 487 inclusive.

An input representing a decimal number to be added is applied to each of the input terminals 488 and 489. Each of these inputs is in the binary-decimal system wherein a pulse represents a binary 1 and the absence of a pulse represents binary 0. A third input terminal 61 is supplied from the delay 483 having its input connected to terminal 23 which receives carry output from the binary adder 480.

The binary adder effects pure binary addition in response to the inputs applied in serial fashion by binary bit to each of input terminals 488, 489 and 61. This sum appears at its output terminal 490. The terminal 490 is connected to the input terminal 60 of delay 484 in series with delay 485. The output terminal 60 of delay 485 is connected by a lead 491 to the input terminal 488 of binary adder 482.

Each delay receives an input pulse representing a binary bit during the occurrence of one binary column and produces an output during the occurrence of the next binary column. Hence, if binary 1 representing the decimal digit 8 is present at the input terminal 60 of delay 484 the binary 1 representing decimal 4 is present at the output terminal 60 of delay 484 and input terminal 61 of delay 485. The time delay effected is equal to the time occurrence between successive binary columns or one time interval. This time interval is a matter of design and that actually employed herein was approximately one microsecond.

Since the binary adder 480 in conjunction with delay 483 effects addition in pure binary fashion of the two binary decimal numbers applied to input terminals 488 and 489 the output produced at its terminal 490 may not be in the binary-decimal system. The binary-decimal discriminator 481 is provided to insure that the sum appearing at output terminal 492 of binary adder 482 is in the binary-decimal system. Hence, the binary-decimal discriminator inspects the output of binary adder 480 and supplies pulses to the binary adder 482 to effect the addition of 6 (0110) therein when the sum of any two groups of four binary bits (one decimal column or digit position) is greater than 9.

This inspection and correction is performed once upon the sum of each two groups of four binary bits added or once for each decimal column or digit position of the sum. This time is determined by the application of a column pulse to the terminal 493 of binary-decimal discriminator 481. This column pulse occurs during the same binary column or order of each decimal column and may be derived from any suitable source. This means for providing such a timed column pulse does not constitute part of this invention.

To inspect for the existence of carry, a lead 494 is connected between the terminal 60 connected to the binary adder 480 and terminal 495 of the binary-decimal discriminator.

To inspect for the existence of a binary 1 in the fourth binary column plus a binary 1 in the second or third binary column (decimal sum greater than 9), it is necessary to inspect only the second, third and fourth binary columns since the existence of a binary 1 in the first binary column is immaterial. Such inspection is effected simultaneously with that for the carry and with the occurrence of a column pulse. The output resulting from addition of the first binary columns is allowed to pass from the output terminal 492 and inspection is effected when the sum of the second binary columns appears at the output terminal 492; such is denoted by a circled 2 thereat. Similarly, a circled decimal number indicates the position throughout the circuit of the binary column which it represents when inspection is effected; i.e., circled 4, 8, and 16 for the third binary column, fourth binary column and carry respectively. From this representation it is seen that negligible delay is caused by the binary adders 480 and 482 and by the binary-decimal discriminator.

For inspection of the fourth binary column a lead 496 is connected between the terminal 60 of delay 484 and a terminal 497 of binary-decimal discriminator 481. For inspection of the third binary column a lead 498 is connected between the terminals 61, 60 (between delays 484 and 485) and a terminal 499 of binary-decimal discriminator 481. Similarly, for inspection of the second binary column a lead 500 is connected between the terminal 61 of delay 485 and terminal 501 of the binary-decimal discriminator 481.

A lead 502 is connected between the input terminal 61 of binary adder 482 and terminal 503 of binary-decimal discriminator 481 to indicate whether or not carry results from binary addition of the first binary column in binary adder 482. Such addition may be effected as a result of the addition of 6(0110) to the previous group of four binary bits. In other words, this lead 502 and the lead 500 are required to determine whether or not a binary 1 is present in the second binary column (decimal 2) of the sum.

If a carry is present or the sum is greater than 9 the binary-decimal discriminator is operative to produce a pulse at its output terminal 504. This pulse is transferred over a lead 505 to the input terminal 489 of the binary adder 482 to effect the addition of 2 (0010) therein. The same pulse appearing at output terminal 504 is also present at the terminal 506 connected to the terminal 60 of delay 486. The delay 486 produces an output pulse at its terminal 61 during the next time interval when the third binary column or bit representing decimal digit 4 is present at the inputs of binary adder 482. This pulse is applied to the terminal 507 of binary-decimal discriminator 481 and causes a pulse to be produced at the output terminal 504 thereof. This pulse is applied over the lead 505 to the terminal 489 of binary adder 482 to effect the addition of 4 (0100) therein. A total of 6 (0110) has now been added to the sum applied to the binary adder 482 and the sum of the two numbers applied to the input terminals 488 and 489 of binary adder 480 appears in the binary-decimal system at the output terminal 492 of binary adder 482.

It is seen from the above description that two time intervals elapse from the time a binary bit is applied to one of the input terminals 488, 489 of the binary adder 480 until the sum appears at the output terminal 492 of binary adder 482. This time delay of two intervals is effected by delays 484 and 485.

The binary-decimal adder of FIG. 12 is fully described and claimed in the United States patent application of Byron L. Havens, Serial No. 334,256, filed January 30, 1953, granted as Patent Number 2,910,239 on October 27, 1959, and entitled Serial Type Binary-Coded Decimal Adder.

The serial binary decimal adder, FIG. 12, will be shown hereinafter as indicated by FIG. 12A.

SERIAL PRODUCT GENERATOR

The serial product generator is shown in FIGS. 13A, 13B and 13C arranged as indicated by FIG. 13D.

Information in the binary-decimal system is applied serially to the input terminal 510 (FIG. 13A). This is to say that during a first time interval a 1 bit is applied, during the second time interval the 2 bit is applied, during the third time interval the 4 bit is applied, during the fourth time interval the 8 bit is applied and during the fifth time interval the 10 bit is applied, etc.

During the twelfth time interval the multiples one through nine designated as M through 9M respectively expressed in the binary-decimal system begin to emerge from the corresponding output terminals 511 through 519 (FIGS. 13B, 13C). The information applied to input terminal 510 is transferred through serially connected delays, DC520 through DC531 (FIGS 13A, 13B) to the output terminal 511 (FIG. 13B) and appears thereat twelve time intervals after its application to the input terminal 510, each delay effecting a delay of one time interval. Hence, the output at terminal 511 is identical with the input at terminal 510 and represents the one multiple, M, of the input.

The input terminal 510 is connected directly to the input terminals 488 and 489 of adder 532 (FIG. 13A). It is understood from the description of this serial binary decimal adder shown in FIG. 12 that the input is added to itself or doubled. Hence, the two multiple of the input applied to the terminal 510 appears serially at the output terminal 492 of adder 532. The two multiple is transferred through delay DC533 and appears at the output terminal thereof during the third time interval. The output of delay DC533 is connected through serially connected delays DC534 through DC542 to the terminal 512 (FIG. 13B) and begins to appear at the output terminal 512 during the twelfth time interval.

The outputs of delay DC528 and delay DC539 (FIG. 13B) are connected to the input terminals 488 and 489 respectively of adder 544. The inputs to adder 544 (FIG. 13B) are therefore each delayed 9 time intervals with respect to input terminal 510. The one multiple of the input appears at the output of delay DC528 and the two multiple of the input appears at the output of delay DC539. Since these outputs supply the inputs to adder 544 (FIG. 13B) the output of adder 544 represents the sum of the one and two multiples, or the three multiple. This output is transferred through delay DC545 having its output connected to the terminal 513. The third multiple therefore begins to appear at the terminal 513 twelve time intervals after it is applied to the input terminal 510.

The four multiple is obtained by adding the two multiple to itself. The output of delay DC533 (FIG. 13A) is applied to the input terminals 488 and 489 of adder 546 (FIG. 13A). The output of adder 546 is transferred through delay DC547 and is delayed six time intervals with respect to input terminal 510. The output of delay DC547 is transferred through the six serially connected delays DC548 through DC553 to the output terminal 514 at which the four multiple, 4M, begins to appear during the twelfth time interval.

The five multiple is obtained by the addition of the one and four multiples in the adder 554 (FIG. 13B). To accomplish this addition the output of delay DC525 (FIG. 13A) and the output of delay DC547 (FIG. 13A) are connected to the input terminals 548 and 549 respectively of the adder 554. The output of delay DC555 appearing during the ninth time interval is transferred through the three serially connected delays, DC556, DC557 and DC558, to the output terminal 515 (FIG. 13C) at which the five multiple, 5M, begins to appear during the twelfth time interval.

The six multiple, 6M, is obtained by adding the one and five multiples during the ninth time interval. To accomplish this addition the output of delay DC528 (FIG. 13B) and the output of delay DC555 (FIG. 13B) are connected to the input terminals 489 and 488, respectively, of the adder 559 (FIG. 13C). Hence, the six multiple, 6M, is transferred through delay DC560 (FIG. 13C) having its output connected to the output terminal 516 where it begins to appear during the twelfth time interval.

The seven multiple, 7M, is obtained by adding the two multiple and the five multiple. The output of delay DC539 (FIG. 13B) is connected to the input terminal 489 of adder 561 (FIG. 13C) and output of delay DC555 (FIG. 13B) is connected to the input terminal 488 of adder 561. Hence, the two and the five multiples are added by the adder 561 during the ninth time interval. The output of adder 561 occurring during the eleventh time interval is transferred through delay DC562 having its output connected to the terminal 517 at which the seven multiple begins to appear during the twelfth time interval.

The eight multiple, 8M, is obtained by adding the fourth multiple to itself. The output of delay DC550 (FIG. 13B) occurring during the ninth time interval is connected to the input terminals 488 and 489 of adder 563 (FIG. 13C). The output of adder 563 is transferred through delay DC564 (FIG. 13C) to the output terminal 518 where it begins to appear during the twelfth time interval.

The nine multiple, 9M, is obtained by the addition of the four and the five multiples. The output of delay DC550 (FIG. 13B) occurring during the ninth time interval is connected to the input terminal 488 of adder 565 (FIG. 13C) and the output of delay DC555 (FIG. 13B) occurring during the ninth time interval is connected to the input terminal 489 of adder 565. The output of adder 565 occurring during the eleventh time interval is transferred through delay circuit DC566 to the output terminal 519 where it begins to appear during the twelfth time interval.

SINGLE POLE CONVERTER SWITCH

The single pole converter switch shown in FIG. 14 is the functional equivalent of a binary to decimal converter and a single pole-9 position switch.

Referring to FIG. 14 the multiplier in binary decimal form is applied to the input terminals 570–1, 570–2 570–4 and 570–8 during the entire operation of the single pole converter switch. The suffix to the terminal designation indicates that the correspondingly designated bit is applied to that terminal. The nine multiples, M through 9M of the multiplicand are applied to the terminals 511 through 519 as provided by the serial type product generator of FIGS. 13A, 13B and 13C. The nine AND circuits 571a through 579a inclusive have one input connected to receive the corresponding multiple of the multiplicand. This multiple is indicated by the last digit of the AND circuit designation; for example, the lower input of AND circuit 578a is connected to the terminal 518 which receives the eight multiple, 8M, of the multiplicand. The outputs of the AND circuits 571a through 579a are connected to form a common cathode OR circuit designated as CCOR to which the output terminal 580 is connected.

The multiplier applied to the input terminals 570 in binary decimal form is utilized to render the AND circuit corresponding to its decimal value responsive to the corresponding multiple of the multiplicand. For example, if the decimal value of the multiplier is 4 the terminal 570–4 is UP. This causes the three upper inputs to AND circuit 574a to go UP and thereby permits the four multiple, 4M, of the multiplicand appearing at the terminal 514 and connected as the lower input to AND circuit 574a to appear at the output terminal 580. The remaining AND circuits 571a, 572a, 573a, 575a, 576a, 577a, 578a and 579a remain inoperative during this operation; i.e., less than all of their input terminals are UP. During the entire operation the nine multiples of the multiplicand appear at the corresponding terminals 511 through 519. The multiplier serves merely to select the multiple of the multiplicand corresponding to the multiplier.

The 1 bit terminal 570–1 is connected to the input of cathode follower 581 having its output connected to inverter 582. Similarly, the 2 bit terminal 570–2 is connected to cathode follower 583 and inverter 584, the 4 bit terminal 570–4 is connected to the cathode follower 585 and to the inverter 586, and the 8 bit terminal 570–8 is connected to the cathode follower 587 and the inverter 588. The particular connections of the output of cathode followers 581, 583, 585 and 587 and the outputs of inverter 582, 584, 586 and 588 are readily understood by reference to Table III set forth hereinbefore. When referring to Table III the terminals 160–1, 160–2, 160–4 and 160–8 thereof correspond respectively to the terminals 570–1, 570–2, 570–4 and 570–8 of FIG. 14.

The output of cathode follower 581 is UP when a 1 bit is present. A 1 bit is present when any one of the decimal values 1, 3, 5, 7 or 9 is present. Hence, the output of cathode follower 581 is connected as an input to each of the AND circuits 571a, 573a, 575a, 577a and 579a, respectively. The decimal values 1, 3, 5, 7 and 9 included in a rectangle and directed to the output of cathode follower 581 indicate that this lead is UP when a multiplier of 1, 3, 5, 7 and 9 is present. Similarly, the multiplier values which cause the outputs of cathode followers 583, 585 and 587 and the outputs of inverters 582, 584, 586 and 588 to be UP are indicated in a like manner. The output of inverter 582 is UP when the terminal 570–1 is DOWN. Hence, the output of inverter 582 is UP when a multiplier having a value of 2, 4, 6 or 8 is present. This means that the output of inverter 582 is connected as an input to each of the AND circuits 572a, 574a, 576a and 578a.

In a like manner, the terminals 570–2, 570–4 and 570–8 are connected in accordance with the teaching of Table III.

Assume that a multiplicand of 3 is to be multiplied by a multiplier of 5. The multiplier 5 (0101) causes the terminals 570–1 and 570–4 to go UP. This means that the second from the lowest or the second from the bottom input of each of the AND circuits 271a, 273a, 275a, 277a and 279a go UP and that the third from the lowest input of each of the AND circuits 271a, 274a and 275a go UP as a result of the output of inverter 584 going UP. The output of cathode follower 585 goes UP and causes the top output of each of AND circuits 574a, 575a, 576a and 577a to go UP. The output of inverter 588 goes UP causing the top input of AND circuit 571a to go UP. The lowest or bottom input of each AND circuit is UP because the correspondingly designated multiple of the multiplicand is applied thereto. It is seen from the above that all of the four inputs of AND circuit 575a are UP and that one or more of the inputs of each of the remaining AND circuits is DOWN. It follows that the output of the AND circuit 575a goes UP whenever a binary 1 is present in the five multiple of the multiplicand. The multiplicand chosen is 3. Its five multiple is 15. This means that 0001, 0101 will be provided at the output terminal 580. Hence, during the first, third and fifth time intervals the output terminal 580 goes UP. During the remaining or second, fourth, sixth, seventh and eighth intervals the output terminal 580 remains DOWN.

It follows that all of the inputs of each of the AND circuits 571a through 579a are UP only when a multiplier having a decimal value equal to the last digit designating the AND circuit is presented.

MULTIPLICATION

Referring to FIG. 15 the multiplicand 523 is multiplied by the multipiler 154. The multiplicand is designated as MC, the multiplier as MP. In the usual manual operation as shown in FIG. 12 the product, Prod., is obtained by adding the three partial products designated 1st PP, 2nd PP, 3rd PP. The addition of the partial products is performed from right to left, i.e., beginning with the units order or digit position 1. In each partial product the carries obtained are shown encircled and in the digit position in which they are added.

To obtain the first partial product the digit of the units order of digit position 1 of the multiplier MP is multiplied by the digit of each order or digit position of the multiplicand MC. First, the digit 4 occupying digit position 1 of the multiplier is multiplied by 3 occupying digit position 1 of the multiplicand. The product of this multiplication is 12; i.e., 2 with a carry of 1 to the second digit position of the first partial product. Next, the digit 4 of the multiplier is multiplied by the digit 2 occupying the second digit position of the multiplicand. The product of this multiplication is 8 which is written directly beneath the carry 1 obtained from the previous multiplication of 4×3. The digit 4 of the multiplier is then multiplied by the digit 5 occupying the third digit position of the multiplicand. This gives a product of 0 and a carry of 2 to the next or fourth digit position of the first partial product. This multiplication of the digit of the first digit position of the multiplier by the digit of each digit position of the multiplicand to obtain the first partial product (1st PP) may be considered as step 1 of the multiplication process.

Next, the digit 5 occupying the second digit position of the multiplier is multiplied by the digit of each digit position of the multiplicand to obtain the second partial product (2nd PP). Initially, the digit 5 of the multiplier is multiplied by the digit 3 of the multiplicand to obtain a product of 5 and a carry of 1. The second partial product is effectively shifted one digit position to the left with respect to the first partial product; i.e., the digit of the first digit position of the second partial product is written directly beneath the digit 8 occupying the second digit position of the first partial product. The 1 carry is therefore written beneath the 0 of the first partial product. The digit 5 of the multiplier is now multiplied by the digit 2 occupying the second digit position of the multiplicand. This provides a 0 in the second digit position of the second partial product and a carry of 1 to the third digit position. The digit 5 of the multiplier is now multiplied by the digit 5 of the multiplicand to provide the digit 5 in the third position of the second partial product and a carry of 2 to the fourth digit position of the second partial product. This completes the second step in the multiplication process and provides the second partial product, (2nd PP).

Next, the digit 1 occupying the third digit position of the multiplier is multiplied by the digit of each digit position of the multiplicand. Hence, in sequence the digit 1 of the multiplier is multiplied by the digits 3, 2 and 5 of the multiplicand to provide the third partial product (3rd PP). This completes the third step in the multiplication process.

Next, the three partial products are added digit position by digit position from the right to the left. The extreme right digit of the first partial product is therefore the extreme right digit or the digit occupying digit position 1 of the product (Prod.). The digit occupying the next digit position of the product is provided by the summation of the digits of digit position 1 of the second partial product and digit position 2 of the first partial product. A 5 occupies digit position 1 of the second partial product, an 8 occupies digit position 2 of the first partial product and a carry of 1 is provided to digit position 2 of the first partial product by the multiplication of 4×3 to obtain the digit 2 occupying the first digit position of the first partial product. The sum of 5+8+1 is 14. The digit 4 therefore occupies the second digit position of the product and a carry of 1 is provided to the third digit position thereof. The digit occupying the third digit position of the product is obtained by the summation of the digit 3 occupying the first digit position of the third partial product, the digit 0 occupying the second digit position of the second partial product and the carry 1 thereto and the digit 0 occupying the third digit position of the first partial product and the carry of 1 provided to the third digit position of the product. The sum is therefore obtained by the addition of 3, 1 and 1 which provides the digit 5 occupying the third digit position of the product.

Similarly, the digits 0 and 8 occupying the fourth and fifth digit positions, respectively, of the product are obtained. Each digit of the product is obtained as the result of a separate distinct additive process. Hence, the digit 2 is provided during a fourth step of the multiplication process, the digit 4 during a fifth step, digit 5 during a sixth step, digit 0 during a seventh step and digit 8 during an eighth step.

Each time a partial product is obtined it is obtained by multiplying one digit of the multiplier by each digit of the multiplicand. Hence, the manual multiplication process effectively uses the digits of the multiplicand in parallel since all digits thereof are employed to obtain each partial product. The digits of the multiplier are utilized in series since each digit thereof is used to obtain a single partial product.

The manner in which multiplication is effected by the invention is demonstrated in FIGS. 15A, 15B, 15C, 15D and 15E and will be described in connection therewith.

The digits of the multiplier are utilized in parallel; i.e., during each time interval actual multiplication is being performed. The diigts of the multiplicand are utilized serially; i.e., only one during a time interval. For example, during the first time interval all digits of the multiplier are used and the digit occupying the first digit position of the multiplicand is used. This means that the digit occupying the first digit position of each partial product will be obtained during the first time interval. All carries obtained during any given time interval are added to the digit occupying the next higher digit position during the next time interval.

FIG. 15A illustrates the operation effected during the first time interval. Each digit of the multiplier is multiplied by the digit occupying digit position 1 of the multiplicand. When the digit 4 occupying the first digit position of the multiplier is multiplied by the digit 3 occupying the first digit position of the multiplicand, the digit 2 occupying the first digit position of the first partial product (1st PP) and a carry of 1 are obtained. The digit 5 occupying the second digit position of the multiplier is multiplied by the digit 3 of the multiplicand to provide the digit 5 occupying the first digit position of the second partial product (2nd PP) and a carry of 1 to the next digit position of the second partial product. The digit 1 occupying the third digit position of the multiplier is multiplied by the digit 3 of the multiplicand to provide the digit 3 occupying the first digit position of the third partial product (3rd PP). It is noted in FIG. 15A that the digit 5 of the second partial product and the digit 3 of the third partial product are located immediately beneath the carries provided by the first and second partial products, respectively. Hence, the second and third partial products are shifted one digit position to the left with respect to the first partial product. The 2 occupying digit position 1 of the first partial product appears in the digit position 1 of the product. All of the above operations illustrated in FIG. 15A are performed during a single time interval. This means that a single digit of the multiplicand is multiplied simultaneously by each digit of the multiplier and the lowest order digit of the product is obtained.

During the next or second time interval (FIG. 15B) each digit of the multiplier is multiplied by the digit 2 occupying the second digit position of the multiplicand. 4 is multiplied by 2 to provide a product of 8. This 8 is added to the carry of 1 in the first partial product (FIG. 15A) to provide the digit 9 occupying the second digit position of the first partial product (FIG. 15B). The digit 5 of the multiplier is multiplied by the digit 2 of the multiplicand to provide the product of 10 which is added to the carry of 1 provided by the second partial product (FIG. 15A) to provide the digit 1 occupying the second digit position of the second partial product and a carry of 1 to be added during the next time interval (FIG. 15B). The digit 1 of the multiplier is multiplied by the digit 2 of the multiplicand to provide the digit 2 occupying the second digit position of the third partial product. Also, digits 9 and 5 of the first and second partial products, respectively, are added to provide the digit 4 occupying the second digit position of the product (FIG. 15B) and a carry of 1.

During the third time interval operation is effected as illustrated in FIG. 15C. Each digit of the multiplier is now multiplied by the digit 5 occupying the third digit position of the multiplicand to obtain the digits 0, 6 and 5 of the first, second and third partial products, respectively, and the carries of 2 for the first and second partial products, respectively. The product digit 5 occupying the third digit position of the product (FIG. 15C) is obtained by the addition of 0, 1 and 3 of the first, second and third partial products and the carry of 1 provided by the previous addition in obtaining the digit 4 occupying the second digit position of the product.

During the fourth time interval the 2 carries (FIG.

15C) of the first and second partial products, respectively, occupy the fourth digit positions of the first and second partial products, respectively, as illustrated in FIG. 15D. The digit 0 occupying the fourth digit position of the product and the carry of 1 to the fifth digit position of the product are obtained by the addition of the digits 2, 6 and 2 of the first, second and third partial products, respectively.

During the fifth and final time interval required for the solution of this particular problem, the digits 2 and 5 of the second and third partial products and the 1 carry to the fifth digit position of the product are added to provide the digit 8 occupying the fifth position of the product. The multiplicand 523 has now been multiplied by the multiplier 154 to obtain the product 80542 (FIG. 15E).

MULTIPLIER CIRCUITS

The multiplier circuit of one embodiment of the invention is realized by placing the circuits shown in FIGS. 16A and 16B as indicated in FIG. 16C. FIG. 16D comprises a chart illustrating the operation of the multiplier of FIGS. 16A and 16B when a multiplicand 523 is multiplied by a multiplier 154 to obtain a product of 80542.

Referring to FIGS. 16A and 16B the multiplier circuit includes the product generator 590 (FIG. 16B), three 4 pole-9 position selector switches 591, 592, and 593 and three binary decimal adders 594, 595 and 596 having their input terminals 91 connected to the output terminals 195 of the selector switches 591, 592 and 593, respectively. These selector switches may be of the type described in detail in connection with FIGS. 4A–4E inclusive. The binary decimal adders may be of the type illustrated in FIG. 1N. The binary decimal converters 597, 598, and 599 have their output terminals 161 through 169 connected to the selector switches 591, 592 and 593, respectively. The selector switch 591 (FIG. 16B), binary decimal adder 594 and binary to decimal converter 597 correspond to the units order or first digit position of the multiplier circuit. Likewise, selector switch 592 (FIG. 13A), binary decimal adder 595 and binary to decimal converter 598 correspond to the tens order or second digit position of the multiplier circuit and the selector switch 593 (FIG. 13A), binary decimal adder 596 and binary to decimal converter 599 correspond to the hundreds order or third digit position of the multiplier circuit.

Briefly, the multiplicand is applied to the input terminals 130 of the product generator 590 (FIG. 16B). This multiplicand is applied in binary decimal form, serially by decimal digit and parallel by bits. This is to say that if a multiplicand 523 is to be applied the first digit 3 (0011) is applied during a first time interval in binary decimal form, the second digit 2 (0010) is applied during a second time interval in binary decimal form and, the third digit 5 (0101) is applied during the third time interval. The 9 multiples (M through 9M) of this multiplicand appear at the output terminals 131 through 139, respectively, of the product generator as described in connection with FIG. 2 hereinbefore. The output terminals 131 through 139 are connected to the correspondingly designated input terminal of each of the selector switches 591, 592 and 593.

The proper digit of the multiplier is applied to the input terminals 160 of the binary to decimal converters 597, 598 and 599. Hence, the digit occupying the first digit position of the multiplier is applied in binary decimal form to the input terminals 160 of the binary to decimal converter 597, the second digit of the multiplier is applied to the input terminals 160 of the binary to decimal converter 598 and the third digit position of the multiplier is applied to the input terminals 160 of the binary to decimal converter 599. These multiplier digits are applied to the input terminals 160 of the binary to decimal converter during the entire multiplying operation and cause one of the output terminals 161 through 169 to be placed in the UP condition as explained in connection with FIG. 3 hereinbefore. For example, if the output terminal 168 of the binary to decimal converter 597 is UP the eight multiple, 8M, appearing at the input terminal 138 of the selector switch 591 is transferred to the output terminals 195 of that selector switch.

The output terminals 102 of the binary decimal adder 596 (FIG. 16A) are connected to the input terminals 90 of the binary decimal adder 595 and the output terminals 102 of the binary decimal adder 595 are connected to the input terminals 90 of the binary decimal added 594. Hence, the output of the binary decimal adder of each digit position is transferred to one group of input terminals of the binary decimal adder of the next lower digit position. Obviously, the multiplier circuit may include as many digit positions as desired. Three such positions or orders are shown to illustrate the operation of the invention. The output terminals 102 of the binary decimal adder 594 of the first digit position exhibits the product of the multiplicand and multiplier. This product appears serially by decimal digit beginning with the lowest or first digit position of the product.

It will be seen hereinafter that the first partial product (1st PP, see FIG. 15E) is applied to the input terminals 91 of the binary decimal adder 594, the second partial product (2nd PP) is applied to the input terminals 91 of the binary decimal adder 595 and the third partial product (3rd PP) is applied to the input terminals 91 of binary decimal adder 596. Since the output of adder 596 is connected to the input terminals 90 of adder 595 and the output of adder 595 is connected to the input terminals 90 of adder 594 it is seen that the second partial product is shifted one digit position to the left with respect to the first partial product and that the third partial product is shifted one digit position to the left with respect to the second partial product. The operation of the multiplier circuit of FIGS. 16A and 16B when effecting multiplication of the multiplicand 523 by the multiplier 154 is graphically illustrated in FIG. 16D. Circuit operation is described for the solution of this problem by conjoint reference to FIGS. 16A, 16B and 16D.

During the first time interval the decimal 3 of the multiplicand is applied in binary decimal form to the input terminals 130 of the product generator 590, during the second time interval and the third time interval the second and third digits of the multiplicand are so applied in binary decimal form. Four time intervals later or during the fifth time interval the 9 multiples of the multiplicand begin to emerge decimal digit by decimal digit from the output terminals 131 through 139 of the product generator.

The digit 4 occupies the first digit position of the multiplier. The output terminal 164 of the binary to decimal converter 597 will, therefore, be UP during the entire multiplying operation. The digit 5 occupies the second digit position of the multiplier. The output terminal 165 of the binary to decimal converter 598 will, therefore, be UP during the entire multiplying operation. The digit 1 occupies the third digit position of the multiplier. The output terminal 161 of the binary to decimal converter 599 is, therefore, UP during the entire multiplying operation. This means that the fourth, fifth and first multiples, respectively, of the multiplicand are applied decimal digit by decimal digit in binary decimal form to the input terminals 91 of the binary decimal adders 594, 595 and 596, respectively. The first multiple of the multiplicand 523 is 523, the fifth multiple is 2615, the fourth multiple is 2092. For purposes of clarity these multiples are illustrated as decimal values in FIG. 16D.

During the fifth time interval the first decimal digit of each of the multiples of the multiplicand appears at the output terminals of the product generator 590 (FIG. 16B) and is applied to the input terminals of the selector switches 591 (FIG. 16B), 592 (FIG. 16A) and 593 (FIG. 16A). The terminals 164, 165 and 161, respectively, of the selector switches 591, 592 and 593 are UP. This means that the four multiple, 4M, of the multiplicand is transferred to the output terminals 195 of selector switch 591, the five multiple, 5M, of the multiplicand is transferred to the output terminals 195 of the selector switch 592, and the one multiple, M, is transferred to the output terminals 195 of selector switch 593. This means that the four multiple, 2092, is applied to the input terminals 91 of binary adder 594 (FIG. 16B), the five multiple, 2615, is applied to the input terminals 91 of binary adder 595 (FIG. 16A) and the one multiple, 523, is applied to the input terminals 91 of the binary decimal adder 596. The four multiple, 2092, represents the first partial product (1st PP), the five multiple, 2615, represents the second partial product (2nd PP) and the one multiple, 523, represents the third partial product (3rd PP).

It is seen that the first decimal digit of the four multiple applied to the input terminals 91 of adder 594 is delayed one time interval before it reaches the output terminals 102 thereof. At this time the first decimal digit of the five multiple will have passed through adder 595 and be present at the input terminals 90 of the adder 594 and the one decimal digit of the first multiple will have passed through adder 596 and be present at the input terminals 90 of adder 595. Hence, during the next time interval the sum of the second digit of the first partial product and first digit of the second partial product (applied to terminals 91 and 90, respectively of adder 594) appears at the output terminals 102 of adder 594. This sum represents the second digit of the product. During this same time the second digit of the second partial product and the first digit of the third partial product (applied to the input terminals 91 and 90, respectively, of adder 595) appears at the output terminals 102 thereof and is applied to the terminals 90 of adder 594 during the next time interval. It is now clear that the second partial product is delayed one time interval with respect to the first partial product and the third partial product is delayed one time interval with respect to the second partial product and that this delay effectively shifts the second partial product one digit position to the left with respect to the first partial product and the third partial product one digit position to the left with respect to the second partial product.

FIG. 15E is a graphic representation of the operation of the multiplier circuit to effect multiplication of the multiplicand 523 by the multiplier 154. The third partial product 523 is applied to the input terminals 91 of the adder 596, the second partial product 2615 to the input terminals 91 of adder 595 and the first partial product 2092 to the input terminals 91 of adder 594. The units order digit or digit occupying the first digit position of each of these multiples or partial products is applied to the respective terminals during the fifth time interval. The digit of each of the next higher digit positions of each partial product is applied during the next successive time interval. Hence, during the fifth time interval the 3 of the one multiple, the 5 of the five multiple and the 2 occupying the first digit position of the four multiple are applied to their respective terminals 91 and during the seventh time interval the 5 of the one multiple, the 6 of the five multiple and the 0 of the four multiple are similarly applied.

It is understood that each decimal digit of FIG. 16D is represented in binary decimal form in the multiplier circuit of FIGS. 16A and 16B. During the fifth time interval the 0 and 3 present at the terminals 90 and 91 of adder 596 are added therein and appear at the terminals 102 of adder 596 and terminals 90 of adder 595 during the sixth time interval. Also, the 0 and 5 appearing at the terminals 90 and 91, respectively, of adder 595 are added therein during the fifth time interval and cause a 5 to appear at the output terminals 102 of adder 595, and the input terminals 90 of adder 594 during the sixth time interval. Also, during the fifth time interval the 0 and the 2 present at terminals 90 and 91, respectively, of the adder 594 are added therein and cause a 2 to appear at the product output terminals 102 (adder 594, FIG. 16B) during the sixth time interval. This 2 occupies the first digit position of the product.

During the sixth time interval the 0 and 2 present at the terminals 90 and 91, respectively, of adder 596 are added therein and cause a 2 to appear at the output terminals 102 of adder 596 and the input terminals 90 of adder 595 during the seventh time interval. The 3 and the 1 present at the terminals 90 and 91, respectively, of adder 595 are added therein and cause a 4 to appear at the output terminals 102 of adder 595 and the input terminals 90 of adder 594 during the seventh time interval. The 5 and 9 present at the terminals 90 and 91, respectively, of adder 594 are added therein and cause the 4 occupying the second digit position of the product to appear at the product output terminals 102 during the seventh time interval and a carry of 1 to appear at the terminals 91 (see FIG. 1M, terminal 95) of adder 594 during the seventh time interval.

During the seventh time interval the 0 and 5 present at the terminals 90 and 91, respectively, of adder 596 are added therein and cause a 5 to appear at the terminals 102 of adder 596 and terminals 90 of adder 595 during the eighth time interval. The 2 and the 6 present at the terminals 90 and 91 of adder 595 are added therein and cause an 8 to appear at the terminals 102 of adder 595 and terminals 90 of adder 594 during the eighth time interval. The 4 present at the terminals 90 and the 0 and the carry of 1 present at the terminals 91 of adder 594 are added therein and cause a 5 occupying the third digit position of the product to appear at the product output terminals 102 during the eighth time interval.

During the eighth time interval a 0 appears at the terminals 91 of adder 596 since the third digit of the first multiple of the multiplicand passed therethrough during the seventh time interval. The 5 and the 2 present at the terminals 90 and 91, respectively, of the adder 595 are added therein and cause a 7 to appear at the terminals 102 of adder 595 and the terminals 90 of adder 594 during the ninth time interval. The 8 and the 2 present at the terminals 90 and 91, respectively, of adder 594 are added therein and cause a 0 to be present at the product output terminals 102 during the ninth time interval and a carry of 1 to be present at the terminals 91 (see FIG. 1M, terminal 95) of adder 594 during the ninth time interval.

During the ninth time interval the 7 present at the terminals 90 of adder 594 and the 0 and carry of 1 present at the terminals 91 thereof are added therein to provide an 8 at the product output terminals 102 of adder 594 during the tenth time interval. The multiplication problem is now solved and the product 80542 has been provided at the product output terminals 102 (FIG. 16B) serially by decimal digit, parallel by binary bit.

It is seen from the graphic representation of FIG. 16D that each of the digits of the first partial product is delayed one time interval before it arrives at the product output terminals 102, that each of the digits of the second partial product is delayed two time intervals before it appears at the product output terminals 102, and that each of the digits of the first partial product is delayed three time intervals before it arrives at the product output terminals 102. It is readily seen that the delay provided by the delay circuits employed in the adder 594 are not necessary to the solving of a multiplication problem. These delay circuits may or may not be employed and are employed herein to effect a shaping of the output pulses representative of the product.

Another embodiment of the invention showing a multiplier circuits is realized by placing FIGS. 17A, 17B and 17C as indicated by FIG. 17D. This multiplier circuit is also of the parallel type in that all bits representing a decimal digit of the multiplicand are applied simultaneously and all bits representing each digit of the product appear simultaneously. The circuit is serial in the sense that only one digit of the multiplicand is applied during any given time interval and that only one digit of the product appears during any time interval.

Briefly, binary-decimal adders are employed to provide a multiple of the multiplicand corresponding to the decimal value of each bit employed in the binary-decimal system. In other words, the one, two, four and eight multiples of the multiplicand are created. The multiplier digit of each digit position is employed to select the multiple of the multiplicand corresponding in decimal value to the bits present in that digit position of the multiplier. This is to say, for example, that if the digit of the first digit position of the multiplier is 5 the one and four multiples of the multiplicand are selected because the 1 and 4 bits are used to represent the multiplier digit 5. The various multiples of the multiplicand selected by the multiplier digit of each digit position are then added to create the partial product corresponding to that digit position. In the above example, the one and the four multiples would be added to provide the first partial product.

These partial products are then added to provide the product which appears at the product output terminal. This product appears serially by decimal digit and parallel by binary bit.

Referring more particularly to FIGS. 17A, 17B and 17C the multiplicand is applied to the multiplicand input terminals 600 (FIG. 17A). These terminals are connected to the input terminals 90 and 91 of binary decimal adder 601. A (4) immediately above this connecting lead indicates that this lead is representative of four leads, one for each binary bit. A (4) to the right of a vertical lead also indicates that four similar leads are represented thereby. The multiplicand input terminal 600 are each connected to an input terminal of a different one of the four delays designated as DC602. The outputs of delays DC602 therefore provide the one multiple, M, of the input at the multiplicand input terminals 600 delayed one time interval with respect to the terminals 600 as indicated by 1T enclosed in a rectangle and directed to leads 603.

Connection of the input terminals 600 to the input terminals 90 and 91 of adder 601 causes the input at the multiplicand input terminal to be added to itself. The output of adder 601 appearing on leads 604 is delayed one time interval with respect to the input terminals 600 and represents the two multiple, 2M, of that input. The output of adder 601 is also connected to the input terminals 90 and 91 of adder 605 (FIG. 17A). The second multiple is therefore added to itself to provide the four multiple 4M on the leads 606. This fourth multiple is delayed two time intervals with respect to the inputs at terminal 600.

The output of adder 605 is also connected to the input terminals 90 and 91 of adder 608 (FIG. 17A). The four multiple is therefore added to itself in adder 608 to provide the eight multiple, 8M, on the leads 609.

The sixteen two-input AND circuits 610a through 625a (FIG. 17A) are provided to accommodate digit position DP1 of the multiplier. AND circuits 610a through 613a accommodate the 1 bit, AND circuits 614a through 617a accommodate the 2 bit, AND circuits 618a through 621a accommodate the 4 bit, and AND circuits 622a through 625a accommodate the 8 bit.

The 1 bit terminal 626-1 of the multiplier input terminals for digit position DP1 is connected to the right input of each of the AND circuits 610a through 613a. The 2 bit terminal 626-2 is connected to the right input of each of the AND circuits 614a through 617a. The 4 bit terminal 626-4 is connected to the right input of each of the AND circuits 618a through 621a. The 8 bit terminal 626-8 is connected to the right input of each of the AND circuits 622a through 625a.

The outputs of delays DC602 (FIG. 17A) transferred over leads 603 are connected to the left inputs of AND circuits 610a through 613a. The lead transferring the 1 bit is connected to the left input of AND circuit 610a. The lead transferring the 2 bit is connected to the left input of AND circuit 611a. The lead transferring the 4 bit is connected to the left input of AND circuit 612a. The lead transferring the 8 bit is connected to the left input of AND circuit 613a. Leads 603 (FIG. 17A) are terminated by a bracket above AND circuits 610a through 613a. The separate connections to the left inputs of the AND circuits 610a through 613a are shown within the bracket with the numerical value of the bit transferred thereover designated to the right of the lead. For example, a 4 appears to the right of the left input of AND circuit 612a. This 4 indicates that the 4 bit is transferred to the left input of AND circuit 612a. Similarly, the leads 604 (FIG. 17A) transferring the two multiple, 2M, of the multiplicand are connected to the left inputs of AND circuits 614a through 617a. The leads 606 (FIG. 17A) transferring the four multiple, 4M, of the multiplicand are connected to the left inputs of AND circuits 618a through 621a. The leads 609 (FIG. 17A) transferring the eight multiple, 8M, of the multiplicand are connected to the left inputs of AND circuits 622a through 625a.

The outputs of AND circuits 610a through 613a are connected to the input terminals 91 of adder 628 (FIG. 17A) and the outputs of AND circuits 614a through 617a are connected to the input terminals 90 of adder 628. The outputs of adder 628 are connected to the input terminals 91 of adder 629 and the outputs of AND circuits 618a through 621a are connected to the input terminals 90 of adder 629. It is seen that the inputs to terminals 90 and 91 of adder 628 are delayed one time interval with respect to the multiplicand input terminal 600 since no delay is effected in the AND circuits and the one and two multiples supplying the inputs are each delayed one time interval. No delay is effected anywhere herein as a result of the application of the multiplier input since that input is continuously supplied throughout the multiplying operation. A delay of one time interval is effected in each adder. The input to the terminals 91 of adder 629 is therefore delayed two time intervals since an additional delay of one time interval is effected by adder 628. The inputs to the terminals 90 of adder 629 are also delayed two time intervals since such is derived from the four multiple, 4M, which is delayed two time intervals. The output of adder 629 delayed three time intervals is transferred to the input terminals 91 of adder 630. The output of AND circuits 622a through 625a resulting from a transfer of the eight multiple, 8M, therethrough is delayed three time intervals, and is transferred to the input terminals 90 of adder 630. The output of adder 630 is therefore delayed four time intervals. This output is transferred to the input terminals 91 of adder 631 and will appear at the output of adder 631 connected to the product output terminals 632 delayed five time intervals with respect to the multiplicand input terminals 600. Hence, the first digit of the product, digit position DP1 thereof, will appear at the product output terminal five time intervals after the first digit of the multiplicand; i.e., the digit occupying digit position DP1 thereof, is applied to the multiplicand input terminal 600.

The first partial product 1st PP appears serially by decimal digit at the input terminals 91 of adder 631.

The sixteen AND circuits 635a through 650a (FIG. 17B) are provided to accommodate the second digit position DP2 of the multiplier. These AND circuits are connected in a manner similar to AND circuits 610a through 625a (FIG. 17A), AND circuits 635a through 639a are responsive to the one multiple of the multiplicand and the 1 bit of the multiplier, AND circuits 639a through 642a are responsive to the two multiple of the multiplicand and the 2 bit of the multiplier, AND circuits 643a through 646a are responsive to the four multiple of the multiplicand and the 4 bit of the multiplier, AND circuits 647a through 650a are responsive to the eight multiple of the multiplicand and the 8 bit of the multiplier.

Adders 653, 654, 655 and 656 (FIG. 17B) are connected in a manner similar to adders 628 through 631 (FIG. 17A). Accordingly, the second partial product, 2nd PP, is applied to the input terminals 91 of adder 656 and the decimal digit occupying the first digit position DP1 of the second partial product appears at the output of adder 656 delayed five time intervals with respect to the multiplicand input terminals 600.

AND circuits 660a through 675a (FIG. 17C) are provided to accommodate the third digit position of the multiplier. These AND circuits are connected in a manner similar to the AND circuits 610a through 625a (FIG. 17A) and AND circuits 625a through 650a (FIG. 17B). AND circuits 660a through 663a accommodate the one multiple of the multiplicand and the 1 bit of the third digit position of the multiplier applied to terminal 676-1 (FIG. 17C). AND circuits 664a through 667a accommodate the two multiple of the multiplicand and the 2 bit of the multiplier applied to terminal 676-2 (FIG. 17C). AND circuits 668a through 671a are provided to accommodate the four multiple of the multiplicand and the 4 bit of the multiplier applied to terminal 676-4 (FIG. 17C). AND circuits 672a through 675a are provided to accommodate the eight multiple of the multiplicand and the 8 bit of the multiplier applied to terminal 676-8 (FIG. 17C).

Adders 678, 679, 680 and 681 (FIG. 17C) are connected in a manner similer to adders 628, 629, 630 and 631 inclusive (FIG. 17A) and adders 653, 654, 655 and 656 inclusive (FIG. 17B). The digit of the first digit position of the third partial product, 3rd PP, is applied to the input terminals 91 of adder 681 (FIG. 17C) four time intervals after the digit occupying the first digit position of the multiplicand is applied to the multiplicand input terminals 600 (FIG. 17A). The digit occupying the first digit position, DP1, of the third partial product therefore appears at the output of adder 681 delayed five time intervals with respect to terminals 600 (FIG. 17A). This output of adder 681 (FIG. 17C) is connected to the input terminal 90 of adder 656 (FIG. 17B). Hence, five time intervals after the digit occupying the first digit position of the multiplicand is applied to the multiplicand input terminal 600 (FIG. 17A), the digit occupying the first digit position of the third partial product and the digit occupying the second digit position of the second partial product appear at the input terminals of adder 656. Hence, the sum of the second and third partial products appears at the output of adder 656 (FIG. 17B) beginning with the sixth time interval.

During the sixth time interval, therefore, the digit representing the sum of the second and third partial products is applied to the input terminals 90 of adder 631 (FIG. 17A).

As this same time, the sixth time interval, the digit occupying the third digit position of the first partial product appears at the input terminals 91 of adder 631. Hence, during the sixth time interval the digits occupying digit positions DP1, DP2 and DP3 of the third, second and first partial products, respectively, are added in the adder 631. Hence, during the seventh time interval the sum of these digits appears at the product output terminal 632 to provide the digit occupying the third digit position of the product.

Operation of the multiplier circuits of FIG. 17A, FIG. 17B and FIG. 17C is described briefly with reference to the problem 523×154 where 523 represents the multiplicand. The multiplicand 523 is applied to the multiplicand input terminals 600 (FIG. 17A) in binary-decimal form serially by decimal digit and parallel by binary bit. Hence, during the first time interval 3 (0011) is applied, during the second time interval 2 (0010) is applied, and during the third time interval 5 (0101) is applied. During the second time interval the one and the two multiples of 523 begin to appear on leads 603 and 604 respectively and during the third and four time intervals the fourth and the eight multiples being to appear on the leads 606 and 609, respectively. The multiplier 154 is applied in binary-decimal form to the multiplier input terminals during the entire multiplier operation. Hence, the digit 4 occupying the first digit position DP1 of the multiplier is applied to the terminals 626 (FIG. 17A) the digit 5 occupying the second digit position DP2 of the multiplier is applied to the terminals 651 (FIG. 17B) and the digit 1 occupying the third digit position DP3 of the multiplier is applied to the terminals 676 (FIG. 17C). It follows that the terminals 626-4 (FIG. 17A), 651-1 and 651-4 (FIG. 17B), and terminal 676-1 (FIG. 17C) are UP during the entire multiplying operation.

It is seen from the above description that the one, two, four and eight multiples, M, 2M, 4M, and 8M, respectively, are applied simultaneously to the AND circuits provided to accommodate each digit position of the multiplier. These multiples are transferred into the adders of the respective digit positions of the multiplier in accordance with the value of the particular multiplier involved. Hence, transfer through any given group of four AND circuits is permitted only when the right input terminals thereof are UP or when the binary bit corresponding thereto is present in the multiplier. For example, the AND circuits 610a through 613a inclusive (FIG. 17A) pass the first multiple of the multiplicand when a 1 bit is present in the first digit position DP1 of the multiplier or when the multiplier input terminal 626-1 is UP. It should be noted that since all multiplier digits are applied continuously that the selection of the appropriate multiple or multiples of a multiplicand by each digit position of the multiplier is effected simultaneously. Hence, the digits occupying the lower digit positions of the product become available before the production of all multiples of the multiplicand is completed.

The one multiple of the multiplicand is 523, the two multiple is 1046, the four multiple is 2092, and the eight multiple is 4184. These multiples appear on the leads 603, 604, 606 and 609, respectively in binary decimal form, serially by decimal digit, and parallel by binary bit, beginning with the digit of DP1 thereof and are delayed one, one, two and three time intervals respectively, with respect to the multiplicand input terminals 600. For purposes of simplifying the explanation of the various digits of these multiples the resulting partial products and the product will be referred to in their decimal form. These multiples, partial products obtained, the sum of the second and third partial products and the product are written in decimal form and included within rectangles and directed to certain leads of the circuit to facilitate an understanding of the operation.

The AND circuits 618a through 621a, respectively, receive the four multiple, 2092, because the multiplier input terminal 626-4 connected to the right inputs of these AND circuits is UP during the entire multiplier operation. Hence, 2092 is applied to the input terminals 90 of the adder 629 (FIG. 17A) beginning with the 2 of digit position one, DP1, thereof. Since only the terminal 626-4 of the multiplier input terminals of DP1 (FIG. 17A) is UP this 2092 represents the first partial product. It is passed through the adder 629 and presented to the input terminals 91 of adder 630, passed therethrough, presented to the input terminals 91 of adder 631. In accordance with the previous explanation herein the 2 of digit position DP1 is passed through the adder and appears at the product output terminals 632 (FIG. 17A), delayed five time intervals with respect to the terminals 600.

Next, the 9 of the first partial product is presented at the input terminals 91 of the adder 631. However, this 9 must be added to the digit occupying the second digit position of the first partial product. The multiplier input terminals 651-1 and 651-4 (FIG. 17B) are both UP. This means that the one multiple of the multiplicand will be transferred through the AND circuits 635a through 638a respectively so that 523 will appear at the input terminals 91 of adder 653 (FIG. 17B). Also, the four multiple of the multiplicand is transferred through AND circuits 643a through 646a (FIG. 17B) so that the four multiple, 2092, is presented to the input terminals 90 of adder 654 during the same time interval that 523 from adder 653 is presented to the input terminals 91 of adder 654. Hence, the sum of the one and four multiples, or the five multiple, 2615, appears at the output terminals of adder 654 and is applied to the input terminals 91 of adder 655.

This second partial product, 2615 (2nd PP) is applied to the input terminals 91 of adder 656 (FIG. 17B) and is transferred therethrough to the input terminals 90 of adder 631 (FIG. 17A) so that the first digit thereof, or 5, applied to adder 631 is applied simultaneously with the 9 of the first partial product. Hence, the second digit of the product is present at the product output terminals 632, delayed six time intervals with respect to input terminals 600. This digit is a 4. One is carried to the next digit position as explained in connection with the operation of the binary decimal adder.

The multiplier input terminal 676–1 is the only terminal 676 which is UP. This permits the one multiple of the multiplicand to be transferred through AND circuits 660a through 663a (FIG. 17C) so that 523 is presented to the input terminals 91 of adder 678, the 3 being delayed one time interval with respect to the multiplicand input terminals 600. This 523, the third partial product (3rd PP) is passed through adders 678, 679, 680 and 681 (FIG. 17C) and is presented at the input terminals 90 of adder 656 (FIG. 17B), delayed five time intervals with respect to the multiplicand input terminals 600. Hence, the digit of digit position one, DP1, thereof is applied to the input terminal 90 of adder 656 at the same time that the digit occupying the second digit position of the second partial product is applied to the input terminals 91 of adder 656. This is to say that the 1 of the second partial product and the 3 of the third partial product appear simultaneously at the input terminals of the adder 656. This 4 is transferred to the input terminals 90 of adder 631 (FIG. 17A) where it is added to the carry from the previous digit position to provide the digit 5 of the third digit position of the product at the product output terminals 632. During the next time interval the next digit 8 occupying the third digit position of the sum of the second and third partial products is applied to the input terminals 90 of adder 631 (FIG. 17A) where it is added to the digit 2 occupying the fourth digit position of the first partial product to provide the product digit 0 occupying the fourth digit position of the product at the output terminals 632 and to provide a carry of 1 to the next digit position. During the next time interval the digit 7 occupying the fourth digit position of the sum of the second and third partial products is supplied to the input terminals 90 of adder 631 where it is added to the carry of 1 from the previous digit position to provide the digit 8 occupying the fifth digit position of the product at the product output terminals 632. The multiplication problem is now completed.

To obtain the product of a multiplicand and multiplier selected multiples of the multiplicand are created, partial products are obtained therefrom and the product provided simultaneously. Each partial product is added to the next lower partial product and the sum thereof added to the next lower partial product until the sum of all partial products is obtained. This summing of partial products is initiated simultaneously with the production of the digit occupying the first digit position of the product.

The multiplier circuit shown in FIG. 18 is of the serial type. This means that the multiplicand input terminal 510 receives a single bit during each time interval and that four time intervals are required to receive one decimal digit. The product output terminal 690 provides a single bit during each time interval and therefore requires four time intervals to provide one decimal digit of the product.

The multiplicand expressed in the binary decimal notation is applied serially by bit to the input terminal 510 of the serial type product generator 691. The multiples one through nine of this input simultaneously appear on the leads 511 through 519 twelve time intervals after application of the input. Each of these leads, 511 through 519, is respectively connected to each of the single pole converter switches 692, 693 and 694. The digit occupying the first digit position, DP1, of the multiplier is applied in parallel (by binary bit) to the terminals 570 of the switch 692, the digit occupying the second digit position DP2 of the multiplier is applied in parallel (by binary bit) to the terminals 570 of switch 693, and the digit of the multiplier occupying the third digit position, DP3, is applied in parallel (by binary bit) to the input terminals 570 of the switch 694. These multiplier digits are thus applied in binary decimal form to each of the switches during the entire multiplying operation and effects selection of the multiple of the multiplicand corresponding in decimal value to the particular multiplier digit of that digit position, as set forth in connection with the description of FIG. 14. The output of the switches 692, 693 and 694 is connected to the input terminal 488 of the serial type binary decimal adders 695, 696 and 697, respectively. Since no delay is effected in the transfer of a multiple through the converter switches the output of the converter switches is delayed twelve time intervals with respect to the multiplicand input terminal 510. The input terminal 489 of adder 697 is connected to the output of the adder of the next higher digit position (not shown).

The output terminal 492 of adder 697 is connected through delays DC698 and DC699, in series, to the input terminal 489 of adder 696. A delay of two time intervals is provided by each of the adders 695, 696 and 697. The initial input to terminal 488 of adder 697 therefore appears at the output terminal 492 of that adder delayed fourteen time intervals with respect to the initial input to the multiplicand input terminal 510. Passage through delays DC698 and DC699 effects a further delay of two time intervals so that the initial input to input terminal 489 of adder 696 is delayed sixteen time intervals with respect to the multiplicand input terminal 510.

The output of adder 696 is connected through delays DC700 and DC701, in series, to the input terminal 489 of adder 695. The initial input to terminal 488 of adder 696 is delayed twelve time intervals with respect to the initial input to the multiplicand input terminal 510. The initial input to the input terminal 489 of adder 695 is therefore delayed four additional time intervals or sixteen time intervals with respect to the initial input to the terminal 510.

The output of adder 695 is connected through delays DC702 and DC703 in series to the product output terminal 690. The initial input to terminal 488 of adder 695 is delayed twelve time intervals with respect to the initial input to the multiplicand input terminal 510. The initial product output at the product output terminal 690 is therefore delayed four additional time intervals or sixteen time intervals with respect to the initial input to the multiplicand input terminal 510. Since four time intervals are required to provide the binary decimal representations for one decimal digit the input to terminal 489 of adder 695 and the input to terminal 488 representing the second decimal digit transferred through the switch 692 arrive simultaneously and are added in the adder 695 to provide an output, at the product output terminal, representing the decimal digit occupying digit position DP2 of the product.

Operation of the multiplying circuit of FIG. 18 will be described with particular reference to multiplication of the multiplicand 523 by the multiplier 154. The multiplicand 523 is applied serially to the multiplicand input terminal 510 as 0101, 0010, 0011, reading from right to left, 0011 representing the digit 3 occupying the first digit position, DP1, of the multiplicand is applied serially during the first four time intervals. Twelve time intervals after the first binary 1 is applied to the input terminal 510 the one through nine multiples, M through 9M, of the multiplicand begin to emerge on leads 511 through 519, respectively. The one, four and five multiples, 523, 2092 and 2615, respectively, are noted in FIG. 18 since they are employed in the actual solution of this problem.

The digit 4 occupying the first digit position, DP1, of the multiplier is applied to the terminals 570 of converter switch 692 to transfer the four multiple 2092 of the multiplicand therethrough to the adder 695. This multiple actually appears serially at the output of switch 692 in the binary-decimal system as set forth in connection with FIG. 14. The first four binary bits applied to the terminal 488 of adder 695 are transferred therethrough before an input is applied to the input terminal 489 thereof. This provides the first four binary bits 0010 or the 2 of the product.

The digit 5 (0101) occupying the second digit position DP2 of the multiplier is applied to the input terminals 570 of converter switch 693. This causes the five multiple, 2615, of the multiplicand to appear serially at the input terminal 488 of adder 696. The first decimal digit 5 (0101) of the five multiple appears at the input terminal 489 of adder 695 delayed sixteen time intervals with respect to the application of the 3 (0011) applied to the multiplicand input terminal 510. Hence, the digit 5 occupying the first digit position DP1 of the second partial product (2615) arrives at the terminal 489 of adder 695 simultaneously with the arrival of the digit 9, occupying the second digit position DP2 of the first partial product (2092), at the terminal 488 of adder 695. This means that the second partial product is shifted one decimal digit position with respect to the first partial product. The addition of this 5 and 9 by the adder 695 provides the decimal digit 4 occupying the second digit position, DP2, of the product and effects a carry of 1 to digit position DP3.

The decimal digit 1 occupying the third digit position, DP3, of the multiplier is applied in binary decimal form to the input terminals 570 of converter switch 694 to permit transfer of the first multiple 523 of the multiplicand therethrough to the input terminal 488 of adder 697. This means that the digit 3 of the third partial product 523 arrives at the input terminal 489 of adder 696 simultaneously with the digit 1 occupying the second digit position, DP2, of the second partial product 2615. This 3 and this 1 are added in the adder 696 to provide a 4 at the input terminal 489 of adder 695 in coincidence with the 0 of the first partial product. This 4 is therefore added to this 0 and the 1 carry to provide the digit 5 occupying the third digit position, DP3, of the product.

Similarly, the remaining digits of the third partial product 523 are added to the remaining digits of the second partial product 2615 and their sum is added in the adder 695 to the remaining digit of the first partial product to provide the 0 and the 8 occupying the fourth and fifth digit positions, respectively, of the product. It is noted that the scheme of multiplication employed by the circuit of FIG. 18 is similar to that employed by the multiplying circuit shown in FIG. 16A and FIG. 16B. The multiplier of FIG. 16A and FIG. 16B is serial by decimal digit and parallel by binary bit while the circuit of FIG. 18 is serial by decimal digit and serial by binary bit and therefore requires four time intervals to transfer one decimal digit.

FIGS. 19A and 19B arranged as indicated in FIG. 19C comprise a serial type multiplier circuit. Like the circuit of FIG. 18 the multiplicand is applied in serial fashion by binary bit and the product is presented in like fashion. This multiplier circuit is similar to that of FIGS. 17A, 17B and 17C in that only four multiples of the multiplicand are employed and in the connection of the adders to derive the product from the addition of these multiples.

Referring more particularly to FIGS. 19A and 19B the multiplicand input terminal 705 (FIG. 19A) receives the multiplicand serially in binary decimal form. The multiplicand input terminal 705 is connected to delays DC706, DC707, DC708 and DC709 (FIG. 19A) connected in series to provide the one multiple of the multiplicand on the lead 710 connected to the output terminal of delay DC709. The multiplicand input terminal 705 is also connected to the input terminals 488 and 489 of adder 711 having its output connected through delays DC712 and DC713 in series. Adder 711 effects a delay of two time intervals and delays DC712 and DC713 (FIG. 19A) each effect a delay of one time interval. Hence, the two multiple, 2M, obtained by adding the one multiple to itself in adder 711 appears on lead 714 connected to the output of delay DC713 four time intervals after it is applied to the multiplicand input terminal 705. Hence, the one and two multiples are each delayed four time intervals with respect to the input applied to the multiplicand input terminal 705 as indicated by 4T enclosed in a rectangle and directed to each of the lines 710 and 714. The output of delay DC713 is also connected to the input terminals 488 and 489 of adder 715 (FIG. 19A), having its output connected through delays DC716 and DC717 in series. The output of delay DC717 is connected to the input terminals of adder 718 and to the lead 719. The four multiple, 4M, therefore appears on the lead 719 delayed eight time intervals with respect to the input applied to the multiplicand input terminal 705. The four multiple of the multiplicand is added to itself in adder 718 and transferred through delays DC720 and DC721, in series, to the lead 722. Hence, the eight multiple, 8M, appears on the lead 722 (FIG. 19A) delayed twelve time intervals with respect to the input applied to multiplicand input terminal 705.

The two input AND circuits 725a, 726a, 727a and 728a (FIG. 19A) are provided to accommodate the first digit position, DP1, of the multiplier. The left input of these respective AND circuits are connected to receive the one, two, four and eight multiples respectively of the multiplicand. The right input terminal of these respective AND circuits is connected to the multiplier input terminals 730–1, 730–2, 730–4 and 730–8 respectively (FIG. 19A). The digit occupying the first digit position of the multiplier is continuously applied to the multiplier input terminals 730 during the multiplying operation. The outputs of AND circuits 725a and 726a are connected to the input terminals 488 and 489, respectively, of adder 731 having its output connected through delays DC732 (FIG. 19A) and DC733 in series. The one and two multiples, M and 2M, are delayed four time intervals with respect to the multiplicand input terminal 705. Hence, if these multiples are applied to adder 731 they arrive simultaneously and are added therein to provide the three multiple of the multiplicand at the input terminal 488 of adder 734 having its input terminal 489 connected to receive the four multiple, 4M, of the multiplicand. Hence, the inputs to the terminals 488 and 489 of adder 734 (FIG. 19A) are delayed eight time intervals with respect to the multiplicand input terminal 705. The output of adder 734 is connected through delays DC735 and DC736 (FIG. 19A) in series. The output of delay DC736, delayed twelve time intervals with respect to the multiplicand input terminal 705, is applied to the input terminal 488 of adder 737 (FIG. 19A). The input terminal 489 of adder 737 is connected to receive the eight multiple, 8M, of the multiplicand. The output of adder 737 is connected through delays DC738 and DC739 (FIG. 19A) to the input terminal 488 of adder 740 (FIG. 19A). Hence, this input to adder 740 is delayed sixteen time intervals with respect to the multiplicand input terminal 705.

AND circuits 741a, 742a, 743a and 744a (FIG. 19B) have their right inputs connected to the multiplier input terminals 745-1, 745-2, 745-4 and 745-8, respectively, which receive in binary decimal form the digit occupying the second digit position, DP2, of the multiplier. The left input of each of these AND circuits is connected to receive the multiples of AND circuits multiplicand as are the adders 725a through 728a of the first digit position. Adder 746 has its output connected through delays DC747 and DC748 (FIG. 19B). Adder 749 has its output connected through delays DC750 and DC751 and adder 752 has its output connected through delays DC753 and DC754. The output of delay DC754 is connected to the input terminal 488 of adder 755 (FIG. 19A) having its output connected through delays DC756 and DC757 in series. This input to adder 755 is delayed sixteen time intervals with respect to the multiplicand input terminal 705. The output of delay DC757 connected to the input terminal 489 of adder 740 (FIG. 19A) is therefore delayed twenty time intervals with respect to the multiplicand input terminal 705. It is apparent from FIGS. 19A and 19B that the interconnection of the AND circuits 741a through 744a, adders 746, 749 and 752 and the delays associated therewith are similar to the scheme employed for the first digit position DP1, of the multiplier.

AND circuits 760a through 763a inclusive (FIG. 19B), adder 764 and delays DC765 and DC766 adder 767 and delays DC768 and DC769, and adder 770 and delays DC771 and DC772 are responsive to inputs at multiplier input terminals 773-1, 773-2, 773-4 and 773-8. This circuit is interconnected in the same manner as that for digit positions DP1 and DP2 of the multiplier. The output of delay DC772 delayed sixteen time intervals with respect to the multiplicand input terminal 705 is connected to the input terminal 488 of adder 774 (FIG. 19B). The output of adder 774 is connected through delays DC775 and DC776 in series to the input terminal 489 of adder 755 (FIG. 19B). It is seen that this input to adder 755 is delayed twenty time intervals with respect to the multiplicand input terminal 705.

The circuit operation will be described in connection with the multiplication of the multiplicand 523 by the multiplier 154. The multiplicand is applied serially by binary bit to the multiplicand input terminal 705. The digits 1, 5 and 4 of the multiplier are applied in binary decimal form to the multiplier input terminals 773 (FIG. 19B), 745 (FIG. 19B) and 730 (FIG. 19A) respectively. Since the digit 4 is applied to the multiplier input terminals 730 the terminal 730-4 thereof is UP. The remaining terminals remain DOWN. Hence, the right input terminal of AND circuit 727a (FIG. 19A) is UP. This permits the four multiple, 4M (2092) representing the first partial product to be passed through AND circuit 727a and applied to the input terminal 489 of adder 734 (FIG. 19A). Four time intervals thereafter or twelve time intervals after the initial input to the multiplicand input terminal 705 the first binary representation is applied to the input terminal 488 of adder 737 (FIG. 19A). During the first four time intervals of this input 0010 is applied to the terminal 488 of adder 737. This represents the decimal digit 2 occupying digit position DP1 of the fourth multiple 2092. Four time intervals after this initial input to adder 737, or delayed sixteen time intervals with respect to the multiplier input terminal 705, the value 2092 begins to be applied to the input terminal 488 of adder 740 (FIG. 19A). This input is passed through adder 740 and delays DC777 and DC778 in series to the product output terminal 779. Hence, the decimal digit 2 occupying the digit position DP1 begins to appear in the binary decimal form at the product output terminal twenty time intervals after the initial input to the multiplicand input terminal 705.

The digit 5 occupying the second digit position of the multiplier is applied in binary decimal form to the multiplier input terminals 745 (FIG. 19B). Hence, the multiplier input terminals 745-1 and 745-4 are UP. The remaining multiplier terminals 745 remain DOWN. Both inputs to AND circuits 741a and 743a (FIG. 19B) are therefore UP. The first multiple 523 of the multiplicand is therefore passed through the adder 746 (FIG. 19B) and applied to the input terminal 488 of adder 749. The fourth multiple 2092 of the multiplicand is transferred through AND circuit 743a and applied to the input terminal 489 of adder 749. The first multiple 523 and the fourth multiple 2092 arrive simultaneously at the inputs of adder 749 and are added therein to provide the sum 2615 at the input terminal 488 of adder 752 (FIG. 19B). This sum 2615 which is the second partial product (2nd PP) is transferred from the output of adder 752 to the input terminal 488 of adder 755 (FIG. 19A) and arrives thereat delayed sixteen time intervals with respect to the initial input applied to the multiplicand input terminal 705.

The decimal digit 1 occupying the third digit position, DP3, of the multiplier is applied in binary decimal form to the multiplier input terminals 773 (FIG. 19B). Hence, the input terminal 773-1 goes UP. The remaining terminals 773 remain DOWN. The first multiple of the multiplicand is therefore passed through AND circuit 760a (FIG. 19B) and transferred to the input terminal 488 of adder 764 (FIG. 19B). This first multiple 523 representing the third partial product (3rd PP) is transferred through adders 764, 767, 770 and 774 (FIG. 19B) and begins to appear at the input terminal 489 of adder 755 (FIG. 19B) delayed twenty time intervals relative to the application of the initial input to the multiplicand input terminal 705 (FIG. 19A). Hence, the digit 5, occupying the first digit position of the second partial product, is transferred through adder 755 before the digit 3, occupying the first digit position of the third partial product is applied to the input terminal 489 thereof. In effect, therefore, the third partial product is shifted one digit position to the left with respect to the second partial product. The sum of the second and third partial products, so shifted, are added in the adder 755 to provide the sum of the second and third partial products, or 7845, at the input terminal 489 of adder 740 (FIG. 19A). This sum begins to appear at input terminal 489 of adder 740 twenty time intervals after the application of the initial input to the multiplicand input terminal 705. The first partial product 2092 begins to appear at input terminal 489 of adder 740 sixteen time intervals after the application of the initial input to the terminal 705. Hence, the sum of the second and third partial products is shifted one digit position with respect to the first partial product. The sum of the second and third partial products 7845 and the first partial product 2092, so shifted, are added in the adder 740 to produce the product 80542 at the product output terminal 779 (FIG. 19A). This product appears serially in binary decimal form as 1000,0000,-0101,0100,0010, reading from right to left. The comma is employed merely as a means of separating the binary decimal representations of the decimal digits of the product and indicates that four time intervals are required for the presentation of each decimal digit of the product.

It is understood that in all of the embodiments of the multiplier circuit any number of orders or digit positions may be employed and that the number of such digit positions is determined by the number of digit positions of the multiplier.

In the embodiments where only the one, two, four and eight multiples of the multiplicand are employed to derive the various partial products a plurality of such multiples may be necessary to form a single partial product. The particular multiples so employed are determined solely by the value of the multiplier digit involved. In any case, the sum of the multiples so employed cannot be greater than 9. This is because the sum of the binary bits in the binary-decimal system cannot be greater than 9.

MULTIPLIER-DIVIDER

The multiplier-divider circuit is shown in FIGS. 20A, 20B, 20C, 20D, 20E, 20F, 20G, 20H, 20J, 20K, 20M and 20N. The complete circuit diagram is formed when these figures are arranged as indicated in FIG. 20P. This circuit is used to effect multiplication of a thirteen digit multiplicand by a thirteen digit multiplier and division of a thirteen digit dividend by a thirteen digit divisor. When the circuit is used to effect multiplication it may be cycled by the control circuit represented in FIGS. 10A, 10B and 10C. When it is used to effect division it may be cycled under the control of the control circuit shown in FIGS. 11A, 11B, 11C and 11D.

Two universal registers designated as register 1 (FIG. 20M) and register 2 (FIG. 20N) shown as in FIG. 1S are employed to effect multiplication and to effect division. During multiplication the multiplier is entered into register 1 in the manner taught in connection with the description of the universal register shown in FIGS. 1P and 1Q. The actual entry of the digits into the register does not constitute a part of the present invention and it is assumed that the desired multiplier or dividend is present in register 1 at the beginning of the multiplication or division operation. The values present in register 1 are maintained therein except when shift right, parallel entry or shift left is being effected. When any one of these operations is being accomplished the corresponding shift right, parallel entry or shift left terminals 110, 111 or 112 (FIG. 20M) will be UP. These terminals are connected as the inputs to OR circuit 790 (FIG. 20M) having its output connected through the inverter 791 to the store terminal 113. Hence, when shift right, parallel entry or shift left is being effected the output of OR circuit 790 goes UP and the output of inverter 791 goes DOWN. Since this output is connected to the store terminal 113 that terminal goes DOWN to permit the particular operation to be performed. If all of the terminals 110, 111 and 112 are DOWN the output of OR circuit 790 is DOWN, and the output of inverter 791 is UP. This causes the store terminal 113 to be UP and thereby causes the amounts in the register to be stored therein by circulation within their particular digit position as set forth in connection with the description of FIGS. 1P and 1Q.

Similarly, the shift right, parallel entry and shift left terminals 110, 111 and 112 of register 2 (FIG. 20N) are connected through OR circuit 792 and inverter 793 to the store terminal 113. This means that storage of the values in register 2 is maintained unless shift right, parallel entry or shift left is effected.

MULTIPLICATION

Briefly, the digits of the multiplicand are shifted out as a result of a shift right operation of register 2 and applied to a product generator which provides the nine multiples of the multiplicand beginning five time intervals after the first multiplicand digit occupying digit position DP1 of register 2 is shifted out to the right. These nine multiples M through 9M of the multiplicand are applied simultaneously to each of thirteen 4 pole-9 position selector switches. The thirteen digits of the multiplier stored in register 1 are applied to the input terminals of a corresponding binary to decimal converter which controls the selector switch corresponding to that digit position of the multiplier. In this manner the multiplier digits permit the proper multiple of the multiplicand to pass therethrough. For example, if a particular multiplier digit is 5 the five multiple of the multiplicand will be permitted to pass through the selector switch under the control of this multiplier digit. The output of each of these selector switches is connected to one group of input terminals of a binary decimal adder, except that the output of the selector switch corresponding to the thirteenth digit position is connected through delays and the adder is eliminated. Since the thirteenth digit position is the highest no addition is performed therein.

The output of each of these binary decimal adders is connected to the other group of input terminals of the adder corresponding to the next lower digit position. For example, the output of the delays corresponding to the thirteenth digit position is connected to one group of input terminals of the adder corresponding to the twelfth digit position and the output of the adder corresponding to the twelfth digit position is connected to one group of input terminals of the adder corresponding to the eleventh digit position. The product appears serially by decimal digit at the output terminals of the adder corresponding to the first digit position.

This output is connected to the thirteenth digit position DP13 of register 1 and register 2. Before all digits of the multiplicand are shifted to the right out of register 2 the digits occupying the lower digit positions of the product are determined. These values are applied to the thirteenth digit position of register 2 and are accordingly shifted to the right through lower digit positions of the register as the multiplicand continues to be shifted out. After the multiplicand has been cleared from register 2 the shift right continues until the digits occupying the twelve lower digit positions of the product are stored in digit positions DP2 through DP13 of register 2. When this occurs the shift right operation of register 2 ceases and register 1 is caused to shift right and receive the remaining digits of the product into the thirteenth digit position of the register. If the product contains twenty-five digits the thirteen digits thereof occupying the higher digit positions are stored in digit positions DP1 through DP13 of register 1. Hence, the digit occupying the twenty-fifth position of the product is stored in the thirteenth digit position (DP13) of register 1 and the digit occupying the first digit position of the product is stored in digit position DP2 of register 2.

The product of two thirteen digit numbers may occupy twenty-six digit positions. If a particular product does in fact contain twenty-six digits this fact is sensed before the digit occupying the twenty-sixth digit position of the product is presented at the output of the binary adder corresponding to the first digit position of the multiplier. This energizes circuits which cause registers 1 and 2 to be shifted one additional digit position to the right. As a result the digit occupying digit position DP1 of register 1 is entered into digit position DP13 of register 2. Hence, the thirteen highest order digits of the product are now stored in register 1 and the thirteen lowest order digits of the product are stored in register 2.

The multiplication operation is described in connection with the solution of the following multiplication problem:

```
                    4 9 7 6 5 4 2 2 8 6 3 2 1 Multiplicand
                    5 4 6 3 8 1 9 7 1 0 7 0 9 Multiplier
                  4 4 7 8 8 8 8 0 5 7 6 8 8 9
                  0 0 0 0 0 0 0 0 0 0 0 0 0
                3 4 8 3 5 7 9 6 0 0 4 2 4 7
                0 0 0 0 0 0 0 0 0 0 0 0 0
              4 9 7 6 5 4 2 2 8 6 3 2 1
            3 4 8 3 5 7 9 6 0 0 4 2 4 7
          4 4 7 8 8 8 8 0 5 7 6 8 8 9
        4 9 7 6 5 4 2 2 8 6 3 2 1
      3 9 8 1 2 3 3 8 2 9 0 5 6 8
    1 4 9 2 9 6 2 6 8 5 8 9 6 3
  2 9 8 5 9 2 5 3 7 1 7 9 2 6
1 9 9 0 6 1 6 9 1 4 5 2 8 4
2 4 8 8 2 7 1 1 4 3 1 6 0 5
─────────────────────────────────────
2 7 1 9 0 9 2 9 8 3 5 1 7 7 5 1 1 6 6 7 9 1 1 5 8 9 Product
```

The circuit operation will be described by conjoint reference to the multiplier divider circuit illustrated in FIG. 20P, the control circuit illustrated in FIG. 10D, the timing chart of FIGS. 10E and 10F, and the chart of FIGS. 21A, 21B, 21C and 21D arranged as in FIG. 21E. The chart illustrated in FIG. 21E shows the position during each time interval of each decimal digit involved in the solution of this particular problem and represents graphically by vertical bars some of the more important voltages provided by the control circuit represented by FIG. 10D.

Initially, the multiplicand 4976542286321 is entered in register 2 (FIG. 20N) and stored therein as described hereinbefore with the 1 occupying the lowest digit position of the multiplicand being stored in digit position DP1 of the register.

The multiplier 5463819710709 is similarly stored in register 1 (FIG. 20M) with the digit 9 occupying the lowest digit position of the multiplier being stored in digit position DP1 of the register.

Figure 20J:
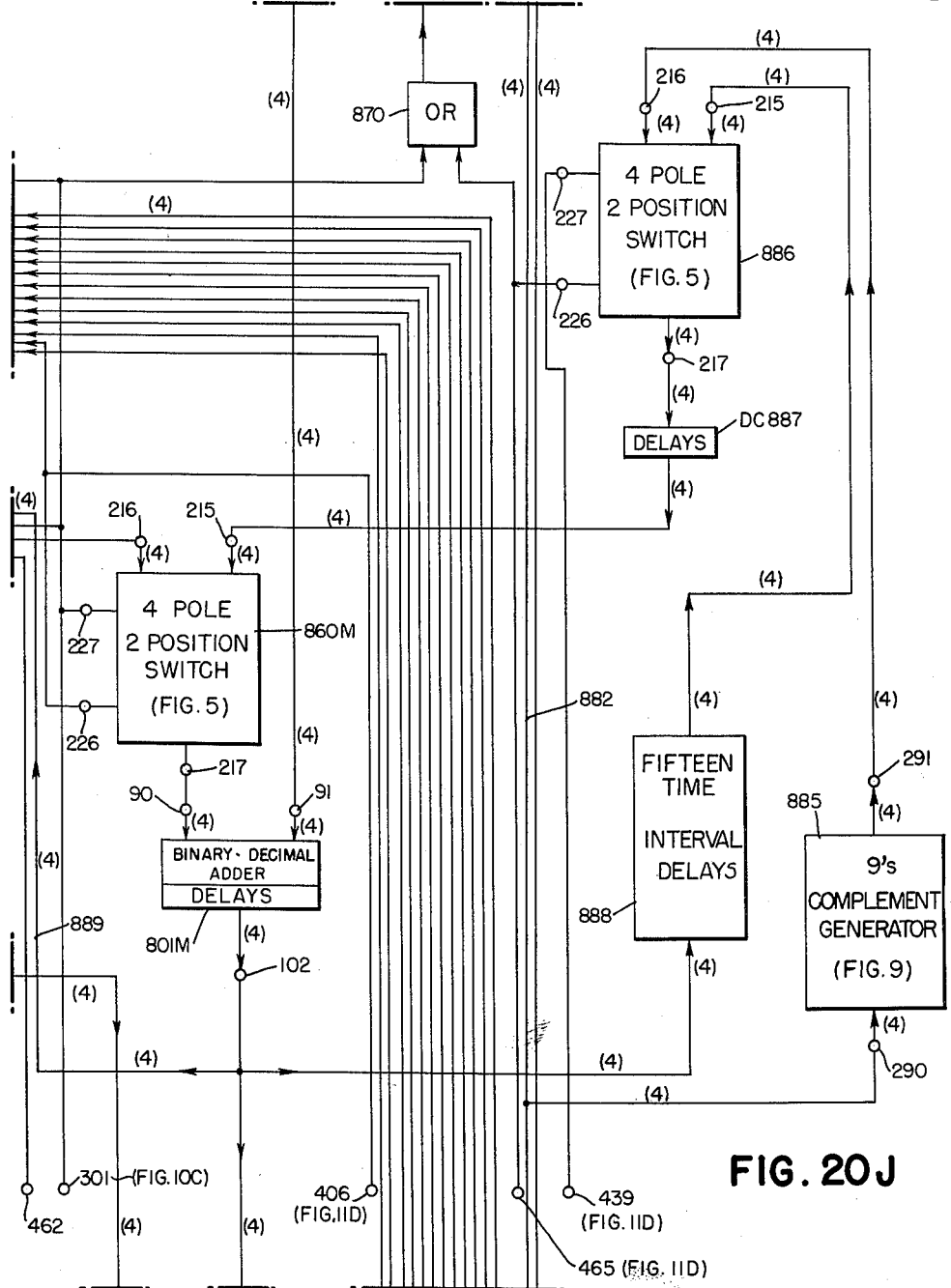
Figure 20K:
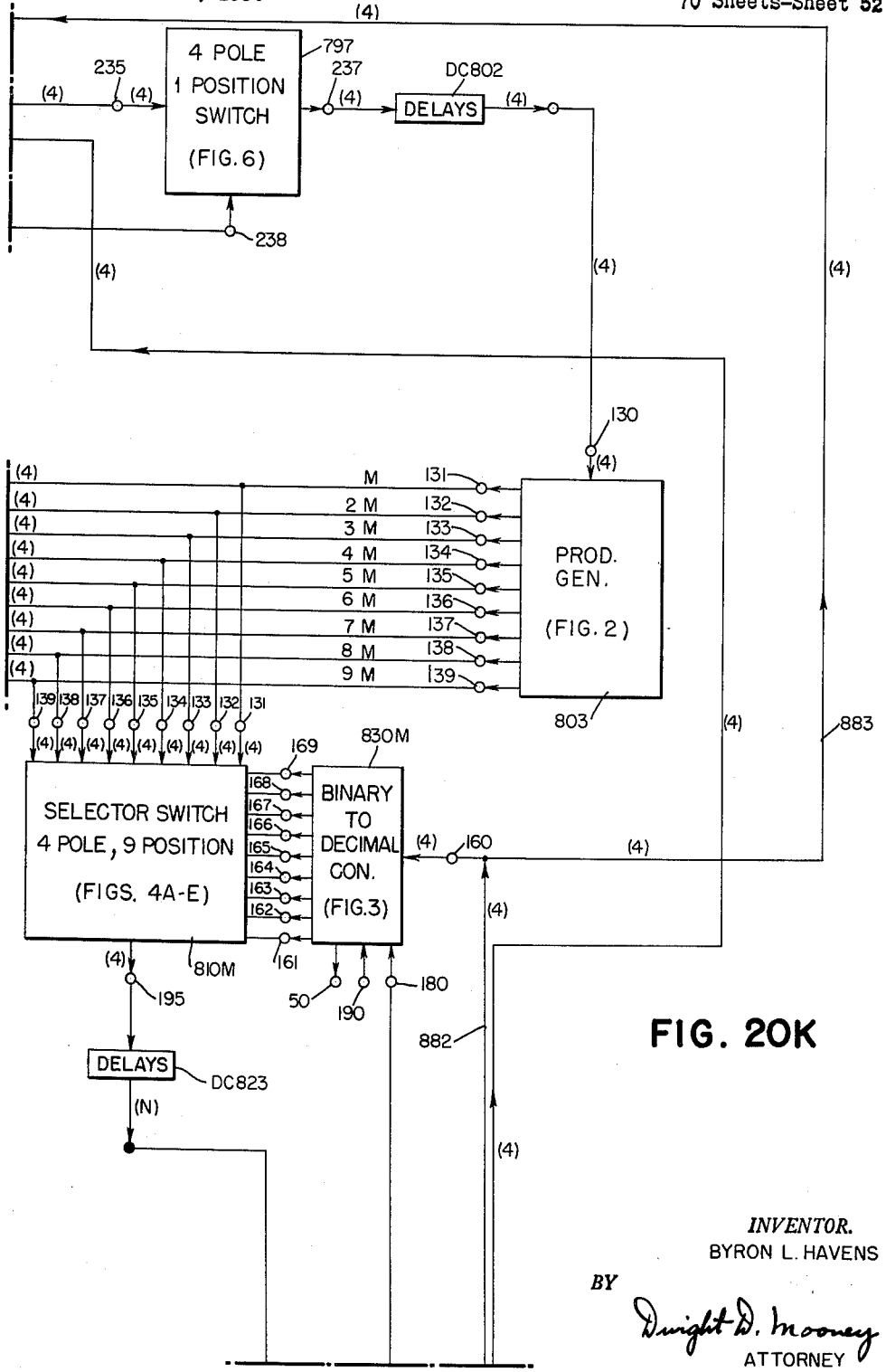
Figure 20N:
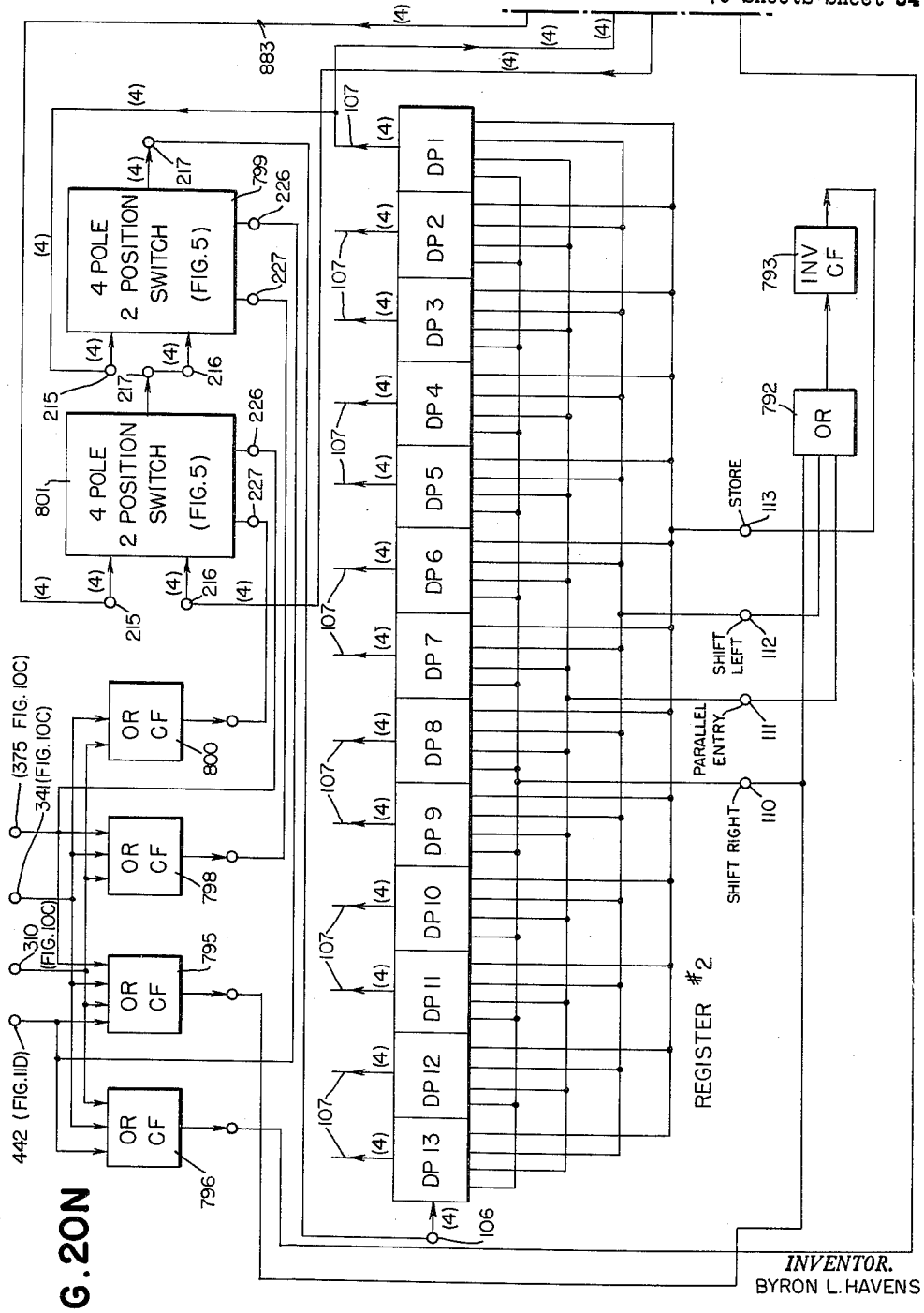

At 0 time terminal 310 (FIGS. 10C and 20N) goes UP (FIG. 10E). This terminal is connected to one input of OR circuit 795 (FIG. 20N) having its output connected to the shift right terminal 110 of register 2. Hence, at 0 time the output of OR circuit 795 goes UP and causes register 2 to shift right one digit position. Terminal 310 is also connected to one input of OR circuit 796 (FIG. 20N) having its output connected to the terminal 238 of the 4 pole-1 position switch 797 (FIG. 20K). This causes the output of OR circuit 796 and the terminal 238 of switch 797 to be UP. This conditions switch 797 as set forth in connection with the description of FIG. 6 to pass the information applied to the input terminal 235 thereof through the switch and present it at the output terminal 237 thereof. The terminal 310 is also connected as one input of OR circuit 798 (FIG. 20N) having its output connected to the input terminal 227 of the 4 pole-2 position switch 799 (FIG. 20N). The output of OR circuit 798 and the terminal 227 of switch 799 therefore go UP. When terminal 227 goes UP switch 799 is conditioned to transfer the information received at the input terminals 216 thereof to the output terminals 217. Hence, information applied to the input terminals 215 of switch 799 is not transferred through the switch. This means that the information or digits appearing at the output 107 of digit position DP1 of register 2 when register 2 is shifted to the right are not applied to the digit position DP13 thereof. The terminal 310 is also connected as one input of OR circuit 800 (FIG. 20N) having its output connected to the terminal 227 of the 4 pole-2 position switch 801 (FIG. 20N). Since the input terminal 216 of switch 801 is connected to the output terminal 102 of the binary decimal adder 801M (FIG. 20J) the information present at the output terminals 102 of adder 801M is transferred through switch 201 (FIG. 20N) and switch 799 to the input 106 of digit position DP13 of register 2.

At 1 time the terminal 310 goes DOWN (FIG. 10E) and the terminal 341 (FIG. 10E) goes UP. The terminal 341 like terminal 310 is connected as an input to each of the OR circuits 795, 796, 798 and 800 (FIG. 20N). Hence, the condition of the shift right terminal 110 of register 2 and switches 797, 799 and 801 remains unchanged. The register 2 therefore continues to shift right and present the digits of the multiplicand at the output 107 of digit position DP1 thereof during successive time intervals. The digit 1 occupying the lowest digit position appears at the output terminals 107 of DP1 of register 2 during the first time interval. The digit occupying the second digit position appears during the second time interval and so forth until the digit 4 occupying the thirteenth digit position, DP13, of register 2 occupies digit position DP1 thereof at 12 time (FIG. 21A). The terminal 341 remains UP until 19 time (FIG. 10E). The register 2 therefore continues to shift right after all digits of the multiplicand have been shifted out and until terminal 341 goes DOWN. This shift right of register 2 is represented by a vertical bar in FIG. 21B.

At 1 time the digit 1 occupying the first digit position, DP1, of register 2 appears at the output 107. This digit 1 is transferred through 4 pole-1 position switch 797 and delays DC802 to the input terminals 130 of product generator 803 (FIG. 20K). Since delays DC802 represent four delays in parallel; i.e., one for each of the four binary bits, this transfer is effected in one time interval. Hence, the digit 1 occupying the lowest digit position of the multiplicand is applied to the product generator 803 two time intervals after register 2 is caused to shift right. Hence, at 2 time the digit 2 (FIG. 21A) occupying the second digit position of the multiplicand occupies the digit position DP1 of Register 2. Also, at 3 time the digit 2 is applied to the input terminals 130 of the product generator 803. This successive shifting out of the digits of the multiplicand into the product generator is shown in FIG. 21A. Four time intervals after the first digit 1 is applied to the input terminals 130 of product generator 803 the nine multiples thereof, M through 9M, appear at the outputs 130 through 139 thereof.

Hence, at 5 time or during the sixth time interval (FIG. 21B) the nine multiples of 1 appear at the terminals 131 through 139. During the next or seventh time interval the nine multiples of 2 appear at these respective terminals. This process is continued in a manner set forth in connection with FIG. 2 until all nine multiples of the multiplicand have been produced by the product generator. This process is completed at 19 time (FIG. 21B). These nine multiples are applied to nine of the 4 pole-9 position selector switches 810M, 811, 812, 813, 814, 815, 816, 817, 818, 819, 820, 821 and 822, respectively, corresponding to the thirteen orders, or digit positions DP1 through DP13, respectively of the multiplier. The input terminals 161 through 169 of these respective selector switches are connected to the similarly designated output terminals of the binary to decimal converters 830M, 831, 832, 833, 834, 835, 836, 837, 838, 839, 840, 841 and 842, respectively. The input terminals 160 of these respective converters are connected to the outputs 107 of digit positions DP1 through DP13, respectively of register 1 (FIG. 20M). The output terminals 107 of digit position DP1 of register 1 are also connected to the terminals 215 of switch 801 (FIG. 20N). The outputs 195 of selector switches 810M, and 811 through 822 are connected respectively to the inputs of delays DC823 through DC835, respectively. The outputs of delays DC823 through DC834 are connected to the input terminals 91 of adders 810M, 841 through 851, respectively. The output of delay DC835 (FIG. 20B) is connected to the input of delay DC852 (FIG. 20A). The output of delay DC852 is connected to the input terminals 90 of adder 851 (FIG. 20A) and the output of adder 851 is connected to the input terminals 90 of adder 850 (FIG. 20A). The input terminals 216 of the 4 pole-2 position selector switches 860M, and 861 through 869 are connected to the output terminals 102 of adders 841 through 850.

When the multiplier operation in initiated the terminal 301 (FIGS. 10C, 10E and 20J) goes UP. This terminal is connected through OR circuit 870 (FIG. 20J) to the terminal 180 of binary to decimal converter 830M (FIG. 20K). Hence, when the terminal 301 goes UP the output of OR circuit 870 goes UP and causes the terminal 180 of the binary to decimal converter 830M to go UP. This renders the binary to decimal converter 830M responsive to the multiplier value present at the terminals 107 of digit position DP1 of register 1. The terminal 301 is connected directly to the terminal 180 of each of the binary to decimal converters 831 through 842. Hence, converters 831 through 842 are rendered responsive to the multiplier value appearing at the output terminals 107 of digit positions DP2 through DP13, respectively, of register 1. The terminal 301 is also connected to the terminals 227 of the 4 pole-2 position switches 860M, 861 through 869 inclusive. Hence, these terminals 227 go UP and permit the inputs present at the terminals 216 of the respective switches to be transferred therethrough and appear at the output 217 thereof connected to the input terminals 90 of adders 801M, 841 through 849. This means that switches 860M, and 861 through 869 are conditioned to effect multiplication.

The multiplier digit 9 is applied in binary decimal form from the terminals 107 of digit position DP1 of register 1 to the input terminals 160 of binary to decimal converter 830M (FIG. 20K). The digit 0 occupying the second digit position of the multiplier is applied from the terminals 107 of digit position DP2 of register 1 to the input terminals 160 of binary to decimal converter 831 (FIG. 20H). Likewise, the digit 7 occupying the third digit position of the multiplier is applied from the terminals 107 of digit position DP3 of register 1 to the terminals 160 of binary to decimal converter 832 (FIG. 20H). Hence, the binary to decimal converters 830M, 831 and 832 are caused to select the nine, zero and seven multiplies, respectively, of the multiplicand. It follows that binary to decimal converters 833 through 842 permit passage of the zero, one, seven, nine, one, eight, three, six, four, and five multiplies of the multiplicand, respectively. Hence, these selected multiples of the multiplicand pass through the related delays DC823 through DC835 and are applied to the input terminals 91 of the adders 801M, and 841 through 851. The five multiple passed through switch 822 (FIG. 20B) and delays DC835 is applied to the input of delays DC852 (FIG. 20A). The application of these multiples to the input terminals 91 of the adders and input terminals 60 of delay DC852 is illustrated in FIGS. 21C and 21D.

It is noted that delays DC823 through DC835 effect a delay of one time interval of the digits occupying each digit position of each of the selected multiples (FIG. 21B). Hence, at 6 time the digit occupying the first digit position of each partial product is applied to the input terminals 91 of the related adder and in the case of the thirteenth partial product to the input terminals 60 of delays DC852. The thirteenth partial product is transferred from the outputs 61 of delays DC852 to the input terminals 90 of adder 851 (FIG. 20A) where it is added to the twelfth partial product after being shifted one digit position to the left with respect thereto. This shift is effected by delays DC852. The sum of the twelfth and thirteenth partial products, shifted one digit position to the left with respect to the eleventh partial product, is transferred from the output of adder 851 to the input terminals 90 of adder 850 (FIG. 20A) where it is added to the eleventh partial product. The sum of the eleventh, twelfth and thirteenth partial products is transferred from the output of adder 850 to the input terminals 216 of switch 869 (FIG. 20C). This sum, shifted one digit position to the left with respect to the tenth partial product, is passed from the terminals 216 of switch 869 to the input terminals 90 of adder 849 (FIG. 20C). The output of adder 849, or the sum of the tenth, eleventh, twelfth and thirteenth partial products is added to the ninth partial product in adder 848 (FIG. 20C). The output of adder 848, or the sum of the ninth, tenth, eleventh, twelfth and thirteenth partial products, is added to the eighth partial product in adder 847 (FIG. 20C). The output of adder 847, or the sum of the eighth through thirteenth partial products, is added to the seventh partial product in adder 846 (FIG. 20E). The output of adder 846, or the sum of the seventh through thirteenth partial products, is added to the sixth partial product in adder 845 (FIG. 20E). The output of adder 845, or the sum of the sixth through thirteenth partial products, is added to the fifth partial product in adder 844 (FIG. 20E). The output of adder 844, or the sum of the fifth through thirteenth partial products, is added to the fourth partial product in adder 843 (FIG. 20G). The output of 843, or the sum of the fourth through thirteenth partial products, is added to the third partial product in adder 842. The output of adder 842, or the sum of the third through thirteenth partial products, is added to the second partial product in adder 841 (FIG. 20G). The output of adder 841, or the sum of the second through thirteenth partial products, is added to the first partial product in adder 801M (FIG. 20J). See charts of FIG. 21E, and in particular FIGS. 21C and 21D thereof.

Hence, the digits of the product beginning with the lowest digit position thereof appear serially at the output terminals 102 of adder 801M (FIGS. 20J, 20D). These output terminals are connected to the input terminals 235 of the 4 pole-1 position switch 880 (FIG. 20M) and the terminals 216 of the 4 pole-2 position switch 801 (FIG. 20N). The terminal 238 of switch 880 is DOWN because the terminal 364 (FIG. 20M, FIG. 10E) is DOWN. The terminal 227 of switch 801 (FIG. 20N), is UP because the terminal 341 (FIG. 20N, FIG. 10E) is UP. The digits of the product are therefore passed from the output of adder 801M (FIG. 20J) through the switch 801 (FIG. 20N) and switch 799 (FIG. 20N) to the input 106 of digit position DP13 of register 2 (FIG. 20N).

The digit occupying the first digit position of the product also occupies the first digit position of the first partial product. This digit is 9. This 9 appears at the input terminals 91 of adder 801M at 6 time (FIG. 21D) and at the output terminals of adder 801 at 7 time. At the same time this digit is passed through switches 801 and 799 (FIG. 20N) and appears at the inputs 106 of register 2 without delay or at 7 time. This digit appears one time interval later, or at 8 time, at the output of digit position DP13 of register 2 as shown in FIG. 21A. Each subsequent time interval this digit, 9, appears at the next lower numbered digit position of register 2. For example, it appears at the output of digit position DP12 of register 2 (FIG. 21A) at 9 time and at the output of digit position DP8 of register 2 at 13 time. Each time interval subsequent to 8 time causes the next digit of the product to be applied to the terminals 106 of digit position DP13 of register 2 as indicated in FIG. 21A. This shifting of the product to the right is indicated by an oblique line in FIG. 21A. Hence, at 19 time the twelve digits occupying the twelve lower digit positions of the product are present at the outputs of digit positions DP2 through DP13 of register 2.

At 19 time (FIG. 20E) the terminal 341 (FIG. 20N) goes DOWN. This causes the shift right terminal 110 (FIG. 20N) of register 2 to go DOWN and the shift right of register 2 ceases. The twelve lower order digits of the product are therefore stored in the digit positions DP2 through DP13 of register 2. The terminals 227 of switches 801 and 799 (FIG. 20N) go DOWN, and the terminal 238 of switch 797 (FIG. 20K) goes DOWN. Switches 801, 799 and 797 are therefore inoperative.

Also, at 19 time (FIG. 10E) the terminal 364 (FIG. 20M) goes UP. When terminal 364 goes UP the input of OR circuit 881 (FIG. 20M) goes UP. The output of OR circuit 881 connected to the shift right terminal 110 of register 1 goes UP. This causes register 1 to shift right and it will continue to do so until terminal 364 goes DOWN. The output of OR circuit 881 is also connected as one input to OR circuit 790 (FIG. 20M) having its output connected as the input to inverter 791 (FIG. 20M). The output of inverter 791 is connected to the store terminal 113 of register 1. Hence, when terminal 364 goes UP the output of OR circuit 881 goes UP, the output of OR circuit 790 goes UP, the output of inverter 791 goes DOWN and store terminal 113 connected thereto goes DOWN. The shift right of register 1 is indicated by a vertical bar in FIG. 21D. The terminal 364 is also connected to the terminal 238 of switch 880 (FIG. 20M). Hence, at 19 time the terminal 238 goes UP and permits the 4 pole-1 position switch 880 to become operative. The inputs 235 of switch 880 are connected to the outputs of adder 801M (FIG. 20J). Hence, the digit occupying the thirteenth digit position of the product is applied to the inputs 235 of switch 880 (FIG. 20M) and transferred therethrough to the inputs 106 of digit position DP13 of register 1. At 19 time therefore the digit 7 occupying the thirteenth digit position of the product is applied to the inputs 106 of digit position DP13 of register 1. Hence, at 20 time the digit 7 is present at the output of digit position DP13 of register 1 as indicated in FIG. 21B. The oblique line in FIG. 21B indicates the shift right of the digits of the product into register 1. If only twenty-five digits are present in the product the multiplying operation is completed at 33 time.

At 32 time the digits occupying the digit positions DP12 through DP25 of the product are respectively stored in digit positions DP1 through DP13 of register 1 (FIG. 21B). At 31 time the digit 2 occupying the twenty-sixth digit position of the product is present at the input terminals 90 of adder 841 (FIG. 21D). One time interval later or at 32 time this digit is present at the output terminals 102P (FIG. 20G) connected to the output terminals 102 of adder 841. These terminals 102P are connected to the inputs of OR circuit 370 (FIG. 10C) to cause the terminal 364 thereof to remain UP at 32 time because a twenty-six digit is present in the product. This also causes terminals 373, 375, 300 and 301 (FIGS. 10C and 10F) and the output of delay DC350 (FIGS. 10B and 10F) to be UP during a succeeding time interval.

The fact that terminal 364 (FIG. 20M) remains UP until 33 time (FIG. 10F) causes register 1 to shift right an additional step. This means that the digit 7 stored in digit position 1 of register 1 during 32 time will appear at the terminals 107 of digit position DP1 of register 1. This digit 7 is transferred by leads 882 and 883 to the input terminals 215 of switch 801 (FIG. 20N).

At 32 time the terminal 375 (FIG. 10F) goes UP. This terminal 375 (FIG. 20N) is connected to the terminal 226 of switch 801 (FIG. 20N). Hence, terminal 226 of switch 801 goes UP at 32 time. This permits the digit 7 present at the terminals 215 of switch 801 to pass therethrough and be applied to the terminals 216 of switch 799 (FIG. 20N). The terminal 375 is also connected through OR circuit 798 (FIG. 20N) to the terminal 226 of switch 799. Hence, when terminal 375 goes UP at 32 time terminal 226 of switch 799 goes UP. This permits the digit 7 present at the input terminals 216 of switch 799 to be transferred therethrough and be applied to the terminals 106 of digit position DP13 of register 2. The terminal 375 is connected through OR circuit 795 (FIG. 20N) to the shift right terminal 110 (FIG. 20N) of register 2. Hence, when terminal 375 goes UP at 32 time the shift right terminal 110 of register 2 goes UP and causes register 2 to shift right. This means that the digit 7 applied to the input terminals 106 of digit position DP13 of register 2 is stored therein and that each digit of the product previously stored (see FIG. 21A) in digit positions DP2 through DP13 of register 2 is shifted one digit position to the right.

The twenty-sixth digit of the product appears at the output terminals 102 of adder 801M (FIG. 20J) at 32 time (FIG. 21D). This digit is transferred through switch 880 and stored in digit position DP13 of register 1 at 33 time (FIG. 21B), the digits occupying the twelve next higher digit positions of the product being each shifted one digit position to the right. It is now clear that the sensing of the twenty-sixth digit of the product prior to its arrival or storage was used to effect a shifting of the digit 7 occupying the thirteenth digit position of the product from digit position DP1 of register 1 into storage in digit position DP13 of register 2 to permit storage of the twenty-sixth digit of the product in the digit position DP13 of register 1. At 33 time the digits occupying the thirteen highest digit positions of the product, 2719092983517 (FIG. 21B), are stored in register 1 and the digits occupying the thirteen lowest digit positions of the product, 7511667911589 (FIG. 21A), are stored in register 2. Hence, the product from the highest digit position to the lowest is obtained from reading the value stored in register 1 from left to right and then reading the value stored in register 2 from left to right.

The terminal 364 (FIG. 10F) goes DOWN at 33 time and stops register 1 from shifting to the right and thereby effects storage of the digits occupying the thirteen highest digits of the product. Also, at 33 time (FIG. 10F) the terminal 375 goes DOWN and stops register 2 from shifting to the right and thereby permits it to effect storage of the digits occupying the thirteen lowest digit positions of the product. At 34 time (FIG. 10F) the terminal 373 (FIG. 21D) goes DOWN and causes the multiply control terminal 300 and terminal 301 (FIG. 20J) to go DOWN. This returns the circuits illustrated in FIG. 20P to their initial condition and maintains storage of the product. At 35 time the output of delay DC350 (FIG. 10B) goes DOWN and returns the multiply control circuit illustrated in FIG. 10D to its starting condition. It is apparent from the above and from an inspection of FIG. 21D that registers 1 and 2 shift right simultaneously only during 32 time. These shift rights are required to effect proper storage of the twenty-sixth digit of the product. Simultaneous shift rights are effected only for this purpose.

If the product does not contain a twenty-sixth digit the terminals 102P (FIG. 20J) are DOWN at 32 time and the OR circuit 370 (FIG. 10C) is not energized. Hence, the operation illustrated diagrammatically in FIG. 10F does not take place and subsequent operation is as illustrated in FIG. 10E. Terminal 364 (FIG. 10E) goes DOWN at 32 time. The terminal 375 (FIG. 10E) remains DOWN and the last shift right of register 2 effected when a twenty-six digit product is present is not effected. Hence, there is no transfer of a product digit from storage in register 1 to storage in register 2. The terminal 373 initially goes UP at 32 time and causes the multiply terminal 300 (FIG. 10B) and terminal 301 (FIG. 20J) to go DOWN at 33 time. The output of delay DC336 (FIG. 10A) goes DOWN at 33 time (FIG. 10E). This causes the output of delay DC350 (FIG. 10B) to go DOWN at 34 time (FIG. 10E). The fact that lead 356 went DOWN at 32 time (FIG. 10E) causes the terminal 373 (FIG. 10C) to go DOWN at 34 time. The multiplier circuit illustrated in FIG. 20P and the multiply control circuit illustrated in FIG. 10D are now returned to their initial condition and the proper product having a twenty-sixth digit of 0 is stored in registers 1 and 2. The thirteen highest order digits are stored in register 1 and the twelve lowest order digits are stored in digit positions DP2 through DP13 of register 2.

DIVISION

One method of effecting division by machine operation involves the over and over subtraction of the divisor from the dividend. When the divisor can no longer be subtracted from the dividend; i.e., when a partial dividend changes sign or becomes negative, it can no longer be subtracted. When a partial dividend does become negative it indicates that the subtraction operation has been carried one step too far. Correction of this exclusive subtraction is required in order to obtain the proper quotient.

One method of performing division by over and over subtraction involves the use of certain multiples of the divisor, for example, the tens, hundreds and thousands multiples. The quotient is obtained by subtracting the largest multiple which will not cause a change in the sign of the resulting partial dividend. Again, over subtraction is effected and correction is required to obtain the proper quotient digits. This correction involves additional machine operation and therefore requires additional time.

The usual method of manually performing division is illustrated in FIG. 22A whereby the divisor (DS) 523 is divided into the dividend (DD) 80542 to obtain the quotient (Quo). Initially, the largest multiple of the divisor which is equal to or less than the least number of digits from the highest order to the lowest of the dividend 523, which dividend digits comprise a number equal to or greater than the divisor, determines the first quotient digit. The largest multiple of the divisor 523 which is equal to or less than the three higher order digits 805 of the dividend is 1. Hence, the first quotient digit is 1. This determines the first partial dividend 2824. The five multiple of the divisor is the greatest multiple thereof which is equal to or less than the first partial dividend. Hence, the second quotient digit is 5. This determines the second partial dividend 2092. 2092 is the four multiple of the divisor. The third quotient digit is therefore 4. The fourth multiple of the divisor is then subtracted from the second partial dividend to provide the third partial dividend which is zero.

In obtaining the partial dividends shown in FIG. 22A a certain predetermined multiple of the divisor was subtracted from the dividend or from a partial dividend. These numbers are all in true form as distinguished from complement form. The difference between two numbers may be obtained by subtraction of one true number from the other. For example, in obtaining the first partial dividend in FIG. 22A, 523 was subtracted from 805 to provide the difference of 282. This difference is of positive sign since the smaller number was subtracted from the larger.

Subtraction of two numbers may also be performed by the addition of one number in true form to the other number in complement form. To obtain the 9's complement of a digit the true digit is subtracted from 9 and the difference obtained represents the true digit in 9's complement form. For example, 7 in 9's complement form is written as 2. The 9's complement of 805 is 9194. The 9 occupying the fourth digit position indicates that the true number 805 is of positive sign. If 523 is to be subtracted from 805 by complementary addition, 9194 representing 805 in 9's complement form is added to 523 to obtain 9717, the sum in 9's complement form. To convert the sum to true form 9717 is subtracted from 9999 to provide the difference 282 which corresponds to the difference obtained by the subtraction of the true number 523 from the true number 805. If the subtrahend is larger than the minuend the digit 9 will not occupy the highest digit position of the sum of the complementary addition. For example, suppose 1046 (subtrahend) is to be subtracted from 805 (minuend), 805 is written in 9's complement form and added to 1046. 805 is written in 9's complement form as 9194 and added to 1046 to provide the 9's complement sum of 10240. The 9 occupying the fourth digit position in 9194 and indicating that the true number is positive was added to the 1 of 1046 to provide 10. A 0 is present in the fourth digit position of the 9's complement sum and a 1 is present in the fifth digit position. This 1 is a carry from the fourth to the fifth digit positions. The fourth digit position is indicative of the sign. A 9 indicates that the sign of the difference is positive and the absence of a 9 indicates that the 9's complement sum is negative and that it is in true form. Hence, the difference in true form is 240 plus the 1 carry or 241.

It is seen from the above that if complementary addition is employed to obtain a partial dividend that the digit 9 should always occupy the digit representing position of the partial dividend obtained. In other words, the partial dividend must remain positive if the corresponding quotient digit is correct. Hence, if a carry is provided when a partial dividend is obtained the multiple of the divisor added to the dividend or partial dividend to obtain the particular partial dividend is too large.

FIG. 22B shows the solution of the problem of FIG. 22A when 9's complement addition is employed in the place of subtraction. In FIG. 22A each partial dividend is shifted one digit position to the left with respect to the dividend or previous partial dividend. For example, the second partial dividend 2092 (997907 in 9's complement form) is shifted one digit position to the left with respect to the first partial dividend 2824 (997907 in 9's complement form) and the first partial dividend is shifted one digit position to the left with respect to the dividend. In FIG. 22B the dividend 80542 is written in 9's complement form as 919457. The one multiple of the divisor 523 is added to the 9's complement of the dividend to provide the first partial dividend 971757. The digit 9 occupying the extreme left digit position of the first partial dividend indicates that the partial dividend is positive.

This partial dividend is shifted one digit position to the left with respect to the dividend as indicated by the rewriting of the first partial dividend. The five multiple 2615 of the divisor 523 is now added to the 9's complement 971757 of the first partial dividend. The second partial dividend 997907 is obtained by this addition of the five multiple of the divisor and the 9's complement of the first partial dividend. The second partial dividend is now shifted one digit position to the left with respect to the first partial dividend as indicated by the rewriting in FIG. 22B of the second partial dividend. The four multiple, 2092, of the divisor 523 is now added to the 9's complement of the second partial product to provide the third partial dividend 999999 which in true form is 000000. The quotient 154 is indicated by use of the one, five and four multiples of the divisor to derive the first, second and third partial dividends, respectively.

A machine operation which will perform division as illustrated in FIG. 22B will provide substantial saving in machine operation and time as compared to over and over subtraction or over and over complement addition methods. Also, the trial and error determination of multiples of the divisor is eliminated.

The divider of the invention performs simultaneous additions of the multiples one through nine of the divisor and the 9's complement of the dividend. The results of the addition are used to determine the correct quotient digit and provide the correct partial dividend in 9's complement form. The multiples one through nine of the divisor are then added to the 9's complement of the first partial dividend to determine the second quotient digit and the second partial dividend. This process is repeated until the division problem is solved.

Briefly, two universal registers, as shown in FIG. 1S, and designated as register 1 and register 2 respectively, are utilized by the divider of the invention to accommodate the dividend and divisor, respectively.

The dividend is transferred from register 1 to a 9's complement generator which provides the 9's complement thereof, serially by decimal digit beginning with the digit occupying the first digit position. The dividend, in 9's complement form is transferred through a first adder to a delay circuit arrangement which effects a predetermined delay and is part of the circuit termed the "dividend loop" herein.

The divisor is transferred serially by decimal digit beginning with the digit occupying the first digit position from register 2 to a product generator which provides the multiples one through nine of the divisor. These multiples are provided simultaneously and each is added simultaneously to the 9's complement of the dividend. The highest multiple of the divisor which when added to the 9's complement of the dividend does not produce a carry to the next higher digit position, represents the proper quotient digit.

The examination or inspection for presence and absence of carries is effected by a quotient generator which provides the proper quotient digit in binary decimal form. This quotient digit is stored in digit position DP1 of register 1 as this register shifts left. This quotient digit is applied from digit position DP1 of register 1 to a binary to decimal converter. This converter is connected to a selector switch and permits passage of the multiple of the divisor through the selector switch which multiple corresponds to the quotient digit already determined. The output of this selector switch is applied to the first adder where it is added to the 9's complement of the dividend to provide the first partial dividend in 9's complement form.

The 9's complement of the first partial dividend is added to each of the nine multiples one through nine of the divisor and the next quotient digit is obtained by the quotient generator. This quotient digit is stored in digit position DP1 of register 1 and the first quotient digit obtained is stored in digit position DP2 thereof. This storage is effected by a shift left of register 1.

The second quotient digit is also applied to the binary to decimal converter and permits passage of the proper multiple of the divisor through the selector switch to the first adder. The first adder adds this multiple of the divisor to the 9's complement of the first partial dividend to obtain the 9's complement of the second partial dividend.

The above process is continued until the desired number of quotient digits is obtained. These quotient digits are stored in register 1.

The operation of the divider will be described briefly with reference to the diagram illustrated by FIG. 20P. Initially, the divisor is entered into register 2 (FIG. 20N) which is advanced until a non-zero digit occupies digit position DP13 of register 2. Hence, if the divisor is 523, the 5 occupies DP13, the 2 occupies DP12 and the 3 occupies DP11 of register 2. The remaining digit positions DP10 through DP1, of the register exhibit a 0. Register 2 is caused to shift right and the digits of the divisor appear serially by decimal digit beginning with the digit 3 occupying the first digit position of the divisor. This divisor is therefore transferred from the output terminals 107 of digit position DP1 of register 2 to the input terminals 215 of the 4-pole-2 position switch 799 (FIG. 20N). The terminal 226 of switch 799 is UP to permit the transfer of the divisor into the register via terminals 106 of digit position DP13. Hence, the divisor is continuously stored in register 2 to permit use in the subsequent operation of the divisor. Terminal 238 of switch 797 (FIG. 20K) is UP. This permits the divisor appearing serially at the output terminals 107 of digit position DP1 of Register 2 to be transferred through the switch 797 and the delays DC802 (FIG. 20K) to the input terminals 130 of product generator 803 (FIG. 20K). The product generator produces the nine multiples, 1 through 9, designated respectively as M through 9M simultaneously at the outputs 131 through 139. The operation of the product generator is fully described hereinbefore in connection with FIG. 2.

The dividend is initially entered into register 1 (FIG. 20M) and the register effects a shift left until a non-zero digit occupies digit position DP13 of the register. Hence, if the dividend is 80542 the 8 occupies DP13, the 0 occupies DP12, the 5 occupies DP11, the 4 occupies DP10 and the 2 occupies DP9. The digit positions DP8 through DP1 each effect storage of a zero. Register 1 is caused to shift right in synchronism with the shift right of register 2 to provide the dividend serially by decimal digit beginning with the digit 2 at the output terminals 107 of digit position DP1 of register 1. These terminals 107 are connected to the input terminals 160 of binary to decimal converter 830M (FIG. 20K) and the input terminals 290 of the 9's complement generator (FIG. 20J). At this time the terminal 180 of binary to decimal converter 830M is DOWN. Hence, this converter is inoperative.

The 9's complement generator 885 provides the 9's complement of 919457 of the dividend 80542 as described hereinbefore in connection with FIG. 9. This 9's complement of the dividend is applied to the input terminals 216 of the 4 pole-2 position switch 886 (FIG. 20J). The terminal 227 of switch 886 is UP at this time. The 9's complement of the dividend is therefore transferred from the output terminals 217 of switch 886 through delays DC887 (FIG. 20J) to the input terminals 215 of the 4 pole-2 position switch 860M. The terminal 226 of switch 860M is UP. The 9's complement of the dividend is therefore transferred through the switch 860M to the input terminals 90 of adder 801M (FIG. 20J). No input is applied to the input terminals 91 of adder 801M because selector switch 810M (FIG. 20K) is inoperative because of the terminal 180 of binary to demical converter 830M (FIG. 20K) being DOWN. The 9's complement of the dividend therefore appears at the output terminals 102 of adder 801M.

This output is transferred to the input of the fifteen time interval delay 888 (FIG. 20J). This delay includes fifteen delay circuits in series for each input or bit and therefore includes a total of sixty delays. The output of the fifteen time interval delay 888 is connected to the input terminals 215 of switch 886 (FIG. 20J). When the 9's complement of the dividend arrives at the terminal 215 of switch 886 the terminal 226 thereof is UP. This permits the 9's complement of the dividend to pass through switch 886, delays DC887, switch 860M, adder 801M and back through the same circuit. This circuit including adder 801M, fifteen time interval delays 888, switch 886, delays DC887 and switch 860M is termed the "dividend loop." It is through this circuit that the dividend is circulated or stored and from which it is transferred for use. The dividend loop is also used to store the 9's complement of the partial dividends.

When the 9's complement of the dividend appears at the output terminals 102 of adder 801M it is transferred over lead 889 to the input terminals 215 of the 4 pole-2 position switches 861 through 869. When the dividend is so transferred the terminal 226 of each of these switches, 861 through 869, inclusive is UP. This permits the 9's complement of the dividend to pass through each switch to the input terminals 90 of adders 841 through 849.

The terminal 50 of binary to decimal converter 831 (FIG. 20H) is connected to the input terminal 161 of the 4 pole-9 position selector switch 811 (FIG. 20H). This causes the input terminal 161 of selector switch 811 to be UP. In accordance with the description of this selector switch undertaken in connection with FIGS. 4A, 4B, 4C, 4D and 4E, respectively, hereinbefore, the selector switch permits the one multiple of the divisor to pass therethrough. Hence, the multiple, M, transferred from the output 131 of the product generator 803 (FIG. 20K) appears at the output terminals 195 of selector switch 811. Similarly, the terminal 50 of binary to decimal converters 832 through 839 are connected to the input terminals 162, 163, 164, 166, 167, 168 and 169, respectively, of the selector switches 812 through 819. The multiples 2M through 9M are therefore transferred through the respective selector switches 812 through 819 and appear at the output terminals 195 of the respective selector switches. These multiples M through 9M are transferred through respective delays DC824 through DC832, to the input terminals 91 of adders 841 through 849, respectively. These multiples arrive at the input terminals 91 of the adders simultaneously with the arrival of the 9's complement of the dividend at the input terminals 90 of each of the adders 841 through 849. This means that the 9's complement of the dividend is added to each multiple M through 9M, respectively, of the divisor. The sum of each of these multiples and the 9's complement of the dividend is applied to the input terminals 216 of the related 4 pole-2 position switches 860M, and 861 through 869. However, the terminal 226 of each of these switches is UP. This means that there can be no transfer through the switch of the information present at the input terminals 216 thereof. Hence, these sums are lost.

The quotient digit is determined by examining the carry terminal 61C of the adders 841 through 849. The examination of the carry terminals is made by quotient generator 890 (FIG. 20E). The output, 261 through 269, corresponding to the correct decimal digit of the quotient goes UP. These terminals are connected to the inputs, 241 through 249, respectively of the decimal to binary converter 891 (FIG. 20E). The correct quotient digit therefore appears in the binary decimal form at the output terminals 257 of the decimal to binary converter 891 FIG. 20E. These terminals are connected to the input terminals 106 of digit position DP1 of register 1 (FIG. 20M) and the quotient digit is stored in digit position DP1 of register 1 as that register shifts left.

This quotient digit appears at the output terminals 107 of digit position DP1 of register 1 and is applied over lead 882 to the input terminals 160 of binary to decimal converter 830M (FIG. 20K). This causes the selector switch 810M to permit passage of the multiple of the divisor corresponding to the quotient digit. Since the digit occupying the highest digit position of the quotient in this example is 1, the selector switch 810M will permit transfer of the one multiple, M, therethrough. This multiple is transferred from the output terminals 195 of selector switch 810M through delays DC823 to the input terminals 91 of adder 801M (FIG. 20J). This multiple arrives at the terminals 91 of adder 801M simultaneously with the arrival of the 9's complement of the dividend at the input terminals 90 thereof. The adder 801M effects this addition to produce the first partial dividend as illustrated in FIG. 22B. This partial dividend is then circulated through the dividend loop and applied to the terminals 90 of adders 841 through 849 to determine the next quotient digit. The next quotient digit is stored in digit position DP1 of register 1 (FIG. 20M) as the first quotient digit is shifted to the left to occupy digit position DP2. The quotient digit then controls the binary to decimal converter 830M (FIG. 20K) to permit passage through the selector switch 810M of the multiple of the divisor corresponding to this quotient digit.

This multiple of the divisor and the 9's complement of the first partial dividend are added in adder 801M (FIG. 20J) to determine the 9's complement of the second partial dividend.

It is noted that the dividend loop provides a total delay of seventeen time intervals (FIG. 20J). Fifteen time intervals of delay are caused by fifteen time interval delays 888, one time interval delay is caused by delays DC887 and one time interval delay is caused by the delays associated with adder 801M. The basic cycle of the dividing operation is determined by the control circuits illustrated in FIG. 11E. This basic cycle is sixteen time intervals. Hence, the arrival of the dividend and partial dividends at the adder 801M is delayed one time interval with respect to the arrival of the multiples of the divisor at the input terminals 90 of adder 801M. This means that the 9's complement of the dividend is delayed one time interval or shifted left one digit position.

The above process is used to determine the next quotient digit which in turn is used to select the proper multiple of the divisor and determine the 9's complement of the third partial dividend. This process is repeated until the first quotient digit determined is stored in digit position DP13 of register 1 and the problem is solved. Hence, in the example the quotient 154 will be stored in digit positions DP13 through DP11, respectively. A zero will be present in each of the digit positions, DP10 through DP1.

Table VI below illustrates the addition of the nine multiples, M through 9M, of the divisor 523 to the 9's complement 971757 of the first partial dividend 2824 to determine the second quotient digit.

*Table VI*

| | | |
|---|---|---|
| 1st partial dividend (9's complement) | 9 7 1 7 5 7 | |
| M | 5 2 3 | |
| Sum (Adder 841) | 9 7 6 9 8 7 | no carry |
| 1st partial dividend (9's complement) | 9 7 1 7 5 7 | |
| 2M | 1 0 4 6 | |
| Sum (Adder 842) | 9 8 2 2 1 7 | no carry |
| 1st partial dividend (9's complement) | 9 7 1 7 5 7 | |
| 3M | 1 5 6 9 | |
| Sum (Adder 843) | 9 8 7 4 4 7 | no carry |
| 1st partial dividend (9's complement) | 9 7 1 7 5 7 | |
| 4M | 1 5 6 9 | |
| Sum (Adder 844) | 9 8 7 4 4 7 | no carry |
| 1st partial dividend (9's complement) | 9 7 1 7 5 7 | |
| 5M | 2 6 1 5 | |
| Sum (Adder 845) | 9 9 7 9 0 7 | no carry |
| 1st partial dividend (9's complement) | 9 7 1 7 5 7 | |
| 6M | 3 1 3 8 | |
| Sum (Adder 846) | 1 0 0 3 1 3 7 | carry |
| 1st partial dividend (9's complement) | 9 7 1 7 5 7 | |
| 7M | 3 6 6 1 | |
| Sum (Adder 847) | 1 0 0 8 3 6 7 | carry |
| 1st partial dividend (9's complement) | 9 7 1 7 5 7 | |
| 8M | 4 1 8 4 | |
| Sum (Adder 848) | 1 0 1 3 5 9 7 | carry |
| 1st partial dividend (9's complement) | 9 7 1 7 5 7 | |
| 9M | 4 7 0 7 | |
| Sum (Adder 849) | 1 0 1 8 8 2 7 | carry |

In each of the adders 841 through 849 the 9's complement 971757 of the first partial dividend is added to the corresponding one of the multiples, M through 9M, of the divisor. Each sum from the addition of the multiples, M through 5M, is a positive value as indicated by the digit 9 in the extreme left position thereof. Each addition of the multiples, 6M through 9M, provides a negative value as indicated by the absence of a 9 in the left digit position of the sums. The correct multiple is the highest multiple of the divisor contained in the partial dividend. It is seen from Table VI that this highest multiple is the five multiple, or 5M. Since the digit 9 occupies the left digit position of the sums derived from the addition of the multiples, M through 5M, no carry is provided by adders 841 through 845. Since a 10 occupies the two left digit positions of the sums derived from the addition a carry is provided by each of the adders 846 through 849. The carry terminal 61C of each of the adders 841 through 845 is therefore DOWN and the carry terminal 61C of each of the adders 846 through 849 is therefore UP. These carry terminals 61C are connected to the input terminals 260–1 through 260–9 of the quotient generator 890 (FIG. 20E). In accordance with the description hereinbefore of FIG. 8 the output terminal 265 of quotient generator 890 is caused to go UP. This terminal represents the highest multiple (5) of the divisor, which, when added to the 9's complement of the first partial dividend, will produce no carry. The second quotient digit is therefore 5. The same process of addition of the multiples of the divisor to the 9's complement of the dividend, examination of the carries produced and conversion to a decimal value was accomplished to determine the first quotient digit. The third quotient digit is obtained by adding these nine multiples of the divisor to the 9's complement of the second partial dividend, examining the carries and converting the information indicated therefrom to the decimal value representing the third quotient digit or 4. The division of the divisor 523 into the dividend 80542 to obtain the quotient 154 is now complete. The quotient 154 is caused to shift left in register 1 as stated above until it occupies digit positions DP13 through DP11 thereof. This is because the divider provides for a quotient of thirteen digits.

In the embodiment of the divider illustrated by FIG. 20P the location of the decimal point is for determination of the operator.

DIVISION PROBLEM

The divisor 523 is divided into the dividend 80542 to provide the product 154 in order to illustrate the detailed operation of the embodiment of the divider circuit illustrated by FIG. 20P. During the solution of this problem the divider circuit is controlled by the division control circuit illustrated in FIG. 11E which provides the waveforms illustrated by FIG. 11H. The flow of digits through the divider circuit and certain potentials are illustrated in FIGS. 23A, 23B, 23C, 23D, 23E, 23F, 23G, 23H, 23J, and 23K, arranged as shown in FIG. 23M to provide a flow chart illustrating the flow of the decimal digits through the divider circuit when the above problem is solved. Description of the division operation is undertaken in connection with the particular figures illustrated in FIGS. 11E, 11H, 20P and 23M.

When FIGS. 23A–23K are arranged as shown in FIG. 23M, the left column designates time intervals within a sixteen time interval repetitive cycle. The next column illustrates the total number of time intervals elapsed, 0 through 330. The next thirteen columns show the decimal digit present at the output of the digit positions DP1 through DP13 of register 2. The next nine columns illustrate the multiples, M through 9M, of the divisor (DS) as they are present at the output terminals, 131 through 139 (FIG. 20K) of the product generator 803. The next thirteen columns represent the decimal digits present at the output of each of the digit positions DP1 through DP13 of register 1. The next column represents the digits present at the output of the 9's complement generator 885 (FIG. 20J) which provides the 9's complement of the dividend. The next column indicates the position of the selector switch 810M (FIG. 20K). For example, the selector switch is referred to as being in position 1 when it permits the one multiple of the divisor to be transferred therethrough. The next column illustrates the input to the terminals 90 of adder 801M (FIG. 20J) and the next column indicates the input to the terminals 91 of adder 801M. The next column shows the output at terminals 102 of adder 801M. The next column illustrates the useful output of the quotient generator 890 (FIG. 20E). The next fifteen columns show the progress of the decimal digits through delays 888 which comprises fifteen delays in series for each of the 1, 2, 4 and 8 bits or a total of sixty delays. The next column shows the output of delays DC887 (FIG. 20J). The remaining columns show the more important control potentials illustrated in FIGS. 11F and 11G.

In the flow chart illustrated in FIG. 23M numerous 0's and 9's occur due to non-operation of circuits or due to normal circuit operation. Also, numerous 0's and 9's occur in response to circuit operation to solve this particular problem. In order to focus attention on the solution of the problem only the 0's and 9's (as a rule) necessary to such solution are shown.

At 0 time the terminal 113 of register 1 and the terminal 113 of register 2 are UP. The divisor 523 is stored in register 2 and the dividend 80542 is stored in register 1. The digit 5 of the divisor and the digit 8 of the dividend occupy digit position DP13 of the respective registers. Hence, both the divisor and the dividend are converted to thirteen digit numbers. A thirteen digit divisor is divided into the thirteen digit dividend to produce a thirteen digit quotient. Placement of the decimal point does not constitute part of this invention and is assumed herein to be within the control of the operator. The divisor continues to be stored in register 2 and the dividend stored in register 1 until 1 time.

At 1 time the terminal 462 (FIGS. 11D, 20J, 23F) is UP. Terminal 462 is connected to the terminal 226 of the 4 pole-2 position switches 861 through 869 (FIGS. 20G, 20E, 20C). This causes the input terminals 215 of the switches to be effectively connected to the output terminals 217 thereof. Hence, the input applied to the terminals 215 is transferred through the switches.

Also, at 1 time the terminal 439 (FIGS. 11D, 20J) is UP (FIG. 11F). Terminal 439 is connected to the terminal 227 of switch 886 (FIG. 20J). This means that the output from the 9's complement generator 885 (FIG. 20J) applied to the input terminals 216 of switch 886 will be transferred therethrough until the terminal 227 of switch 886 goes DOWN. This terminal goes DOWN at 22 time (FIG. 23F) or 6 time of cycle 2 (FIG. 11F). At 1 time terminal 442 (FIGS. 11D, 20N) goes UP (FIG. 23F). This terminal is connected to the terminal 226 of 4 pole-2 position switch 799 (FIG. 20N). This means that the output of digit position DP1 of register 2 applied to the input terminals 215 of switch 799 will be transferred therethrough and applied to the input terminals 106 of digit position DP13 of register 2. The terminal 442 is also connected to the shift right terminal 110 of register 2 (FIG. 20N). This causes register 2 to shift right once during each time interval until terminal 442 goes DOWN. The terminal 442 is also connected to OR circuit 796 (FIG. 20N). Hence, at 1 time the output of OR circuit 796 goes UP. This output is connected to the terminal 238 of the 4 pole-1 position switch 797 (FIG. 20K). This means that the output from digit position DP1 of register 2 connected to the input terminals 235 of switch 797 will be transferred therethrough and appear at the output terminals 237 of switch 797.

At 1 time when register 1 is caused to shift right the 0 stored in digit position DP1 is present at its output terminals and is transferred through the switch 797 (FIG. 20K) and delays DC802 (FIG. 20K) to the input terminals 130 of the product generator 803 (FIG. 20K). This 0 therefore arrives at the input terminals 130 of the product generator at 2 time. Hence, four time intervals thereafter the first digit of each of the nine multiples is present at the outputs 130 through 139 of the product generator. Hence, at 6 time (FIG. 23A) the 0 occupying the lowest digit position of each of the nine multiples is present at the outputs 131 through 139.

Register 2 continues to shift right until all thirteen digits of the divisor are shifted out. As a result the multiples M through 9M (FIGS. 23A, 23B) of the divisor are provided at the outputs 131 through 139, respectively, of the product generator. At 14 time the 5 which occupied digit position DP13 of register 2 is shifted out and appears at the output of DP1 at 15 time. All of these digits of the divisor are transferred serially by decimal digit through switch 797 (FIG. 20K) and delays DC802 (FIG. 20K) to the product generator 803 and through 4 pole-2 position switch 799 to the input terminals 106 of digit position DP13 of register 2. Hence, each time a digit is shifted out of digit position DP1 of register 2 it is transferred to the product generator and back into digit position DP13 of register 2. At 14 time the thirteen digit divisor is stored in register 2 and the terminal 442 (FIGS. 23F, 20N) goes DOWN. The shift right of register 2 therefore ceases and the divisor is stored in the register. Terminal 226 of switch 799 (FIG. 20N) goes DOWN and the terminal 238 of switch 797 (FIG. 20K) goes DOWN.

At 5 time the terminal 452 (FIG. 11F, FIG. 20M, FIG. 23F) goes UP. This causes the output of OR circuit 881 (FIG. 20M) to go UP. The terminal 110 of register 1 therefore goes UP and register 1 begins to shift right. The terminal 462 (FIGS. 11F, 23F, 20J) goes DOWN at 5 time. This causes the terminals 226 of the 4 pole-2 position switches 861 through 869 to go DOWN. The terminal 462 goes UP at 6 time and causes these terminals to go UP.

The 0 occupying the digit position DP1 of register 1 is at the output terminals 107 thereof when the shift right terminal 110 of register 1 goes UP at 5 time. This 0 is applied to the input terminals 160 of binary to decimal converter 830M (FIG. 20K) but has no effect thereon since the terminal 180 thereof is DOWN. This 0 is also applied to the input terminals 215 of the 4 pole-2 position switch 801 (FIG. 20N) but is not transferred therethrough since the terminal 226 of switch 801 is DOWN. The 0 applied to the input terminals 290 of the 9's complement generator 885 (FIG. 20J) is immediately reflected at its output terminals 291 as a 9 (FIG. 23F). Since the terminal 227 of the 4 pole-2 position switch 886 is UP the output of the 9's complement generator applied to the terminals 216 of switch 886 (FIG. 20J) is transferred therethrough and through delays DC887 (FIG. 20J) to the input terminals 215 of switch 860M (FIG. 20J). The terminal 406 (FIG. 20J) is connected to the terminal 226 of switch 860M and thereby permits the 9's complement 91945799999999 of the dividend received at terminals 215 to be transferred through the switch 860M to the input terminals 90 of the adder 801M. When a 0 or no input is applied to the 9's complement of generator 885 a 9 is provided at its output.

Register 1 continues to shift right once during each time interval until 18 time (FIG. 23F). Hence, during successive time intervals the dividend digit stored in the next higher digit position of register 1 is shifted out to the right and appears at the output terminals 107 of digit position DP1 of register 1. Hence, the 9's complement 91945799999999 of the dividend delayed one time interval appears at the input terminals 90 of the adder 801M (FIG. 20J) serially by decimal digit during successive time inetrvals beginning at 6 time. In FIG. 23F the digit 9 occupying the first digit position of the 9's complement of the dividend is enclosed in a circle. This same digit is circled throughout the flow chart of FIG. 23M to facilitate understanding of the operation and illustrate the shifting of the 9's complement of the partial dividends designated by brackets throughout FIG. 23M.

Figure 23E:
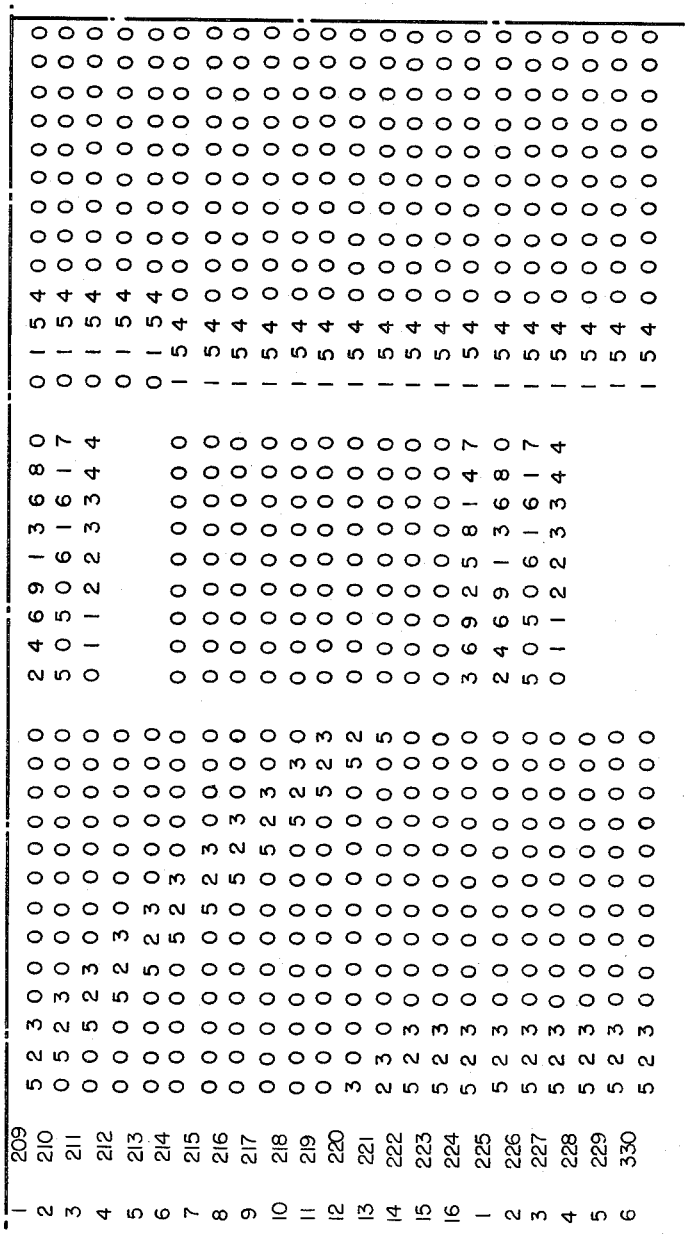
Figure 23G:
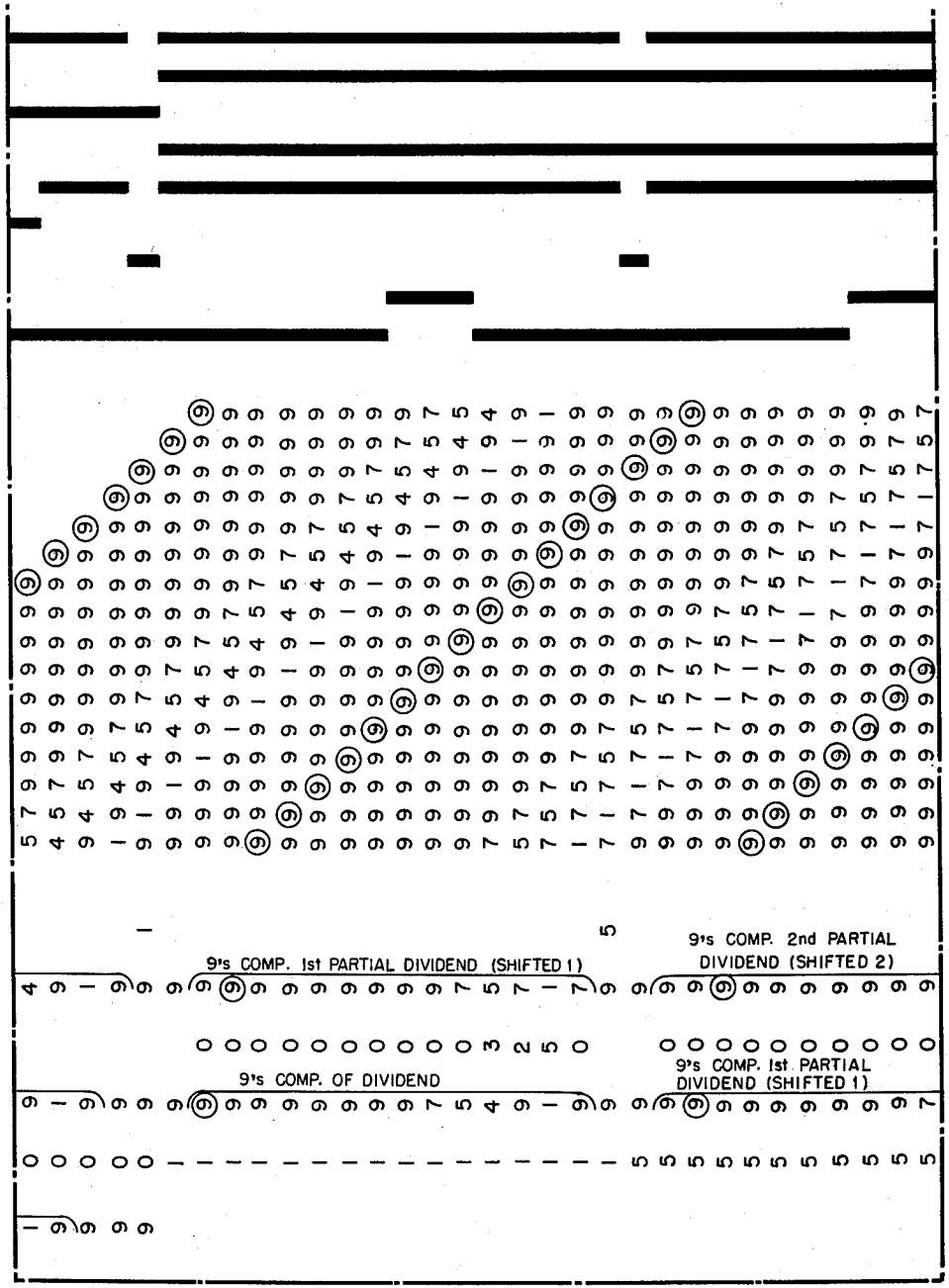

No input is applied to the input terminals 91 of adder 801M because the selector switch 810M (FIG. 20K) is inoperative. Switch 810M is inoperative because the terminal 180 of binary to decimal converter 830M (FIG. 20K) is DOWN. The binary decimal adder 801M therefore transfers the 9's complement of the dividend therethrough and it begins to appear at the output terminals 102 of adder 801M serially by decimal digit beginning at 7 time (FIG. 23F). Hence, the 9's complement of the dividend is now delayed two time inetrvals. The 9's complement of the dividend is applied in binary decimal form to the inputs of the first delays of the fifteen time interval delays 888 (FIG. 20J). The decimal digit 9 (circled) occupying the first digit position of the 9's complement of the dividend therefore appears at the output of the first delays in binary decimal form one time interval later, or during 8 time (FIG. 23F). This same decimal digit appears in binary decimal form at the output terminals of the last, or fifteenth delays, of the fifteen time interval delays 888 at 23 time (FIG. 23G).

The 9's complement of the dividend is also transferred from the output terminals 102 of adder 801M to the leads 889 connected to the input terminals 215 of the 4 pole-2 position switches 861 through 869. The terminal 462 (FIG. 20J) is now UP (terminal 462 DOWN from 5 time to 6 time of each cycle). The terminal 462 causes each terminal 226 of switches 861 through 869 to go UP. Hence, the 9's complement of the dividend present at the input terminals 215 of switches 861 through 869 is transferred therethrough to the output terminals 217 thereof and to the input terminals 90 of adders 841 through 849 inclusive. Since there is no delay in the transfer of the 9's complement of the dividend from the output terminals 102 of adder 801M to the input terminals 90 of adders 841 through 849 the 9's complement of the digit occupying the lowest digit position of the dividend is applied to the input terminals 90 of adders 841 through 849 at 7 time.

Terminal 406 (FIGS. 20J, 11F, 11G, 11D) goes UP at 0 time and remains UP throughout the division problem. Terminal 406 is connected to the terminal 226 of the 4 pole-2 position switch 860M and permits the 9's complement of the dividend and subsequently the 9's complement of the partial dividends to be transferred from the input terminals 215 of switch 860M to the input terminals 90 of added 801M.

Terminal 406 is also connected to the terminals 190 of binary to decimal converters 831 through 839. The terminal 50 of binary to decimal converter 831 (FIG. 20H) is connected to the output 161 thereof. This causes output 161 to be UP and permits the one multiple, M, of the divisor to be transferred through the 4 pole-9 position selector switch 811. The terminal 50 of binary to decimal converter 832 (FIG. 20H) is connected to the output 162 thereof. This causes the output 162 of binary to decimal converter 832 to be UP and permits the two multiple, 2M, of the divisor to be transferred through selector switch 812. Similarly, the terminals 50 of binary to decimal converters 833 through 839 are connected to the outputs 163 through 169, respectively, of binary to decimal converters 833 through 839. This causes the outputs 163 through 169 of these respective binary to decimal converters to be UP. Hence, the multiples 3M through 9M of the divisor are transferred through the respective selector switches 813 through 819.

The digit occupying the lowest digit position of the designation of selector switches 811 through 819 designates the multiple of the divisor which is transferred therethrough. For example, the multiple, 6M, of the divisor is transferred through the selector switch 816 (FIG. 20F). The digit occupying the lowest digit position of the multiples appears at the outputs 131 through 139 of the product generator 803 (FIG. 20K) at 6 time (FIG. 23A). These respective multiples M through 9M, inclusive are transferred through the respective selector switches to the delays DC824 through DC832 and appear at the outputs thereof during the next time interval or at 7 time. The outputs of these delays are connected to the respective input terminals 91 of adders 841 through 849. Hence, the digit occupying the lowest digit position of the 9's complement of the dividend (FIG. 23F) and the digit occupying the lowest digit position of each of the multiples, M through 9M, of the divisor arrive at the input terminals of the adders 841 through 849 at 7 time. Hence, during succeeding time intervals the addition of the multiples of the divisor and the 9's complement of the dividend is effected. The sum of these additions appears at the output terminals 102 of the adders 841 through 849. These terminals are connected to the input terminals 216 of the 4 pole-2 position switches 860M, 861 through 868. However, these switches 860M, and 861 through 868, inclusive are conditioned to transfer inputs only from their input terminals 215. The sums of these additions are therefore lost.

The quotient generator 890 (FIG. 20F) is connected to receive inputs from the carry terminal 61C of each of the adders 841 through 849. In accordance with the explanation of the quotient generator undertaken hereinbefore in connection with FIG. 8 the presence and the absence of carries at the terminals 61C of adders 841 through 849 are utilized to determine the correct decimal digit of the quotient. It should be noted in the flow chart of FIG. 23M that the carry used to determine the quotient digit is the carry from the fourteenth digit position. This carry always occurs at 5 time of a sixteen time interval cycle. Hence, the first test of carry performed by the quotient generator is at 21 time or 5 time of the second sixteen time interval cycle. Carry is present at the terminal 61C of adder 842 (FIG. 20G). This carry is produced by the addition of 9 1 9 4 5 7 9 9 9 9 9 9 9 9 and 1 0 4 6 0 0 0 0 0 0 0 0 0 0

Carry is also present at each of the terminals 61C of adders 843 through 849 inclusive which effect addition of the 9's complement of the dividend and the respective multiples, 3M through 9M, of the divisor. The 9's complement of the divided 9 1 9 4 5 7 9 9 9 9 9 9 9 9 and 0 5 2 3 0 0 0 0 0 0 0 0 0 0

The one multiple, M, of the divisor are added in adder 841 (FIG. 20G). Addition of the digit 9 occupying the fourteenth digit position of the 9's complement of the dividend and the digit 0 occupying the fourteenth digit position of the one multiple of the divisor does not provide a carry. Since no higher multiple of the divisor can be added to the 9's complement of the dividend without producing a carry the correct quotient digit is 1. The digit 9 occupying the fourteenth digit of the 9's complement of the dividend is present at the output terminals 102 of adder 801M at 20 time (FIG. 23G). This same 9 is therefore present at the output terminals 102 of adder 841 (FIG. 20G) at 21 time. Carries produced by the addition of the 9's complement of the dividend and multiples of the divisor will also be present at each of the terminals 61C of the adders 842 through 849, which produce them, at 21 time. The quotient generator 890 and the decimal to binary converter 891 (FIG. 20E) respond immediately to these carries. As a result the quotient digit 1 is produced at 21 time (FIG. 23G) and is stored in digit position DP1 of register 1 as a result of the left shift thereof.

It will be understood from the connection of the terminals 61C in the adders that various carries will be produced during the additions herein. However, these carries do not effect the solution of the problem since the quotient digits produced therefrom are lost. The only quotient digit which will be retained by the divider is that occurring at 5 time of a sixteen time interval cycle. These are retained because register 1 shifts left at this time. The quotient digit produced at 5 time of any sixteen time interval cycle except the first is a correct quotient digit.

The outputs of the quotient generator 890 are connected to the inputs of the decimal to binary decimal converter 891 (FIG. 20E). The decimal to binary decimal converter converts the decimal representation of the quotient digit into binary decimal representations which appear at its output terminals 257. These output terminals are connected to the input terminals 106 of digit position DP1 of register 1 (FIG. 20M). The addition of the 9's complement of the dividend with each of the multiples of the divisor is completed at 21 time.

At 21 time the register 1 (FIG. 23G) shifts left to effect storage of the quotient digit 1 in digit position DP1 of register 1. At 6 time the terminal 433 (FIGS. 20M, 23F) goes DOWN and permits register 1 to store. Hence, at this time a 1 is stored in digit position DP1 of register 1 and a 0 is stored in each of the remaining digit positions.

The digit 8 occupying the thirteenth digit position DP13 of the dividend was shifted out at 18 time (FIG. 23B) and register 1 was caused to store until it was shifted left to receive the quotient digit 1 at 5 time of the second, sixteen time interval, cycle.

The digit 5 occupying the thirteenth digit position of the divisor was shifted out of register 2 at 14 time. Hence, at 14 time the divisor is stored in register 2 exactly as it was at 1 time. The terminal 442 (FIGS. 20N, 11F) goes DOWN and remains DOWN until 17 time or 1 time of the second sixteen time interval cycle. Hence, register 2 effects storage of the divisor from 14 time to 17 time. At 17 time the divisor is again shifted right and the process of shifting out the divisor, restoring the divisor, and creating the nine multiples of the divisor is repeated.

The quotient digit 1 stored in digit position DP1 of register 1 appears at the output terminals 107 thereof during the next time interval. The terminal 465 (FIGS. 20J, 11D) goes UP at 6 time (FIG. 11F) of cycle 2 or 22 time. Hence, the output of OR circuit 870 (FIG. 20J) goes UP at 22 time and causes the terminal 180 of binary to decimal converter 830M (FIG. 20K) to go UP. This permits the binary to decimal converter 830M to respond to the input at its terminals 160. The terminal 465 is also connected to the terminal 226 of 4 pole-2 position switch 886. The terminal 226 of switch 886 therefore goes UP at 22 time and permits the switch 886 to transfer the input applied to its input terminals 216.

The quotient digit 1 appearing at the output terminals 107 of digit position DP1 of register 1 is transferred to the input terminals 160 of binary to decimal converter 830M (FIG. 20K). Since the quotient digit is 1 the output 161 of the binary to decimal converter 830M goes UP at 22 time. This permits the one multiple, M, of the divisor to be transferred through selector switch 810M (FIG. 20K). The digit occupying the first digit position of the one multiple of the divisor is applied thereto at 22 time (FIG. 23B). This one multiple is transferred through delay DC823 (FIG. 20K) to the input terminals 91 of adder 801M (FIG. 20J) where it begins to appear at 23 time (FIG. 23G).

The digit occupying the first digit position of the 9's complement of the dividend is transferred through switch 886 of the dividend loop to the input terminals of delay DC887 at 22 time. At 23 time this digit of the 9's complement of the dividend appears at the output of delay DC887 (FIGS. 20J, 23G) and is transferred through the 4 pole-2 position switch 860M (FIG. 20J) to the input terminals 90 of adder 801M (FIG. 20J). Hence, at 23 time the application of the 9's complement of the dividend to the input terminals 90 of adder 801M and the one multiple of the divisor to the input terminals 91 thereof is begun.

The 9's complement of the dividend and the one multiple of the divisor are added as indicated hereinbefore in adder 801M to provide the 9's complement of the first partial dividend at the output terminals 102 of adder 801M. The digit occupying the first digit position of the 9's complement of the first partial dividend appears at the output terminals 102 of adder 801M at 24 time (FIG. 23G). This digit is the circled 9 in FIG. 23B, and occupies the second digit position of the 9's complement of the first partial dividend at the output terminals 102 of adder 801M. The 9's complement of the first partial dividend has therefore been shifted one digit position to the left. This means that the 9 formerly occupying the fourteenth digit position of the 9's complement of the dividend is replaced by the 7 derived from the addition of the thirteenth digit positions within the adder 801M. A 9 therefore is shifted out to the left and discarded from the solution of the problem and a 9 is caused to occupy the first digit position of the 9's complement of the first partial dividend. This 9's complement of the first partial dividend is circulated in the dividend loop. It is also transferred from leads 889 to the inputs 90 of adders 841 through 849.

The 0 occupying the first digit position of each of the nine multiples of the divisor is present at the outputs 131 through 139 of the product generator 803 at 22 time (FIG. 23B). These nine multiples are passed through the respective selector switches and delays to the input terminals 91 of adders 841 through 849 inclusive and arrive thereat at 23 time simultaneously with the arrival of the digit 9 occupying the first digit position of the 9's complement of the first partial dividend at the input terminals 90 of the same adders.

Each of these multiples M through 9M inclusive is added in the corresponding adders, 841 through 849, of the 9's complement of the partial dividend. The digit occupying the fourteenth position of these multiples and the 7 occupying the fourteenth position of the 9's complement of the first dividend arrive at the input terminals of the adders 841 through 849 inclusive at 36 time. The sum and the carry produced by the addition of these digits therefore appear at the outputs of the adders at 37 time (FIG. 23B). This is 5 time of the third sixteen time interval cycle. At this time the quotient generator 890 and the decimal to binary converter 891 (FIG. 20E) causes the quotient digit 5 to be produced. Register 1 shifts left at 37 time (5 time of third sixteen time interval cycle) and accepts the quotient digit 5 into storage at digit position DP1 thereof. The quotient digit 1 is shifted from digit position DP1 of register 1 into storage at digit position DP2 of register 1. At 38 time register 1 resumes storage. Quotient digit 5 present at the output terminals 107 of digit position DP1 of register 1 is supplied to the terminals 160 of binary to decimal converter 830M and permits the five multiple 26150000000000 of the divisor to be transferred therethrough and applied to the input terminals 91 of adder 801M. The 0 occupying the first digit position of the fifth multiple is applied to the input terminals 91 of adder 801M at 39 time (FIG. 23B). The digit 9 occupying the first digit position of the first partial dividend and shifted one position to the left is applied to the input terminals 90 of adder 801M at 39 time. Hence, the first partial dividend shifted one position to the left 7 1 7 5 7 9 9 9 9 9 9 ⑨ 9 and 2 6 1 5 0 0 0 0 0 0 0 0 0 0 are added to provide the 9's complement of the second partial dividend 7 9 0 7 9 9 9 9 9 9 ⑨ 9 9

This 9's complement of the second partial dividend begins to appear at the output terminal 102 of adder 801M at 39 time or simultaneously with the inputs applied to its input terminals 90 and 91. This means that the 9's complement of the second partial dividend is shifted one additional digit position to the left as compared to the 9's complement of the first partial dividend. Hence, the 9's complement of the second partial dividend (FIGS. 23B, 23C) is shifted two digit positions to the left.

The 9's complement of the second partial dividend is circulated in the dividend loop and applied to the input terminals 90 of adders 841 through 849.

Figure 23H:
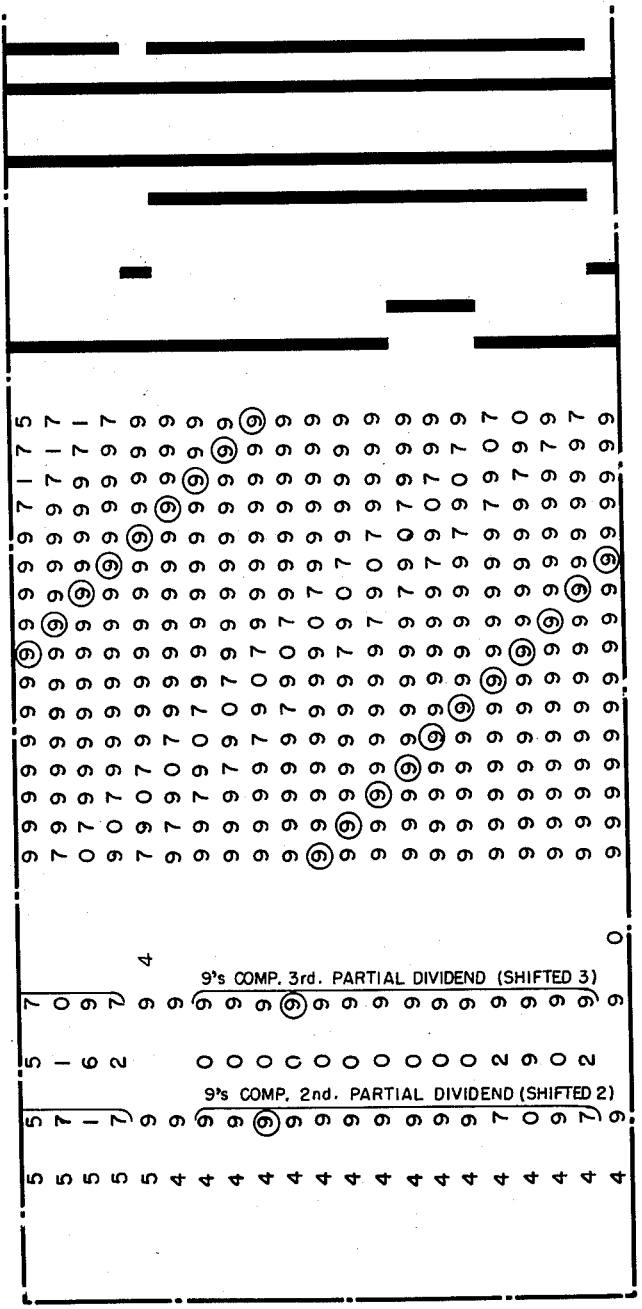
Figure 23J:
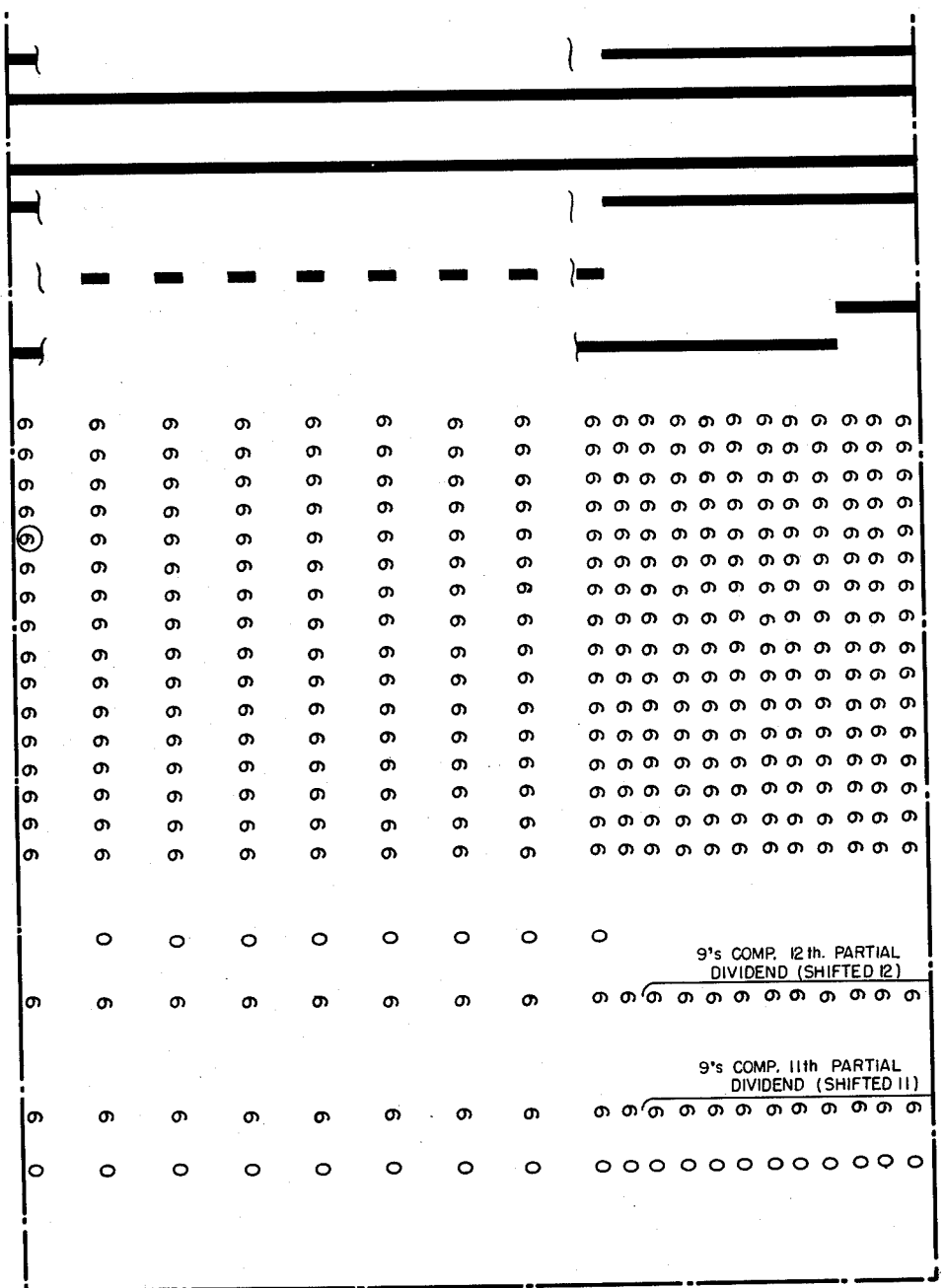

At 53 time (5 time of the fourth sixteen time interval cycle) the quotient generator 890 and the decimal to binary converter 891 provide the quotient digit 4 (FIG. 23H). The register 1 shifts left at 53 time to accept the quotient digit 4 into storage at digit position DP1, shift quotient digit 5 from digit position DP1 into storage at digit position DP2 and shift the quotient digit 1 from digit position DP2 into storage at digit position DP3.

This quotient digit 4 is supplied to the input terminals 160 of binary to decimal converter 830M (FIG. 20K) and permits the fourth multiple 20920000000000 to be transferred through the selector switch 810M, delays DC823 to the input terminals 91 of adder 801M (FIG. 20J). The 9's complement of the second partial dividend shifted two digit positions to the left is applied to the input terminals 90 of adder 801M where it is added to the four multiple of the divisor to provide at its output terminals 102 the 9's complement of the third partial dividend shifted three digit positions to the left. The digit 9 occupying the first digit position of the 9's complement of the second partial dividend and the digit 0 occupying the first digit position of the four multiple of the divisor arrive at the input terminals 90 and 91 respectively of adder 801M at 55 time (FIG. 23H).

The digits occupying the fourteenth digit positions, respectively, of the four multiple of the divisor and the 9's complement of the second partial dividend shifted two digit positions to the left are applied to the inputs of the adder 801M at 68 time (FIG. 23H). It is seen that the 9's complement of the third parital dividend shifted three digit positions to the left as it appears at the output terminals 102 of adder 801M contains no digit other than 9. This means that the third partial dividend is represented in true form by 0. Hence, the fourth and all subsequent quotient digits must be 0.

The fourth quotient digit is provided by the quotient generator 890 and the decimal to binary converter 891 at 69 time (5 time of fifth sixteen time interval cycle). The register 1 shifts left to receive the 0 quotient digit into storage at 69 time. The quotient digits 1, 5, 4 are therefore shifted left into storage at digit positions DP4, DP3 and DP2 respectively. This process is continued as illustrated in the figures of FIG. 23M until the quotient digits 1, 5 and 4 occupy digit positions DP13, DP12 and DP11, respectively, of register 1. At this time a 0 is stored in each of the other digit positions DP10 through DP1 of register 1.

Figure 23K:
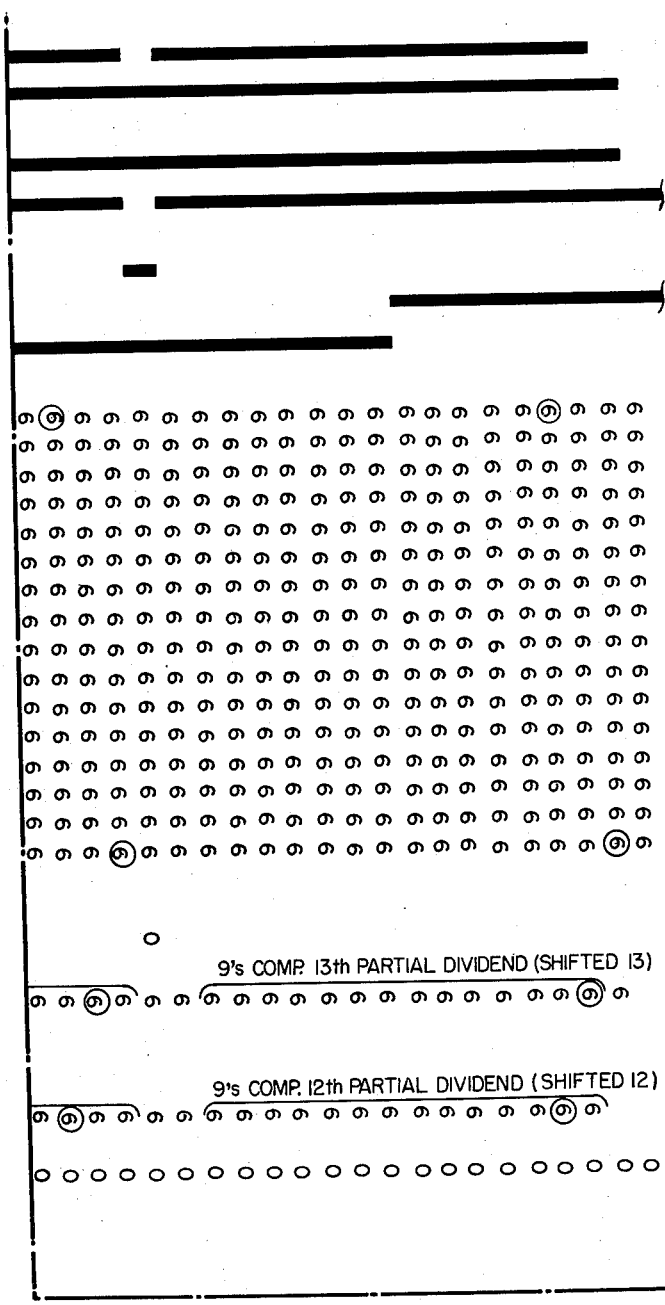

Finally, at 229 time, corresponding to 5 time subsequent to the fourteenth sixteen time interval cycle, the terminal 462 (FIGS. 11G, 20J, 23K) goes DOWN. At 330 time the terminal 465 (FIGS. 11D, 20J) goes DOWN and causes the terminal 180 of the binary to decimal converter 830M (FIG. 20K) and the terminal 226 of the 4 pole-2 position switch 886 (FIG. 20J) to go DOWN (FIG. 23K). The divider circuit is now returned to its initial condition at starting except for register 1 and register 2. Registers 1 and 2 continue to store. The divisor is stored in register 2 (FIG. 23E) and the quotient is stored in register 1 (FIG. 23E). The quotient and divisor may therefore be manipulated in any desired manner as set forth hereinbefore in connection with FIG. 1R.

The last partial dividend of a division operation represents the remainder. In FIG. 23K it is seen, from the 9's complement of the thirteenth partial dividend shifted thirteen digit positions to the left, that the remainder is 0. In many division operations the remainder is not 0 and its particular value may be desired. It is seen that this remainder in 9's complement form appears at the output terminals 102 of adder 801M (FIG. 20K) serially by decimal digit in the binary decimal form from 215 through 228 time. If operation in response to the remainder, or an indication of its value, is desired such may be obtained by connection to the terminals 102 of adder 801M (FIG. 20J) from time intervals 215 through 228. It is seen from FIG. 11G that terminal 465 (FIG. 20J) goes DOWN at 6 time following cycle $m$. This means that terminal 226 of switch 886 (FIG. 20J) goes DOWN and that the switch will not transfer the information applied to its input terminals 215. Hence, the remainder circulating in the dividend loop will be lost in accordance with the particular operation of the invention herein.

The addition of the 9's complement of the dividend and the 9's complements of the partial dividends employed in the solultion of the above problem as a result of the obtaining of the quotient digits 1, 5, and 4, respectively, is readily understood from the following:

```
  9 1 9 4 5 7 9 9 9 9  9  9 ⑨  (9's complement DD)
  0 5 2 3 0 0 0 0 0 0  0  0 0   (M)
  ─────────────────────────────
  9 7 1 7 5 7 9 9 9 9  9  9 ⑨  (9's complement 1st partial DD)

ȹ 7 1 7 5 7 9 9 9 9 9 ⑨ 9   (9's complement 1st partial DD,
                                   shifted one)
  2 6 1 5 0 0 0 0 0 0 0  0 0   (5M)
  ─────────────────────────────
  ȹ 9 7 9 0 7 9 9 9 9 9 ⑨ 9   (9's complement 2nd partial DD,
                                   shifted one)

ȹ ȹ 7 9 0 7 9 9 9 9 9 9 ⑨ 9 9 (9's complement 2nd partial DD,
                                    shifted two)
  2 0 9 2 0 0 0 0 0 0 0 0 0 0   (4M)
  ─────────────────────────────
  ȹ ȹ 9 9 9 9 9 9 9 9 9 ⑨ 9 9 (9's complement 3rd partial DD,
                                    shifted two)
```

The most left digits, uncancelled above, occupy the fourteenth digit positions. It is the carry from the addition of the fourteenth digit position of the 9's complement of the dividend and the 9's complement of the partial dividends with the multiples M through 9M of the divisor that the quotient generator utilizes to determine the correct quotient digit. It is apparent from inspection of the above that the correct multiples are employed in each addition since a larger multiple would produce a carry from the fourteenth digit position.

The shifting of the dividend and the partial dividends is apparent from inspection of the figures of FIG. 23M. It is also readily understood by reference to the figures of FIG. 20P and of FIG. 11E. The repetitive sixteen time interval cycles are under control of the division control circuits shown in FIGS. 11A, 11B and 11C arranged as shown in FIG. 11E. Register 1 and register 2 go through one complete cycle of operation during each sixteen time interval cycle. The 9's complement of the dividend and the 9's complement of the partial dividends are transferred through the dividend loop once in seventeen time intervals. Fifteen of these seventeen time intervals are consumed in being transferred through the fifteen time interval delays 888 (FIG. 20J), one time interval in being transferred through delays DC887 and the remaining time interval in being transferred through the delays of adder 801M. Hence, in being transferred through the dividend loop the 9's complement of the dividend and of the partial dividends requires one time interval more than a cycle of the registers. Register 2 controls the production of the nine multiples of the divisor produced by product generator 830. Register 2 is shifted to the right one digit position during each of thirteen time intervals and effects storage during the remaining three time intervals of the sixteen time interval cycle. Since the transfer through the dividend loop requires one time interval more than the cycling of register 2 the 9's complement of the dividend is provided one time interval after the nine multiples of the divisor are provided. This means that the 9's complement of the dividend is shifted one digit position to the left with respect to the multiples of the divisor.

It follows that the 9's complement of the first partial dividend will be shifted one additional digit position to the left or a total of two digit positions to the left. Each succeeding partial dividend is therefore shifted one additional digit position to the left. Register 1 is left shifted one digit position during each sixteen time interval cycle after 21 time in order to accommodate the storage of a quotient digit.

It is apparent from FIGS. 20P and 11F that the terminal 462 (FIG. 20J) is DOWN from 5 time to 6 time of each sixteen time interval cycle. This causes terminal 226 of switches 861 through 869 inclusive to go DOWN. Switches 861 through 869 therefore will not transfer information appearing at 5 time from the output terminals 102 of adder 801M (FIG. 20J).

It is seen from the flow chart of FIG. 23M that a digit is present at the output of adder 801M at 5 time of each sixteen time interval cycle after the first. Hence, if the terminal 226 of switches 861 through 869 did not go DOWN at 5 time these digits appearing at the output terminals 102 of adder 801M at 5 time would be added to the multiples of the divisor and provide spurious carry outputs from adders 841 through 849 inclusive. Such would cause selection of a spurious quotient digit. For example, because the addition of the 9's complement of the dividend 91945799999999 with the second multiple 10460000000000 of the divisor in adder 842 (FIG. 20G). Hence,

9991945799999999 and

10460000000000 are added to provide

10002405799999999 at the output terminal 102 of adder 842. The carry provided by the addition of the fourteenth digit position is reflected in the seventeenth digit position of the sum. It is seen from FIG. 23G that this carry reflected in the seventeenth digit position occurs at 23 time and that the first digit position of the 9's complement of the partial dividend is added to the multiples of the divisor at 23 time. The error which would result is now manifest.

When terminal 226 of switches 861 through 869 goes DOWN at 21 time the digit 9 occupying the fourteenth digit position of the output from the adder 801M is prevented from being transferred to the adders 841 through 849. Hence, error in the subsequent addition within the adders 841 through 849 is eliminated.

Inspection of the flow chart of FIG. 23M immediately points out the numerous simultaneous operations effected by the divider shown in FIG. 20P. For example, shifting of the divisor in register 2, restoring of the divisor in register 2, production of multiples of the dividend, shifting of the dividend, producing the 9's complement of the dividend, adding the 9's complement of the dividend to the nine multiples of the divisor, and timed storage of the 9's complement of the dividened occur simultaneously. Also, the shifting and restoring of the divisor, operation of the product generator to create the nine multiples of the divisor, timed storage of the 9's complement of the dividend and determination of the first quotient digit are undertaken simultaneously. As a further example, the shifting and restoring of the divisor, storing determined digits of the quotient, obtaining and shifting the 9's complement of the partial dividend and adding the nine multiples of the divisor to the 9's complement of the partial dividend occur simultaneously.

Each of the nine multiples M through 9M of the divisor is effectively subtracted from the dividend to produce the first quotient digit correctly in response to this single operation. The quotient digit is stored and thereafter read out of storage to permit the correct multiple of the divisor to be effectively subtracted from the dividend to provide the correct partial dividend. The multiples of the divisor are then effectively subtracted from the partial dividend to determine the next quotient digit. This quotient digit is stored and thereafter used to determine the next partial dividend. This process of determining the quotient digit and using it to determine the next partial dividend is repeated until the division is completed.

PREVENTING OPERATION OF THE DIVIDER

If all digits of the dividend are zero, a series of 9's representing the 9's complement of the dividend will be transferred to the switches 861 through 869 (FIGS. 20G, 20E, 20C). This series of 9's will be added to the nine multiples of the divisor and in each instance will provide a carry. Each of the input terminals 261–1 to 269–9, inclusive, of the quotient generator will therefore be UP. It is understood from the description hereinbefore in connection with the quotient generator (FIG. 8) that each of the output terminals 261 through 269 thereof will be DOWN. This means that a quotient digit of zero is indicated. Obviously each succeeding quotient digit will likewise be zero.

This means that the output terminals 107 of digit position DP13 of register 1 will remain DOWN. These terminals 107 (FIGS. 20M, 11D) are UP only when the quotient digit stored therein is not a zero. Hence, if each digit of the dividend is zero, these terminals will never go UP. The UP condition of these terminals is used herein to stop the operation of the divider. Hence, if each digit of the dividend is zero, the operation of the divider cannot be stopped. It is, therefore, necessary to provide a circuit which will prevent operation of the divider of FIG. 20P when each digit of the dividend is zero.

If each digit of the divisor is zero, the input to terminals 91 of adders 841 through 849 (FIGS. 20G, 20E, 20C) will be zero. The 9's complement of the dividend will be transferred to the input terminals 90 of these adders. Hence, in each adder the 9's complement of the dividend will be added to zero. This means that no carriers will be produced. Hence, all of the input terminals to the quotient generator will be DOWN. From the description hereinbefore of the quotient generator of FIG. 8 it is understood that the output terminal 269 thereof will be UP. This means that a quotient digit of 9 will be indicated in each instance and, when the divider operation is finally stopped, the digit 9 will be stored in each digit position of register 1, thereby providing a spurious quotient.

It is seen from the above that proper operation of the divider requires that operation be prevented when all digits of the dividend or of the divisor are zero.

If the digit of the divisor occupying the thirteenth digit position is zero, spurious operation occurs. Consider the example where the divisor 523 is divided into the dividend 80,542 to provide the quotient 154. If the divisor is properly stored in register 2, the 9's complement of the dividend 919457 is added to the divisor 523 to provide the first partial dividend 971757. From this addition and the addition of the remaining multiplies of the divisor to the 9's complement of the dividend, the correct quotient digit 1 was determined. Hence, if the divisor is improperly stored in register 2, a spurious quotient digit will be determined. If the digit 5 of the divisor is stored in digit position DP12 of register 2, a zero is stored in digit positon DP13 of regster 2. Under these conditions the 9's complement of the dividend 919457 is added to the ninth multiple of the divisor 4707 to provide 966527. Since this addition provides no carry, the divider indicates that the correct quotient digit is 9. It has been shown hereinbefore that this is incorrect and that the correct quotient digit is 1. It follows that a spurious quotient is produced not only when each digit position of register 2 is zero, but also when only digit position DP13 thereof indicates a zero. This is to say that a spurious quotient digit is produced when the thirteenth digit position of the divisor is occupied by a zero, irrespective of the digital values occupying the other digit positions of the divisor. Hence, operation of the divider should be prevented when a zero is stored in each digit position of register 1 or when a zero is stored in digit position DP13 of register 2. This is synonymous with saying that division operation is prevented when all digits of the dvidend are zero or when the highest digit position of the divisor is zero.

This is accomplished by the circuit shown in FIG. 24 wherein the output terminals 107 of digit positions DP1 through DP13 of register 1 are connected as inputs to the OR circuit 900. The output of OR circuit 900 is DOWN only if a zero is stored in each digit position of register 1; that is, when all digits of the dividend are zero. The output of OR circuit 900 is connected as the left input of the three-input AND circuit 901a. The center input of AND circuit 901a is connected to the divide control voltage terminal 902 which receives an UP voltage during the entire division operation. The same voltage is applied to this terminal 902 which for purposes of clarifying the explanation of the division operation was hereinbefore applied to terminal 405 of FIG. 11B. Output terminals 107 of digit position DP13 of register 2 are connected as the inputs to OR circuit 903. If the decimal digit stored in digit position DP13 of register 2 is a zero, the output of OR circuit 903 is DOWN. This output is connected as the right input of AND circuit 901a.

The output of AND circuit 901a is connected to the divide control terminal 405 of FIG. 11B. If the output of AND circuit 901a is UP, the divide operation is effected as described hereinbefore. If it is DOWN, the divider is prevented from operating. Hence, if division is to take place, the output of OR circuits 900 and 903 must be UP. This means that the dividend must not be a zero and that the digit occupying the thirteenth digit position of the divisor must not be a zero. The requirements for preventing operation will therefore be complied with. The output of OR circuit 900 is DOWN if the dividend is a zero, the output of OR circuit 903 is DOWN if the thirteenth digit position of the divisor is a zero. If either of these conditions exist, the output of AND circuit 901a and the terminal 405 connected thereto are DOWN, and operation of the divider is prevented.

The outputs of OR circuits 900 and 903 are connected as the inputs of inverters 904 and 905 which have their outputs connected as a common cathode OR circuit (CCOR). This common output is connected as the right input of AND circuit 906a. The left input of AND circuit 906a is connected to the divide control voltage terminal 902. The left input of AND circuit 906a is therefore UP during the entire division operation. If a zero is present in digit position DP13 of register 2 (thirteenth digit position of divisor), the output of inverter 905 is UP, and if the dividend is zero the output of inverter 904 is UP. Hence, if the thirteenth digit position of the divisor is zero, or if the dividend is zero, the output terminal 907 of AND circuit 906a is UP. Hence, the output terminal 907 is UP if the division operation is to be prevented or when an improper operand is present; that is, when the divisor or dividend are improper for division operation.

If the dividend is improperly stored in register 1; that is, a zero is present in digit position DP13 of register 1, the quotient generator produces a quotient digit of zero and the dividend is shifted to the left. This shift will continue until a non-zero digit occupies digit position DP13 of register 1. This will permit designation of a quotient digit other than zero.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic parallel binary-coded decimal multiplier for obtaining the product of a multiplicand and a multiplier, said multiplier including; first means for simultaneously forming the one through nine multiples of said multiplicand, each of said multiples being formed serially by decimal digit, and beginning with the decimal digit occupying the lowest decimal digit positon of each multiple; selecting means, under control of said multiplier, for simultaneously selecting, for each decimal digit of the multiplier the one of said multiples corresponding thereto; second means for simultaneously summing, serially by decimal digit, the selected multiples; and said second means including time delay means whereby read out of the decimal digit occupying the $n^{th}$ decimal digit position of the product occurs simultaneously with the forming of the decimal digits occupying the $(n+1)^{th}$ decimal digit position of said multiples.

2. The invention set forth in claim 1 wherein said selecting means includes; a selector switch for each decimal digit position of the multiplier for receiving each of said multiples expressed in the binary-decimal system; a binary to decimal converter for receiving in the binary-decimal system the decimal digit occupying that decimal digit position of the multiplier and providing an output representative of the decimal value thereof; and means coupling said output to said selector switch to permit transfer of said multiple corresponding thereto.

3. A parallel binary-coded decimal multiplier circuit for providing the product of a multiplier and a multiplicand respectively expressed in binary-coded decimal notation, including; first means for simultaneously forming the one through nine multiples, expressed in binary-coded decimal notation, of the multiplicand, each of said multiples being formed serially by decimal digit; means under control of the entire multiplier for simultaneously selecting a plurality of multiples of the multiplicand, each selected multiple corresponding to a partial product, whereby all the partial products of which said product is the sum are simultaneously selected and available; a plurality of binary-coded decimal adding means each having two inputs and one output for receiving each partial product at one input; and digit position shifting means, including delay circuit means, coupling the output of each said binary-coded decimal adding means, except that corresponding to the lowest decimal order partial product, to the other input of the binary-coded decimal adding means corresponding to the next lower decimal order partial product, whereby said product appears, expressed in binary-coded decimal notation, parallel by binary bit, serial by decimal digit, at the output of said binary-coded decimal adding means corresponding to said lowest decimal order partial product during selection of said multiples.

4. An electronic multiplier for receiving the multiplicand, serially by decimal digit, parallel by binary bit, in the binary-decimal system and simultaneously providing the one through nine multiples thereof a predetermined time thereafter; selection means controlled by each digit of the multiplier for simultaneously forming all of the partial products corresponding thereto, each of said partial products being formed serially by decimal digit; and means controlled by each of said partial products for forming the product simultaneously with the forming of the partial products, whereby said product is rendered available by said last mentioned means, serial by decimal digit, parallel by binary bit.

5. An electronic multiplier for multiplying a multiplicand by a multiplier to provide a product including: means for simultaneously forming the one through nine multiples of the multiplicand, each of said multiples being formed serially by decimal digit; means corresponding to each decimal digit position of the multiplier and under the control thereof to effect predetermined simultaneous selection of a plurality of said multiples corresponding respectively to the partial products whose summation is said product; means controlled by the multiples selected to provide a product; and circuit means interconnecting said means to provide simultaneously the decimal digit occupying the first decimal digit position of each partal product and the digit occupying the first decimal digit position of said product.

6. A parallel binary-coded decimal electronic multiplier for providing the product of a multiplier and multiplicand, respectively, expressed in binary-coded decimal notation, and including; first register means for storing the multiplicand and presenting said multiplicand decimal digit by decimal digit; second register means for presenting all decimal digits of the multiplier simultaneously; product generator means energizable by presentations from said first register means for simultaneously providing the multiples one through nine of said multiplicand expressed in binary-coded decimal notation, serial by decimal digit, parallel by binary bit; a selector switch corresponding to each decimal digit position of said multiplier and having an input for receiving each of said one through nine multiples; and circuit means coupling each decimal digit of said multiplier to the selector switch corresponding thereto to permit transfer therethrough of the multiple having the value designated by that decimal digit of the multiplier; binary-coded decimal adding means corresponding to each decimal digit position of the multiplier and connected to receive the output of the corresponding selector switch and provide at its output a sum representing a total of the output of that selector switch and the output of all selector switches corresponding to a higher decimal digit position of the multiplier, whereby the output of the adding means corresponding to the lowest decimal digit, position of the multiplier represents the product of said multiplier and multiplicand, expressed in binary-coded decimal notation, serial by decimal digit, parallel by binary bit.

7. The multiplier set forth in claim 6 including; first coupling circuits interconnecting the output of said binary-coded decimal adding means corresponding to said lowest decimal digit position and said first register means; second coupling circuits interconnecting the output of said binary-coded decimal adding means corresponding to said lowest decimal digit position and said second register means; and means rendering said first and second coupling circuits selectively operative to effect storage of preselected decimal digits of said product by said register means; means anticipating the presence of a decimal digit greater than zero in a preselected decimal digit position of said product to render said first and second register means operative to permit transfer of a predetermined stored digit therebetween; wherein said first and second register means each include a register having a number of decimal digit positions equal to the decimal digit positions of said multiplicand and multiplier respectively and capable of storing information as it is made simultaneously available at the output of each decimal digit position and capable of shifting right to transfer information to the next lower decimal digit position; and means controlling said multiplier to cause simultaneous storage of decimal digits of said product and said multiplicand in said first register means.

8. A 4 pole-9 position switch including; first, second, third and fourth groups of coincidence circuits, each capable of providing a binary bit of information to collectively provide an output in the binary-decimal system; first, second, third, fourth, fifth, sixth, seventh, eighth and ninth groups of input terminals for respectively receiving multiples 1–9 inclusive of a value in the binary-decimal system; means connecting the 1, 2, 4 and 8 bit terminals of each of the nine groups of input terminals to an input of a different one of said coincidence circuits of said first, second, third and fourth groups respectively; nine input terminals for respectively receiving a representation corresponding to the decimal digits 1–9 inclusive; and means selectively connecting said nine input terminals to said coincidence circuits to permit selective operation thereof in response to a selected group of said input terminals receiving multiples in the binary-decimal system.

9. A 4 pole-9 position switch including; first, second, third and fourth groups of coincidence circuits, each capable of providing a binary bit of information to collectively provide an output in the binary-decimal system; first, second, third, fourth, fifth, sixth, seventh, eighth and ninth groups of input terminals for respectively receiving multiples 1–9 inclusive of a value in the binary-decimal system; means connecting the 1, 2, 4 and 8 bit terminals of each of the nine groups of input terminals to an input of a different one of said coincidence circuits of said first, second, third and fourth groups respectively; nine input terminals for respectively receiving a representation corresponding to the decimal digits 1–9 inclusive; and a connection from each of said nine input terminals to an input of a different coincidence circuit of said first, second, third and fourth groups.

10. A 4 pole-9 position switch including; first, second, third and fourth groups of nine two-input AND circuits corresponding respectively to the decimal digits 1–9 inclusive, each coincidence circuit being capable of providing a binary bit of information to thereby collectively provide an output in the binary-decimal system; first, second, third, fourth, fifth, sixth, seventh, eighth and ninth groups of input terminals for respectively receiving the multiples 1–9 inclusive of a value in the binary-decimal system; means connecting the 1, 2, 4 and 8 bit terminals of each of the nine groups of input terminals to an input of a different one of said AND circuits of said first, second, third and fourth groups respectively; nine input terminals for respectively receiving, one at a time, a representation corresponding to the decimal digits 1–9 inclusive; and a connection from each of said nine input terminals to an input of the corresponding AND circuit whereby the presence of a decimal digit at one of said nine input terminals causes the similarly designated multiple to appear at said output in the binary-decimal system.

11. In an electronic divider, carry detection means for detecting carry signals representing two opposite states in two and only two adjacent positions of a plurality of carry indicating positions, said carry detection means including in combination, a plurality of input representing different values and a plurality of corresponding outputs representing like corresponding values; a coincidence circuit corresponding to each of said outputs, except that corresponding to the highest value, for energizing its corresponding output; and means coupling each said coincidence circuit to the input corresponding thereto and to the input representing the next higher value to energize said output only when the inputs coupled to the coincidence circuit are different and wherein the input representing the highest value is coupled to the corresponding output to cause that output to electrically manifest a voltage condition determined by the input and different therefrom; and said means coupling each coincidence circuit to the corresponding input causes a voltage condition determined by that input and different therefrom to be electrically manifested at said coincidence circuit.

12. In an electronic divider wherein the one through nine multiples of the divisor are respectively, simultaneously added to the complement of a dividend, a quotient generator for determining a quotient digit including means for simultaneously receiving one or more carry pulses when carry is provided by the additions of the complement of a dividend, respectively, with each of the multiples 1–9 inclusive of the divisor, said means including a carry terminal corresponding to each of said multiples; a coincidence circuit corresponding to each said terminal, except that corresponding to the 9 multiple, for receiving the inverted input from its corresponding terminal and the input from the terminal corresponding to the next higher multiple; and an inverter for receiving the input from the terminal corresponding to the 9 multiple, whereby the outputs of the coincidence circuits and said inverter electrically manifest the correct quotient digit.

13. The quotient generator of claim 12 wherein each said coincidence circuit is a two-input AND circuit.

14. In an electronic divider wherein the one through nine multiples of the divisor are respectively, simultaneously, added to the complement of a dividend, a quotient generator for determining a quotient digit including means for simultaneously receiving one or more carry pulses when carry is provided by the additions of the complement of a dividend, respectively, with each of the multiples 1–9 inclusive of the divisor, said means including a carry terminal corresponding to each of said multiples; output terminals corresponding to the quotient digits 1–9 inclusive, one of said terminals electrically manifesting a voltage condition different from the remaining ones of said terminals in response to each said addition to thereby electrically manifest the corresponding quotient digit resulting from that addition; circuits means coupling each two successive carry terminals, except the highest, to the output terminals corresponding to the quotient digits 1–8 inclusive; and a circuit coupling the carry terminal corresponding to the multiple 9 to the terminal corresponding to the quotient digit 9.

15. An electronic divider wherein the one through nine multiples of the divisor are respectively, simultaneously, effectively subtracted from a dividend, and from a partial dividend, respectively, said electronic divider including; means for simultaneously determining the presence and absence of carries from each effective subtraction of the multiples 1–9 inclusive of a divisor from a dividend, and from a partial dividend; and circuit means connected to be rendered operative by the determination of the presence and absence of said carries to electrically manifest the highest multiple of said divisor which does not exceed the minuend; wherein said means for determining the presence and absence of carries includes, a plurality of binary-coded decimal adding means each for simultaneously adding a complement of the dividend and partial dividend respectively to the respective multiples of the divisor; wherein said circuit means includes, a plurality of circuits each connected to simultaneously receive electrical manifestations of the presence and absence of carries from said effective subtraction of each two successive multiples of the divisor, except the ninth; and an inverter connected to receive electrical manifestations of the presence and absence of carry from said effective subtraction of the multiple nine of the divisor, whereby only said circuit which is operative receives an electrical manifestation that carry is present and an electrical manifestation that carry is absent.

16. In an electronic divider wherein the one through nine multiples of the divisor are respectively, simultaneously, effectively subtracted from a dividend, and from a partial dividend, respectively, said electronic divider including, means for deriving groups of nine outputs from the comparison of the dividend and partial dividend, in turn, with each decimal digital multiple of the divisor; means connected to receive each said group of nine outputs to provide, in turn, the quotient digit required to obtain the next partial dividend; and means under the control of each said quotient digit for selecting the multiple of the divisor corresponding to that quotient digit; means for effectively subtracting the first selected multiple of the divisor from the dividend to obtain the first partial dividend and for subtracting each subsequently selected multiple of the divisor from the existing partial dividend to provide the next partial dividend; and wherein each said quotient digit is first provided in the decimal system and decimal to binary-decimal converter means is provided to represent the quotient digits in the binary decimal system to enable sequential selection of multiples of the divisor.

17. A nine's complement generator of the binary-decimal type to provide an output which is the nine's complement of the input said nine's complement generator consisting of; inverting means responsive to the 1 bit from the input; transfer means connecting the input and output for transferring the 2 bit; an exclusive OR circuit for receiving the 2 bit and the 4 bit from the input and providing the 4 bit at the output; and OR-inverter means for receiving the 2, 4 and 8 bits from the input to provide the 8 bit at the output; and wherein said exclusive OR circuit includes; a first AND circuit having inputs for receiving the 2 bit and the 4 bit; an inverting circuit for providing an output which is the inversion of the output of said first AND circuit; an OR circuit for receiving the 2 bit and the 4 bit; a second AND circuit for receiving the output of said OR circuit and the output of said inverting circuit whereby the output of said second AND circuit represents the 4 bit of the nine's complement of the input to the generator.

18. In a calculating circuit, a nine's complement generator consisting of; 1 bit, 2 bit, 4 bit, and 8 bit input terminals representing at a certain time an input of the binary-decimal system; 1 bit, 2 bit, 4 bit, and 8 bit output terminals representing an output in the binary-decimal system which is the nine's complement of the input presented to said input terminals at said certain time; a first inverting circuit joining said input and said output terminals for inverting the binary character of the 1 bit; a circuit connecting said input and said output terminals for transferring the binary character of the 2 bit from the former to the latter; a three-input OR circuit having its inputs connected to the 2 bit, 4 bit, and 8 bit input terminals and an inverting circuit in series with said OR circuit for inverting the output thereof to provide a binary 1 at the 8 bit output terminal when a binary 0 is present at the 2 bit, 4 bit, or 8 bit input terminals and a binary 0 at the 8 bit output terminal when a binary 1 is present at the 2 bit, 4 bit, or 8 bit input terminals; a first two-input AND circuit connected to the 2 bit and the 4 bit input terminals; a second inverting circuit connected to receive the output of said first two-input AND circuit for providing an output which is the inversion of the output of said first AND circuit; a two-input OR circuit connected to the 2 bit and the 4 bit input terminals; and a second two-input AND circuit having its output connected to the 4 bit output terminal and its inputs connected respectively to receive the output of said two-input OR circuit and the output of said second inverting circuit.

19. In an electronic computer system, an electronic latch circuit wherein outputs of component circuits may assume UP and DOWN voltage conditions including; a first AND circuit and a second AND circuit each having a plurality of inputs and an output; an OR circuit having an input connected to the output of each said AND circuit; means for causing all inputs of said first AND circuit to go UP simultaneously to cause the output of said OR circuit to go UP; and pulse delay means coupling the output of said OR circuit to an input of said second AND circuit to maintain the output of said OR circuit in the UP condition after all inputs of said first AND circuit go UP simultaneously; inverting means coupling the output of said pulse delay means to an input of said first AND circuit; cyclically operable means for causing the other of said inputs of said first AND circuit to go UP simultaneously; and third and fourth two-input AND circuits each having one input coupled to said pulse delay means and the other input coupled to said cyclically operable means to provide preselected outputs under the conjoint control of said OR circuit and said cyclically operable means; second and third latch circuits under the control of the output of said third AND circuit; first circuit means including pulse delay means under the control of said fourth AND circuit for providing a plurality of timed outputs; means transferring one of said timed outputs to the third latch circuit to conjointly control the operation of said third latch circuit; and control circuit means connected to control the operation of said circuit means conjointly with said fourth AND circuit.

20. The invention set forth in claim 19 including digit sensing means connected to said control circuit means to alter the time occurrence of said timed outputs under the control of the value of the digit sensed.

21. The invention set forth in claim 20 wherein said digit sensing means includes an adder for summing partial products to determine the digits of a product.

22. The invention set forth in claim 21 including; shifting register means for storing the digits of said product; and means connecting said shifting register means to said timed output to effect transfer of said digits from storage in said shifting register means when the digit sensed occupies a certain predetermined digit position of a product and has a value greater than zero.

23. An electronic multiplier including: first and second shifting register means providing a digit position of storage for each digit position of the product for storing the digits of the product; adding means for summing the partial products to serially provide the digits of the product for storing; means for selectively transferring each of the digits of the product and storing each said digit in one of said shifting register means; and control circuit means for rendering said electronic multiplier cyclically operable including, a connection from said adding means to transfer the digits of the product to said control circuit means, and means operable upon receipt of a non-zero digit occupying the highest digit position of the product to effect operation of said control circuit means in a different cyclic pattern to cause a shifting of said shifting register means and storage of said non-zero digit therein, wherein said means for selectively transferring each of the digits of the product includes switching and digit transfer means interconnecting said first and second shifting register means and said adding means wherein said receipt of said certain digit causes transfer of the digit stored in the lowest digit position of said first shifting register means to the highest digit position of said second shifting register means and the transfer of said certain digit to the highest digit position of said first shifting register means.

24. In a divider control circuit for controlling a divider which effects storage of the digit occupying each digit position of a quotient; first, second, third, fourth, and fifth electronic latches each having first and second input means and output means; a connection from said output means of each said latch to said second input means thereof so that operation of said first input means of each latch is a condition precedent to the operation of said second input means thereof; a plurality of output terminals selectively coupled to said latches; cyclic circuit control means for cyclically providing a plurality of pulses to control the operation of said latches, means coupling said latches and said cyclic circuit control means for receiving a constant voltage to initiate operation of said latches and said cyclic circuit control means, said voltage being coupled through delay, coincidence, and inverting circuit means to the first input means of said first latch; inverting means coupling the output means of said fifth latch to the first input means of said first latch to permit operation of said first latch in response to said constant voltage; and inverting means coupling the output means of said third latch to the first input means of said second latch to permit operation of said second latch in response to said cyclic control circuit.

25. The invention set forth in claim 24 including circuit means operable in response to the digit occupying the highest digit position of the quotient and connected to said fifth latch so that said cyclic circuit control means and said circuit means conjointly render said fifth latch operable to indicate the determination of all quotient digits.

26. A binary-decimal converter for selecting one of the multiples 1–9 inclusive of a multiplicand corresponding to the decimal digital value of a multiplier including; an AND circuit having a plurality of inputs and corresponding to each of said multiples for receiving that multiple serially in the binary-decimal system at an input thereof and selectively transferring that multiple; four converter inputs for receiving said multiplier, decimal digit by decimal digit, in the binary-decimal system; first circuit means coupling the 1 bit converter input to an input of each said AND circuit; second circuit means coupling the 2 bit converter input to an input of each said AND circuit, except that corresponding to the multiples 8 and 9; third circuit means coupling the 4 bit converter input to an input of each said AND circuit, except that corresponding to the multiples 8 and 9; and fourth circuit means coupling the 8 bit converter input to an input of each said AND circuit corresponding to the multiples 1, 8 and 9.

27. The binary-decimal converter set forth in claim 26 wherein the 1, 2, 4 and 8 bit converter inputs respectively are transferred without change in polarity to said AND circuits requiring a binary 1 of that bit value to represent the multiples transferable by that AND circuit and the inversion of the 1, 2, 4 and 8 bit converter inputs respectively are transferred to an input of the remaining AND circuits coupled thereto.

28. The invention set forth in claim 27 wherein the output of each said AND circuit is connected to a single converter output whereby the decimal value of a multiplier causes all inputs of only the AND circuit corresponding to that multiple of the multiplicand to be simultaneously energized and permit transfer of that multiple of the multiplicand therethrough to said converter output.

29. A circuit for selecting a binary coded value in accordance with its corresponding decimal value including; a first group of input terminals each for receiving a first binary coded value; a second group of input terminals for receiving a second binary coded value in parallel; an output terminal; a coincidence circuit corresponding to each decimal value receivable at said first group of input terminals; means interconnecting said coincidence circuits and said first and second groups of input terminals so that each representation from said second group of input terminals contained in the representation corresponding to each said coincidence circuit is connected to an input of that coincidence circuit.

30. A selection circuit wherein one of a first group of inputs is to be selected by all inputs applied to a selecting group of inputs and like values applied to each group of inputs is represented by like representations including; means for preselecting each of said first group of inputs; circuit means corresponding to each of said first group of inputs and responsive to transfer the preselected one of said inputs; and circuits coupling each of said selecting group of inputs to all said circuit means including a like representation so that one of said circuit means corresponding to a value equal to that at said selecting group of inputs is rendered responsive.

31. An electronic multiplier including; first and second shifting register means of predetermined digital storage capacity for effecting storage of the multiplicand and multiplier respectively and preselected digits of the product; circuit means for determining when the product digit occupying the digit position equal to the total digital capacity of said first and second shifting register means is greater than 0 to provide an output; and transfer means interconnecting said first and second shifting register means for receiving said output from said circuit means to shift said register means and thereby transfer a digit of the product occupying a preselected digit position thereof from a preselected one of said register means to the other.

32. In an electronic multiplier for providing the product of a multiplier and multiplicand: first and second shifting register means; means shifting said second shifting register means to receive in storage a preselected number of digits occupying the lowest digit positions of the product; means shifting said first shifting register means to receive in storage an additional preselected number of digits of the product; first circuit means for indicating the value of the digit occupying the last digit position of the product; second circuit means for causing a simultaneous shifting of said first and second shifting register means in response to the indication of the value of said digit occupying the last digit position of the product; and means coupling said first and second shifting register means for transferring a digit from storage in said second shifting register means to storage in said first shifting register means to permit storage in said first shifting register means of said digit occupying the last digit position of the product.

33. A multiplier including; first storage means for storing a multiplicand and digits of a product; second storage means for storing a multiplier and other digits of the product; means for selectively operating each said storage means to remove the digits of said multiplicand and multiplier respectively from storage and simultaneously effect storage of digits of the product therein; and means for simultaneously operating each said storage means when the number of product digits to be stored exceeds a predetermined number to effect a transfer of a product digit occupying a predetermined digit position of the product from said first storage means, storage thereof in said second storage means and storage by said first storage means of the next digit of the product to be stored.

34. A divider comprising first and second storage means for storing a dividend and divisor respectively; means connected to said first storage means for providing the 9's complement of said dividend; means connected to said second storage means for simultaneously providing the multiples 1–9 inclusive of said divisor, each of said multiples being provided serially by decimal digit; and circuit means for simultaneously combining the 9's complement of said divided respectively, with each of and said multiples of said divisor to provide the highest order quotient digit; means for maintaining said divisor available at said second storage means; means under control of said highest order quotient digit for providing the first partial dividend; and wherein said last mentioned means is successively controlled by each quotient digit in turn to provide the partial dividend corresponding thereto and said circuit means simultaneously combines each partial dividend, respectively with each of the multiples one through nine of the divisor to provide the next quotient digit.

35. An electronic divider including means for maintaining the divisor in storage throughout the division operation and simultaneously providing the multiples 1–9 thereof, each of said multiples being provided serially by decimal digit; and means for simultaneously combining each of said multiples, respectively with the dividend and the partial dividends in succession, whereby each quotient digit is determined correctly as a result of a plurality of operations occurring simultaneously.

36. In an electronic divider, means for simultaneously adding, serially by decimal digit, each of the multiples 1–9 of the divisor, respectively to the 9's complement of the dividend and partial dividends, in succession, to determine the corresponding quotient digit from the presence and absence of a 9 in predetermined digit positions of the sums thereof; and means under the the control of each quotient digit to select the corresponding multiple of the divisor required to determine the next partial dividend.

37. In an electronic divider; first register means for receiving a dividend and shifting that dividend to the right in a step by step fashion; a dividend loop including time delay circuits, a first electronic switch having inputs connected to the outputs of said time delay circuits, a second electronic switch, means coupling the outputs of said time delay circuits to inputs of said second electronic switch, a first binary-decimal adder having two groups of inputs, one group of inputs of said binary decimal adder being coupled to the outputs of said second electronic switch, and connections from the outputs of said adder to the inputs of said time delay circuits; a 9's complement generator coupling said first register means to the other inputs of said first electronic switch to transfer the 9's complement of said dividend therethrough; circuit means for permitting operation of said first electronic switch in response to said first 9's complement of said dividend to effect transfer of the 9's complement of said dividend into said dividend loop; and means permitting circulation of the 9's complement of said dividend through said dividend loop.

38. The invention set forth in claim 37 including circuit means connected to the other group of inputs of said adder for receiving a predetermined multiple of a divisor thereat to provide a partial dividend at the outputs of said adder; and timing means for timing the circulation of said partial dividend in said loop.

39. The invention set forth in claim 38 including second register means for receiving and storing a divisor, shifting that divisor to the right in step by step fashion and re-storing said divisor; and product generator means for accepting said divisor when it is shifted out of said second register means to the right and providing the multiples 1–9 respectively thereof.

40. The invention set forth in claim 39 including a selector switch corresponding to each of said multiples, each selector switch receiving all of said multiples and transferring only the multiple corresponding thereto; binary-decimal adding means corresponding to each said multiple; and circuit means coupling said dividend loop to inputs of each binary-decimal adding means so that each adding means may add the 9's complement of the dividend to the multiple of the divisor corresponding to that means to determine said predetermined multiple.

41. The invention set forth in claim 40 including a quotient generator connected to receive carry indications from said binary-decimal adding means and provide the highest order quotient digit therefrom.

42. The invention set forth in claim 41 including means transferring said highest order quotient digit to said first register means to cause said first register means to shift left and accept said quotient digit into storage and wherein said circuit means is coupled to said first register means and controlled by said highest order quotient digit to permit reception of a multiple of the divisor corresponding thereto.

43. The invention set forth in claim 42 wherein said circuit means includes a selector switch connected to receive the multiples 1–9 inclusive of the divisor; and a binary to decimal converter under the control of said highest order quotient digit and coupled to said selector switch to permit passage therethrough of a single multiple of the divisor corresponding to the value of said quotient digit.

44. The invention set forth in claim 43 including control circuit means for operating said divider to provide subsequent quotient digits.

45. An electronic divider including circuit means for simultaneously adding, serially by decimal digit, the multiples 1–9 inclusive of a divisor to a complement of the dividend to determine the quotient digit occupying the highest digit position of the quotient; and means under the control of said quotient digit to determine the complement of the first partial dividend.

46. The invention set forth in claim 45 including means for simultaneously adding, serially by decimal digit, the multiples 1–9 inclusive of said divisor to the complement of said first partial dividend to provide the quotient digit occupying the next lower digit position of the quotient and the complement of the second partial dividend and to provide subsequent quotient digits.

47. In a calculator, first means for storing and exhibiting a first operand having a predetermined number of digits; second means for storing and exhibiting a second operand having a predetermined number of digits; arithmetic means receiving and combining said operands to fabricate, digit by digit, an arithmetic result having a predetermined number of digits during a given cycle of said arithmetic means; control circuit means sensing the value of one of the digits of said arithmetic result and providing an indication thereby that said result properly includes more than the last mentioned predetermined number of digits; and circuit means receiving said indication and responsive thereto to extend the cycle of said arithmetic means beyond said given cycle in time to permit said arithmetic means to fabricate an additional digit of said result.

48. An electronic divider wherein the one through nine multiples of the divisor are respectively, simultaneously, effectively subtracted from the dividend, each effective subtraction being performed serially by decimal digit, said electronic divider including: means for simultaneously determining the presence and absence of carries from the effective subtraction of the multiples one through nine inclusive of a divisor from a dividend; and circuit means connected to be rendered operative by the determination of the presence and absence of said carries to electrically manifest the highest multiple of said divisor which does not exceed the dividend; wherein said means for determining the presence and absence of said carries includes, a plurality of binary-coded decimal adding means each for simultaneously adding a complement of the dividend to the respective multiples of the divisor; wherein said circuit means includes, a plurality of circuits each connected to simultaneously receive electrical manifestations of the presence and absence of carries from said effective subtraction of each two successive multiples of the divisor, except the ninth; and an inverter connected to receive electrical manifestations of the presence and absence of carry from said effective subtraction of the nine multiple of the divisor, whereby only said circuit which is operative receives an electrical manifestation that carry is present and an electrical manifestation that carry is absent.

49. In an electronic divider wherein the one through nine multiples of the divisor are respectively, simultaneously, effectively subtracted from the dividend, each effective subtraction being performed serially by decimal digit, said electronic divider including: means for simultaneously deriving groups of nine outputs from the comparison of the dividend and partial dividend, in turn, with each decimal digital multiple of the divisor; means connected to receive each said group of nine outputs to provide, in turn, the quotient digit required to obtain the next partial dividend; means under the control of each said quotient digit for selecting the multiple of the divisor corresponding to that quotient digit; means for effectively subtracting the first selected multiple of the divisor from the dividend to obtain the first partial dividend and for substracting each subsequently selected multiple of the divisor from the existing partial dividend to provide the next partial dividend; and wherein each said quotient digit is first provided in the decimal system, and decimal to binary decimal converter means is provided to represent the quotient digits in the binary-decimal system to enable sequential selection of the multiples of the divisor.

50. In an electronic divider circuit including: first shifting register means for storing a first operand; second shifting register means for storing a second operand; means for simultaneously forming, serially by decimal digit, the multiples one through nine inclusive of said first operand; a plurality of selector switches for respectively accepting said one through nine multiples of said operand; circuit means controlling each selected switch to permit passage of a preselected one of said multiples therethrough; adding means corresponding to each said selector switch for receiving said selected multiples; and means coupling said second shifting register means to said adding means and said circuit means to control the additions performed by said adding means.

References Cited in the file of this patent

UNITED STATES PATENTS

| | | |
|---|---|---|
| 2,295,448 | Bryce et al. | Sept. 8, 1942 |
| 2,328,610 | Bryce et al. | Sept. 7, 1943 |
| 2,401,621 | Desch et al. | June 4, 1946 |
| 2,444,042 | Hartley et al. | June 29, 1948 |
| 2,643,820 | Williams et al. | June 30, 1953 |
| 2,672,283 | Havens | Mar. 16, 1954 |
| 2,685,407 | Robinson | Aug. 3, 1954 |
| 2,686,632 | Wilkinson | Aug. 17, 1954 |
| 2,700,504 | Thomas | Jan. 25, 1955 |
| 2,701,095 | Stibitz | Feb. 1, 1955 |
| 2,703,201 | Woods-Hill et al. | Mar. 1, 1955 |
| 2,703,202 | Cartwright | Mar. 1, 1955 |
| 2,722,375 | Chenus | Nov. 1, 1955 |
| 2,731,201 | Harper | Jan. 17, 1956 |
| 2,745,599 | Woods-Hill et al. | May 15, 1956 |
| 2,749,037 | Stibitz | June 5, 1956 |
| 2,758,787 | Felker | Aug. 14, 1956 |
| 2,761,621 | Wright et al. | Sept. 4, 1956 |
| 2,786,628 | Kilburn | Mar. 26, 1957 |
| 2,798,667 | Spielberg et al. | July 9, 1957 |
| 2,800,276 | Harper | July 23, 1957 |

(Other references on following page)

UNITED STATES PATENTS

| | | | |
|---|---|---|---|
| 2,834,543 | Burkhart | May 13, | 1958 |
| 2,846,142 | Strachey et al. | Aug. 5, | 1958 |
| 2,850,233 | Blankenbaker | Sept. 2, | 1958 |
| 2,856,126 | Kilburn | Oct. 14, | 1958 |
| 2,881,978 | Kilburn et al. | Apr. 14, | 1959 |
| 2,895,672 | Dickinson | July 21, | 1959 |
| 2,913,179 | Gordon | Nov. 17, | 1959 |

OTHER REFERENCES

A Functional Description of the Edvac-Moore School of Elec. Eng. Univ. of Penna., Philadelphia, Pa., November 1949, vol. I, pp. 4–19 to 4–22 and vol. II, FIG. 104–3LD–2.

Synthesis of Electronic Computing and Control Circuits-Computation Laboratory, Harvard U., Harvard U. Press, Cambridge, Mass., 1951, pp. 151, 200–285.

Berkely et al.: How an Electronic Brain Works, Electronics, September 1951, pp. 45–47.

Felker: Typical Block Diagrams for a Transistor Digital Computer, Electrical Engineering, December 1952, pp. 1103–1108.

Seac-Greenwald et al.: Proc. of the IRE, October 1953, pp. 1309–1310.